US 6,748,101 B1

(12) United States Patent
Jones et al.

(10) Patent No.: US 6,748,101 B1
(45) Date of Patent: Jun. 8, 2004

(54) AUTOMATIC CURRENCY PROCESSING SYSTEM

(75) Inventors: William J. Jones, Kenilworth, IL (US); Douglas U. Mennie, Barrington, IL (US); Mark C. Munro, Park Ridge, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 30 days.

(21) Appl. No.: 09/676,349

(22) Filed: Sep. 29, 2000

Related U.S. Application Data

(63) Continuation of application No. 09/028,162, filed on Feb. 23, 1998, now Pat. No. 6,128,402, which is a continuation of application No. 08/824,073, filed on Mar. 24, 1997, now Pat. No. 5,905,810, which is a continuation of application No. 08/433,920, filed on May 2, 1995, now abandoned.

(51) Int. Cl.[7] ................................................. G06K 9/00
(52) U.S. Cl. ......................... 382/135; 705/43; 235/379; 902/11
(58) Field of Search ................................ 382/135–140, 382/318, 319, 321; 209/534; 250/559.11; 194/206, 207; 356/71; 705/43; 235/379, 380; 902/4, 11, 15

(56) References Cited

U.S. PATENT DOCUMENTS

| 2,669,998 A | 2/1954 | Buchholz ........................ 133/8 |
| 2,750,949 A | 6/1956 | Kulo et al. .................... 133/8 |

(List continued on next page.)

FOREIGN PATENT DOCUMENTS

| EP | 0077464 A2 | 4/1983 |
| EP | 0101115 | 2/1984 |
| EP | 0109743 | 5/1984 |
| EP | 0342647 A2 | 5/1989 |
| EP | 0325364 | 7/1989 |
| EP | 0338123 | 10/1989 |
| EP | 0583526 A1 | 8/1992 |
| EP | 0583723 A1 | 8/1993 |
| EP | 0633553 A1 | 1/1995 |
| GB | 2190996 | 12/1987 |
| WO | WO 90/07165 | 6/1990 |
| WO | WO 91/11778 | 8/1991 |
| WO | WO 92/17394 | 10/1992 |
| WO | WO 93/23824 | 11/1993 |
| WO | WO 94/16412 | 7/1994 |

OTHER PUBLICATIONS

Molser Inc. brochure "The Mosler/Toshiba CF–420", 1989.
AFB Currency Recognition System (1982).

(List continued on next page.)

*Primary Examiner*—Phuoc Tran
(74) *Attorney, Agent, or Firm*—Jenkens & Gilchrist

(57) ABSTRACT

An apparatus for currency discrimination comprises first and second stationary scanheads, disposed on opposite sides of a bill transport path, for scanning respective first and second opposing surfaces of a bill traveling along the bill transport path and for producing respective output signals. The bill travels along the transport path in the direction of a predetermined dimension of the bill. A memory stores master characteristic patterns corresponding to associated predetermined surfaces of a plurality of denominations of genuine bills. Sampling circuitry samples the output signals associated with the respective first and second opposing surfaces of the scanned bill. A signal processor is programmed to determine which one of the first and second opposing surfaces corresponds to the associated predetermined surfaces of the plurality of denominations of genuine bills. The processor then correlates the output signal associated with the one of the first and second opposing surfaces corresponding to the associated predetermined surfaces with the master characteristic patterns to identify the denomination of the scanned bill.

48 Claims, 89 Drawing Sheets

U.S. PATENT DOCUMENTS

| | | | |
|---|---|---|---|
| 2,835,260 A | 5/1958 | Buchholz | 133/8 |
| 3,246,295 A | 4/1966 | De Claris et al. | 382/56 |
| 3,280,974 A | 10/1966 | Riddle et al. | 209/111.8 |
| 3,480,785 A | 11/1969 | Aufderheide | 250/219 |
| 3,496,370 A | 2/1970 | Haville et al. | 250/219 |
| 3,509,535 A | 4/1970 | Berube | 340/149 |
| 3,612,835 A | 10/1971 | Andrews et al. | 235/61.11 D |
| 3,679,314 A | 7/1972 | Mustert | 356/71 |
| 3,764,899 A | 10/1973 | Peterson | 324/61 R |
| 3,788,628 A | 1/1974 | Novak et al. | 250/556 |
| 3,800,078 A | 3/1974 | Cochran et al. | 178/7.1 |
| 3,806,710 A | 4/1974 | Shigemori et al. | 235/92 |
| 3,815,021 A | 6/1974 | Kerr | 324/61 R |
| 3,842,281 A | 10/1974 | Goodrich | 250/461 |
| 3,870,629 A | 3/1975 | Carter et al. | 209/111.8 |
| 3,906,449 A | 9/1975 | Marchak | 340/149 R |
| 3,976,198 A | 8/1976 | Carnes et al. | 209/111.7 T |
| 4,041,456 A | 8/1977 | Ott et al. | 346/146.3 |
| 4,096,991 A | 6/1978 | Iguchi | 235/419 |
| 4,114,804 A | 9/1978 | Jones et al. | 235/476 |
| 4,147,430 A | 4/1979 | Gorgone et al. | 356/51 |
| 4,179,685 A | 12/1979 | O'Maley | 382/135 |
| 4,205,780 A | 6/1980 | Burns et al. | 235/454 |
| 4,250,806 A | 2/1981 | Boyson et al. | 101/2 |
| 4,255,651 A | 3/1981 | Phillips | 235/92 |
| 4,264,808 A | 4/1981 | Owens et al. | 235/379 |
| 4,277,774 A | 7/1981 | Fujii et al. | 340/146.3 |
| 4,283,708 A | 8/1981 | Lee | 340/146.3 Z |
| 4,288,781 A | 9/1981 | Sellner et al. | 340/146.3 Q |
| 4,302,781 A | 11/1981 | Ikeda et al. | 358/486 |
| 4,310,885 A | 1/1982 | Azcua et al. | 364/405 |
| 4,311,914 A | 1/1982 | Huber | 250/556 |
| 4,337,864 A | 7/1982 | McLean | 209/534 |
| 4,348,656 A | 9/1982 | Gorgone et al. | 340/146.3 R |
| 4,349,111 A | 9/1982 | Shah et al. | 209/534 |
| 4,352,988 A | 10/1982 | Ishida | 250/559 |
| 4,355,300 A | 10/1982 | Weber | 340/146.3 C |
| 4,355,369 A | 10/1982 | Garvin | 364/900 |
| 4,356,473 A | 10/1982 | Freudenthal | 340/146.3 H |
| 4,360,034 A | 11/1982 | Davila et al. | 133/3 |
| 4,381,447 A | 4/1983 | Horvath et al. | 250/223 |
| 4,386,432 A | 5/1983 | Niakamura et al. | 382/7 |
| 4,396,902 A | 8/1983 | Warthan et al. | 382/64 |
| 4,416,299 A | 11/1983 | Bergman | 133/1 R |
| 4,442,541 A | 4/1984 | Finkel et al. | 382/7 |
| 4,461,028 A | 7/1984 | Okubo | 382/15 |
| 4,464,786 A | 8/1984 | Nishito et al. | 382/7 |
| 4,464,787 A | 8/1984 | Fish et al. | 382/7 |
| 4,480,177 A | 10/1984 | Allen | 235/379 |
| 4,490,846 A | 12/1984 | Ishida et al. | 382/7 |
| 4,513,439 A | 4/1985 | Gorgone et al. | 382/7 |
| 4,530,067 A | 7/1985 | Dorr | 364/900 |
| 4,538,719 A | 9/1985 | Gray et al. | 194/100 A |
| 4,539,702 A | 9/1985 | Oka | 382/7 |
| 4,543,969 A | 10/1985 | Rasmussen | 133/3 |
| 4,553,222 A | 11/1985 | Kurland et al. | 364/900 |
| 4,556,140 A | 12/1985 | Okada | 194/4 |
| 4,558,224 A | 12/1985 | Gober | 250/460.1 |
| 4,563,771 A | 1/1986 | Gorgone et al. | 382/7 |
| 4,567,370 A | 1/1986 | Falls | 250/461.1 |
| 4,569,421 A | 2/1986 | Sandstedt | 186/39 |
| 4,582,172 A | 4/1986 | Takeuchi et al. | 186/38 |
| 4,587,412 A | 5/1986 | Apisdorf | 235/449 |
| 4,587,434 A | 5/1986 | Roes et al. | 250/556 |
| 4,592,090 A | 5/1986 | Curl et al. | 382/7 |
| 4,593,184 A | 6/1986 | Bryce | 235/449 |
| 4,594,664 A | 6/1986 | Hashimoto | 364/405 |
| 4,617,458 A | 10/1986 | Bryce | 235/449 |
| 4,628,194 A | 12/1986 | Dobbins et al. | 235/379 |
| 4,645,936 A | 2/1987 | Gorgone | 250/556 |
| 4,653,647 A | 3/1987 | Hashimoto | 209/534 |
| 4,658,289 A | 4/1987 | Natano et al. | 358/75 |
| 4,676,343 A | 6/1987 | Humble et al. | 186/61 |
| 4,677,682 A | 6/1987 | Miyagawa et al. | 382/7 |
| 4,697,071 A | 9/1987 | Hiraoka et al. | 235/379 |
| 4,700,368 A | 10/1987 | Munn et al. | 377/8 |
| 4,716,456 A | 12/1987 | Hosaka | 358/75 |
| 4,733,308 A | 3/1988 | Nakamura et al. | 358/496 |
| 4,735,289 A | 4/1988 | Kenyon | 186/37 |
| 4,743,974 A | 5/1988 | Lockwood | 358/285 |
| 4,753,625 A | 6/1988 | Okada | 453/32 |
| 4,782,328 A | 11/1988 | Denlinger | 340/365 |
| 4,806,709 A | 2/1989 | Evans | 178/19 |
| 4,811,004 A | 3/1989 | Person et al. | 340/712 |
| 4,821,332 A | 4/1989 | Durham | 382/7 |
| 4,823,393 A | 4/1989 | Kawakami | 382/7 |
| 4,825,246 A | 4/1989 | Fukuchi et al. | 355/4 |
| 4,827,531 A | 5/1989 | Milford | 382/7 |
| 4,837,842 A | 6/1989 | Holt | 382/26 |
| 4,841,358 A | 6/1989 | Kammoto et al. | 358/75 |
| 4,851,616 A | 7/1989 | Wales et al. | 178/18 |
| 4,877,230 A | 10/1989 | Winkler et al. | 271/3 |
| 4,881,268 A | 11/1989 | Uchida et al. | 382/7 |
| 4,883,181 A | 11/1989 | Yoshikawa | 209/534 |
| 4,888,812 A | 12/1989 | Dinan et al. | 382/7 |
| 4,903,953 A | 2/1990 | Winkler et al. | 271/4 |
| 4,905,840 A | 3/1990 | Yuge et al. | 209/534 |
| 4,908,516 A | 3/1990 | West | 250/556 |
| 4,928,094 A | 5/1990 | Smith | 340/712 |
| 4,931,782 A | 6/1990 | Jackson | 340/706 |
| 4,954,697 A | 9/1990 | Kokubun et al. | 235/381 |
| 4,970,655 A | 11/1990 | Winn et al. | 364/479 |
| 4,973,851 A | 11/1990 | Lee | 250/556 |
| 4,980,543 A | 12/1990 | Hara | |
| 4,992,860 A | 2/1991 | Hamaquchi et al. | 358/75 |
| 4,996,604 A | 2/1991 | Oqawa et al. | 358/486 |
| 5,023,782 A | 6/1991 | Lutz et al. | 364/405 |
| 5,047,871 A | 9/1991 | Meyer et al. | 358/486 |
| 5,054,621 A | 10/1991 | Murphy et al. | 209/534 |
| 5,063,599 A | 11/1991 | Concannon et al. | 382/7 |
| 5,068,519 A | 11/1991 | Bryce | 235/449 |
| 5,076,441 A | 12/1991 | Gerlier | 209/534 |
| 5,091,961 A | 2/1992 | Baus, Jr. | 382/7 |
| 5,105,601 A | 4/1992 | Horiguchi et al. | 53/465 |
| 5,114,381 A | 5/1992 | Ueda et al. | 453/57 |
| 5,122,754 A | 6/1992 | Gotaas | 324/676 |
| 5,134,663 A | 7/1992 | Kozlowski | 382/7 |
| 5,141,443 A | 8/1992 | Rasmussen et al. | 453/10 |
| 5,146,512 A | 9/1992 | Weideman et al. | 382/30 |
| 5,151,607 A | 9/1992 | Crane | 250/556 |
| 5,163,868 A | 11/1992 | Adams et al. | 453/11 |
| 5,167,313 A | 12/1992 | Dobbins et al. | 194/317 |
| 5,183,142 A | 2/1993 | Latchinian et al. | 194/206 |
| 5,184,115 A | 2/1993 | Black et al. | 340/708 |
| 5,187,750 A | 2/1993 | Behera | 382/7 |
| 5,193,121 A | 3/1993 | Elischer et al. | 382/7 |
| 5,198,976 A | 3/1993 | Form et al. | 364/410 |
| 5,231,381 A | 7/1993 | Duwaer | 340/712 |
| 5,237,158 A | 8/1993 | Kern et al. | 235/379 |
| 5,239,593 A | 8/1993 | Wittner et al. | 382/14 |
| 5,261,518 A | 11/1993 | Bryce | 194/206 |
| 5,277,651 A | 1/1994 | Rasmussen et al. | 453/10 |
| 5,295,196 A | 3/1994 | Raterman et al. | 382/7 |
| 5,297,030 A | 3/1994 | Vassigh et al. | 364/405 |
| 5,299,977 A | 4/1994 | Mazur et al. | 453/10 |
| 5,304,813 A | 4/1994 | De Man | 250/556 |
| 5,317,140 A | 5/1994 | Dunthorn | 250/221 |
| 5,321,238 A | 6/1994 | Kamata et al. | 235/379 |
| 5,335,292 A | 8/1994 | Lovelady et al. | 382/17 |
| 5,342,165 A | 8/1994 | Graef et al. | 414/788.9 |
| 5,363,949 A | 11/1994 | Matsubayashi | 194/206 |

| | | | |
|---|---|---|---|
| 5,371,345 A | 12/1994 | LeStrange et al. | 235/380 |
| 5,379,344 A | 1/1995 | Larsson et al. | 380/23 |
| 5,381,019 A | 1/1995 | Sato | 250/556 |
| 5,429,550 A | 7/1995 | Mazur et al. | 453/10 |
| 5,438,184 A | 8/1995 | Roberts et al. | 235/380 |
| 5,444,793 A | 8/1995 | Kelland | 382/138 |
| 5,459,304 A | 10/1995 | Eisenmann | 235/380 |
| 5,465,301 A | 11/1995 | Jotcham et al. | 380/54 |
| 5,467,405 A | 11/1995 | Raterman et al. | 382/135 |
| 5,467,406 A | 11/1995 | Graves et al. | 382/135 |
| 5,507,379 A | 4/1996 | Mazur et al. | 194/318 |
| 5,530,772 A | 6/1996 | Storey | 382/135 |
| 5,542,880 A | 8/1996 | Geib et al. | 453/10 |
| 5,544,043 A | 8/1996 | Miki et al. | 364/406 |
| 5,577,589 A | 11/1996 | Garcia Tinoco | 194/204 |
| 5,602,933 A | 2/1997 | Blackwell et al. | 382/116 |
| 5,602,936 A | 2/1997 | Green et al. | 382/140 |
| 5,630,494 A | 5/1997 | Strauts | 194/317 |
| 5,633,949 A | 5/1997 | Graves et al. | 382/135 |
| 5,640,463 A | 6/1997 | Csulits | 382/135 |
| 5,652,802 A | 7/1997 | Graves et al. | 382/135 |
| 5,724,438 A | 3/1998 | Graves | 382/135 |
| 5,751,840 A | 5/1998 | Raterman et al. | 382/135 |
| 5,790,693 A | 8/1998 | Graves et al. | 382/135 |
| 5,790,697 A | 8/1998 | Munro et al. | 382/135 |
| 5,806,650 A | 9/1998 | Mennie et al. | 194/206 |
| 5,815,592 A | 9/1998 | Mennie et al. | 382/135 |
| 5,822,448 A | 10/1998 | Graves et al. | 382/135 |
| 5,832,104 A | 11/1998 | Graves et al. | 382/135 |
| 5,867,589 A | 2/1999 | Graves et al. | 382/135 |
| 5,870,487 A | 2/1999 | Graves et al. | 382/135 |
| 5,875,259 A | 2/1999 | Mennie et al. | 382/135 |
| 5,905,810 A * | 5/1999 | Jones et al. | 382/135 |
| 5,909,502 A | 6/1999 | Mazur | 382/135 |
| 5,909,503 A | 6/1999 | Graves et al. | 382/135 |
| 5,912,982 A | 6/1999 | Munro et al. | 382/135 |
| 5,938,044 A | 8/1999 | Weggesser | 209/534 |
| 5,943,655 A | 8/1999 | Jacobson | 705/30 |
| 5,960,103 A | 9/1999 | Graves et al. | 382/135 |
| 5,966,456 A | 10/1999 | Jones et al. | 382/135 |
| 5,982,918 A | 11/1999 | Mennie et al. | 382/135 |
| 5,992,601 A | 11/1999 | Mennie et al. | 194/207 |
| 6,012,564 A | 1/2000 | Mukai | 194/206 |
| 6,012,565 A | 1/2000 | Mazur | 194/207 |
| 6,026,175 A | 2/2000 | Munro et al. | 382/135 |
| 6,028,951 A | 2/2000 | Raterman et al. | 382/135 |
| 6,068,194 A | 5/2000 | Mazur | 235/492 |
| 6,072,896 A | 6/2000 | Graves et al. | 382/135 |
| 6,073,744 A | 6/2000 | Raterman et al. | 194/207 |
| 6,074,334 A | 6/2000 | Mennie et al. | 493/438 |
| 6,128,402 A | 10/2000 | Jones et al. | 382/135 |
| 6,220,419 B1 | 4/2001 | Menie | 194/207 |
| 6,234,294 B1 | 5/2001 | Defeo et al. | 194/207 |
| 6,237,739 B1 | 5/2001 | Mazur et al. | 194/207 |
| 6,241,069 B1 | 6/2001 | Mazur et al. | 194/207 |
| 6,256,407 B1 | 7/2001 | Mennie et al. | 382/135 |
| 6,278,795 B1 | 8/2001 | Anderson et al. | 382/135 |
| 6,311,819 B1 | 11/2001 | Stromme et al. | 194/207 |
| 6,318,537 B1 | 11/2001 | Jones et al. | 194/346 |
| 6,351,551 B1 | 2/2002 | Munro et al. | 382/135 |
| 6,363,164 B1 | 3/2002 | Jones et al. | 382/135 |
| 6,371,303 B1 | 4/2002 | Klein et al. | 209/534 |
| 6,378,683 B2 | 4/2002 | Mennie | 194/207 |
| 6,381,354 B1 | 4/2002 | Mennie et al. | 382/135 |
| 6,398,000 B1 | 6/2002 | Jenrick et al. | 194/200 |
| 2001/0019624 A1 | 9/2001 | Raterman et al. | 382/135 |
| 2002/0001393 A1 | 1/2002 | Jones et al. | 382/100 |
| 2002/0020603 A1 | 2/2002 | Jones et al. | 194/346 |
| 2002/0056605 A1 | 5/2002 | Mazur et al. | 194/207 |
| 2002/0085245 A1 | 7/2002 | Mennie et al. | 358/498 |
| 2002/0085745 A1 | 7/2002 | Jones et al. | 382/135 |
| 2002/0103757 A1 | 8/2002 | Jones et al. | 705/45 |
| 2002/0104785 A1 | 8/2002 | Klein et al. | 209/534 |
| 2002/0107801 A1 | 8/2002 | Jones et al. | 705/45 |
| 2002/0118871 A1 | 8/2002 | Jones et al. | 382/137 |

OTHER PUBLICATIONS

JetScan Currency/Counter, Model 4060, Operator's Manual by Cummins–Allison (8/91).

Sale of JetScan Currency Scanner/Counter, Model 4060 (8/91).

JetScan Currency Scanner/Counter, Model 4061, Operating Instructions by Cummins–Allison (Apr. 20, 1993).

Sale of JatScan Currency Scanner/Counter, Model 4061 (Apr. 20, 1993).

JetScan Currency Scanner/Counter, Model 4062, Operating Instructions by Cummins–Allison (Nov. 28, 1994).

Sale of JetScan Currency Scanner/Counter, Model 4062 (Nov. 28, 1994).

Translation of EP 0 077 464 A2.

Translation of EP 0 342 647 A2.

Brochure (2 pages) for Mach 7 High–Speed Coin Sorter/Counter, Brandt; dated Apr. 1, 1993.

Brochure (2 pages) for Model 8904 Upfeed, High Speed 4–Denomination Currency Dispenser; Brandt; dated prior to May 1995.

Operating Instructions (11 pages) for JetSort® High Speed Sorter/Counter (Kits I & J); Cummins–Allison Corp., dated 1993.

Toshiba Fitness Sorter, CF–400 Series; 6 pages; estimated 1989 or earlier.

Brochure for Cash Depositing Systems CDS 5700 and CDS 5800 (with translation); De La Rue Garny GmbH; date Jan. 3, 1995.

Brochure: PREMA 405 (RE) Self Service Coin Deposit Facility; date prior to Mar. 1995.

Brochure: Scan Coin CDS 600 Cash Deposit System; date Jun. 15, 1994.

Brochure: Scan Coin CDS 640 Cash Deposit System (with translation); date Jun. 15, 1994.

Brochure: Cash Receipt System CRS/6501/CRS6510;IREIS; date 2/95.

Cassius Elston, "No More Lines . . . Self Serve Cash–Out", DropStream Developments; pps.3–4; date: prior to Sep. 1994.

Brochure for ISH 12005/500 SB–Münzähler (with translation), date prior to Mar. 1995.

Brochure for ISH 12005/501 SB–Münzähler (with translation); date prior to Mar. 1995.

Brochure for NGZ 2100; date prior to Mar. 1995.

Brochure for Contomat; date prior to Mar. 1995.

Barton, Louis L., "Check Processing Operations," Chapter 8 and Appendix 2, 1994, pp. 119–140 and 225–231.

* cited by examiner

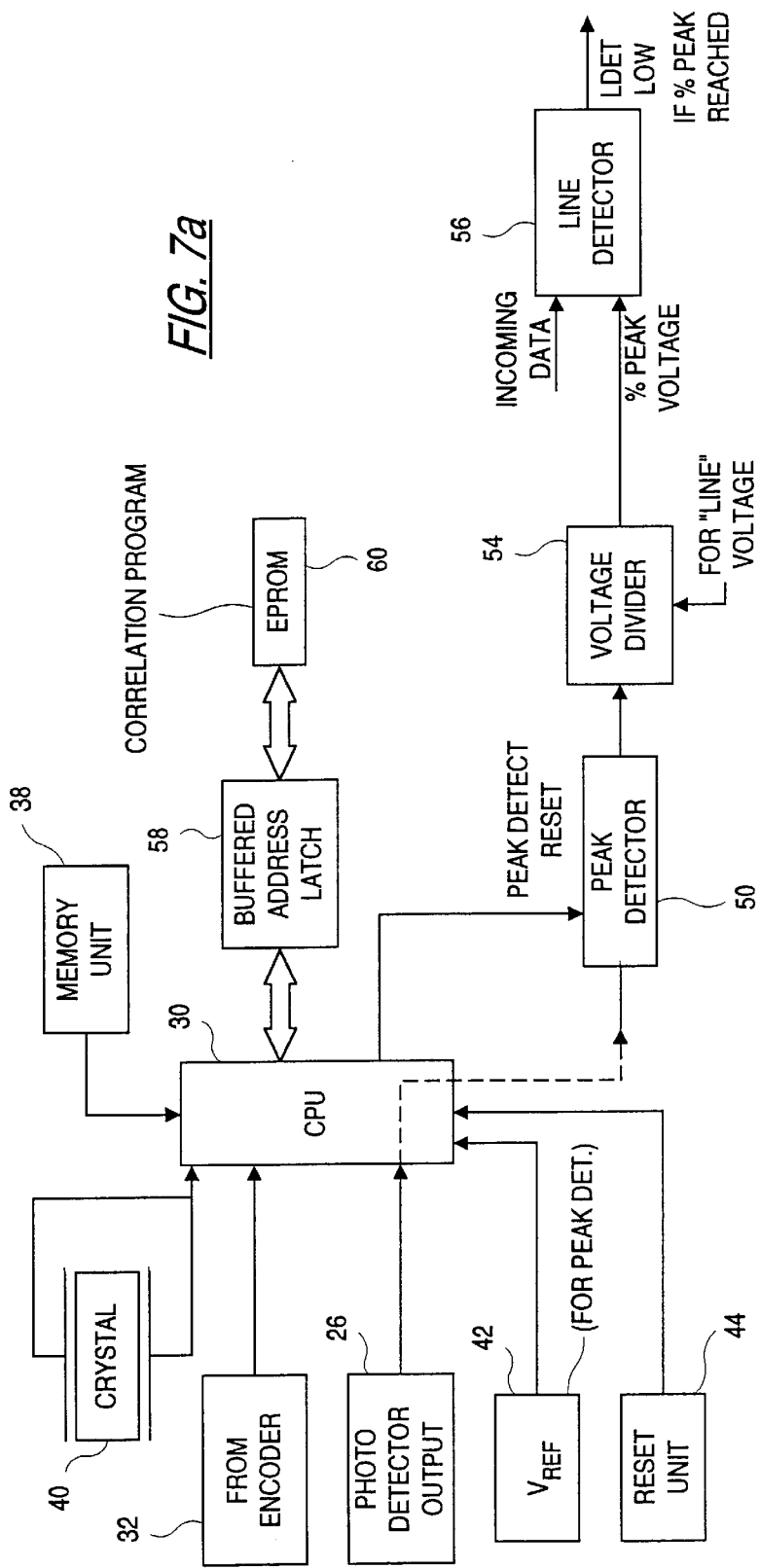
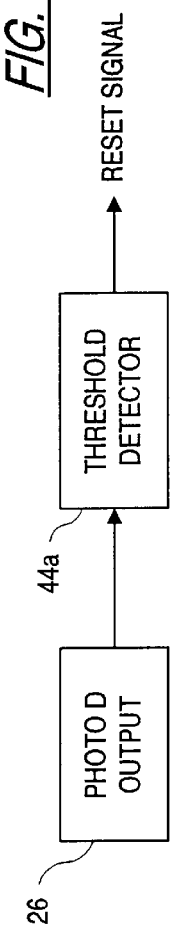
FIG. 7a
FIG. 7b

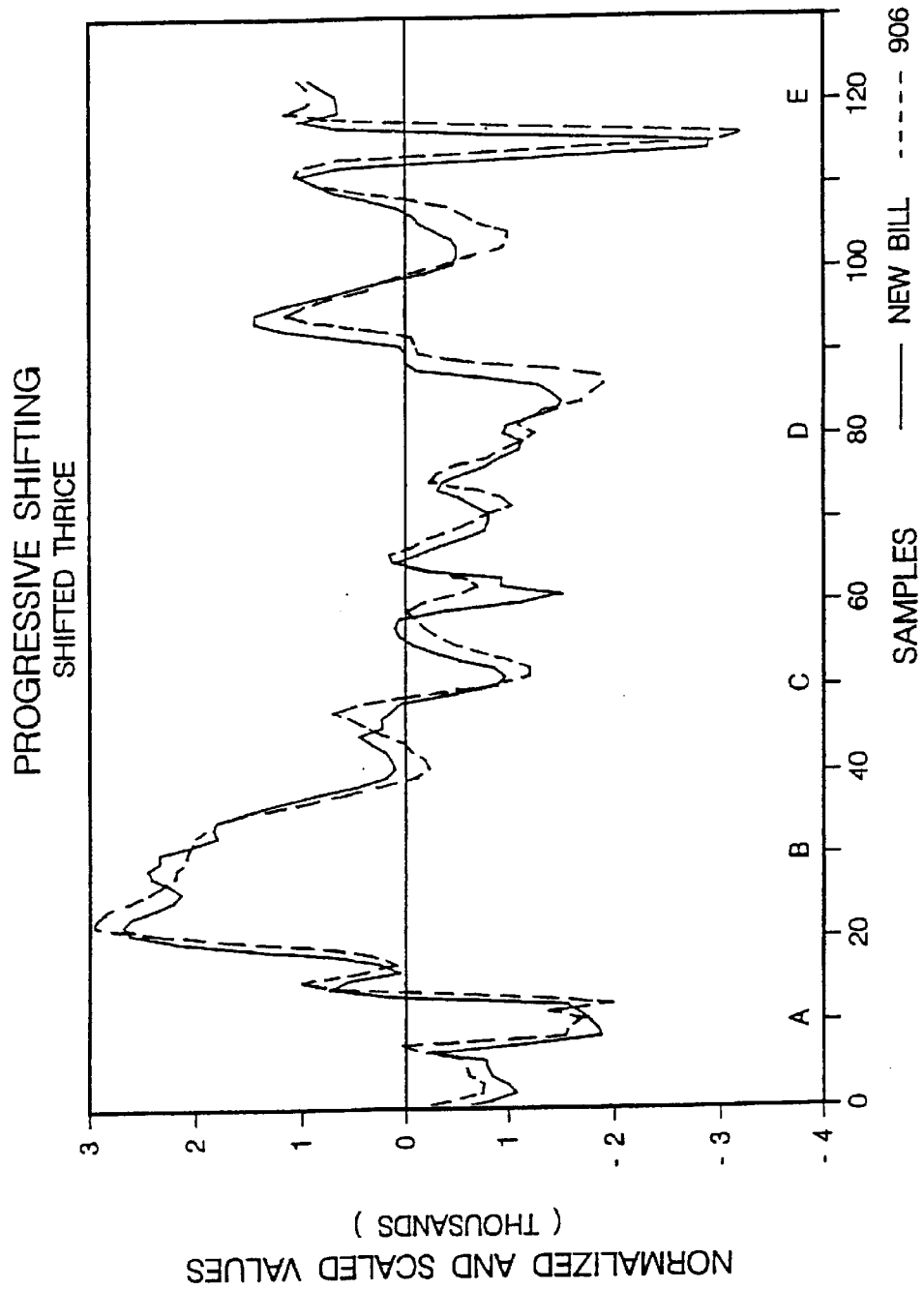

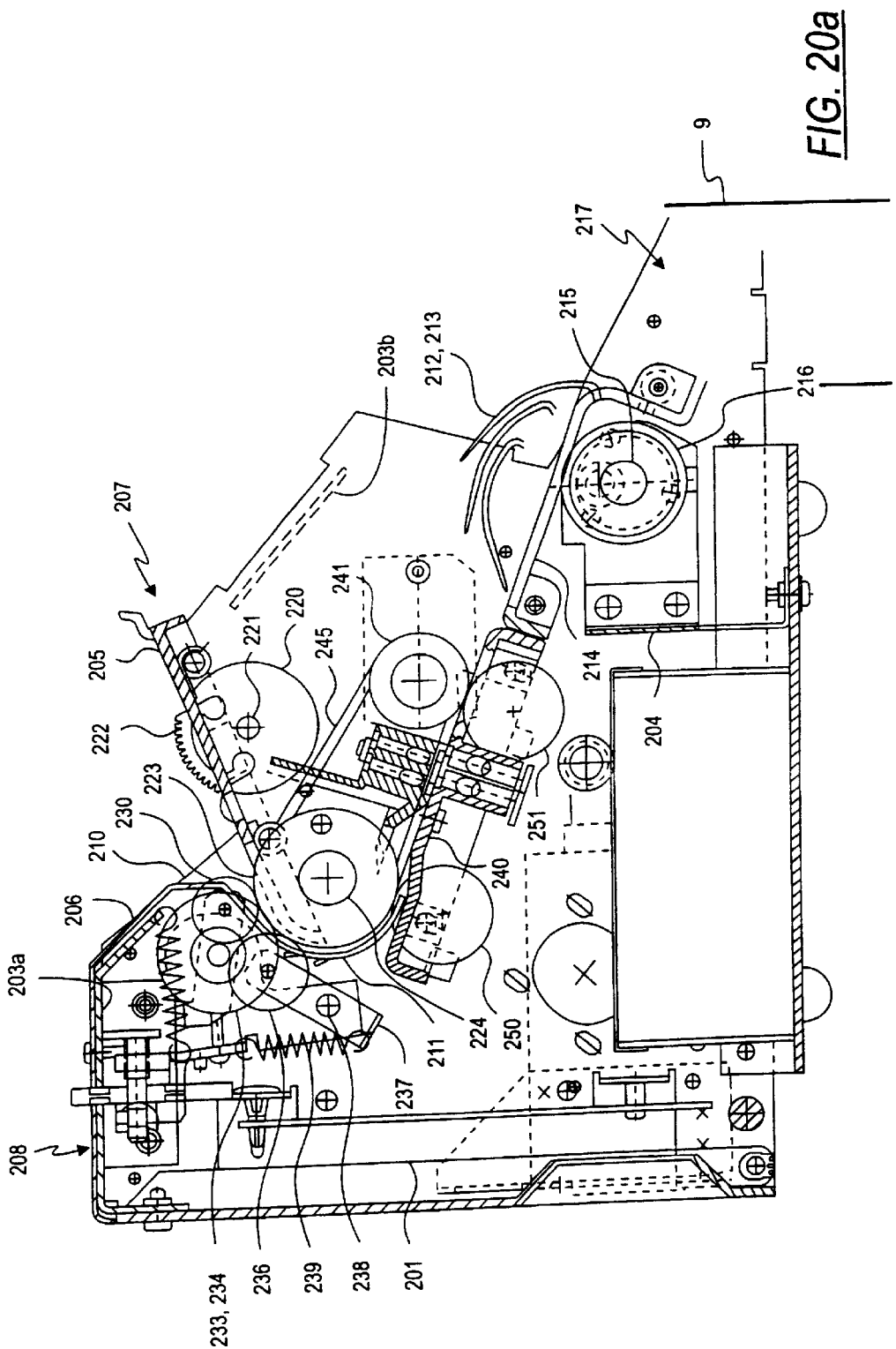

AUTOMATIC CURRENCY PROCESSING SYSTEM

CROSS-REFERENCE TO RELATED APPLICATIONS

This application is a continuation of application Ser. No. 09/028,162, filed Feb. 23, 1998, entitled "Automatic Currency Processing System," now U.S. Pat. No. 6,128,402, which is a continuation of application Ser. No. 08/824,073, filed Mar. 24, 1997, entitled "Automatic Currency Processing System," now U.S. Pat. No. 5,905,810, which in turn is a continuation of application Ser. No. 08/433,920, filed May 2, 1995, entitled "Automatic Currency Processing System," now abandoned.

FIELD OF THE INVENTION

The present invention relates to currency processing systems such as automatic teller machines and currency redemption machines.

SUMMARY OF THE INVENTION

The primary object of the present invention is to provide an improved automatic teller machine ("ATM") or currency redemption machine that is capable of processing cash deposits as well as withdrawals.

Another object of this invention is to provide such machines that are capable of accepting and dispensing coins as well as bills.

A further object of this invention is to provide such machines that automatically evaluate the authenticity, as well as the denomination, of the cash that is deposited, whether in the form of bills or coins.

Still another object of the invention is to provide such machines that are coupled to the cash accounting system of a bank or other financial institution so that the customer's account can be immediately credited with verified cash deposit amounts.

In accordance with the present invention, the foregoing objectives are realized by providing a currency processing machine for receiving and dispensing cash and substantially immediately furnishing an associated cash accounting system with data, including the value of the currency processed, for each transaction. The machine includes a bill dispenser having a bill storage device and controllable transport means for dispensing selected numbers of bills from the storage device, a bill receptacle for receiving stacks of bills to be deposited, and a bill counter and scanner for rapidly removing the bills one at a time from the receptacle and counting the bills while determining the denomination of each bill. The counter and scanner also generates data representing the denomination of each bill, and the number of bills of each denomination, passed through the counter and scanner. A memory receives and stores data representing the number of bills of each denomination passed through the counter and scanner in each transaction, and data representing the total value of the bills passed through the counter and scanner in each transaction. A control system transfers data from the memory to an associated cash accounting system so that the deposits and withdrawals executed at the currency processing machine are entered in the accounting system substantially immediately after the execution of those transactions. The preferred control system checks the genuineness of each bill and coin that is counted, and produces a control signal in response to the detection of a non-genuine bill or coin. The processing of the bill or coin detected to be non-genuine is altered in response to such control signals.

BRIEF DESCRIPTION OF THE DRAWINGS

FIG. 1b is a diagrammatic side elevation of the machine of FIG. 1a;

FIG. 1c is a more detailed diagrammatic side elevation of the machine of FIG. 1a;

FIG. 1d is a flow chart illustrating the sequential procedure involved in the execution of a transaction in the machine of FIG. 1a;

FIG. 1e is a flow chart illustrating the sequential procedure involved in the execution of a deposit of bills in the machine of FIG. 1a;

FIG. 1f is a flow chart illustrating an alternative sequential procedure involved in the execution of a deposit of bills in the machine of FIG. 1a;

FIGS. 7a and 7b form a block diagram illustrating a preferred circuit arrangement for processing and correlating reflectance data according to the optical sensing and counting technique of this invention;

FIGS. 16a–16e are graphical illustrations of the effect produced on correlation pattern by using the progressive shifting technique, according to an embodiment of this invention;

FIG. 18b is a flow chart illustrating a modified sequential procedure of that of FIG. 18a;

FIG. 20a is an enlarged vertical section taken approximately through the center of the machine, but showing the various transport rolls in side elevation;

FIG. 67b is a waveform diagram of the input signals supplied to the circuit of FIG. 67a;

DETAILED DESCRIPTION OF THE PREFERRED EMBODIMENTS

Figure 1A:
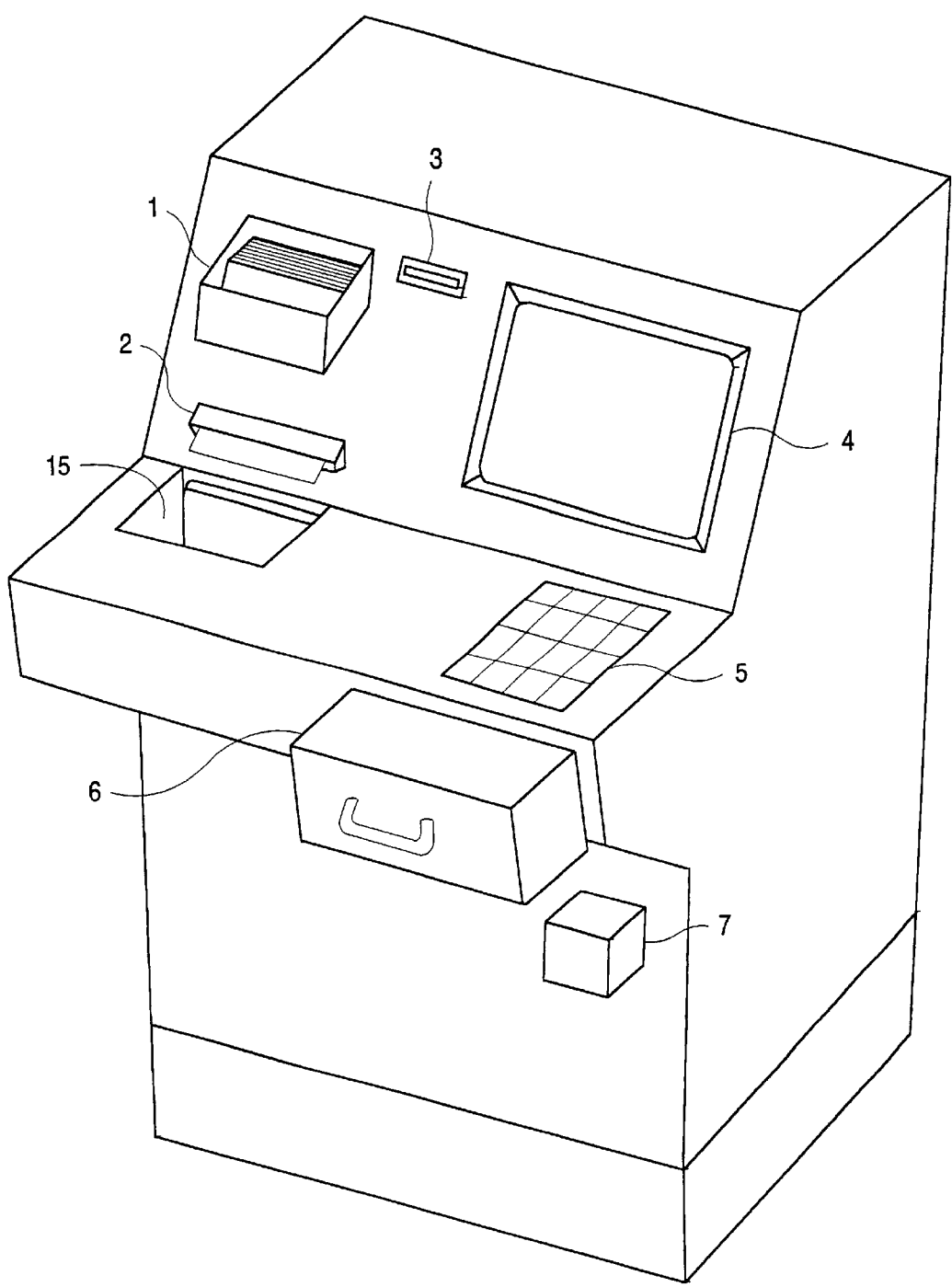
FIG. 1a is a perspective view of an automatic teller machine embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

Figure 1B:
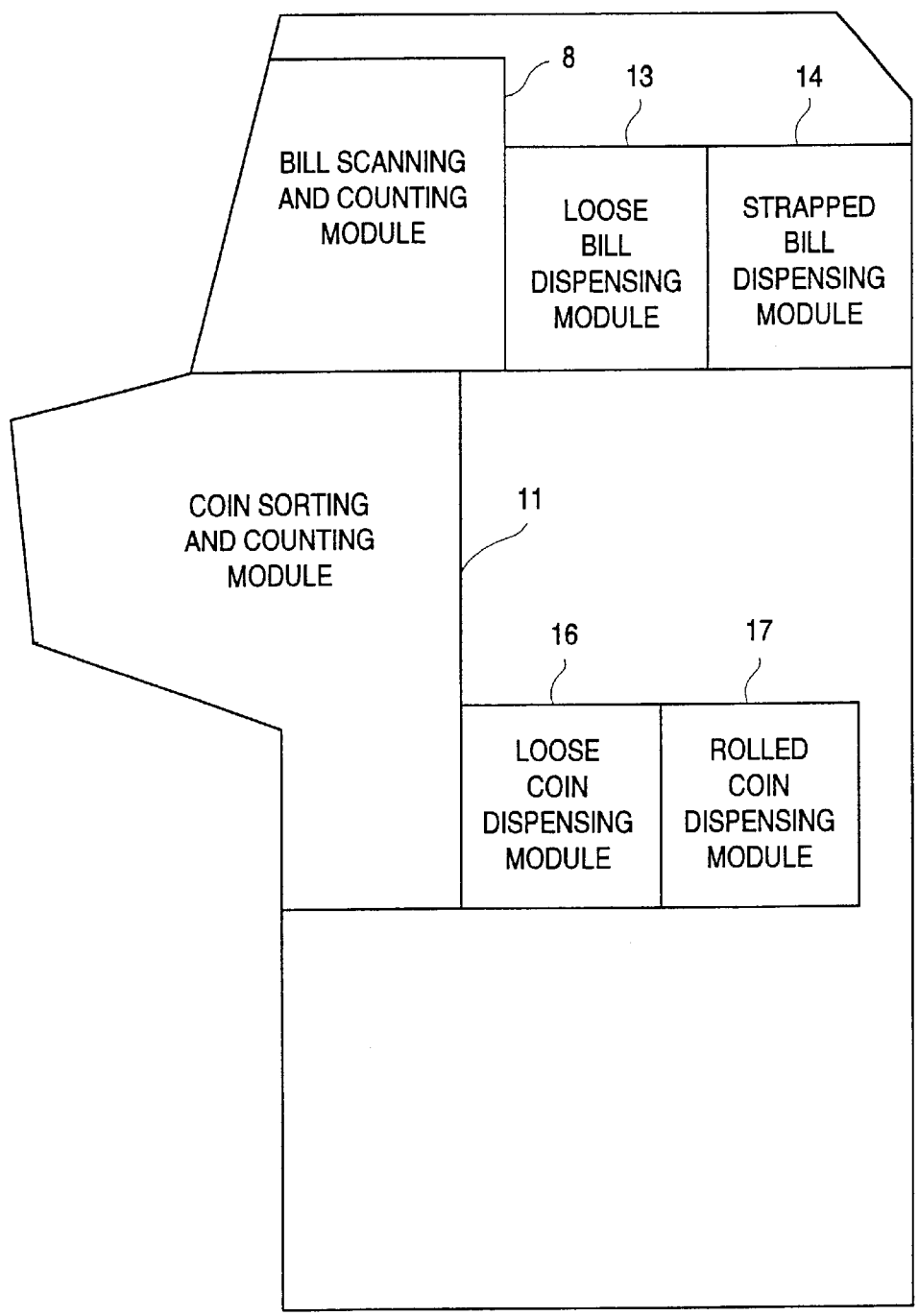
Figure 1C:
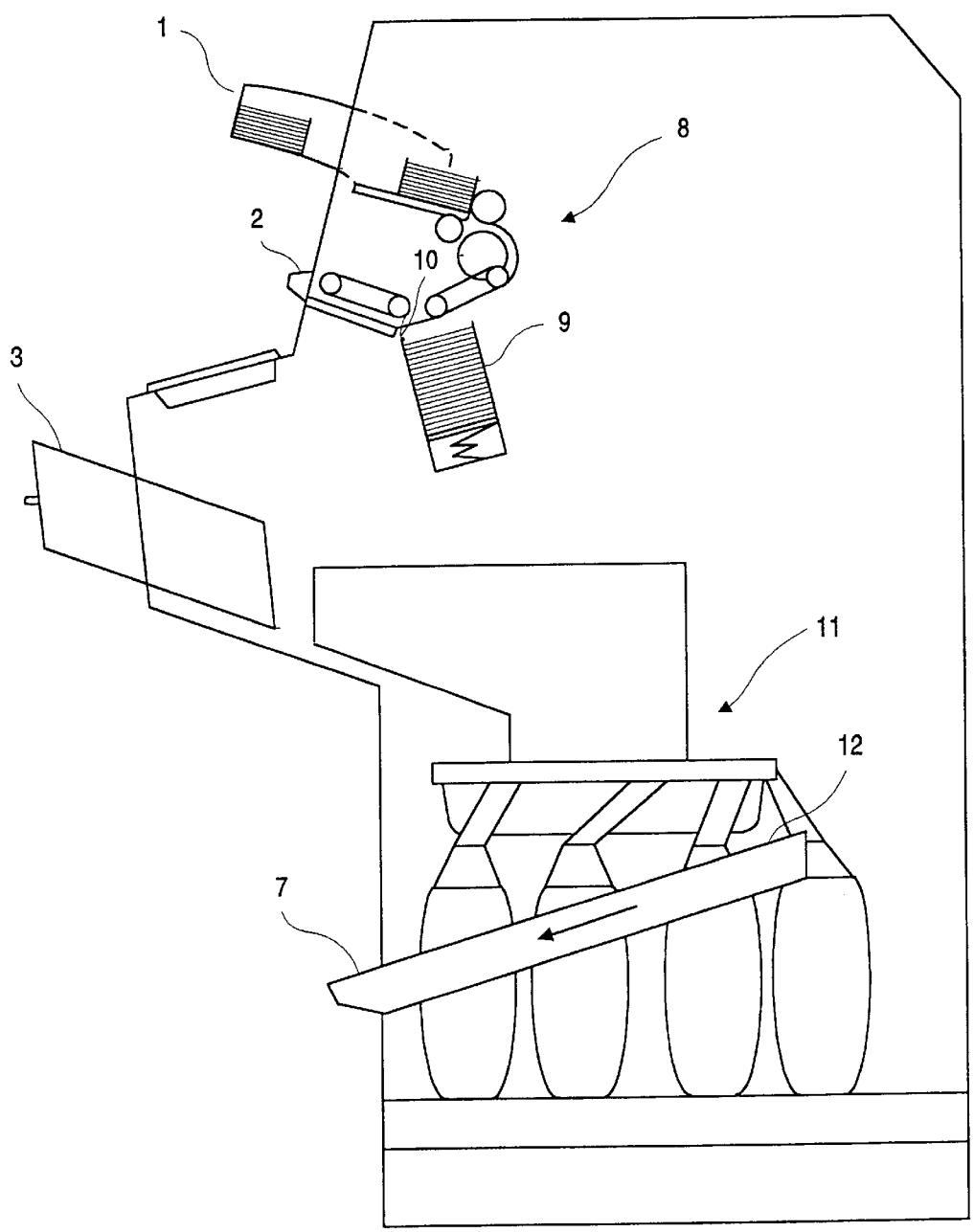

Turning now to the drawings and referring first to FIGS. 1a, 1b and 1c, there is shown an automatic teller machine ("ATM") having a bill deposit receptacle 1 as well as a bill withdrawal or return slot 2. The ATM has the conventional slot 3 for receiving the customer's identification card so that the data on the card can be automatically read by a card reader. A video display 4 provides the customer with a menu of options, and also prompts the customer to carry out the various actions required to execute a transaction, including the use of a keypad 5.

The illustrative ATM also has a coin deposit receptacle 6 and a coin return pocket 7. The deposit receptacles 1 and 6 are normally retracted within the machine but are advanced to their open positions (shown in FIG. 1a) when a customer initiates a transaction and selects a "cash deposit" mode of operation. Bills and coins can then be deposited by the customer into the deposit receptacles 1 and 6, respectively.

After the customer has placed a stack of bills into the receptacle 1, the customer is prompted to push that receptacle into the machine, to its retracted position. This inward movement of the receptacle 1 positions the stack of bills at the feed station of a bill scanning and counting module 8 which automatically feeds, counts, scans and authenticates the bills one at a time at a high speed (e.g., at least 350 bills per minute). The bills that are recognized by the scanning module 8 are delivered to a conventional currency canister 9 (FIG. 1c) which is periodically removed from the machine and replaced with an empty canister. When a bill cannot be recognized by the scanning module, a diverter 10 is actuated to divert the unidentified bill to the return slot 2 so that it can be removed from the machine by the customer. Alternatively, unrecognizable bills can be diverted to a separate currency canister rather than being returned to the customer. Bills that are detected to be counterfeit are treated in the same manner as unrecognizable bills.

Though not shown in FIGS. 1a–1c, the bill transport system may also include an escrow holding area where the bills being processed in a pending deposit transaction are held until the transaction is complete. Then if the declared balance entered by the customer does not agree with the amount verified by the machine, the entire stack of bills can be returned to the customer. If desired, this decision can be controlled by the customer via the keypad.

When coins are deposited by the customer in the receptacle 6, the customer again is prompted to push that receptacle into the machine. This causes the coins to be fed by gravity into the receiving hopper of a coin-sorting and counting module 11 which physically separates the coins by size (denomination) while separately counting the number of coins of each denomination in each separate transaction. The module 11 also includes a coin discriminator which detects coins that are counterfeit or otherwise non-genuine. These unacceptable coins are discharged from the sorter at a common exit, and the coins from that exit are guided by a tube 12 to the coin return slot 7.

The ATM also preferably includes a conventional loose currency dispensing module 13 for dispensing loose bills, and/or a strapped currency dispensing module 14 for dispensing strapped currency, into a receptacle 15 at the front of the machine, in response to a withdrawal transaction. If desired, a loose coin dispensing module 16 and/or a rolled coin dispensing module 17, may also be included for dispensing coins via the coin return pocket 7. Additional modules that may be included in the ATM or a redemption machine using the same system are modules for verifying and accepting checks, food stamps, tokens and/or tickets containing bar codes.

As will be described in more detail below, each of the modules 8 and 11 accumulates data representing both the number and the value of each separate currency item processed by these modules in each separate transaction. At the end of each transaction, this data and the account number for the transaction are downloaded to an associated cash accounting system by a modem link, so that the customer's account can be immediately adjusted to reflect both the deposits and the withdrawals effected by the current transaction. Alternatively, the data from the currency-processing modules and the card reader can be temporarily stored within a temporary memory within the ATM, so that the data can be downloaded at intervals controlled by the computing system on which the cash accounting system is run.

Figure 1D:
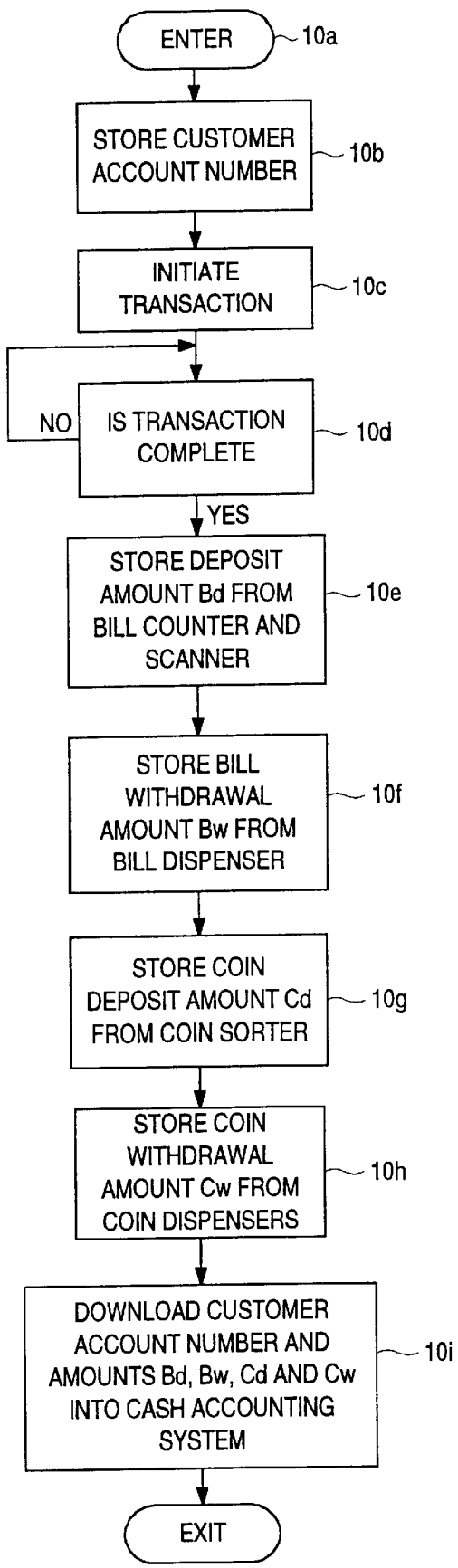

FIG. 1d is a flow chart of a subroutine for transferring data from the ATM to the cash accounting system. This subroutine is entered at step 10a each time a customer inserts an identification card into the ATM. The customer's account number is stored at step 10b, and step 10c then initiates a transaction by prompting the customer to select from a menu of available deposit or withdrawal transactions, and step 10d then monitors the ATM system to determine when the transaction is complete. When the answer is affirmative, the bill deposit amount $B_d$, the bill withdrawal amount $B_w$, the coin deposit amount $C_d$, and the coin withdrawal amount Cw are stored at steps 10e, 10f, 10h and 10h, and then downloaded to the cash accounting system at step 10i. If desired, these amounts may be loaded into a buffer memory for later retrieval by the computer that controls the cash accounting system. The cash accounting system then enters these amounts in the customer's account, and immediately adjusts the balance in that account accordingly.

Figure 1E:
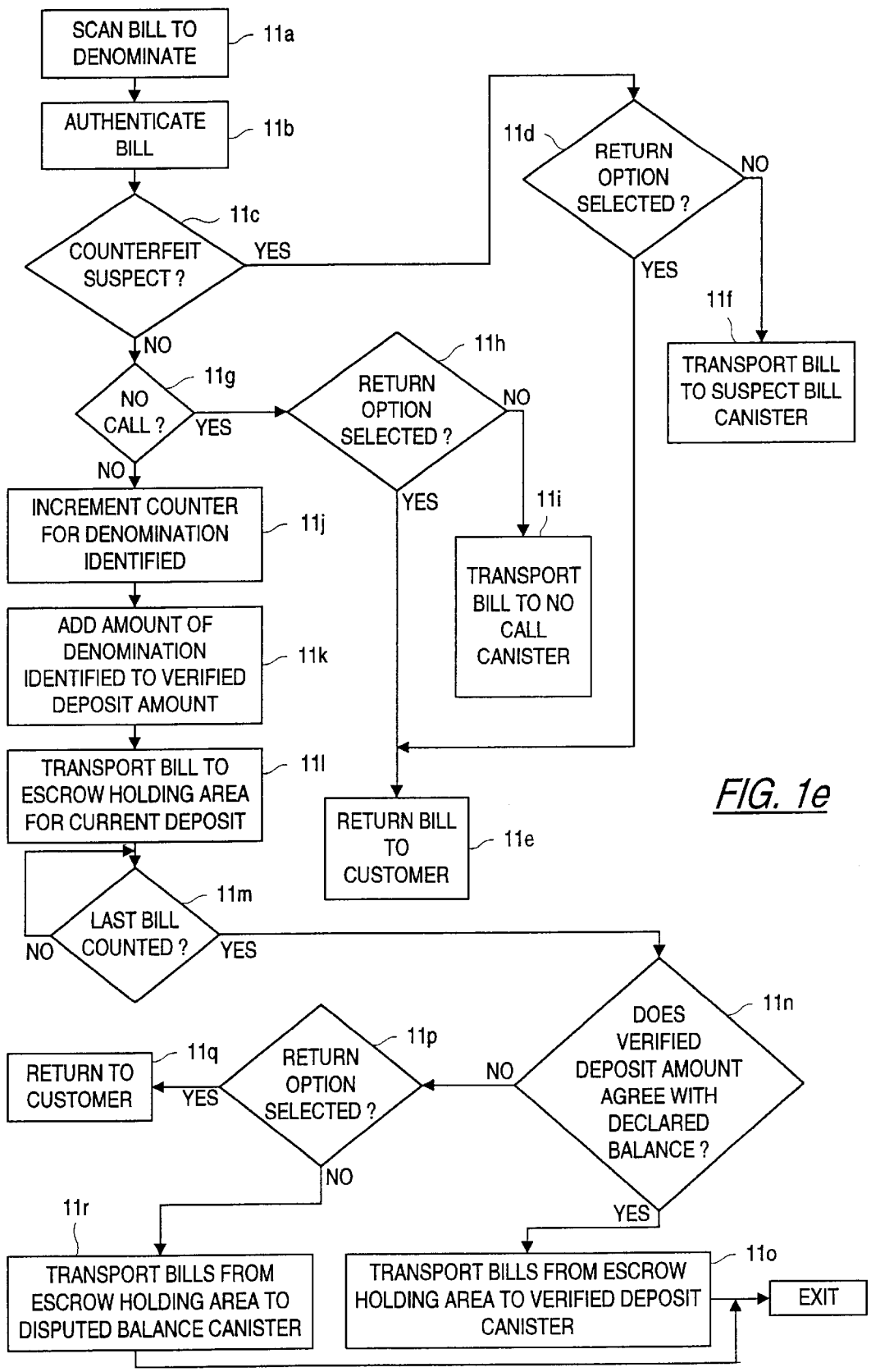

A subroutine for executing a cash deposit of bills is shown in FIG. 1e. When this type of transaction is selected by the customer, the video display prompts the customer to place the stack of bills being deposited into the receptacle 1 and to push that receptacle into the machine. The bill counting and scanning module then automatically withdraws one bill at a time from the bottom of the stack, and scans each bill for denomination and authentication.

Each successive bill that is withdrawn from the deposit stack is scanned at step 11a to determine the denomination of the bill, and checked for authentication at step 11b. The results of the authentication are checked at step 11c. If the bill cannot be authenticated, it is a counterfeit suspect and thus step 11c produces an affirmative answer. This advances the system to step 11d, which determines whether the owner of the ATM or redemption machine has opted to return counterfeit-suspect bills to the customer. If this option has been selected, the suspect bill is returned to the customer at step 11e. If the return option has not been selected at step 11d, the resulting negative response advances the system to step 11f which transports the bill to a suspect bill canister.

If the bill is not a counterfeit suspect, the resulting negative answer at step 11c advances the system to step 11g to check the results of the scanning step. This step determines whether the bill is a "no call," i.e., whether it was impossible for the scanning operation to determine the denomination of the bill. If the bill is a "no call," step 11g produces an affirmative answer, and step 11h determines whether the option to return "no calls" to the customer has been selected. If the answer is affirmative, the "no call" bill is returned to the customer at step 11e. If the answer is negative, the "no call" bill is transported to a "no call" canister at step 11i.

If the denomination of the bill has been determined by the scanner, the resulting negative response at step 11g causes the counter for that particular denomination to be incremented at step 11j. The dollar value of that denomination is then added to the verified deposit amount at step 11k to maintain a current cumulative total of the currency deposit that is being processed. The bill is then transported to an escrow holding area for the current deposit, at step 11l.

To determine when the processing of a deposit has been completed, step 11m determines when the last bill in a deposited stack of bills has been counted. When this step produces an affirmative answer, step 11m then determines whether the final verified deposit amount agrees with the declared balance that was entered by the customer through the key pad. If the answer is affirmative, the deposited bills are transported from the escrow holding area to a verified deposit canister at step 11o. A negative answer at step 11n advances the system to step 11p where again the system determines whether a "return" option has been selected. This option may be preselected by the owner of the ATM or redemption machine, or it may be an option that is available to the customer. In any event, if the option has been selected, the bills are returned to the customer at step 11q to enable the customer to determine why the verified deposit amount does not agree with the customer's declared balance. At this time, the verified deposit amount is displayed to the customer along with an appropriate message. A negative response at step 11p causes the bills to be transported from the escrow holding area to a disputed balance canister at step 11r.

Figure 1F:
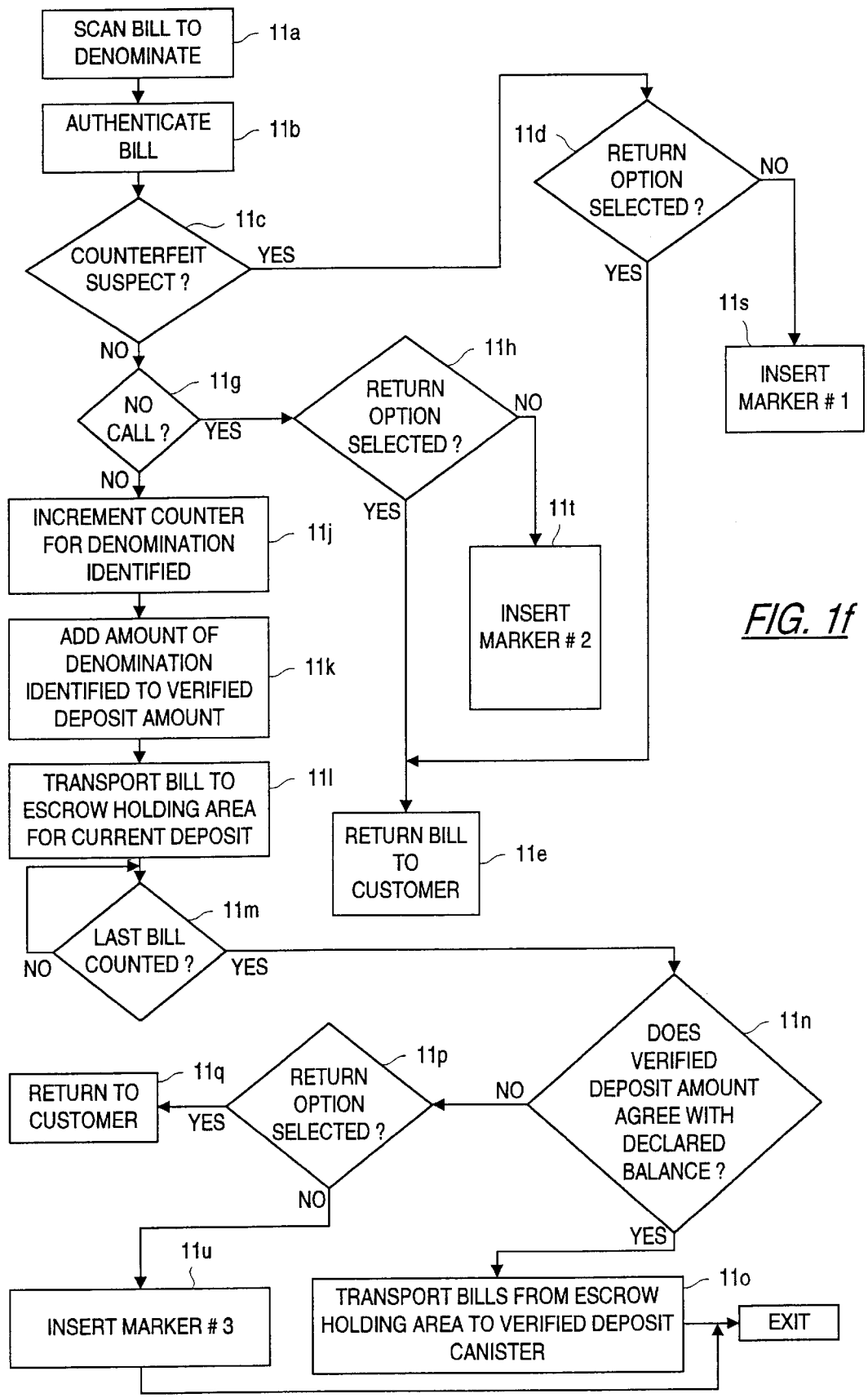

FIG. 1f illustrates a modification of the routine of FIG. 1e which permits the use of a single storage canister for all of the bills, regardless of whether they are verified bills, no calls, or counterfeit suspects. In this system the various bills are identified within the single canister by placing different colored markers on top of different bills. These markers are inserted into the bill transport path so that they follow the respective bills to be marked into the canister. Specifically, a first marker, e.g., a marker of a first color, is inserted at step 11s following an affirmative response at step 11c and a negative response at step 11d to indicate that the bill is a counterfeit suspect that is not to be returned to the customer. A second type of marker, e.g., a marker of a second color, is inserted at step 11t in response to an affirmative response at step 11g and a negative answer at step 11h, to indicate that the marked bill is a counterfeit suspect. A third type of marker, e.g., of a third color, is inserted at step 11u in response to negative answers at steps 11n and 11p, to indicate that the marked batch of bills represents a deposit whose verified amount did not agree with the customer's declared balance. Because this third type of marker identifies a batch of bills instead of a single bill, it is necessary to insert a marker at both the beginning and end of the marked batch.

In the event that the customer wishes to deposit "no call" bills that are returned to the customer, the customer may key in the value and number of such bills and deposit them in an envelope for later verification by the bank. A message on the display screen may advise the customer of this option. For example, if four $10 bills are returned, and then re-deposited by the customer in an envelope, the customer may press a "$10" key four times. The customer then receives immediate credit for all the bills denominated and authenticated by the scanner. Credit for the re-deposited "no call" bills is given only after the bank picks up the deposit envelope and— manually verifies the amount. Alternatively, at least preferred customers can be given full credit immediately, subject to later verification, or immediate credit can be given up to a certain dollar limit. In the case of counterfeit bills that are not returned to the customer, the customer can be notified of the detection of a counterfeit suspect at the ATM or later by a written notice or personal call, depending upon the preferences of the financial institution.

The ATM or redemption machine may also have a "verify mode" in which it simply denominates and totals all the currency (bills and/or coins) deposited by the customer and returns it all to the customer. If the customer agrees with the amount and wishes to proceed with an actual deposit, the customer selects the "deposit mode" and re-deposits the same batch of currency in the machine. Alternatively, the "verify mode" may hold the initially deposited currency in an escrow area until the customer decides whether to proceed with an actual deposit.

In the event that the machine jams or otherwise malfunctions while currency is being processed, the message display screen advises the customer of the number and value of the currency items processed prior to the jam. The customer is instructed to retrieve the currency not yet processed and to manually deposit it in a sealed envelope which is then deposited into the machine for subsequent verification. The machine malfunction is automatically reported via modem to the home office.

Figure 2A:
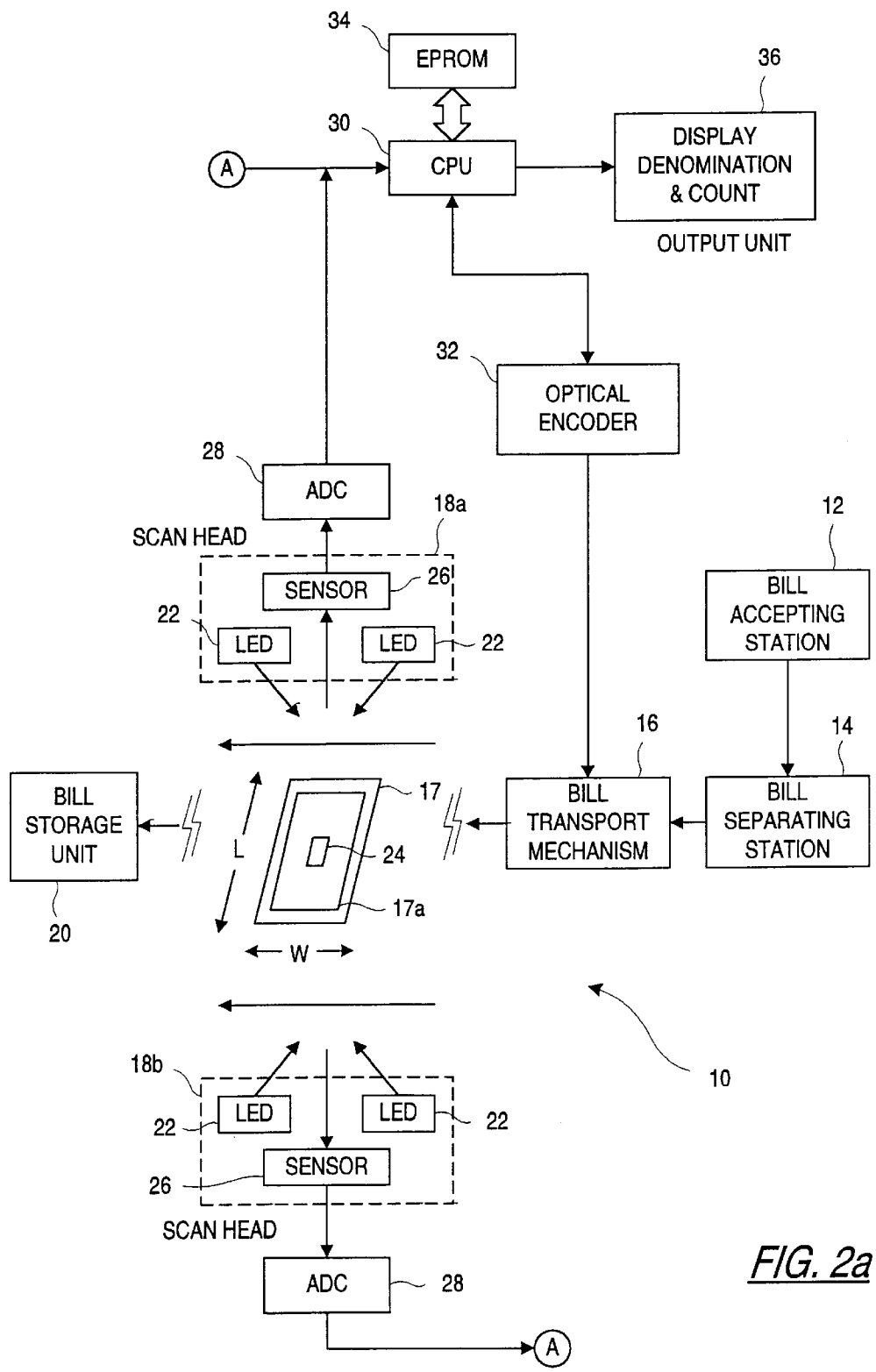
FIG. 2a is a functional block diagram of the currency scanning and counting subassembly in the machine of FIG. 1, including a scanhead arranged on each side of a transport path.

Referring now to FIG. 2a, there is shown a preferred embodiment of a currency scanning and counting module 8. The module 8 includes a bill accepting station 12 for receiving stacks of currency bills from the deposit receptacle 1. A feed mechanism functions to pick out or separate one bill at a time for transfer to a bill transport mechanism 16 (FIG. 2a) which transports each bill along a precisely predetermined transport path, between a pair of scanheads 18a, 18b where the denomination of the bill is identified. In the preferred embodiment, bills are scanned and identified at a rate in excess of 350 bills per minute. In the preferred embodiment depicted, each scanhead 18a, 18b is an optical scanhead that scans for characteristic information from a scanned bill 17 which is used to identify the denomination of the bill. The scanned bill 17 is then transported to a cassette or bill stacking station 20 where bills so processed are stacked for subsequent removal.

Each optical scanhead 18a, 18b preferably comprises a pair of light sources 22 directing light onto the bill transport path so as to illuminate a substantially rectangular light strip 24 upon a currency bill 17 positioned on the transport path adjacent the scanhead 18. Light reflected off the illuminated strip 24 is sensed by a photodetector 26 positioned between the two light sources. The analog output of the photodetector 26 is converted into a digital signal by means of an analog-to-digital (ADC) convertor unit 28 whose output is fed as a digital input to a central processing unit (CPU) 30.

While the scanheads 18a, 18b of FIG. 2a are optical scanheads, it should be understood that the scanheads and the signal processing system may be designed to detect a variety of characteristic information from currency bills. Additionally, the scanheads may employ a variety of detection means such as magnetic, optical, electrical conductivity, and capacitive sensors. Use of such sensors is discussed in more detail below (see, e.g., FIG. 2d).

Referring again to FIG. 2a, the bill transport path is defined in such a way that the transport mechanism 16 moves currency bills with the narrow dimension of the bills being parallel to the transport path and the scan direction. Alternatively, the system may be designed to scan bills along their long dimension or along a skewed dimension. As a bill 17 traverses the scanheads 18a, 18b, the coherent light strip 24 effectively scans the bill across the narrow dimension of the bill. In the preferred embodiment depicted, the transport path is so arranged that a currency bill 17 is scanned across a central section of the bill along its narrow dimension, as shown in FIG. 2a. Each scanhead functions to detect light reflected from the bill as it moves across the illuminated light strip 24 and to provide an analog representation of the variation in reflected light, which, in turn, represents the variation in the dark and light content of the printed pattern or indicia on the surface of the bill. This variation in light reflected from the narrow-dimension scanning of the bills serves as a measure for distinguishing, with a high degree of confidence, among a plurality of currency denominations which the system is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a normalizing routine for processing the sampled data for improved correlation and for smoothing out variations due to "contrast" fluctuations in the printed pattern existing on the bill surface. The normalized reflectance data represents a characteristic pattern that is unique for a given bill denomination and provides sufficient distinguishing features among characteristic patterns for different currency denominations.

In order to ensure strict correspondence between reflectance samples obtained by narrow dimension scanning of successive bills, the reflectance sampling process is preferably controlled through the CPU 30 by means of an optical encoder 32 which is linked to the bill transport mechanism 16 and precisely tracks the physical movement of the bill 17 between the scanheads 18a, 18b. More specifically, the optical encoder 32 is linked to the rotary motion of the drive motor which generates the movement imparted to the bill along the transport path. In addition, the mechanics of the feed mechanism ensure that positive contact is maintained between the bill and the transport path, particularly when the bill is being scanned by the scanheads. Under these conditions, the optical encoder 32 is capable of precisely tracking the movement of the bill 17 relative to the light strips 24 generated by the scanheads 18a, 18b by monitoring the rotary motion of the drive motor.

The outputs of the photodetectors 26 are monitored by the CPU 30 to initially detect the presence of the bill adjacent the scanheads and, subsequently, to detect the starting point of the printed pattern on the bill, as represented by the thin borderline 17a which typically encloses the printed indicia on U.S. currency bills. Once the borderline 17a has been detected, the optical encoder 32 is used to control the timing and number of reflectance samples that are obtained from the outputs of the photodetectors 26 as the bill 17 moves across the scanheads.

Figure 2B:
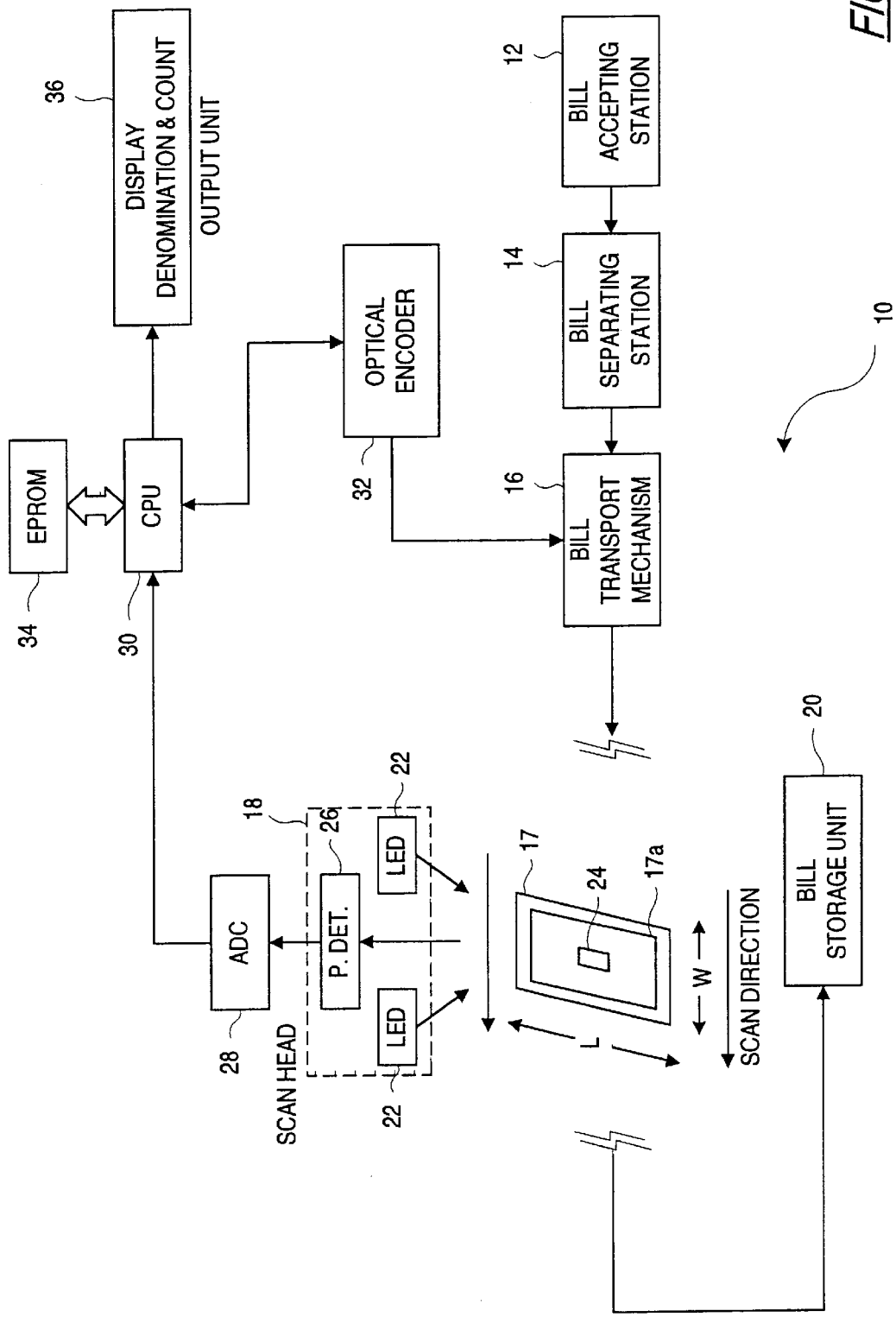
FIG. 2b is a functional block diagram of a currency scanning and counting device that includes a scanhead arranged on a single side of a transport path.

FIG. 2b illustrates a modified currency scanning and counting device similar to that of FIG. 2a but having a scanhead on only a single side of the transport path.

Figure 2C:
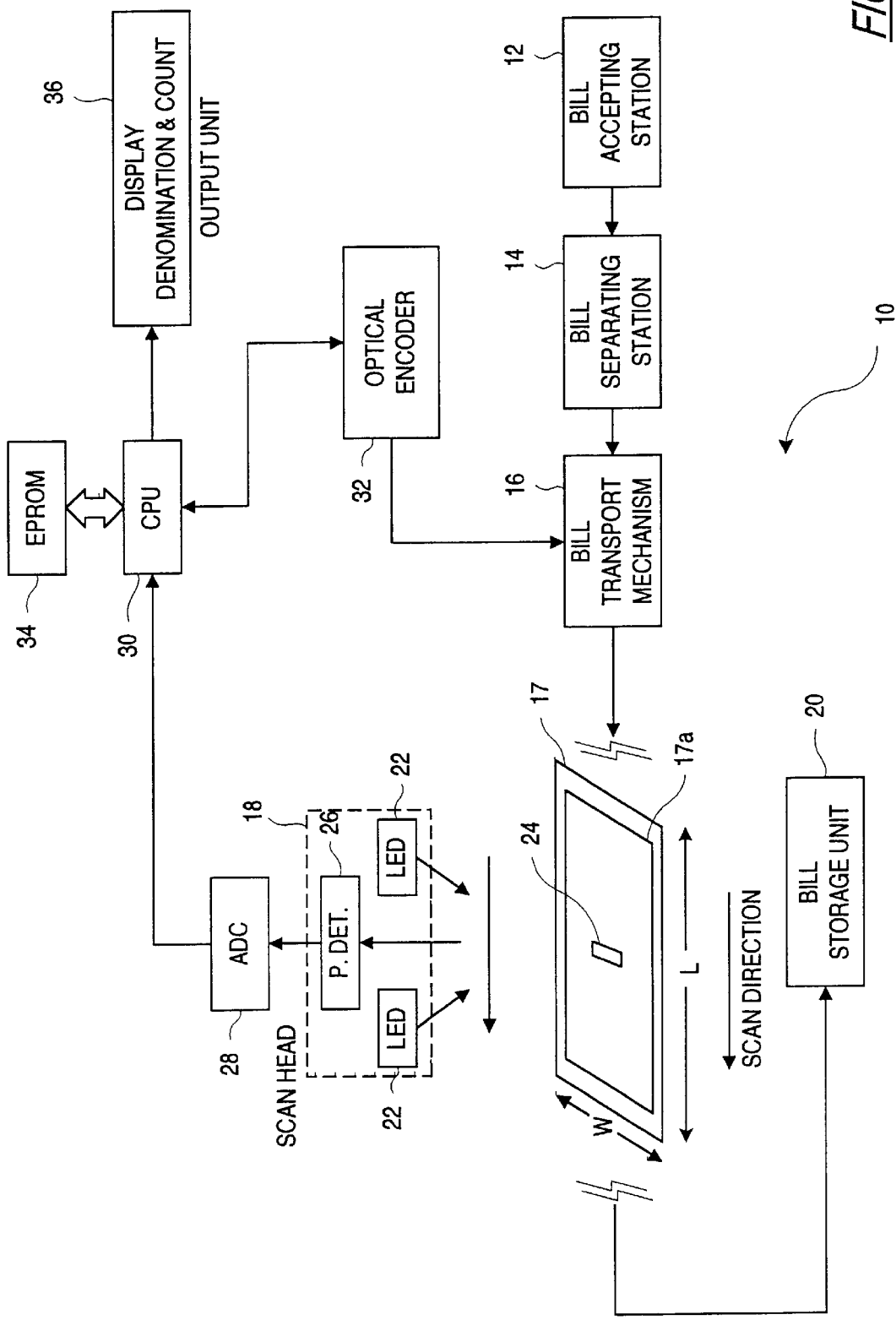
FIG. 2c is a functional block diagram of a currency scanning and counting machine similar to that of FIG. 2b, but adapted to feed and scan bills along their wide dimension.

FIG. 2c illustrates another modified currency scanning and counting device similar to that of FIG. 2b but illustrating feeding and scanning of bills along their wide direction.

Figure 4A:
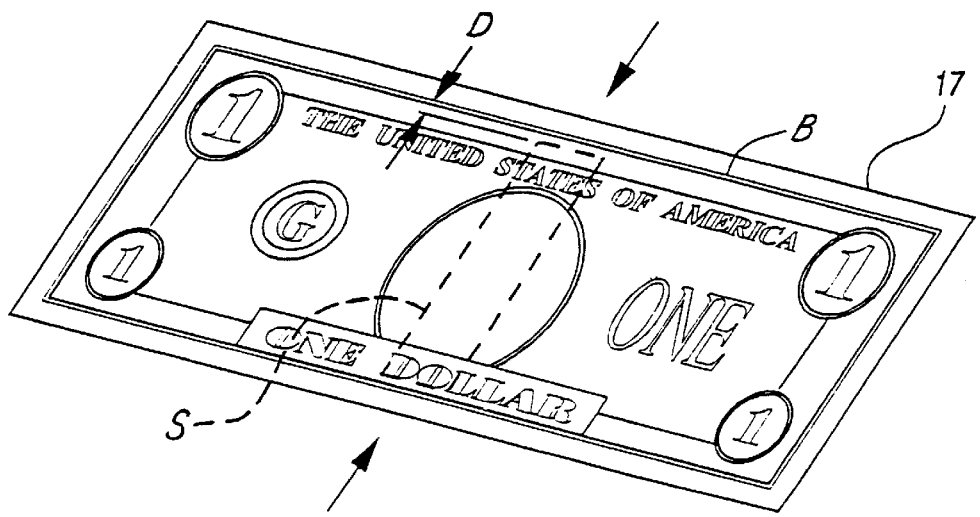
FIGS. 4a and 4b are perspective views of a bill and a preferred area to be optically scanned on the bill.
Figure 4B:
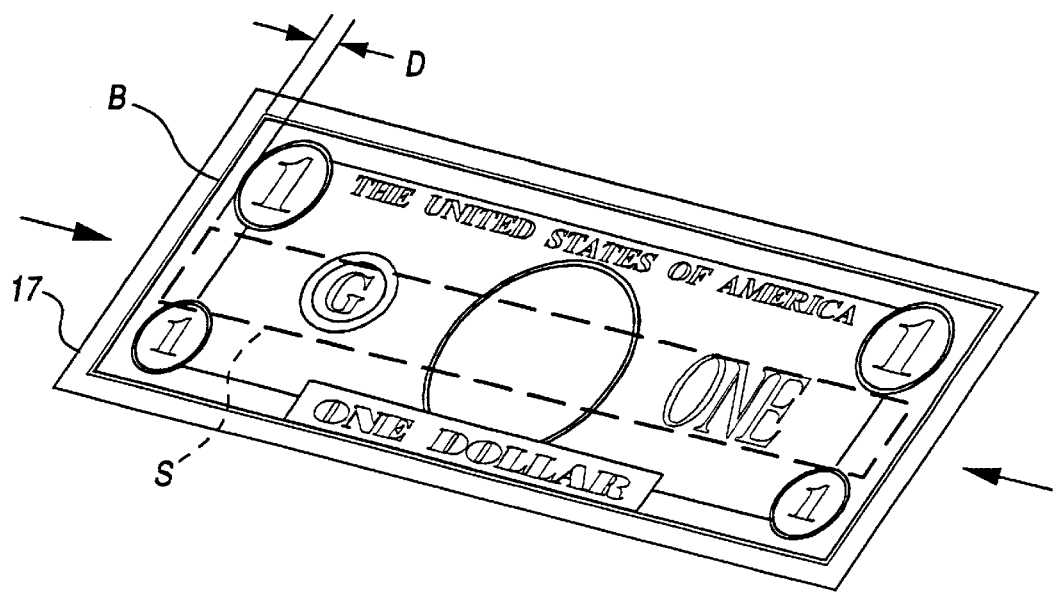

As illustrated in FIGS. 2b–2c, the transport mechanism 16 moves currency bills with a preselected one of their two dimensions (narrow or wide) being parallel to the transport path and the scan direction. FIGS. 2b and 4a illustrate bills oriented with their narrow dimension "W" parallel to the direction of movement and scanning, while FIGS. 2c and 4b illustrate bills oriented with their wide dimension "L" parallel to the direction of movement and scanning.

Figure 2D:
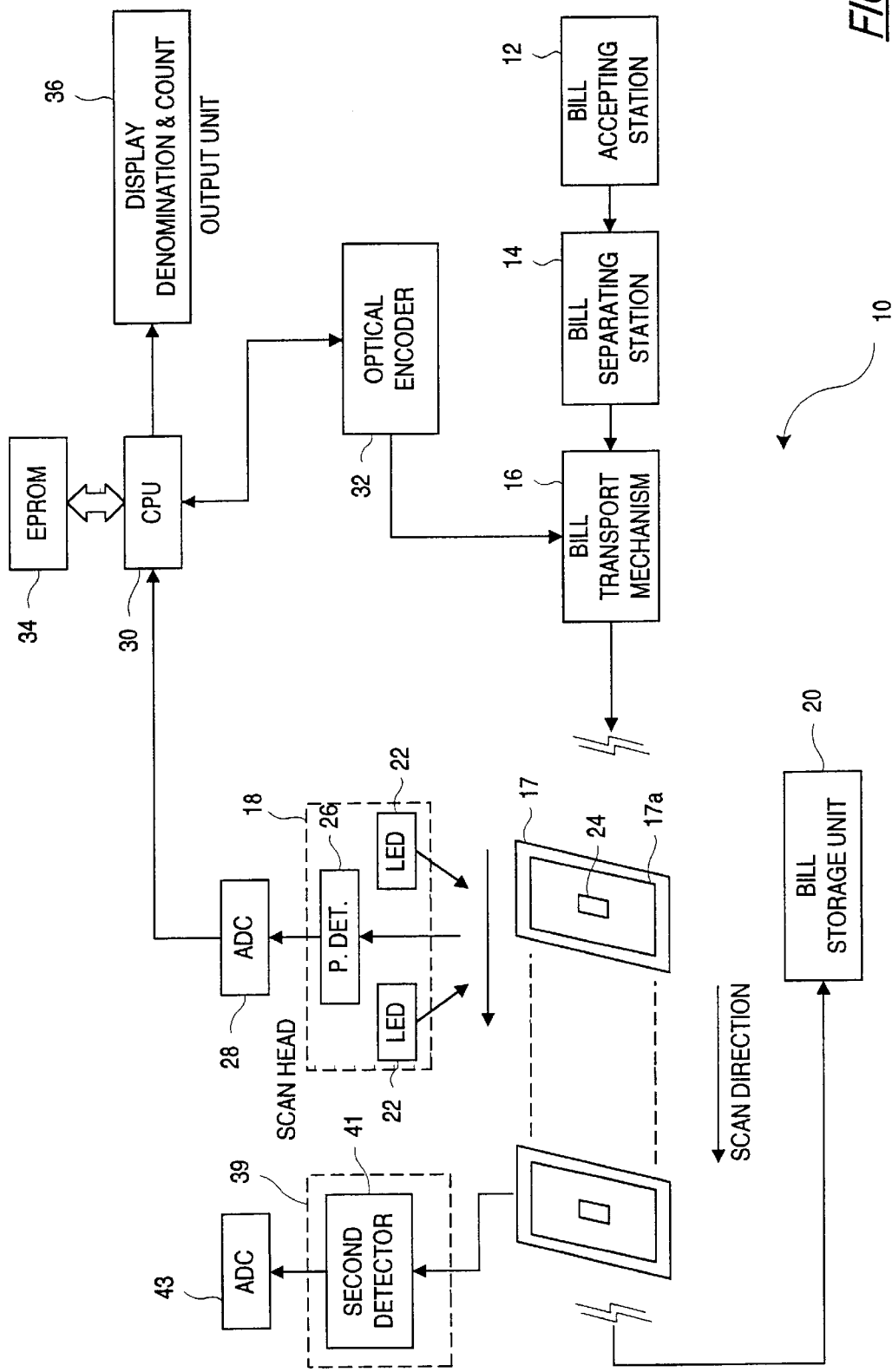
FIG. 2d is a functional block diagram of a currency scanning and counting device similar to those of FIGS. 2a–2c but including a second type of scanhead for detecting a second characteristic of the currency.

Referring now to FIG. 2d, there is shown a functional block diagram illustrating a preferred embodiment of a currency discriminating and authenticating system. The operation of the system of FIG. 2d is the same as that of FIG. 2a except as modified below. The system includes a bill accepting station 12 where stacks of currency bills that need to be identified, authenticated, and counted are positioned. Accepted bills are acted upon by a bill separating station 14 which functions to pick out or separate one bill at a time for transfer to a bill transport mechanism 16 which transports each bill along a precisely predetermined transport path, across two scanheads 18 and 39 where the currency denomination of the bill is identified and the genuineness of the bill is authenticated. In the preferred embodiment depicted, scanhead 18 is an optical scanhead that scans for a first type of characteristic information from a scanned bill 17 which is used to identify the bill's denomination. A second scanhead 39 scans for a second type of characteristic information from the scanned bill 17. While the illustrated scanheads 18 and 39 are separate and distinct, they may be incorporated into a single scanhead. For example, where the first characteristic sensed is intensity of reflected light and the second characteristic sensed is color, a single optical scanhead having a plurality of detectors, one or more without filters and one or more with colored filters, may be employed (U.S. Pat. No. 4,992,860 incorporated herein by reference). The scanned bill is then transported to a bill stacking station 20 where bills so processed are stacked for subsequent removal.

The optical scanhead 18 of the embodiment depicted in FIG. 2d comprises at least one light source 22 directing a beam of coherent light downwardly onto the bill transport path so as to illuminate a substantially rectangular light strip 24 upon a currency bill 17 positioned on the transport path below the scanhead 18. Light reflected off the illuminated strip 24 is sensed by a photodetector 26 positioned directly above the strip. The analog output of photodetector 26 is converted into a digital signal by means of an analog-to-digital (ADC) convertor unit 28 whose output is fed as a digital input to a central processing unit (CPU) 30.

The second scanhead 39 comprises at least one detector 41 for sensing a second type of characteristic information from a bill. The analog output of the detector 41 is converted into a digital signal by means of a second analog-to-digital converter 43 whose output is also fed as a digital input to the central processing unit (CPU) 30.

While the scanhead 18 in the embodiment of FIG. 2d is an optical scanhead, it should be understood that the first and second scanheads 18 and 39 may be designed to detect a variety of characteristic information from currency bills. Additionally these scanheads may employ a variety of detection means such as magnetic or optical sensors. For example, a variety of currency characteristics can be measured using magnetic sensing. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

With regard to optical sensing, a variety of currency characteristics can be measured such as density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), and other patterns of reflectance and transmission (U.S. Pat. No. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325,364). Prescribed hues or intensities of a given color may be detected. Reflection and/or fluorescence of ultraviolet light may also be used, as described in detail below. Absorption of infrared light may also be used as an authenticating technique.

In addition to magnetic and optical sensing, other techniques of detecting characteristic information of currency include electrical conductivity sensing, capacitive sensing (U.S. Pat. No. 5,122,754 [watermark, security thread]; U.S.

Pat. No. 3,764,899 [thickness]; U.S. Pat. No. 3,815,021 [dielectric properties]; U.S. Pat. No. 5,151,607 [security thread]), and mechanical sensing (U.S. Pat. Nos. 4,381,447 [limpness]; U.S. Pat. No. 4,255,651 [thickness]), and hologram, kinegram and moviegram sensing.

The detection of the borderline 17a realizes improved discrimination efficiency in systems designed to accommodate U.S. currency since the borderline 17a serves as an absolute reference point for initiation of sampling. When the edge of a bill is used as a reference point, relative displacement of sampling points can occur because of the random manner in which the distance from the edge to the borderline 17a varies from bill to bill due to the relatively large range of tolerances permitted during printing and cutting of currency bills. As a result, it becomes difficult to establish direct correspondence between sample points in successive bill scans and the discrimination efficiency is adversely affected. Accordingly, the modified pattern generation method discussed below is useful in discrimination systems designed to accommodate bills other than U.S. currency because many non-U.S. bills lack a borderline around the printed indicia on their bills. Likewise, the modified pattern generation method may be important in discrimination systems designed to accommodate bills other than U.S. currency because the printed indicia of many non-U.S. bills lack sharply defined edges which in turns inhibits using the edge of the printed indicia of a bill as a trigger for the initiation of the scanning process and instead promotes reliance on using the edge of the bill itself as the trigger for the initiation of the scanning process.

The use of the optical encoder 32 for controlling the sampling process relative to the physical movement of a bill 17 across the scanheads 18a, 18b is also advantageous in that the encoder 32 can be used to provide a predetermined delay following detection of the borderline 17a prior to initiation of samples. The encoder delay can be adjusted in such a way that the bill 17 is scanned only across those segments which contain the most distinguishable printed indicia relative to the different currency denominations.

In the case of U.S. currency, for instance, it has been determined that the central, approximately two-inch (approximately 5 cm) portion of currency bills, as scanned across the central section of the narrow dimension of the bill, provides sufficient data for distinguishing among the various U.S. currency denominations. Accordingly, the optical encoder can be used to control the scanning process so that reflectance samples are taken for a set period of time and only after a certain period of time has elapsed after the borderline 17a is detected, thereby restricting the scanning to the desired central portion of the narrow dimension of the bill.

FIGS. 3–5b illustrate the scanning process in more detail. Referring to FIG. 4a, as a bill 17 is advanced in a direction parallel to the narrow edges of the bill, scanning via a slit in the scanhead 18a or 18b is effected along a segment S of the central portion of the bill 17. This segment S begins a fixed distance D inboard of the borderline 17a. As the bill 17 traverses the scanhead, a strip s of the segment S is always illuminated, and the photodetector 26 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead. FIG. 4b is similar to FIG. 4a but illustrates scanning along the wide dimension of the bill 17.

Figure 3:
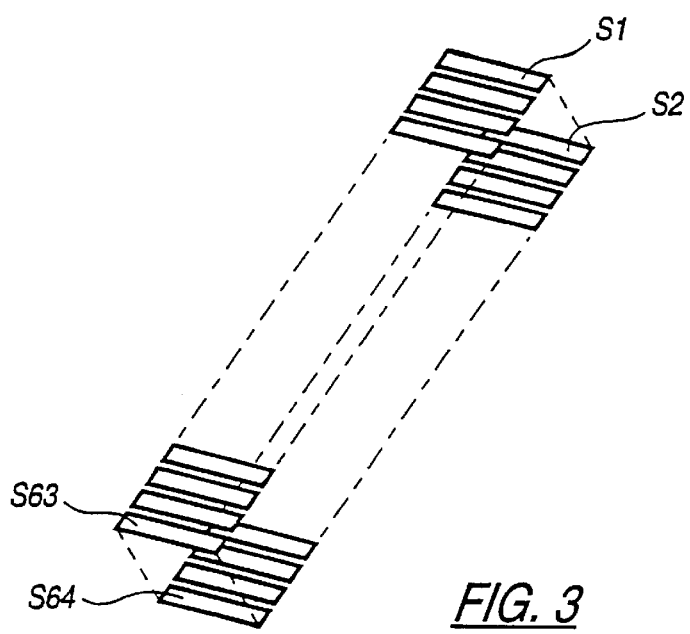
FIG. 3 is a diagrammatic perspective illustration of the successive areas scanned during the traversing movement of a single bill across an optical sensor according to a preferred embodiment of the primary scanhead.
Figure 5A:
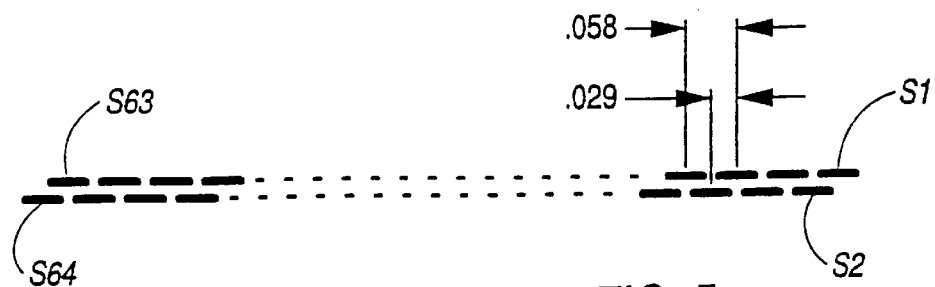
FIGS. 5a and 5b are diagrammatic side elevation views of the preferred areas to be optically scanned on a bill according to a preferred embodiment of the invention.
Figure 5B:
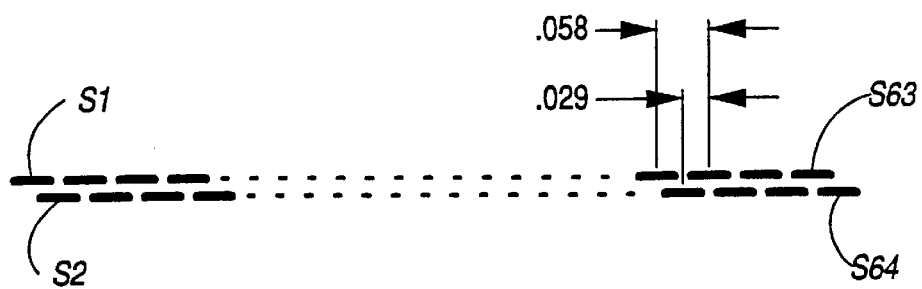

As illustrated in FIGS. 3, 5a, and 5b, it is preferred that the sampling intervals be selected so that the strips s that are illuminated for successive samples overlap one another. The odd-numbered and even-numbered sample strips have been separated in FIGS. 3, 5a, and 5b to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch (0.127 cm) wide at 0.029 inch (0.074 cm) intervals, along a segment S that is 1.83 inch (4.65 cm) long (64 samples).

Figure 6A:
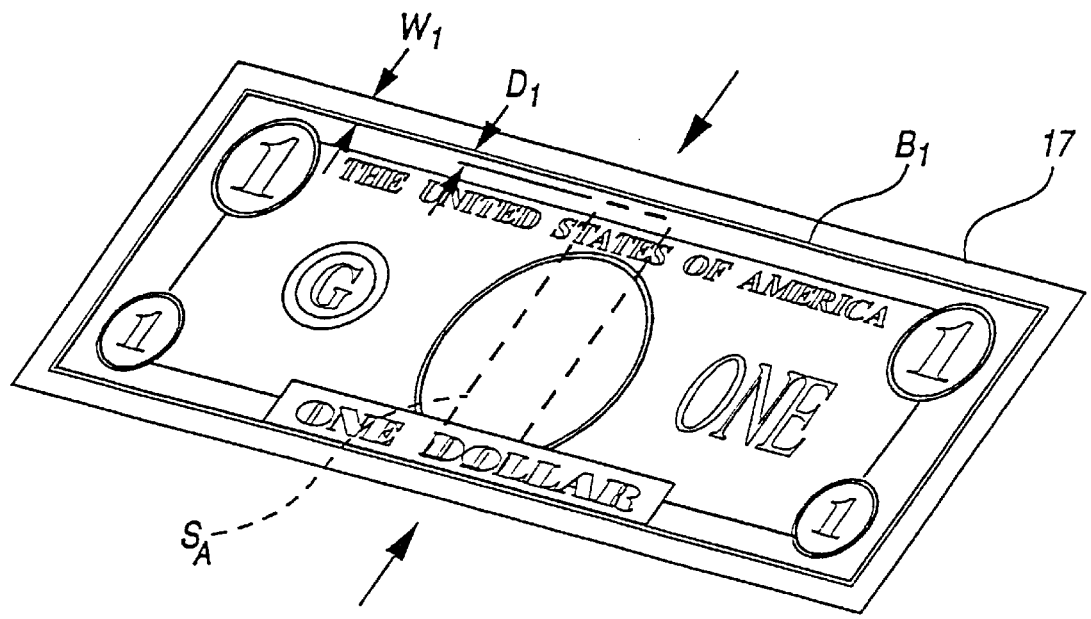
FIG. 6a is a perspective view of a bill showing the preferred area of a first surface to be scanned by one of the two scanheads employed in the preferred embodiment of the present invention.
Figure 6B:
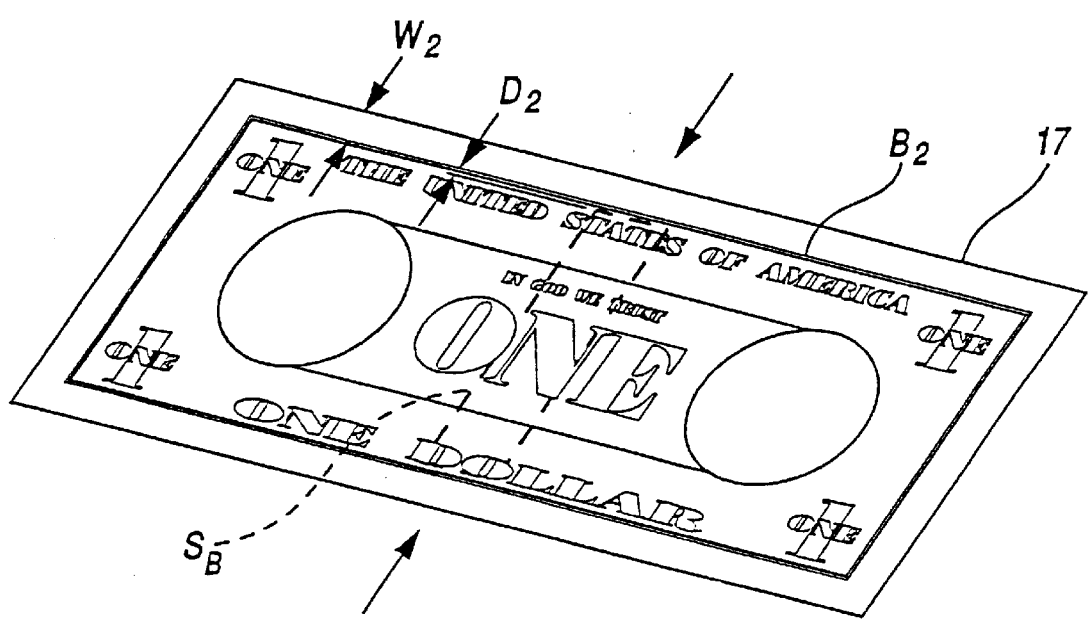
FIG. 6b is another perspective view of the bill in FIG. 6a showing the preferred area of a second surface to be scanned by the other of the scanheads employed in the preferred embodiment of the present invention.

FIGS. 6a and 6b illustrate two opposing surfaces of U.S. bills. The printed patterns on the black and green surfaces of the bill are each enclosed by respective thin borderlines $B_1$ and $B_2$. As a bill is advanced in a direction parallel to the narrow edges of the bill, scanning via the wide slit of one of the scanheads is effected along a segment SA of the central portion of the black surface of the bill (FIG. 6a). As previously stated, the orientation of the bill along the transport path determines whether the upper or lower scanhead scans the black surface of the bill. This segment $S_A$ begins a fixed distance $D_1$ inboard of the borderline $B_1$, which is located a distance $W_1$ from the edge of the bill. The scanning along segment $S_A$ is as described in connection with FIGS. 3, 4a, and 5a.

Similarly, the other of the two scanheads scans a segment $S_B$ of the central portion of the green surface of the bill (FIG. 6b). The orientation of the bill along the transport path determines whether the upper or lower scanhead scans the green surface of the bill. This segment SB begins a fixed distance $D_2$ inboard of the border line $B_2$, which is located a distance $W_2$ from the edge of the bill. For U.S. currency, the distance $W_2$ on the green surface is greater than the distance $W_1$ on the black surface. It is this feature of U.S. currency which permits one to determine the orientation of the bill relative to the upper and lower scanheads 18, thereby permitting one to select only the data samples corresponding to the green surface for correlation to the master characteristic patterns in the EPROM 34. The scanning along segment $S_B$ is as described in connection with FIGS. 3, 4a, and 5a.

Figure 6C:
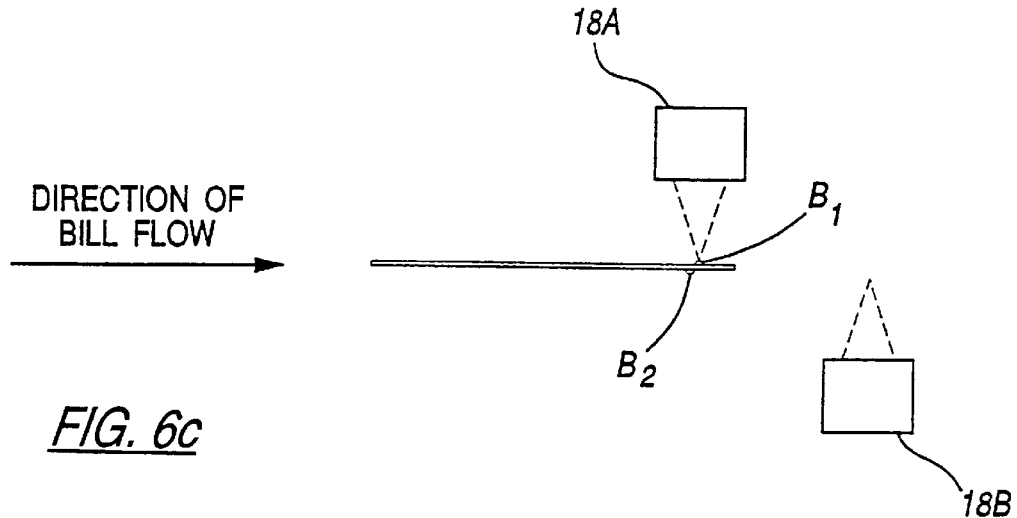
FIG. 6c is a side elevation showing the first surface of a bill scanned by an upper scanhead and the second surface of the bill scanned by a lower scanhead.
Figure 6D:
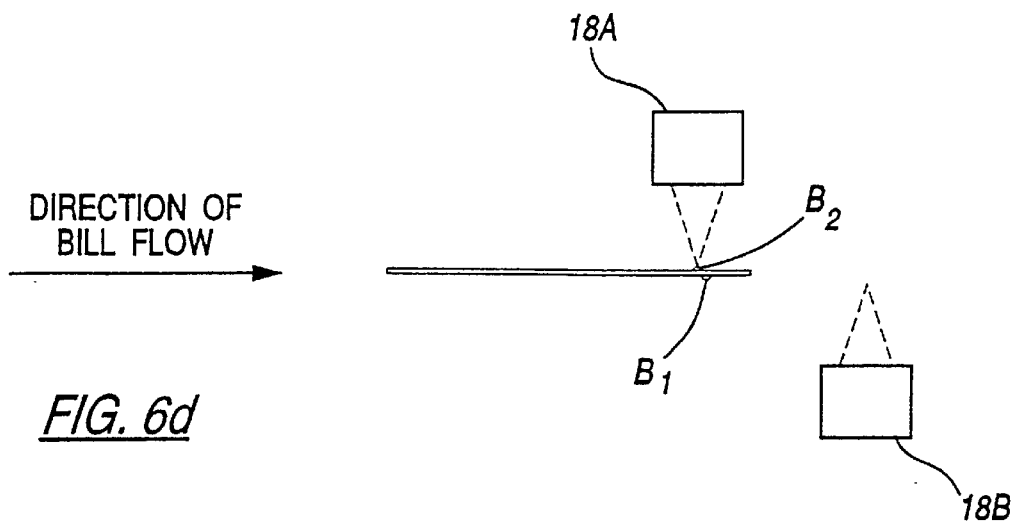
FIG. 6d is a side elevation showing the first surface of a bill scanned by a lower scanhead and the second surface of the bill scanned by an upper scanhead.

FIGS. 6c and 6d are side elevations of FIG. 2a. FIG. 6c shows the first surface of a bill scanned by an upper scanhead and the second surface of the bill scanned by a lower scanhead, while FIG. 6d shows the first surface of a bill scanned by a lower scanhead and the second surface of the bill scanned by an upper scanhead. FIGS. 6c and 6d illustrate the pair of optical scanheads 18a, 18b disposed on opposite sides of the transport path to permit optical scanning of both surfaces of a bill. With respect to United States currency, these opposing surfaces correspond to the black and green surfaces of a bill. One of the optical scanheads 18 (the "upper" scanhead 18a in FIGS. 6c–6d) is positioned above the transport path and illuminates a light strip upon a first surface of the bill, while the other of the optical scanheads 18 (the "lower" scanhead 18b in FIGS. 6c–6d) is positioned below the transport path and illuminates a light strip upon the second surface of the bill. The surface of the bill scanned by each scanhead 18 is determined by the orientation of the bill relative to the scanheads 18. The upper scanhead 18a is located slightly upstream relative to the lower scanhead 18b.

The photodetector of the upper scanhead 18a produces a first analog output corresponding to the first surface of the bill, while the photodetector of the lower scanhead 18b produces a second analog output corresponding to the second surface of the bill. The first and second analog outputs are converted into respective first and second digital outputs by means of respective analog-to-digital (ADC) convertor units 28 whose outputs are fed as digital inputs to a central processing unit (CPU) 30. As described in detail below, the CPU 30 uses the sequence of operations illustrated in FIG. 12 to determine which of the first and second digital outputs corresponds to the green surface of the bill, and then selects the "green" digital output for subsequent correlation to a series of master characteristic patterns stored in EPROM 34. As explained below, the master characteristic patterns are preferably generated by performing scans on the green surfaces, not black surfaces, of bills of different denominations. According to a preferred embodiment, the analog output corresponding to the black surface of the bill is not used for subsequent correlation.

The optical sensing and correlation technique is based upon using the above process to generate a series of stored intensity signal patterns using genuine bills for each denomination of currency that is to be detected. According to a preferred embodiment, two or four sets of master intensity signal samples are generated and stored within the system memory, preferably in the form of an EPROM 34 (see FIG. 2a), for each detectable currency denomination. According to one preferred embodiment these are sets of master green-surface intensity signal samples. In the case of U.S. currency, the sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills. Additionally, the optical scanning may be performed on both sides of a bill.

In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $2, the $10 and/or the $100 bills in U.S. currency, it is preferred to store two green-side patterns for each of the "forward" and "reverse" directions, each pair of patterns for the same direction represent two scan areas that are slightly displaced from each other along the long dimension of the bill. Accordingly, a set of 16 [or 18] different green-side master characteristic patterns are stored within the EPROM for subsequent correlation purposes (four master patterns for the $10 bill [or four master patterns for the $10 bill and the $2 bill and/or the $100 bill] and two master patterns for each of the other denominations). The generation of the master patterns is discussed in more detail below. Once the master patterns have been stored, the pattern generated by scanning a bill under test is compared by the CPU 30 with each of the 16 [or 18] master patterns of stored intensity signal samples to generate, for each comparison, a correlation number representing the extent of correlation, i.e., similarity between corresponding ones of the plurality of data samples, for the sets of data being compared.

According to a preferred embodiment, in addition to the above set of 18 original green-side master patterns, five more sets of green-side master patterns are stored in memory. These sets are explained more fully in conjunction with FIGS. 18a and 18b below.

The CPU 30 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. If a "positive" call can not be made for a scanned bill, an error signal is generated.

According to a preferred embodiment, master patterns are also stored for selected denominations corresponding to scans along the black side of U.S. bills. More particularly, according to a preferred embodiment, multiple black-side master patterns are stored for $20, $50 and $100 bills. For each of these denominations, three master patterns are stored for scans in the forward and reverse directions for a total of six patterns for each denomination. For a given scan direction, black-side master patterns are generated by scanning a corresponding denominated bill along a segment located about the center of the narrow dimension of the bill, a segment slightly displaced (0.2 inches) to the left of center, and a segment slightly displaced (0.2 inches) to the right of center. When the scanned pattern generated from the green side of a test bill fails to sufficiently correlate with one of the green-side master patterns, the scanned pattern generated from the black side of a test bill is then compared to black-side master patterns in some situations as described in more detail below in conjunction with FIGS. 19a–19c.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 (FIGS. 2a and FIG. 2b) which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Referring again to the preferred embodiment depicted in FIG. 2d, as a result of the first comparison described above based on the reflected light intensity information retrieved by scanhead 18, the CPU 30 will have either determined the denomination of the scanned bill 17 or determined that the first scanned signal samples fail to sufficiently correlate with any of the sets of stored intensity signal samples in which case an error is generated. Provided that an error has not been generated as a result of this first comparison based on reflected light intensity characteristics, a second comparison is performed. This second comparison is performed based on a second type of characteristic information, such as alternate reflected light properties, similar reflected light properties at alternate locations of a bill, light transmissivity properties, various magnetic properties of a bill, the presence of a security thread embedded within a bill, the color of a bill, the thickness or other dimension of a bill, etc. The second type of characteristic information is retrieved from a scanned bill by the second scanhead 39. The scanning and processing by scanhead 39 may be controlled in a manner similar to that described above with regard to scanhead 18.

In addition to the sets of stored first characteristic information, in this example stored intensity signal samples, the EPROM 34 stores sets of stored second characteristic information for genuine bills of the different denominations which the system 10 is capable of handling. Based on the denomination indicated by the first comparison, the CPU 30 retrieves the set or sets of stored second characteristic data for a genuine bill of the denomination so indicated and compares the retrieved information with the scanned second characteristic information. If sufficient correlation exists between the retrieved information and the scanned information, the CPU 30 verifies the genuineness of the scanned bill 17. Otherwise, the CPU generates an error. While the preferred embodiment illustrated in FIG. 2d depicts a single CPU 30 for making comparisons of first and second characteristic information and a single EPROM 34 for storing first and second characteristic information, it is understood that two or more CPUs and/or EPROMs could be used, including one CPU for making first characteristic information comparisons and a second CPU for making second characteristic information comparisons. Using the above sensing and correlation approach, the CPU 30 is programmed to count the number of bills belonging to a particular currency denomination whose genuineness has been verified as part of a given set of bills that have been scanned for a given scan batch, and to determine the aggregate total of the currency amount represented by the bills scanned during a scan batch.

Referring now to FIGS. 7a and 7b, there is shown a representation, in block diagram form, of a preferred circuit arrangement for processing and correlating reflectance data according to the system of this invention. The CPU 30 accepts and processes a variety of input signals including those from the optical encoder 32, the sensor 26 and the erasable programmable read only memory (EPROM) 60. The EPROM 60 has stored within it the correlation program on the basis of which patterns are generated and test patterns compared with stored master programs in order to identify the denomination of test currency. A crystal 40 serves as the time base for the CPU 30, which is also provided with an external reference voltage $V_{REF}$ 42 on the basis of which peak detection of sensed reflectance data is performed.

According to one embodiment, the CPU 30 also accepts a timer reset signal from a reset unit 44 which, as shown in FIG. 7b, accepts the output voltage from the photodetector 26 and compares it, by means of a threshold detector 44a, relative to a pre-set voltage threshold, typically 5.0 volts, to provide a reset signal which goes "high" when a reflectance value corresponding to the presence of paper is sensed. More specifically, reflectance sampling is based on the premise that no portion of the illuminated light strip (24 in FIG. 2a) is reflected to the photodetector in the absence of a bill positioned below the scanhead. Under these conditions, the output of the photodetector represents a "dark" or "zero" level reading. The photodetector output changes to a "white" reading, typically set to have a value of about 5.0 volts, when the edge of a bill first becomes positioned below the scanhead and falls under the light strip 24. When this occurs, the reset unit 44 provides a "high" signal to the CPU 30 and marks the initiation of the scanning procedure.

The machine-direction dimension, that is, the dimension parallel to the direction of bill movement, of the illuminated strip of light produced by the light sources within the scanhead is set to be relatively small for the initial stage of the scan when the thin borderline is being detected, according to a preferred embodiment. The use of the narrow slit increases the sensitivity with which the reflected light is detected and allows minute variations in the "gray" level reflected off the bill surface to be sensed. This ensures that the thin borderline of the pattern, i.e., the starting point of the printed pattern on the bill, is accurately detected. Once the borderline has been detected, subsequent reflectance sampling is performed on the basis of a relatively wider light strip in order to completely scan across the narrow dimension of the bill and obtain the desired number of samples, at a rapid rate. The use of a wider slit for the actual sampling also smoothes out the output characteristics of the photodetector and realizes the relatively large magnitude of analog voltage which is desirable for accurate representation and processing of the detected reflectance values.

The CPU 30 processes the output of the sensor 26 through a peak detector 50 which essentially functions to sample the sensor output voltage and hold the highest, i.e., peak, voltage value encountered after the detector has been enabled. For U.S. currency, the peak detector is also adapted to define a scaled voltage on the basis of which the printed borderline on the currency bills is detected. The output of the peak detector 50 is fed to a voltage divider 54 which lowers the peak voltage down to a scaled voltage $V_S$ representing a predefined percentage of this peak value. The voltage $V_S$ is based upon the percentage drop in output voltage of the peak detector as it reflects the transition from the "high" reflectance value resulting from the scanning of the unprinted edge portions of a currency bill to the relatively lower "gray" reflectance value resulting when the thin borderline is encountered. Preferably, the scaled voltage $V_S$ is set to be about 70–80 percent of the peak voltage.

The scaled voltage $V_S$ is supplied to a line detector 56 which is also provided with the incoming instantaneous output of the sensor 26. The line detector 56 compares the two voltages at its input side and generates a signal $L_{DET}$ which normally stays "low" and goes "high" when the edge of the bill is scanned. The signal $L_{DET}$ goes "low" when the incoming sensor output reaches the pre-defined percentage of the peak output up to that point, as represented by the voltage $V_S$. Thus, when the signal $L_{DET}$ goes "low", it is an indication that the borderline of the bill pattern has been detected. At this point, the CPU 30 initiates the actual reflectance sampling under control of the encoder 32, and the desired fixed number of reflectance samples are obtained as the currency bill moves across the illuminated light strip and is scanned along the central section of its narrow dimension.

When master characteristic patterns are being generated, the reflectance samples resulting from the scanning of one or more genuine bills for each denomination are loaded into corresponding designated sections within a system memory 60, which is preferably an EPROM. During currency discrimination, the reflectance values resulting from the scanning of a test bill are sequentially compared, under control of the correlation program stored within the EPROM 60, with the corresponding master characteristic patterns stored within the EPROM 60. A pattern averaging procedure for scanning bills and generating characteristic patterns is described below in connection with FIGS. 15a–15e.

Figure 8A:
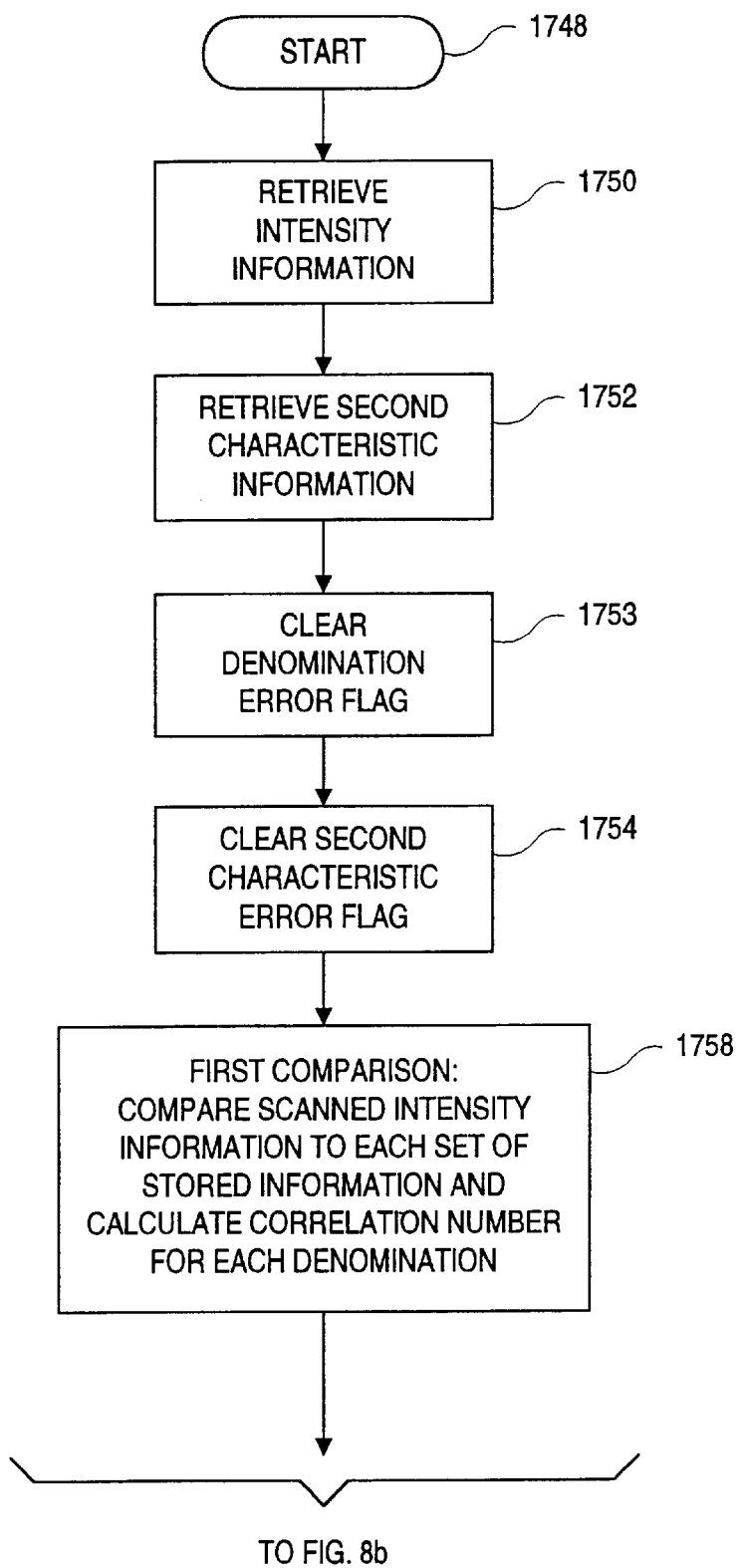
FIGS. 8a and 8b comprise a flowchart illustrating the sequence of operations involved in implementing a discrimination and authentication system according to a preferred embodiment of the present invention.
Figure 8B:
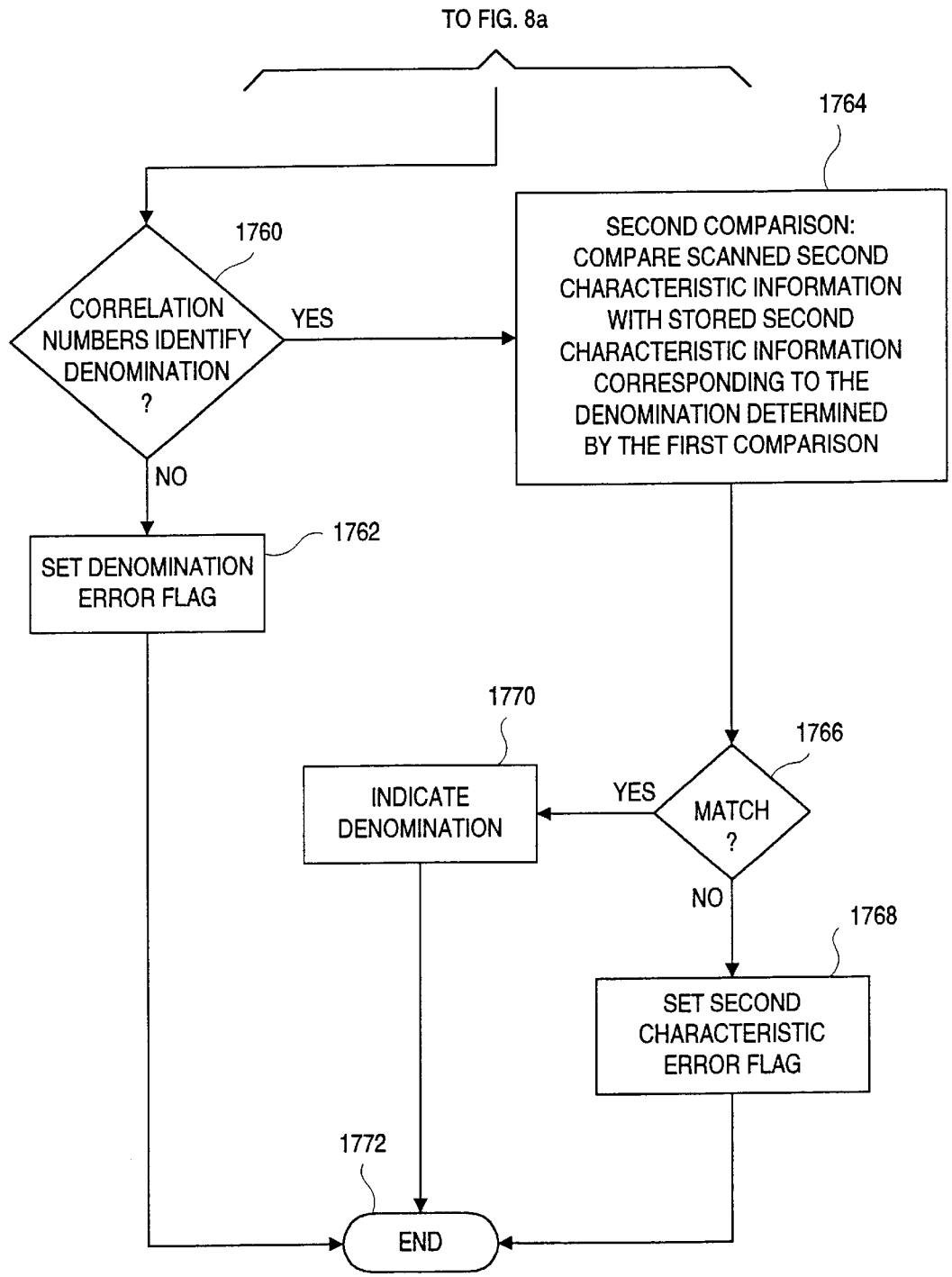

The interrelation between the use of the first and second type of characteristic information can be seen by considering FIGS. 8a and 8b which comprise a flowchart illustrating the sequence of operations involved in implementing a discrimination and authentication system according to a preferred embodiment of the present invention. Upon the initiation of the sequence of operations (step 1748), reflected light intensity information is retrieved from a bill being scanned (step 1750). Similarly, second characteristic information is also retrieved from the bill being scanned (step 1752). Denomination error and second characteristic error flags are cleared (steps 1753 and 1754).

Next the scanned intensity information is compared to each set of stored intensity information corresponding to genuine bills of all denominations the system is programmed to accommodate (step 1758). For each denomination, a correlation number is calculated. The system then, based on the correlation numbers calculated, determines either the denomination of the scanned bill or generates a denomination error by setting the denomination error flag steps 1760 and 1762). In the case where the denomination error flag is set (step 1762), the process is ended (step 1772). Alternatively, if based on this first comparison, the system is able to determine the denomination of the scanned bill, the system proceeds to compare the scanned second characteristic information with the stored second characteristic information corresponding to the denomination determined by the first comparison (step 1764).

For example, if as a result of the first comparison the scanned bill is determined to be a $20 bill, the scanned second characteristic information is compared to the stored second characteristic information corresponding to a genuine $20 bill. In this manner, the system need not make comparisons with stored second characteristic information for the other denominations the system is programmed to accommodate. If based on this second comparison (step 1764) it is determined that the scanned second characteristic information does not sufficiently match that of the stored second characteristic information (step 1766), then a second characteristic error is generated by setting the second characteristic error flag (step 1768) and the process is ended (step 1772). If the second comparison results in a sufficient match between the scanned and stored second characteristic information (step 1766), then the denomination of the scanned bill is indicated (step 1770) and the process is ended (step 1772).

An example of an interrelationship between authentication based on first and second characteristics can be seen by considering Table 1. The denomination determined by optical scanning of a bill is preferably used to facilitate authentication of the bill by magnetic scanning, using the relationship set forth in Table 1.

TABLE 1

| Denomination | Sensitivity | | | | |
|---|---|---|---|---|---|
| | 1 | 2 | 3 | 4 | 5 |
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

Table 1 depicts relative total magnetic content thresholds for various denominations of genuine bills. Columns 1–5 represent varying degrees of sensitivity. The values in Table 1 are set based on the scanning of genuine bills of varying denominations for total magnetic content and setting required thresholds based on the degree of sensitivity selected. The information in Table 1 is based on the total magnetic content of a genuine $1 being 1000. The following discussion is based on a sensitivity setting of 4. In this example it is assumed that magnetic content represents the second characteristic tested. If the comparison of first characteristic information, such as reflected light intensity, from a scanned billed and stored information corresponding to genuine bills results in an indication that the scanned bill is a $10 denomination, then the total magnetic content of the scanned bill is compared to the total magnetic content threshold of a genuine $10 bill, i.e., 200. If the magnetic content of the scanned bill is less than 200, the bill is rejected. Otherwise it is accepted as a $10 bill.

Figure 9:
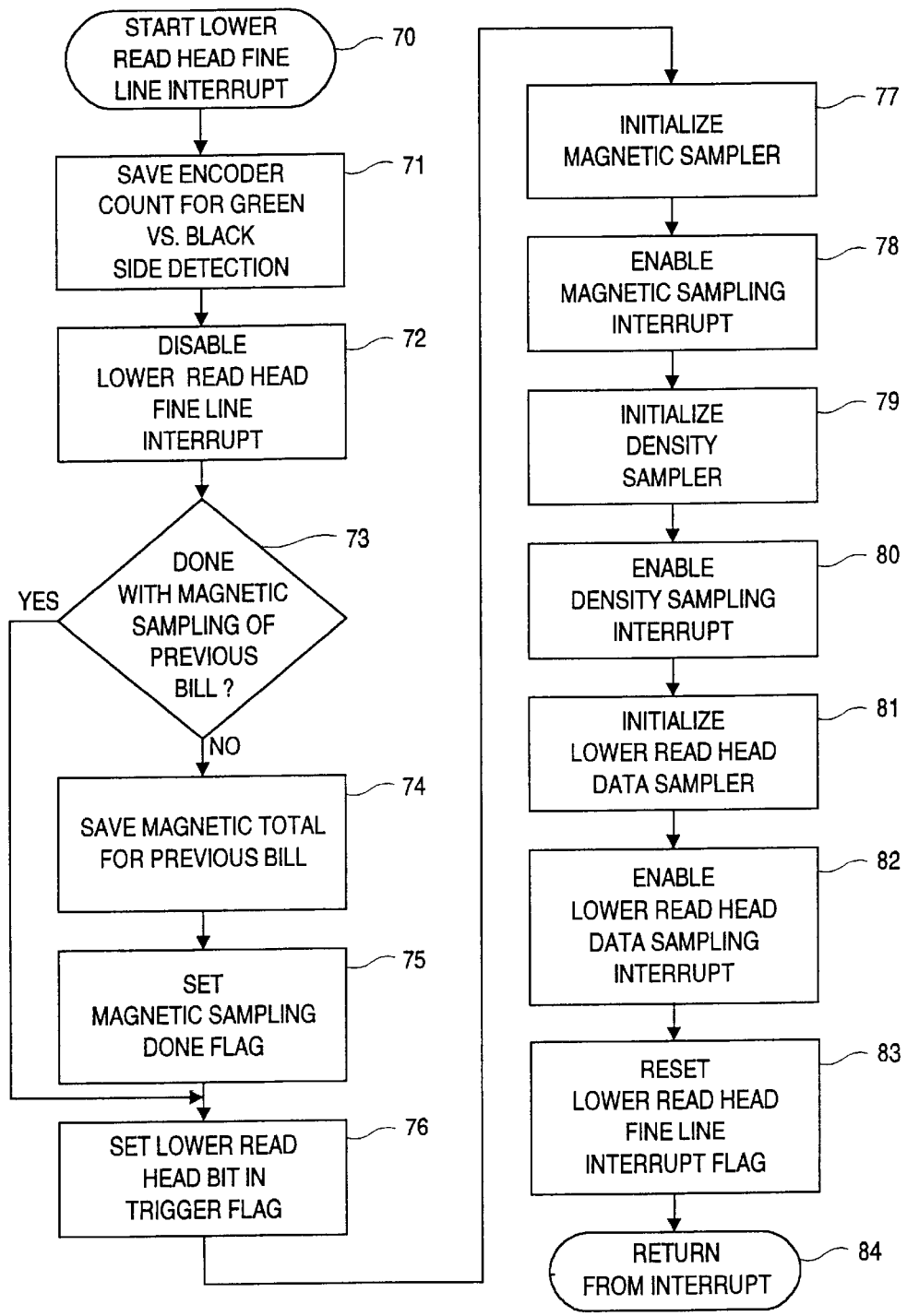
FIG. 9 is a flow chart illustrating the sequential procedure involved in detecting the presence of a bill adjacent the lower scanhead and the borderline on the side of the bill adjacent to the lower scanhead.
Figure 10:
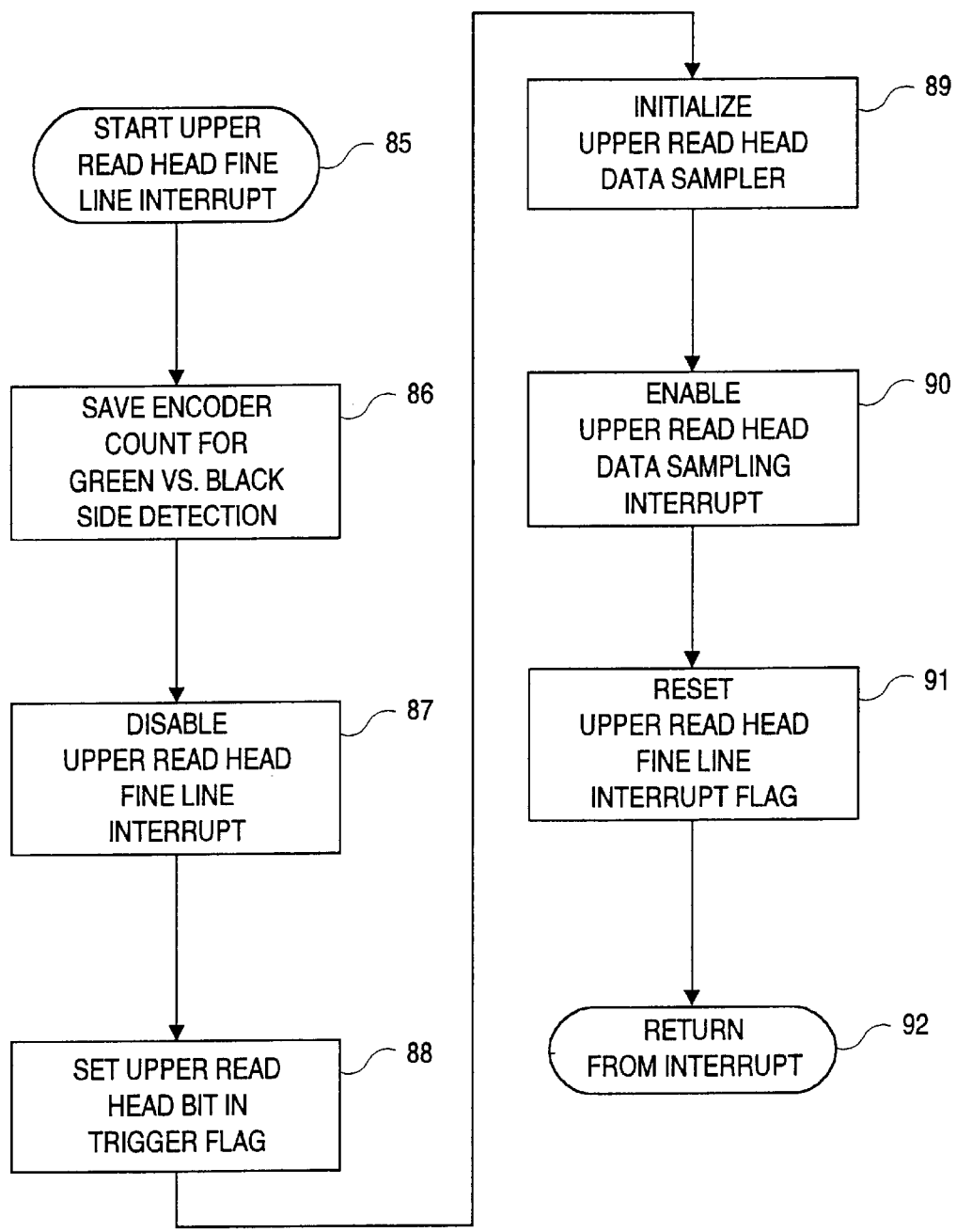
FIG. 10 is a flow chart illustrating the sequential procedure involved in detecting the presence of a bill adjacent the upper scanhead and the borderline on the side of the bill adjacent to the upper scanhead.

Referring now to FIGS. 9–11*b*, there are shown flow charts illustrating the sequence of operations involved in implementing the above-described optical sensing and correlation technique. FIGS. 9 and 10, in particular, illustrate the sequences involved in detecting the presence of a bill adjacent the scanheads and the borderlines on each side of the bill. Turning to FIG. 9, at step 70, the lower scanhead fine line interrupt is initiated upon the detection of the fine line by the lower scanhead. An encoder counter is maintained that is incremented for each encoder pulse. The encoder counter scrolls from 0–65,535 and then starts at 0 again. At step 71 the value of the encoder counter is stored in memory upon the detection of the fine line by the lower scanhead. At step 72 the lower scanhead fine line interrupt is disabled so that it will not be triggered again during the interrupt period. At step 73, it is determined whether the magnetic sampling has been completed for the previous bill. If it has not, the magnetic total for the previous bill is stored in memory at step 74, and the magnetic sampling done flag is set at step 75 so that magnetic sampling of the present bill may thereafter be performed. Steps 74 and 75 are skipped if it is determined at step 73 that the magnetic sampling has been completed for the previous bill. At step 76, a lower scanhead bit in the trigger flag is set. This bit is used to indicate that the lower scanhead has detected the fine line. The magnetic sampler is initialized at step 77, and the magnetic sampling interrupt is enabled at step 78. A density sampler is initialized at step 79, and a density sampling interrupt is enabled at step 80. The lower read data sampler is initialized at step 81, and a lower scanhead data sampling interrupt is enabled at step 82. At step 83, the lower scanhead fine line interrupt flag is reset, and at step 84 the program returns from the interrupt.

Turning to FIG. 10, at step 85, the upper scanhead fine line interrupt is initiated upon the detection of the fine line by the upper scanhead. At step 86 the value of the encoder counter is stored in memory upon the detection of the fine line by the upper scanhead. This information in connection with the encoder counter value associated with the detection of the fine line by the lower scanhead may then be used to determine the face orientation of a bill, that is whether a bill is fed green side up or green side down in the case of U.S. bills, as is described in, more detail below in connection with FIG. 12. At step 87 the upper scanhead fine line interrupt is disabled so that it will not be triggered again during the interrupt period. At step 88, the upper scanhead bit in the trigger flag is set. This bit is used to indicate that the upper scanhead has detected the fine line. By checking the lower and upper scanhead bits in the trigger flag, it can be determined whether each side has detected a respective fine line. Next, the upper scanhead data sampler is initialized at step 89, and the upper scanhead data sampling interrupt is enabled at step 90. At step 91, the upper scanhead fine line interrupt flag is reset, and at step 92 the program returns from the interrupt.

Figure 11A:
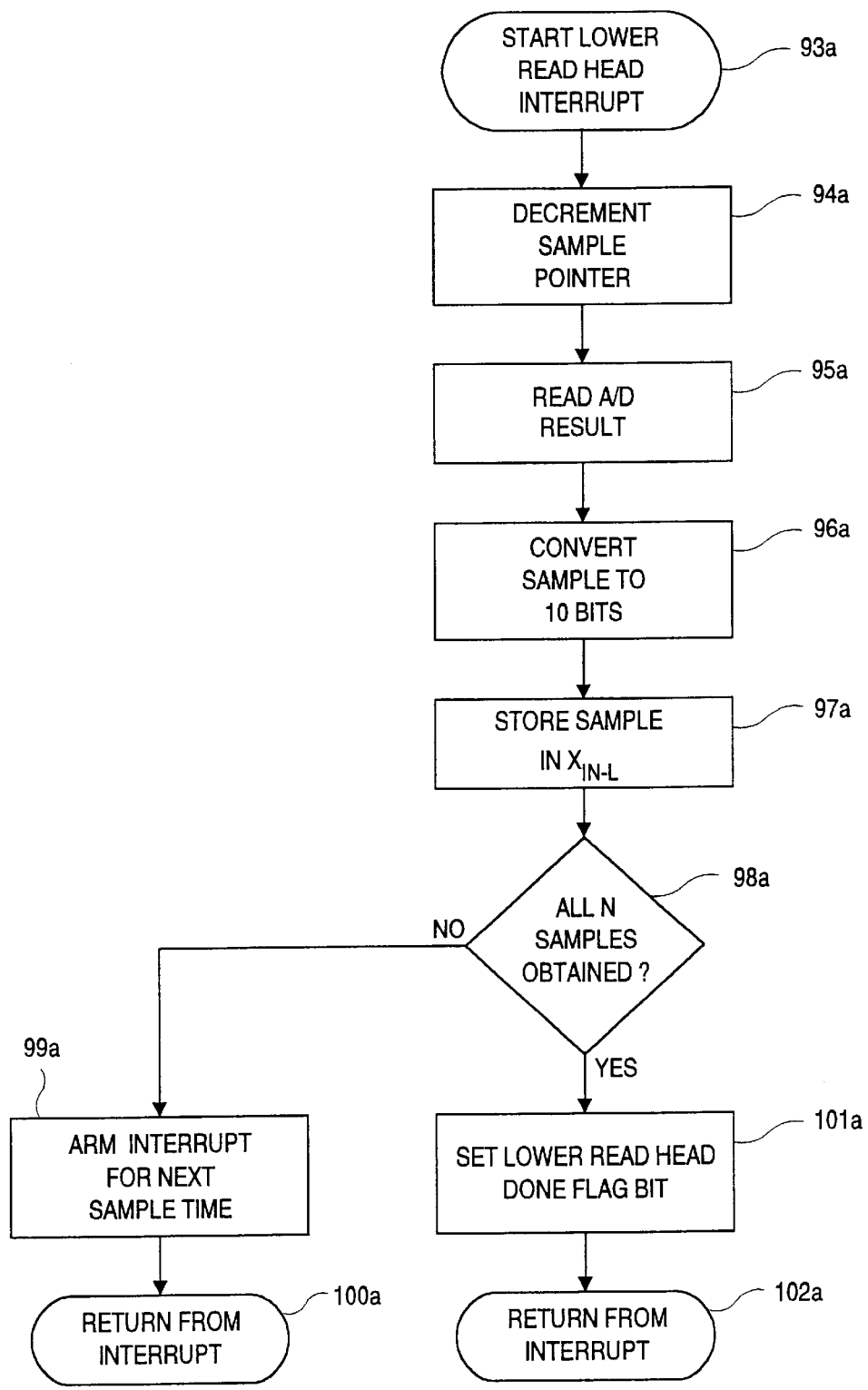
FIG. 11a is a flow chart illustrating the sequential procedure involved in the analog-to-digital conversion routine associated with the lower scanhead.
Figure 11B:
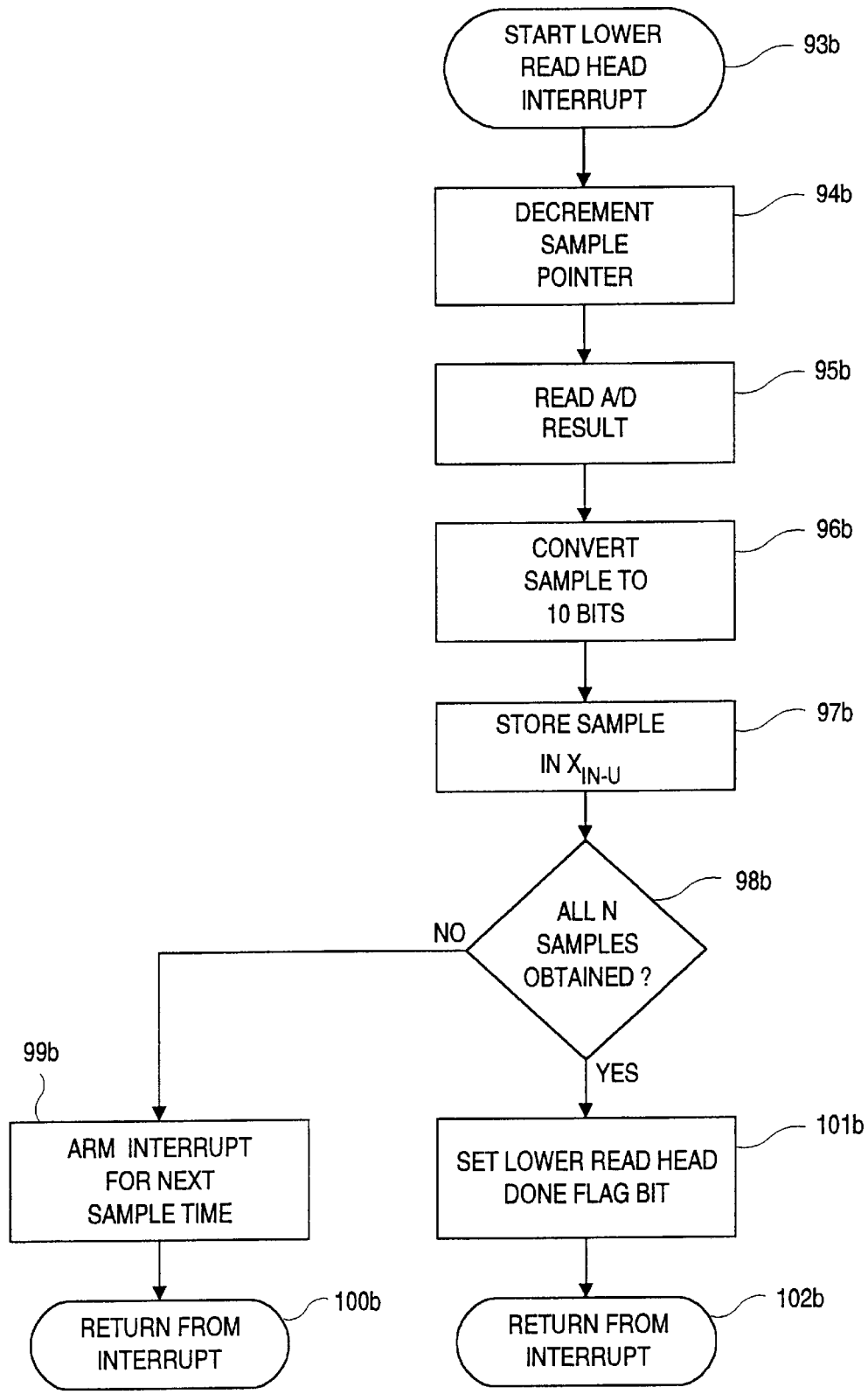
FIG. 11b is a flow chart illustrating the sequential procedure involved in the analog-to-digital conversion routine associated with the upper scanhead.

Referring now to FIGS. 1*a* and 11*b*, there are shown, respectively, the digitizing routines associated with the lower and upper scanheads. FIG. 11*a* is a flow chart illustrating the sequential procedure involved in the analog-to-digital conversion routine associated with the lower scanhead. The routine is started at step 93*a*. Next, the sample pointer is decremented at step 94*a* so as to maintain an indication of the number of samples remaining to be obtained. The sample pointer provides an indication of the sample being obtained and digitized at a given time. At step 95*a*, the digital data corresponding to the output of the photodetector associated with the lower scanhead for the current sample is read. The data is converted to its final form at step 96a and stored within a pre-defined memory segment as $X_{IN-L}$ at step 97a.

Next, at step 98a, a check is made to see if the desired fixed number of samples "N" has been taken. If the answer is found to be negative, step 99a is accessed where the interrupt authorizing the digitization of the succeeding sample is enabled, and the program returns from interrupt at step 10a for completing the rest of the digitizing process. However, if the answer at step 98a is found to be positive, i.e., the desired number of samples have already been obtained, a flag, namely the lower scanhead done flag bit, indicating the same is set at step 101a, and the program returns from interrupt at step 102a.

FIG. 11b is a flow chart illustrating the sequential procedure involved in the analog-to-digital conversion routine associated with the upper scanhead. The routine is started at step 93b. Next, the sample pointer is decremented at step 94b so as to maintain an indication of the number of samples remaining to be obtained. The sample pointer provides an indication of the sample being obtained and digitized at a given time. At step 95b, the digital data corresponding to the output of the photodetector associated with the upper scanhead for the current sample is read. The data is converted to its final form at step 96b and stored within a pre-defined memory segment as $X_{IN-U}$ at step 97b.

Next, at step 98b, a check is made to see if the desired fixed number of samples "N" has been taken. If the answer is found to be negative, step 99b is accessed where the interrupt authorizing the digitization of the succeeding sample is enabled and the program returns from interrupt at step 100b for completing the rest of the digitizing process. However, if the answer at step 98b is found to be positive, i.e., the desired number of samples have already been obtained, a flag, namely the upper scanhead done flag bit, indicating the same is set at step 101b, and the program returns from interrupt at step 102b.

Figure 12:
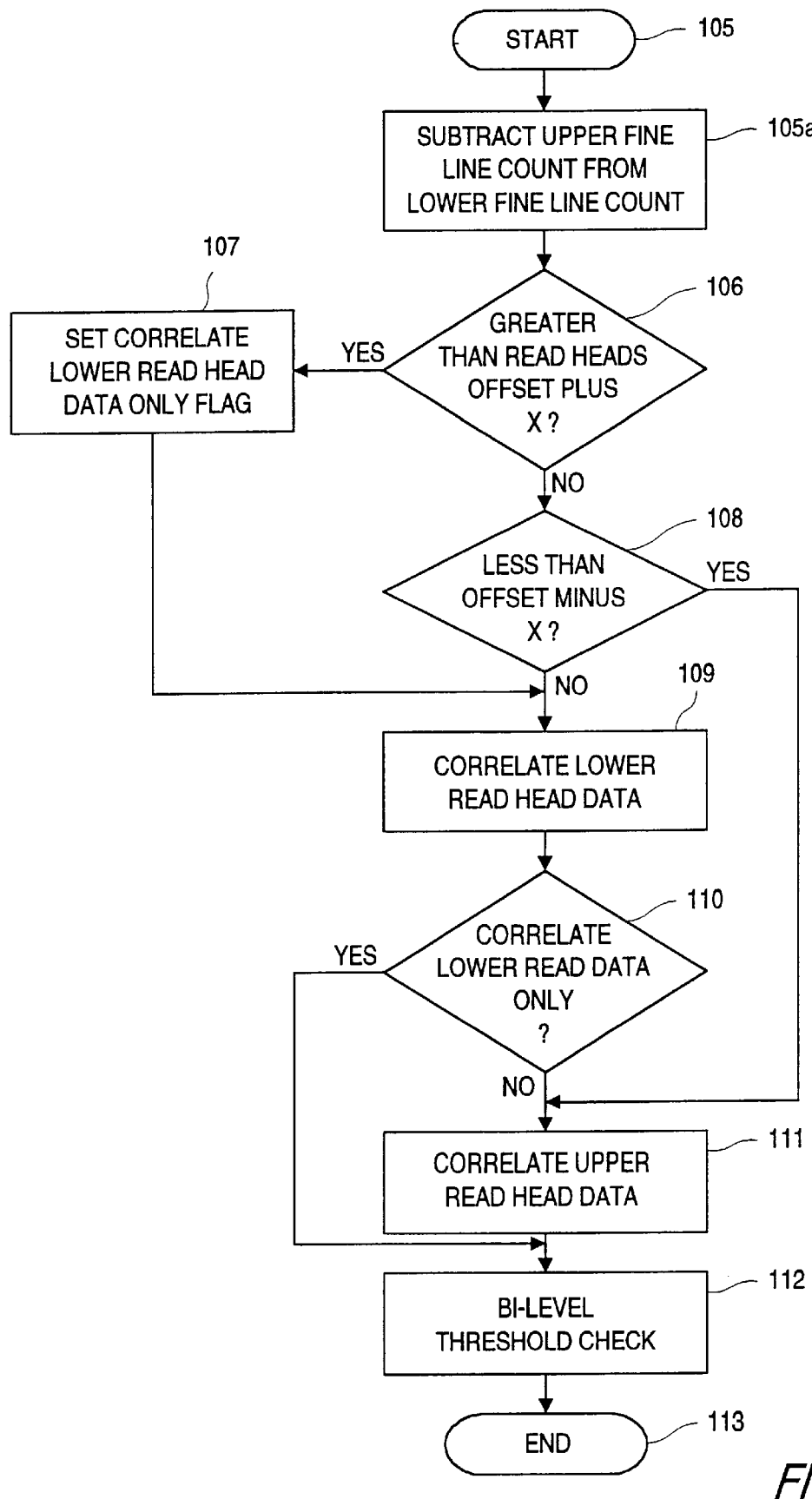
FIG. 12 is a flow chart illustrating the sequential procedure involved in determining which scanhead is scanning the green side of a U.S. currency bill.

The CPU 30 is programmed with the sequence of operations in FIG. 12 to correlate at least initially only the test pattern corresponding to the green surface of a scanned bill. As shown in FIGS. 6c–6d, the upper scanhead 18a is located slightly upstream adjacent the bill transport path relative to the lower scanhead 18b. The distance between the scanheads 18a, 18b in a direction parallel to the transport path corresponds to a predetermined number of encoder counts. It should be understood that the encoder 32 produces a repetitive tracking signal synchronized with incremental movements of the bill transport mechanism, and this repetitive tracking signal has a repetitive sequence of counts (e.g., 65,535 counts) associated therewith. As a bill is scanned by the upper and lower scanheads 18a, 18b, the CPU 30 monitors the output of the upper scanhead 18a to detect the borderline of a first bill surface facing the upper scanhead 18a. Once this borderline of the first surface is detected, the CPU 30 retrieves and stores a first encoder count in memory. Similarly, the CPU 30 monitors the output of the lower scanhead 18b to detect the borderline of a second bill surface facing the lower scanhead 18b. Once the borderline of the second surface is detected, the CPU 30 retrieves and stores a second encoder count in memory.

Referring to FIG. 12, the CPU 30 is programmed to calculate the difference between the first and second encoder counts (step 105a). If this difference is greater than the predetermined number of encoder counts corresponding to the distance between the scanheads 18a, 18b plus some safety factor number "X", e.g., 20 (step 106), the bill is oriented with its black surface facing the upper scanhead 18a and its green surface facing the lower scanhead 18b. This can best be understood by reference to FIG. 6c which shows a bill with the foregoing orientation. In this situation, once the borderline $B_1$ of the black surface passes beneath the upper scanhead 18a and the first encoder count is stored, the borderline $B_2$ still must travel for a distance greater than the distance between the upper and lower scanheads 18a, 18b in order to pass over the lower scanhead 18b. As a result, the difference between the second encoder count associated with the borderline $B_2$ and the first encoder count associated with the borderline $B_1$ will be greater than the predetermined number of encoder counts corresponding to the distance between the scanheads 18a, 18b. With the bill oriented with its green surface facing the lower scanhead, the CPU 30 sets a flag to indicate that the test pattern produced by the lower scanhead 18b should be correlated (step 107). Next, this test pattern is correlated with the green-side master characteristic patterns stored in memory (step 109).

If at step 106 the difference between the first and second encoder counts is less than the predetermined number of encoder counts corresponding to the distance between the scanheads 18a, 18b, the CPU 30 is programmed to determine whether the difference between the first and second encoder counts is less than the predetermined number minus some safety number "X", e.g., 20 (step 108). If the answer is negative, the orientation of the bill relative to the scanheads 18a, 18b is uncertain, so the CPU 30 is programmed to correlate the test patterns produced by both the upper and lower scanheads 18a, 18b with the green-side master characteristic patterns stored in memory (steps 109, 110, and 111).

If the answer is affirmative, the bill is oriented with its green surface facing the upper scanhead 18a and its black surface facing the lower scanhead 18b. This can best be understood by reference to FIG. 6d, which shows a bill with the foregoing orientation. In this situation, once the borderline $B_2$ of the green surface passes beneath the upper scanhead 18a and the first encoder count is stored, the borderline $B_1$ must travel for a distance less than the distance between the upper and lower scanheads 18a, 18b in order to pass over the lower scanhead 18b. As a result, the difference between the second encoder count associated with the borderline $B_1$ and the first encoder count associated with the borderline $B_2$ should be less than the predetermined number of encoder counts corresponding to the distance between the scanheads 18a, 18b. To be on the safe side, it is required that the difference between first and second encoder counts be less than the predetermined number minus the safety number "X". Therefore, the CPU 30 is programmed to correlate the test pattern produced by the upper scanhead 18a with the green-side master characteristic patterns stored in memory (step 111).

After correlating the test pattern associated with either the upper scanhead 18a, the lower scanhead 18b, or both scanheads 18a, 18b, the CPU 30 is programmed to perform the bi-level threshold check (step 112).

A simple correlation procedure is utilized for processing digitized reflectance values into a form which is conveniently and accurately compared to corresponding values pre-stored in an identical format. More specifically, as a first step, the mean value $\overline{X}$ for the set of digitized reflectance samples (comparing "n" samples) obtained for a bill scan run is first obtained as below:

$$\overline{X} = \sum_{i=0}^{n} \frac{X_i}{n} \quad (1)$$

Subsequently, a normalizing factor Sigma ("σ") is determined as being equivalent to the sum of the square of the difference between each sample and the means, as normalized by the total number n samples. More specifically, the normalizing factor is calculated as below:

$$\sigma = \sum_{i=0}^{n} \frac{|X_i - \overline{X}|^2}{n} \quad (2)$$

In the final step, each reflectance sample is normalized by obtaining the difference between the sample and the above-calculated mean value and dividing it by the square root of the normalizing factor a as defined by the following equation:

$$X_n = \frac{X_i - \overline{X}}{(\sigma)^{\frac{1}{2}}} \quad (3)$$

The result of using the above correlation equations is that, subsequent to the normalizing process, a relationship of correlation exists between a test pattern and a master pattern such that the aggregate sum of the products of corresponding samples in a test pattern and any master pattern, when divided by the total number of samples, equals unity if the patterns are identical. Otherwise, a value less than unity is obtained. Accordingly, the correlation number or factor resulting from the comparison of normalized samples within a test pattern to those of a stored master pattern provides a clear indication of the degree of similarity or correlation between the two patterns.

According to a preferred embodiment of this invention, the fixed number of reflectance samples which are digitized and normalized for a bill scan is selected to be 64. It has experimentally been found that the use of higher binary orders of samples (such as 128, 256, etc.) does not provide a correspondingly increased discrimination efficiency relative to the increased processing time involved in implementing the above-described correlation procedure. It has also been found that the use of a binary order of samples lower than 64, such as 32, produces a substantial drop in discrimination efficiency.

The correlation factor can be represented conveniently in binary terms for ease of correlation. In a preferred embodiment, for instance, the factor of unity which results when a hundred percent correlation exists is represented in terms of the binary number $2^{10}$, which is equal to a decimal value of 1024. Using the above procedure, the normalized samples within a test pattern are compared to the master characteristic patterns stored within the system memory in order to determine the particular stored pattern to which the test pattern corresponds most closely by identifying the comparison which yields a correlation number closest to 1024.

A bi-level threshold of correlation is required to be satisfied before a particular call is made, for at least certain denominations of bills. More specifically, the correlation procedure is adapted to identify the two highest correlation numbers resulting from the comparison of the test pattern to one of the stored patterns. At that point, a minimum threshold of correlation is required to be satisfied by these two correlation numbers. It has experimentally been found that a correlation number of about 850 serves as a good cut-off threshold above which positive calls may be made with a high degree of confidence and below which the designation of a test pattern as corresponding to any of the stored patterns is uncertain. As a second threshold level, a minimum separation is prescribed between the two highest correlation numbers before making a call. This ensures that a positive call is made only when a test pattern does not correspond, within a given range of correlation, to more than one stored master pattern. Preferably, the minimum separation between correlation numbers is set to be 150 when the highest correlation number is between 800 and 850. When the highest correlation number is below 800, no call is made.

The procedure involved in comparing test patterns to master patterns is discussed below in connection with FIG. 18a.

Figure 13:
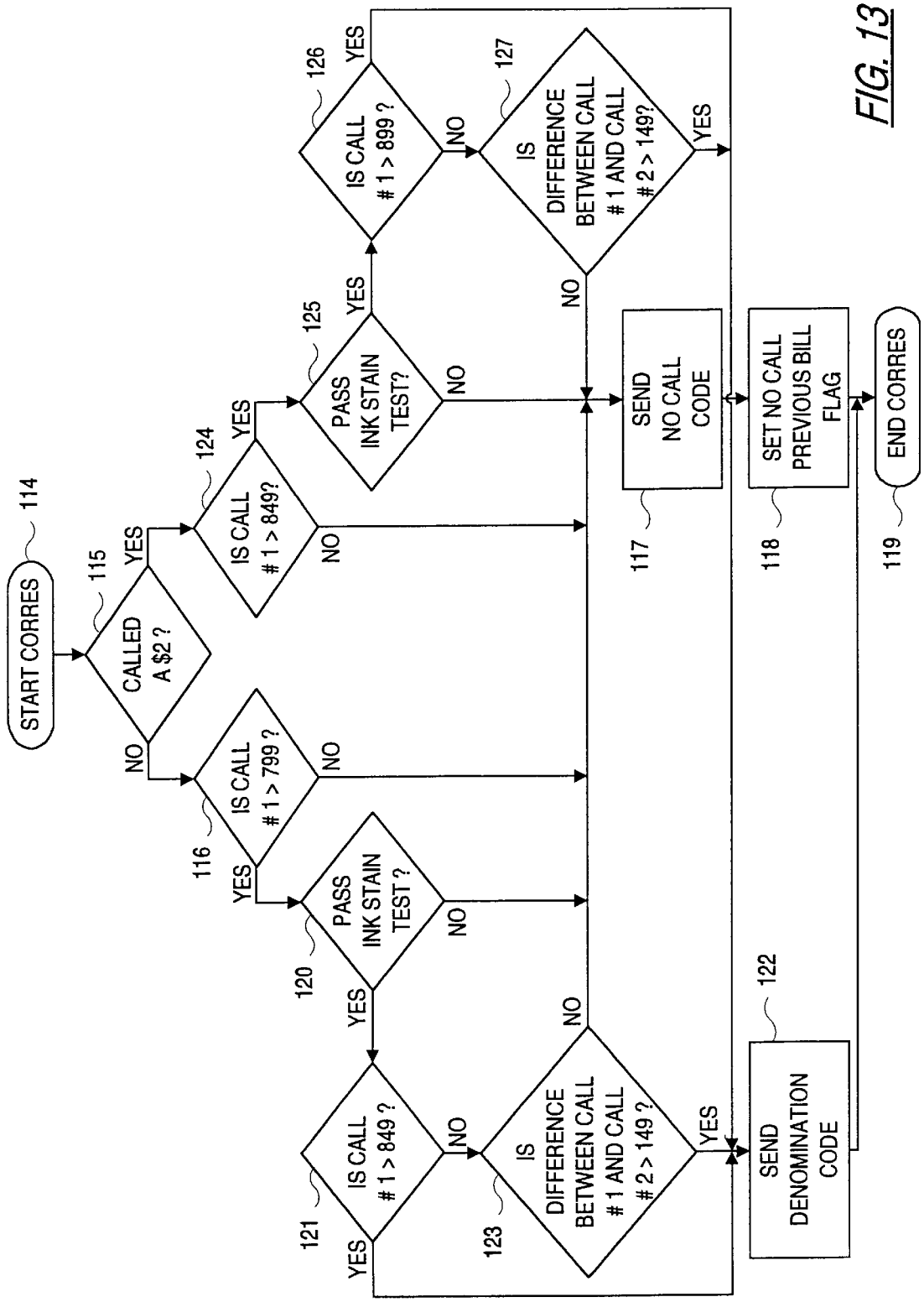
FIG. 13 is a flow chart illustrating the sequence of operations involved in determining the bill denomination from the correlation results.

Next a routine designated as "CORRES" is initiated. The procedure involved in executing the routine CORRES is illustrated at FIG. 13 which shows the routine as starting at step 114. Step 115 determines whether the bill has been identified as a $2 bill, and, if the answer is negative, step 116 determines whether the best correlation number ("call #1") is greater than 799. If the answer is negative, the correlation number is too low to identify the denomination of the bill with certainty, and thus step 117 generates a "no call" code. A "no call previous bill" flag is then set at step 118, and the routine returns to the main program at step 119.

An affirmative answer at step 116 advances the system to step 120, which determines whether the sample data passes an ink stain test (described below). If the answer is negative, a "no call" code is generated at step 117. If the answer is affirmative, the system advances to step 121 which determines whether the best correlation number is greater than 849. An affirmative answer at step 121 indicates that the correlation number is sufficiently high that the denomination of the scanned bill can be identified with certainty without any further checking. Consequently, a "denomination" code identifying the denomination represented by the stored pattern resulting in the highest correlation number is generated at step 122, and the system returns to the main program at step 119.

A negative answer at step 121 indicates that the correlation number is between 800 and 850. It has been found that correlation numbers within this range are sufficient to identify all bills except the $2 bill. Accordingly, a negative response at step 121 advances the system to step 123 which determines whether the difference between the two highest correlation numbers ("call #1" and "call #2") is greater than 149. If the answer is affirmative, the denomination identified by the highest correlation number is acceptable, and thus the "denomination" code is generated at step 122. If the difference between the two highest correlation numbers is less than 150, step 123 produces a negative response which advances the system to step 117 to generate a "no call" code.

Returning to step 115, an affirmative response at this step indicates that the initial call is a $2 bill. This affirmative response initiates a series of steps 124–127 which are identical to steps 116, 120, 121 and 123 described above, except that the numbers 799 and 849 used in steps 116 and 121 are changed to 849 and 899, respectively, in steps 124 and 126. The result is either the generation of a "no call" code at step 117 or the generation of a $2 "denomination" code at step 122.

One problem encountered in currency recognition and counting systems is the difficulty involved in interrupting (for a variety of reasons) and resuming the scanning and counting procedure as a stack of bills is being scanned. If a particular currency recognition unit (CRU) has to be halted in operation due to a "major" system error, such as a bill being jammed along the transport path, there is generally no concern about the outstanding transitional status of the overall recognition and counting process. However, where the CRU has to be halted due to a "minor" error, such as the identification of a scanned bill as being a counterfeit (based on a variety of monitored parameters) or a "no call" (a bill which is not identifiable as belonging to a specific currency denomination based on the plurality of stored master patterns and/or other criteria), it is desirable that the transitional status of the overall recognition and counting process be retained so that the CRU may be restarted without any effective disruptions of the recognition/counting process.

More specifically, once a scanned bill has been identified as a "no call" bill ($B_1$) based on some set of predefined criteria, it is desirable that this bill $B_1$ be transported directly to a return conveyor or to the system stacker, and the CRU brought to a halt, while at the same time ensuring that the following bills are maintained in positions along the bill transport path whereby CRU operation can be conveniently resumed without any disruption of the recognition/counting process.

Since the bill processing speeds at which currency recognition systems must operate are substantially high (speeds of the order of 350 to 1500 bills per minute), it is practically impossible to totally halt the system following a "no call" without the following bill $B_2$ already overlapping the optical scanhead and being partially scanned. As a result, it is virtually impossible for the CRU system to retain the transitional status of the recognition/counting process (particularly with respect to bill $B_2$) in order that the process may be resumed once the bad bill $B_1$ has been dealt with, and the system restarted. The basic problem is that if the CRU is halted with bill $B_2$ only partially scanned, it is difficult to reference the data reflectance samples extracted therefrom in such a way that the scanning may be later continued (when the CRU is restarted) from exactly the same point where the sample extraction process was interrupted when the CRU was stopped.

Even if an attempt were made at immediately halting the CRU system following a "no call," any subsequent scanning of bills would be totally unreliable because of mechanical backlash effects and the resultant disruption of the optical encoder routine used for bill scanning. Consequently, when the CRU is restarted, the call for the following bill is also likely to be bad and the overall recognition/counting process is totally disrupted as a result of an endless loop of "no calls."

The above problems are solved by the use of a currency detecting and counting technique whereby a scanned bill identified as a "no call" is transported directly to the return conveyor which returns the bill to the customer, while the CRU is halted without adversely affecting the data collection and processing steps for a succeeding bill. Accordingly, when the CRU is restarted, the overall bill recognition and counting procedure can be resumed without any disruption as if the CRU had never been halted at all.

According to a preferred technique, if the bill is identified as a "no call" based on any of a variety of conventionally defined bill criteria, the CRU is subjected to a controlled deceleration process whereby the speed at which bills are moved across the scanhead is reduced from the normal operating speed. During this deceleration process the "no call" bill ($B_1$) is transported to the return conveyor, at the same time, the following bill $B_2$ is subjected to the standard scanning procedure in order to identify the denomination.

The rate of deceleration is such that optical scanning of bill $B_2$ is completed by the time the CRU operating speed is reduced to a predefined operating speed. While the exact operating speed at the end of the scanning of bill $B_2$ is not critical, the objective is to permit complete scanning of bill $B_2$ without subjecting it to backlash effects that would result if the ramping were too fast, while at the same time ensuring that bill $B_1$ has in fact been transported to the return conveyor.

It has been experimentally determined that at nominal operating speeds of the order of 1000 bills per minute, the deceleration is preferably such that the CRU operating speed is reduced to about one-fifth of its normal operating speed at the end of the deceleration phase, i.e., by the time optical scanning of bill B has been completed. It has been determined that at these speed levels, positive calls can be made as to the denomination of bill $B_2$ based on reflectance samples gathered during the deceleration phase with a relatively high degree of certainty (i.e., with a correlation number exceeding about 850).

Once the optical scanning of bill $B_2$ has been completed, the speed is reduced to an even slower speed until the bill $B_2$ has passed bill-edge sensors S1 and S2 described below, and the bill $B_2$ is then brought to a complete stop. At the same time, the results of the processing of scanned data corresponding to bill $B_2$ are stored in system memory. The ultimate result of this stopping procedure is that the CRU is brought to a complete halt following the point where the scanning of bill $B_2$ has been reliably completed, and the scan procedure is not subjected to the disruptive effects (backlash, etc.) which would result if a complete halt were attempted immediately after bill $B_1$ is identified as a "no call."

The reduced operating speed of the machine at the end of the deceleration phase is such that the CRU can be brought to a total halt before the next following bill $B_3$ has been transported over the optical scanhead. Thus, when the CRU is in fact halted, bill $B_1$ is in the return conveyor, bill $B_2$ is maintained in transit between the optical scanhead and the stacking station after it has been subjected to scanning, and the following bill $B_3$ is stopped short of the optical scanhead.

Figure 14:
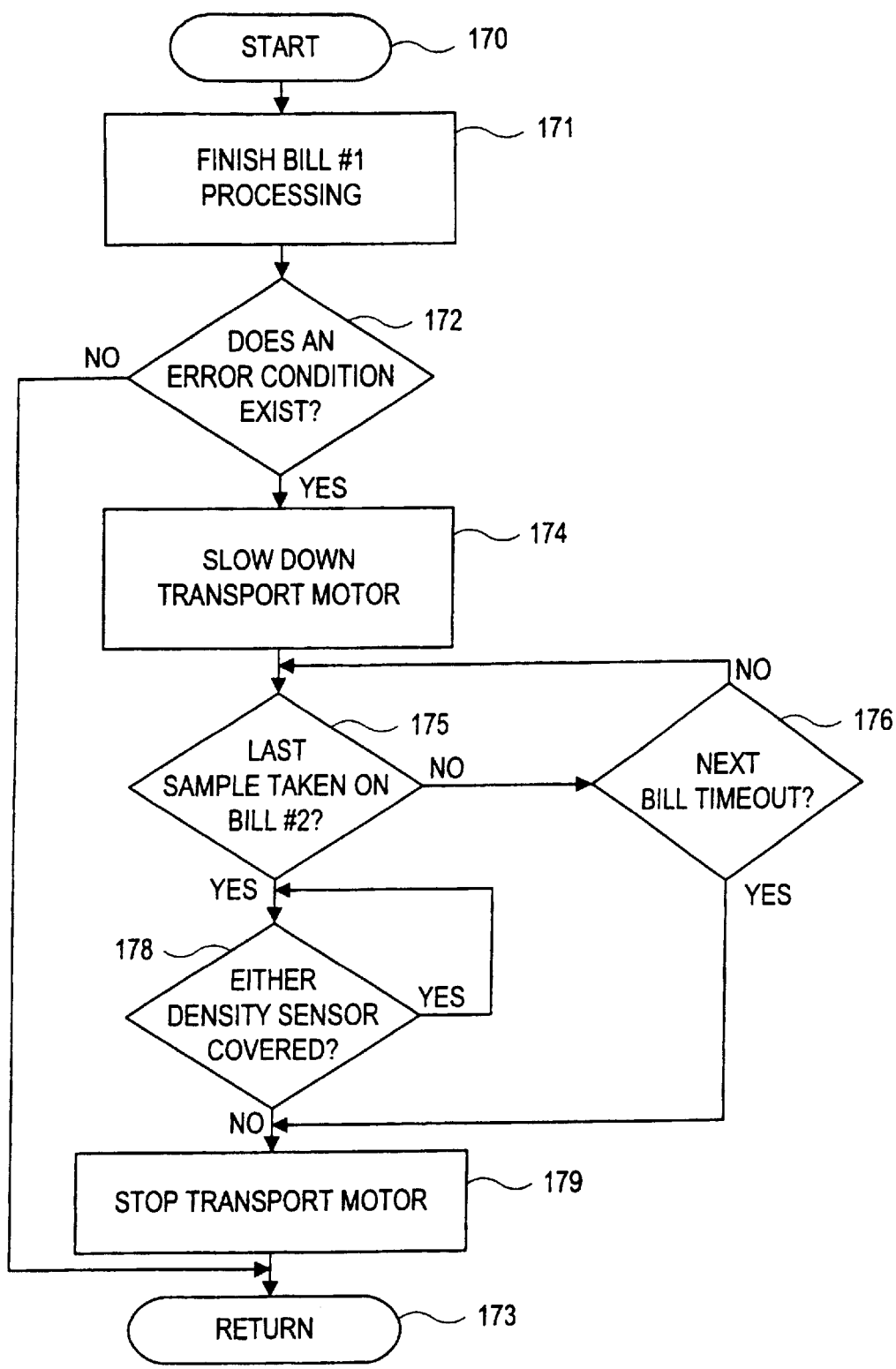
FIG. 14 is a flow chart illustrating the sequential procedure involved in decelerating and stopping the bill transport system in the event of an error.

When the CRU is restarted, the overall scanning operation can be resumed in an uninterrupted fashion by using the stored call results for bill $B_2$ as the basis for updating the system count appropriately, moving bill $B_2$ from its earlier transitional position along the transport path into the stacking station, and moving bill $B_3$ along the transport path into the optical scanhead area where it can be subjected to normal scanning and processing. A routine for executing the deceleration/stopping procedure described above is illustrated by the flow chart in FIG. 14. This routine is initiated at step 170 with the CRU in its normal operating mode. At step 171, a test bill $B_1$ is scanned and the data reflectance samples resulting therefrom are processed. Next, at step 172, a determination is made as to whether or not test bill $B_1$ is a "no call" using predefined criteria in combination with the overall bill recognition procedure, such as the routine of FIG. 13. If the answer at step 172 is negative, i.e., the test bill $B_1$ can be identified, step 173 is accessed where normal bill processing is continued in accordance with the procedures described above. If, however, the test bill $B_1$ is found to be a "no call" at step 172, step 174 is accessed where CRU deceleration is initiated, e.g., the transport drive motor speed is reduced to about one-fifth its normal speed.

Subsequently, the "no call" bill $B_1$ is guided to the return conveyor while, at the same time, the following test bill $B_2$ is brought under the optical scanhead and subjected to the scanning and processing steps. The call resulting from the scanning and processing of bill $B_2$ is stored in system memory at this point. Step 175 determines whether the scanning of bill $B_2$ is complete. When the answer is negative, step 176 determines whether a preselected "bill timeout" period has expired so that the system does not wait for the scanning of a bill that is not present. An affirmative answer at step 176 results in the transport drive motor being stopped at step 179 while a negative answer at step 176 causes steps 175 and 176 to be reiterated until one of them produces an affirmative response.

After the scanning of bill $B_2$ is complete and before stopping the transport drive motor, step 178 determines whether either of the sensors S1 or S2 (described below) is covered by a bill. A negative answer at step 178 indicates that the bill has cleared both sensors S1 and S2, and thus the transport drive motor is stopped at step 179. This signifies the end of the deceleration/stopping process. At this point in time, bill $B_2$ remains in transit while the following bill $B_3$ is stopped on the transport path just short of the optical scanhead.

Following step 179, corrective action responsive to the identification of a "no call" bill is conveniently undertaken, and the CRU is then in condition for resuming the scanning process. Accordingly, the CRU can be restarted and the stored results corresponding to bill $B_2$, are used to appropriately update the system count. Next, the identified bill $B_2$ is guided along the transport path to the stacking station, and the CRU continues with its normal processing routine. While the above deceleration process has been described in the context of a "no call" error, other minor errors (e.g., suspect bills, stranger bills in stranger mode, etc.) are handled in the same manner.

In currency discrimination systems in which discrimination is based on the comparison of a pattern obtained from scanning a subject bill to stored master patterns corresponding to various denominations, the patterns which are designated as master patterns significantly influence the performance characteristics of the discrimination system. According to a preferred technique, a master pattern for a given denomination is generated by averaging a plurality of component patterns. Each component pattern is generated by scanning a genuine bill of the given denomination.

Figure 15A:
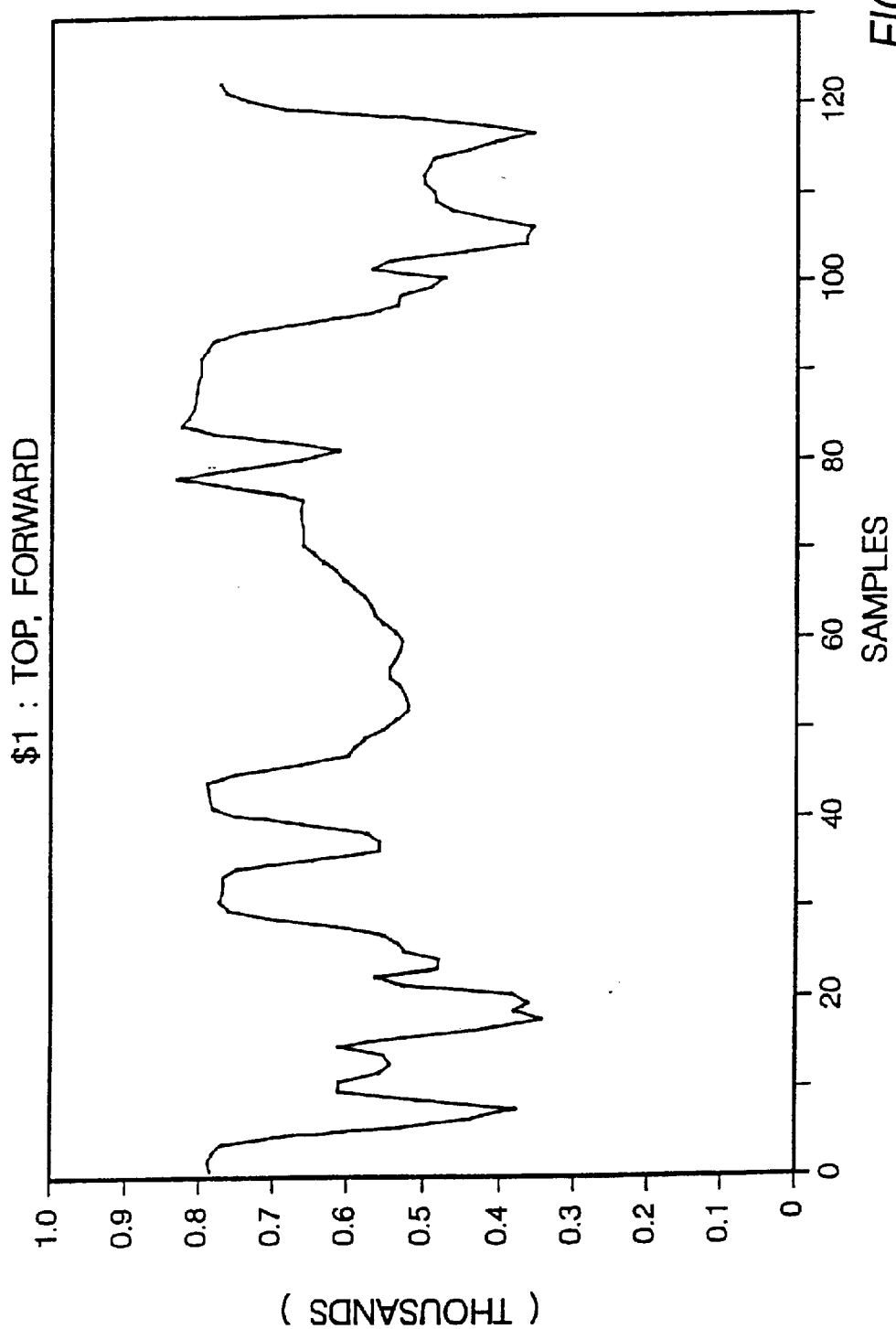
FIG. 15a is a graphical illustration of representative characteristic patterns generated by narrow dimension optical scanning of a $1 currency bill in the forward direction.
Figure 15B:
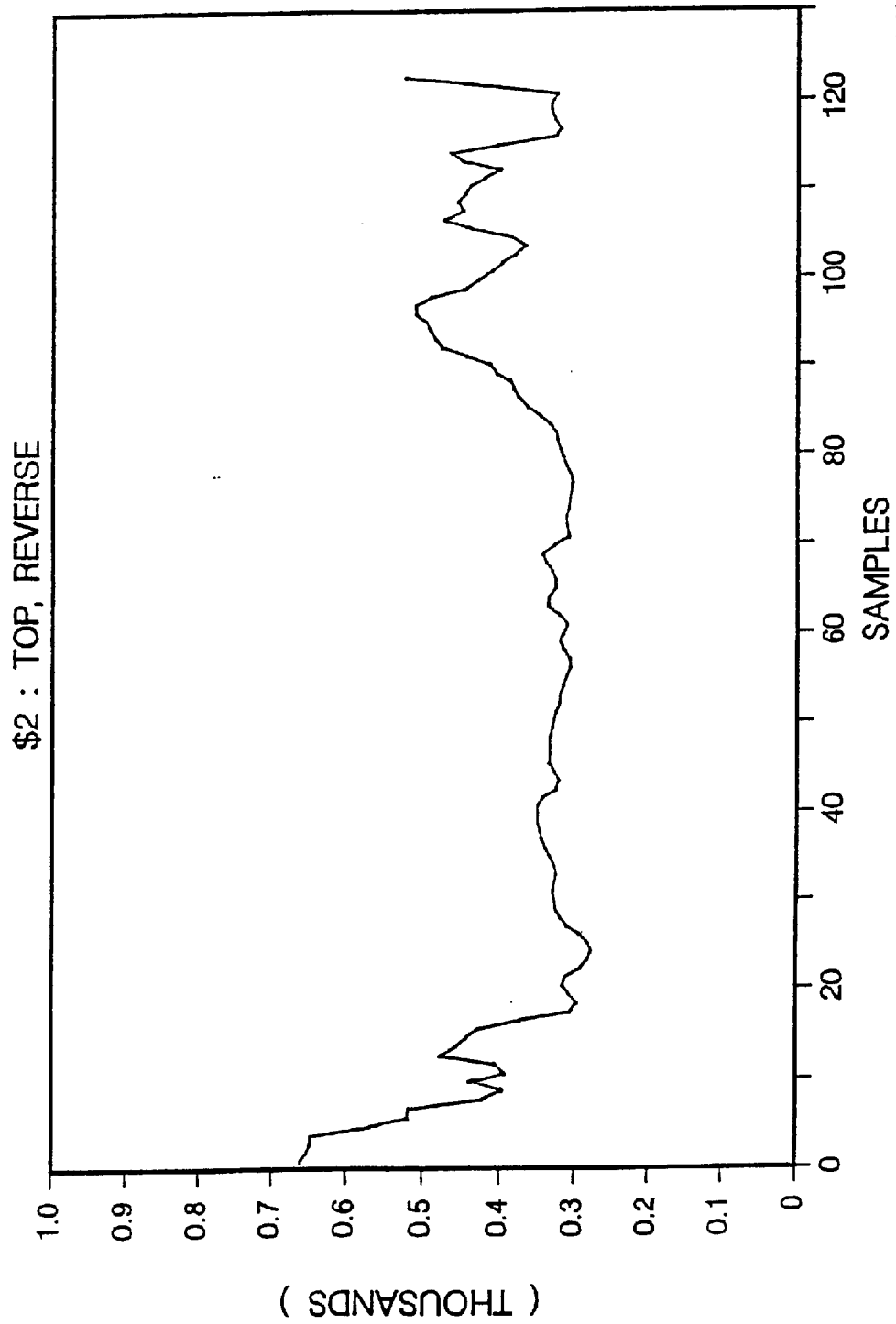
FIG. 15b is a graphical illustration of representative characteristic patterns generated by narrow dimension optical scanning of a $2 currency bill in the reverse direction.
Figure 15C:
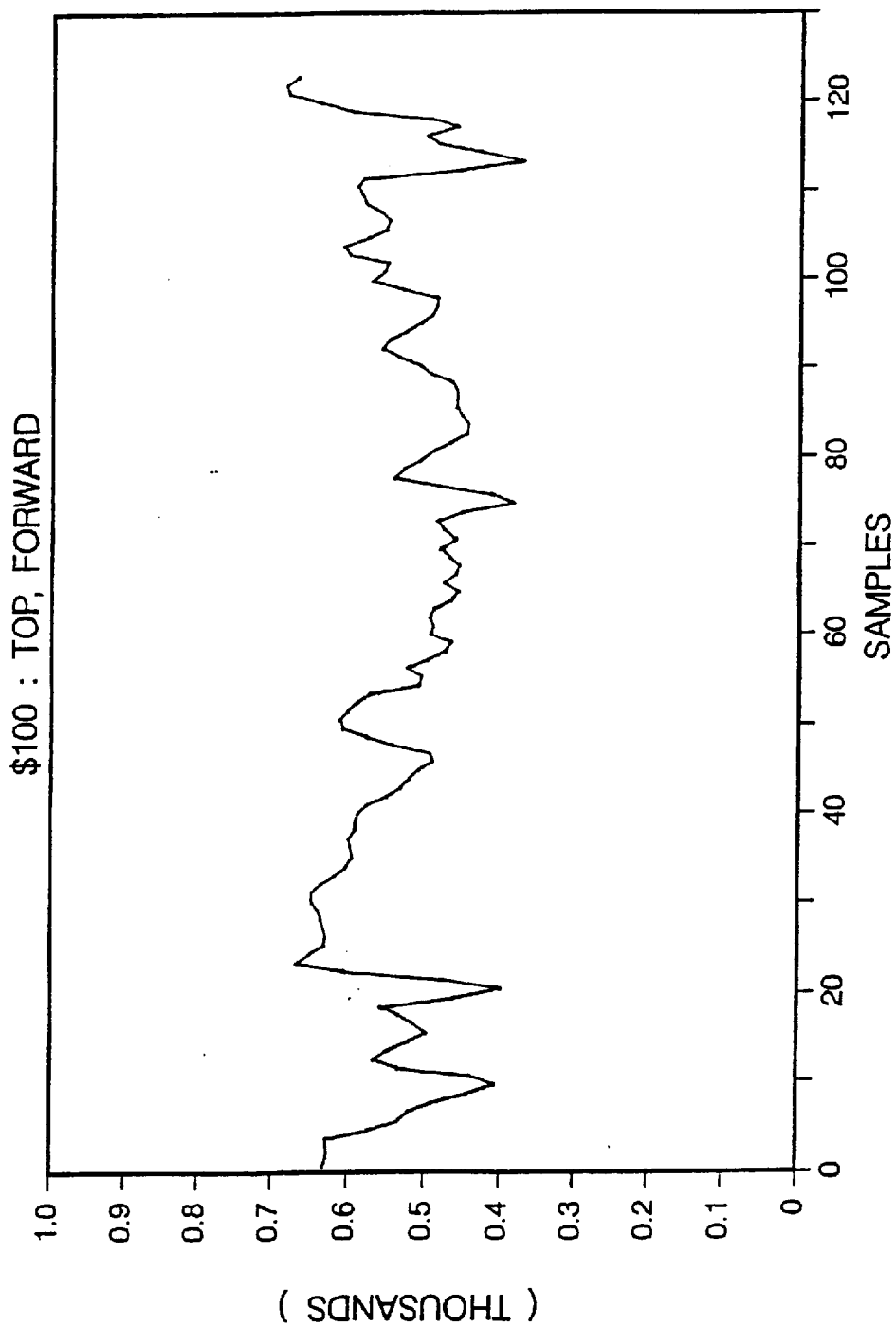
FIG. 15c is a graphical illustration of representative characteristic patterns generated by narrow dimension optical scanning of a $100 currency bill in the forward direction.

According to a first method, master patterns are generated by scanning a standard bill a plurality of times, typically three (3) times, and obtaining the average of corresponding data samples before storing the average as representing a master pattern. In other words, a master pattern for a given denomination is generated by averaging a plurality of component patterns, wherein all of the component patterns are generated by scanning a single genuine bill of "standard" quality of the given denomination. The "standard" bill is a slightly used bill, as opposed to a crisp new bill or one which has been subject to a high degree of usage. Rather, the standard bill is a bill of good to average quality. Component patterns generated according to this first methods are illustrated in FIGS. 15a–15c. More specifically, FIGS. 15a–15c show three test patterns generated, respectively, for the forward scanning of a $1 bill along its green side, the reverse scanning of a $2 bill on its green side, and the forward scanning of a $100 bill on its green side. It should be noted that, for purposes of clarity the test patterns in FIGS. 15a–15c were generated by using 128 reflectance samples per bill scan, as opposed to the preferred use of only 64 samples. The marked difference existing among corresponding samples for these three test patterns is indicative of the high degree of confidence with which currency denominations may be called using the foregoing optical sensing and correlation procedure.

According to a second method, a master pattern for a given denomination is generated by scanning two or more standard bills of standard quality and obtaining a plurality of component patterns. These component patterns are then averaged in deriving a master pattern. For example, it has been found that some genuine $5 bills have dark stairs on the Lincoln Memorial while other genuine $5 bills have light stairs. To compensate for this variation, standard bills for which component patterns are derived may be chosen with at least one standard bill scanned having dark stairs and with at least one standard bill having light stairs.

It has been found that an alternate method can lead to improved performance in a discrimination systems, especially with regards to certain denominations. For example, it has been found that the printed indicia on a $10 bill has changed slightly with 1990 series bills incorporating security threads. More specifically, 1990 series $10 bills have a borderline-to-borderline dimension which is slightly greater than previous series $10 bills. Likewise it has been found that the scanned pattern of an old, semi-shrunken $5 bill can differ significantly from the scanned pattern of a new $5 bill.

According to a third method, a master pattern for a given denomination is generated by averaging a plurality of component patterns, wherein some of the component patterns are generated by scanning one or more new bills of the given denomination, and some of the component patterns are generated by scanning one or more old bills of the given denomination. New bills are bills of good quality which have been printed in recent years and have a security thread incorporated therein (for those denominations in which security threads are placed). New bills are preferably relatively crisp. A new $10 bill is preferably a 1990 series or later bill of very high quality, meaning that the bill is in near mint condition. Old bills are bills exhibiting some shrinkage and often some discoloration. Shrinkage may result from a bill having been subjected to a relatively high degree of use. A new bill utilized in this third method is of higher quality than a standard bill of the previous methods, while an old bill in this third method is of lower quality than a standard bill.

The third method can be understood by considering Table 2 which summarizes the manner in which component patterns are generated for a variety of denominations.

TABLE 2

Component Scans by Denomination

| Denomination | Scan Direction | CP1 | CP2 | CP3 |
| --- | --- | --- | --- | --- |
| $1 | Forward | −0.2 std | 0.0 std | +0.2 std |
| $1 | Reverse | −0.2 std | 0.0 std | +0.2 std |
| $2, left | Forward | −0.2 std | −0.15 std | −0.1 std |
| $2, left | Reverse | −0.2 std | −0.15 std | −0.1 std |
| $2, right | Forward | 0.0 std | +0.1 std | +0.2 std |
| $2, right | Reverse | 0.0 std | +0.1 std | +0.2 std |
| $5 | Forward | −0.2 old (lt str) | 0.0 new (dk str) | +0.2 old (lt str) |
| $5 | Reverse | −0.2 old (lt str) | 0.0 new (dk str) | +0.2 old (lt str) |
| $10, left | Forward | −0.2 old | −0.1 new | 0.0 old |

TABLE 2-continued

Component Scans by Denomination

| Denomination | Scan Direction | CP1 | CP2 | CP3 |
|---|---|---|---|---|
| $10, left | Reverse | 0.0 old | +0.1 new | +0.2 old |
| $10, right | Forward | +0.1 old | +0.2 new | +0.3 old |
| $10, right | Reverse | −0.2 old | −0.15 new | −0.1 old |
| $20 | Forward | −0.2 old | 0.0 new | +0.2 old |
| $20 | Reverse | −0.2 old | 0.0 new | +0.2 old |
| $50 | Forward | −0.2 std | 0.0 std | +0.2 std |
| $50 | Reverse | −0.2 std | 0.0 std | +0.2 std |
| $100 | Forward | −0.2 std | 0.0 std | +0.2 std |
| $100 | Reverse | −0.2 std | 0.0 std | +0.2 std |

Table 2 summarizes the position of the scanhead relative to the center of the green surface of United States currency as well as the type of bill to be scanned for generating component patterns for various denominations. The three component patterns ("CP") for a given denomination and for a given scan direction are averaged to yield a corresponding master pattern. The eighteen (18) rows correspond to the preferred method of storing eighteen (18) master patterns. The scanhead position is indicated relative to the center of the borderlined area of the bill. Thus a position of "0.0" indicates that the scanhead is centered over the center of the borderlined area of the bill. Displacements to the left of center are indicated by negative numbers, while displacements to the right are indicated by positive numbers. Thus a position of "−0.2" indicates a displacement of 2/10th of an inch to the left of the center of a bill, while a position of "+0.1" indicates a displacement of 1/10ths of an inch to the right of the center of a bill.

Figure 15D:
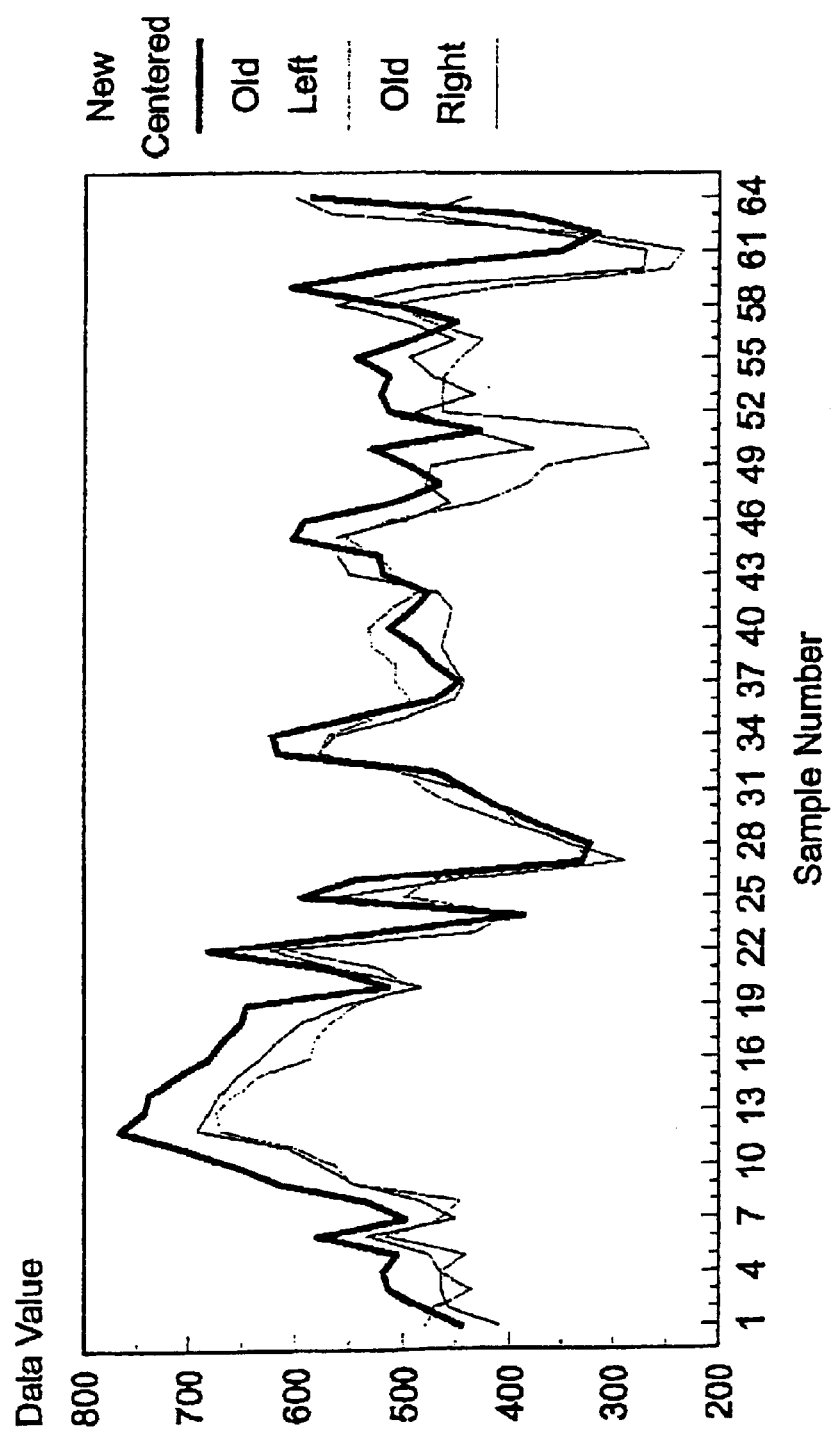
FIG. 15d is a graph illustrating component patterns generated by scanning old and new $20 bills according a second method according to a preferred embodiment of the present invention.
Figure 15E:
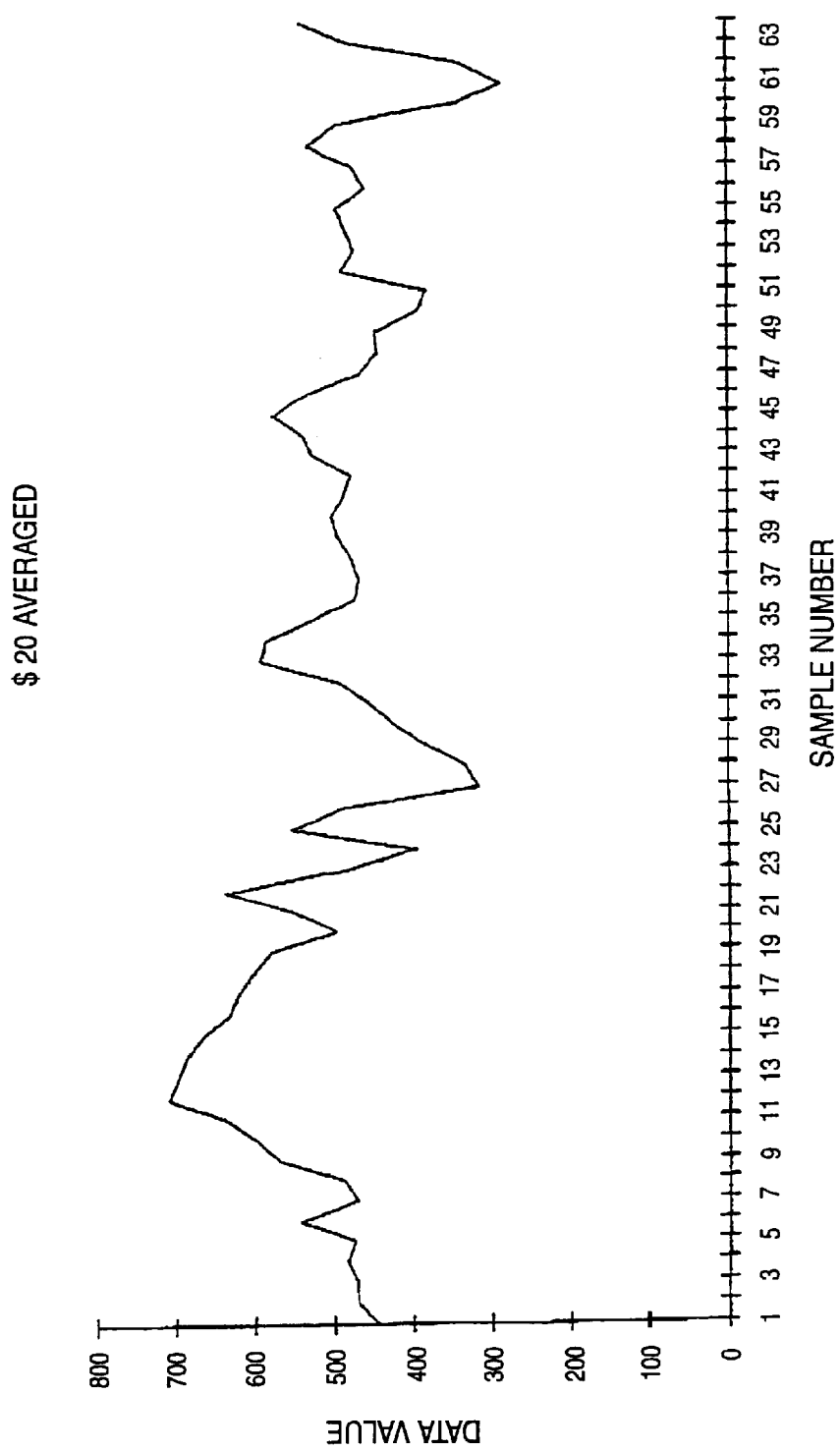
FIG. 15e is a graph illustrating an pattern for a $20 bill scanned in the forward direction derived by averaging the patterns of FIG. 15d according a second method according to a preferred embodiment of the present invention.

Accordingly, Table 2 indicates that component patterns for a $20 bill scanned in the forward direction are obtained by scanning an old $20 bill 2/10ths of a inch to the right and to the left of the center of the bill and by scanning a new $20 bill directly down the center of the bill. FIG. 15d is a graph illustrating these three patterns. These three patterns are then averaged to obtain the master pattern for a $20 bill scanned in the forward direction. FIG. 15e is a graph illustrating a pattern for a $20 bill scanned in the forward direction derived by averaging the patterns of FIG. 15d. This pattern becomes the corresponding $20 master pattern after undergoing normalization. In generating the master patterns, one may use a scanning device in which a bill to be scanned is held stationary and a scanhead is moved over the bill. Such a device permits the scanhead to be moved laterally, left and right, over a bill to be scanned and thus permits the scanhead to be positioned over the area of the bill which one wishes to scan, for example, 2/10ths of inch to the left of the center of the borderlined area.

As discussed above, for $10 bills two patterns are obtained in each scan direction with one pattern being scanned slightly to the left of the center and one pattern being scanned slightly to the right of the center. For $5 bills, it has been found that some $5 bills are printed with darker stairs ("dk str") on the picture of the Lincoln Memorial while others are printed with lighter stairs ("lt str"). The effect of this variance is averaged out by using an old bill having light stairs and a new bill having dark stairs.

As can be seen from Table 2, for some bills, the third method of using old and new bills is not used; rather, a standard ("std") bill is used for generating all three component patterns as with the first method. Thus, the master pattern for a $1 bill scanned in the forward direction is obtained by averaging three component patterns generated by scanning a standard bill three times, once 2/10ths of an inch to the left, once down the center, and once 2/10ths of an inch to the right.

As illustrated by Table 2, a discrimination system may employ a combination of methods wherein, for example, some master patterns are generated according the first method and some master patterns are generated according to the third method. Likewise, a discrimination system may combine the scanning of new, standard, and old bills to generate component patterns to be averaged in obtaining a master pattern. Additionally, a discrimination system may generate master patterns by scanning bills of various qualities and/or having various characteristics and then averaging the resultant patterns. Alternatively, a discrimination system may scan multiple bills of a given quality for a given denomination, e.g., three new $50 bills, while scanning one or more bills of a different quality for a different denomination, e.g., three old and worn $1 bills, to generate component patterns to be averaged in obtaining master patterns.

In order to accommodate or nullify the effect of such bill shrinking, the above-described correlation technique can be modified by use of a progressive shifting approach whereby a test pattern which does not correspond to any of the master patterns is partitioned into predefined sections, and samples in successive sections are progressively shifted and compared again to the stored patterns in order to identify the denomination. It has experimentally been determined that such progressive shifting effectively counteracts any sample displacement resulting from shrinkage of a bill along the preselected dimension.

Figure 16A:
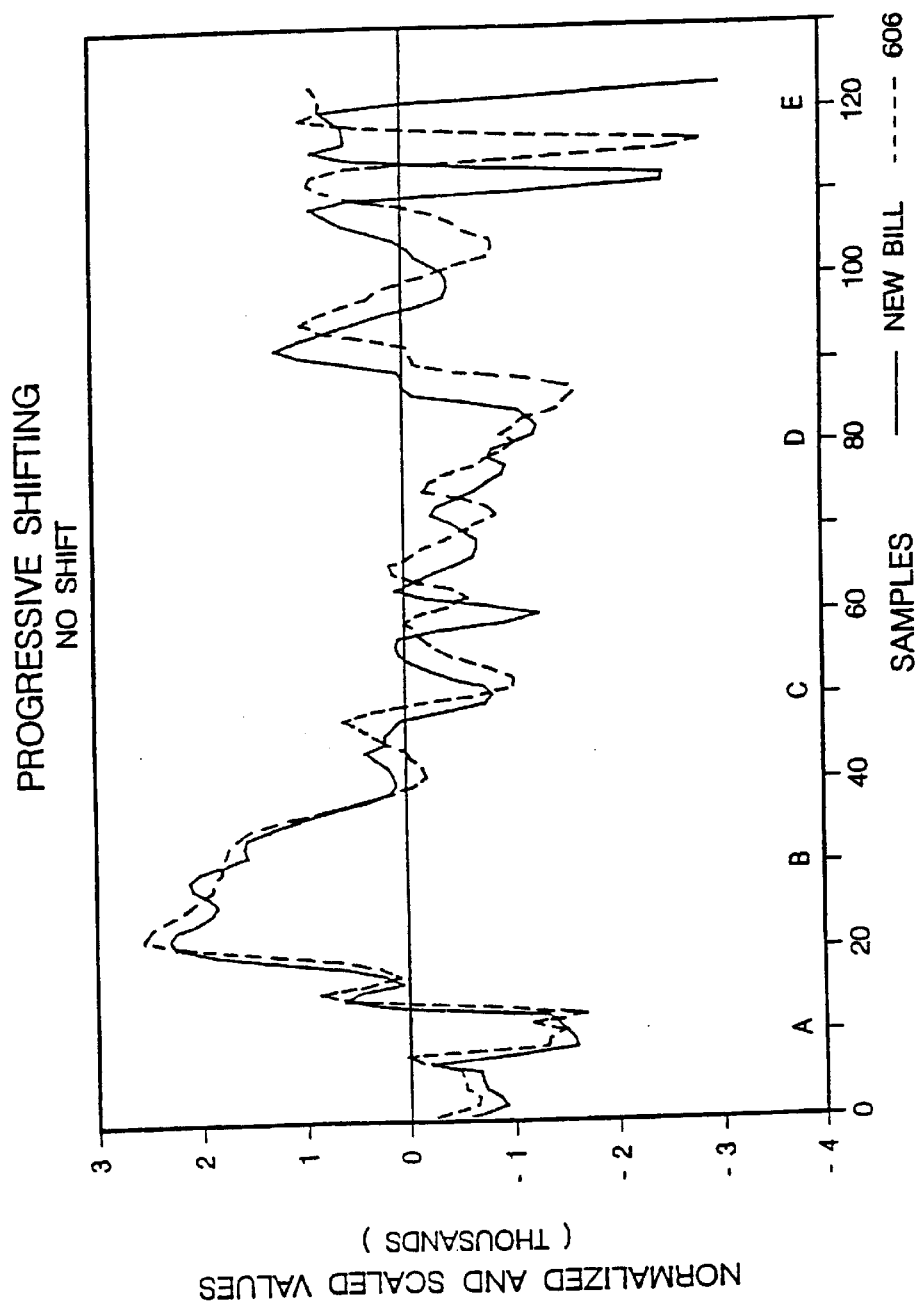

The progressive shifting effect is best illustrated by the correlation patterns shown in FIGS. 16a–e. For purposes of clarity, the illustrated patterns were generated using 128 samples for each bill scan as compared to the preferred use of 64 samples. FIG. 16a shows the correlation between a test pattern (represented by a heavy line) and a corresponding master pattern (represented by a thin line). It is clear from FIG. 16a that the degree of correlation between the two-patterns is relatively low and exhibits a correlation factor of 606.

Figure 16B:
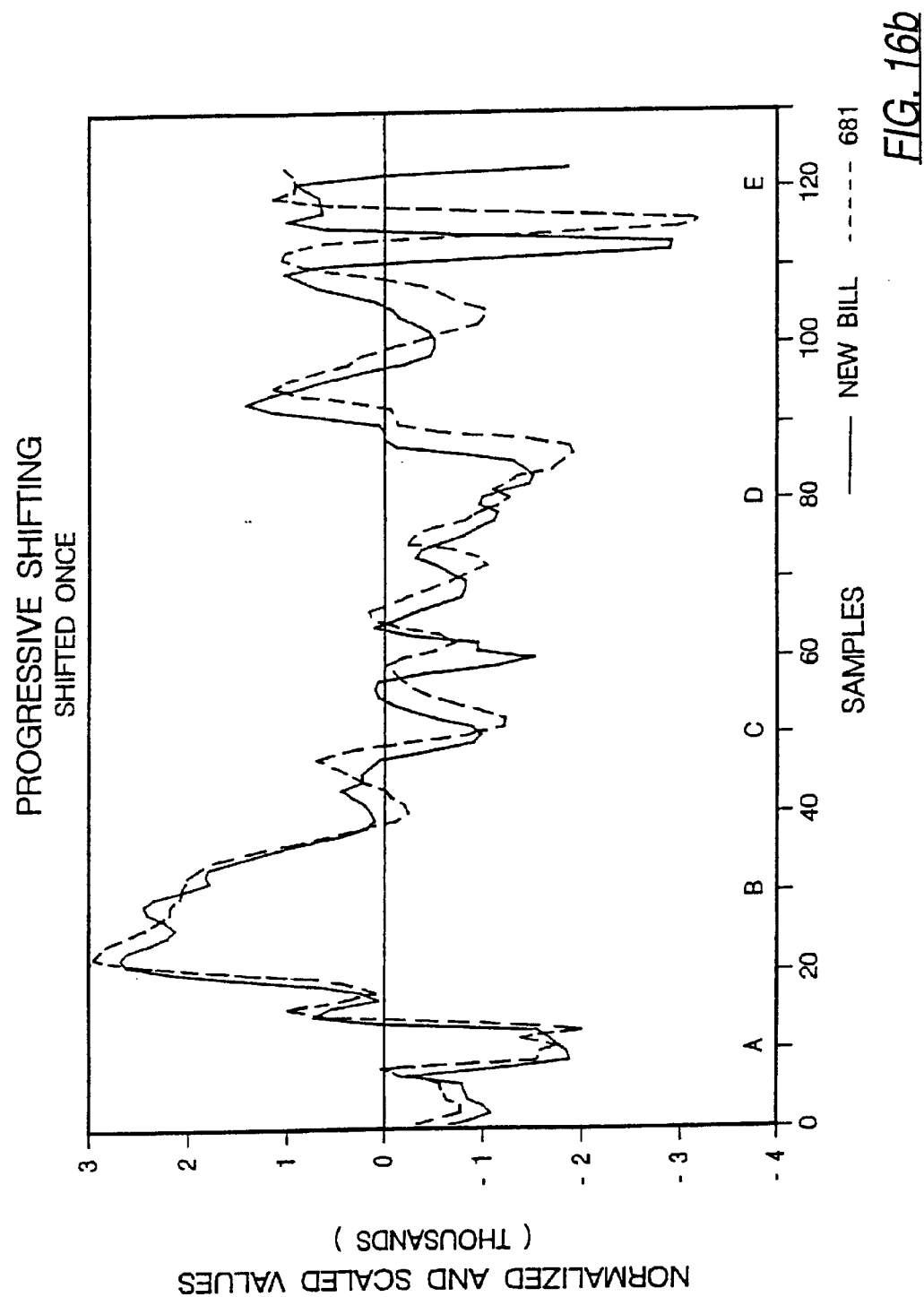

The manner in which the correlation between these patterns is increased by employing progressive shifting is best illustrated by considering the correlation at the reference points designated as A–E along the axis defining the number of samples. The effect on correlation produced by "single" progressive shifting is shown in FIG. 16b which shows "single" shifting of the test pattern of FIG. 16a. This is effected by dividing the test pattern into two equal segments each comprising 64 samples. The first segment is retained without any shift, whereas the second segment is shifted by a factor of one data sample. Under these conditions, it is found that the correlation factor at the reference points located in the shifted section, particularly at point E, is improved.

Figure 16C:
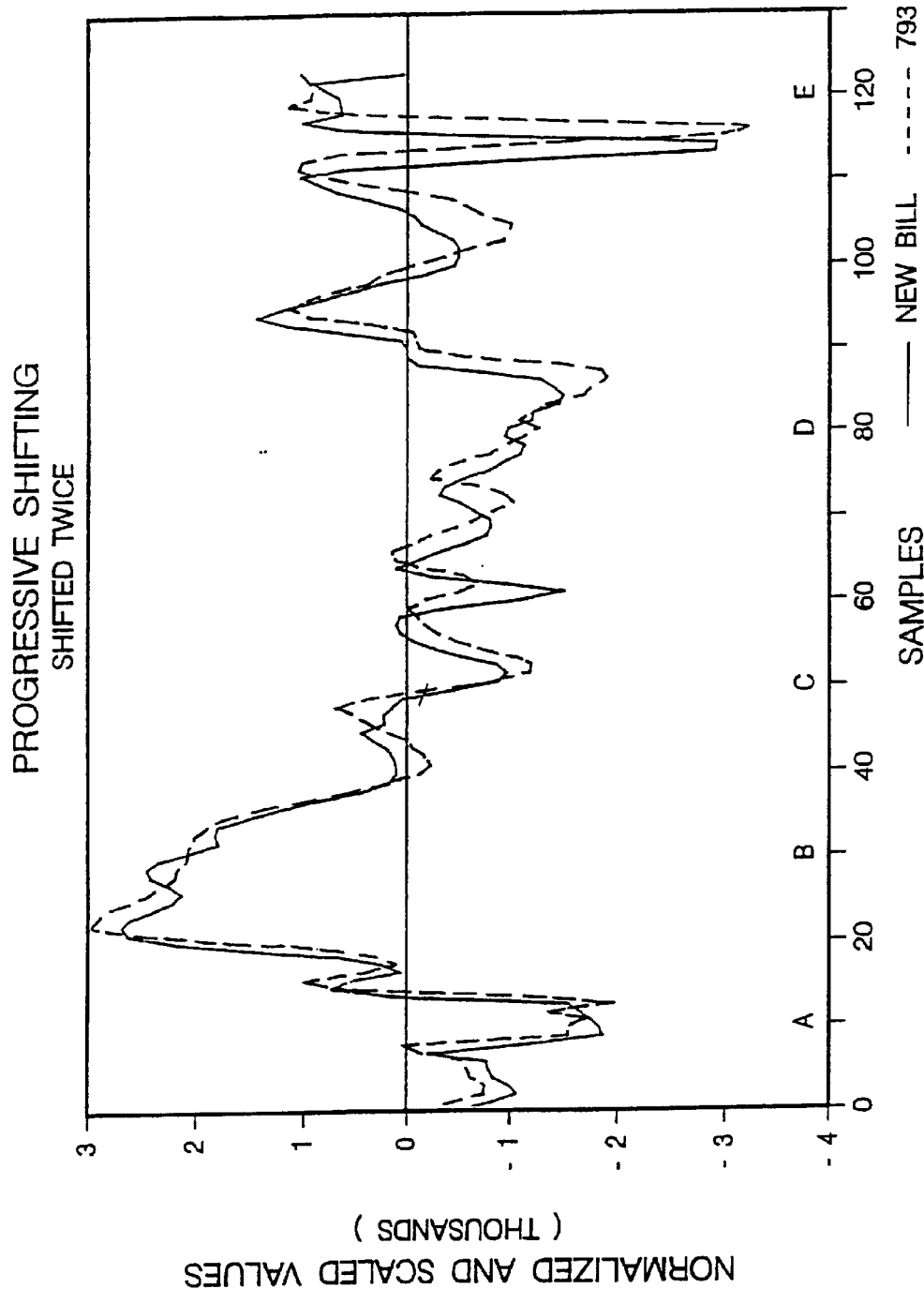

FIG. 16c shows the effect produced by "double" progressive shifting whereby sections of the test pattern are shifted in three stages. This is accomplished by dividing the overall pattern into three approximately equal sized sections. Section one is not shifted, section two is shifted by one data sample (as in FIG. 16b), and section three is shifted by a factor of two data samples. With "double" shifting, it can be seen that the correlation factor at point E is further increased.

On a similar basis, FIG. 16d shows the effect on correlation produced by "triple" progressive shifting where the overall pattern is first divided into four approximately equal sized sections. Subsequently, section one is retained without any shift, section two is shifted by one data sample, section three is shifted by two data samples, and section four is shifted by three data samples. Under these conditions, the correlation factor at point E is seen to have increased again.

Figure 16E:
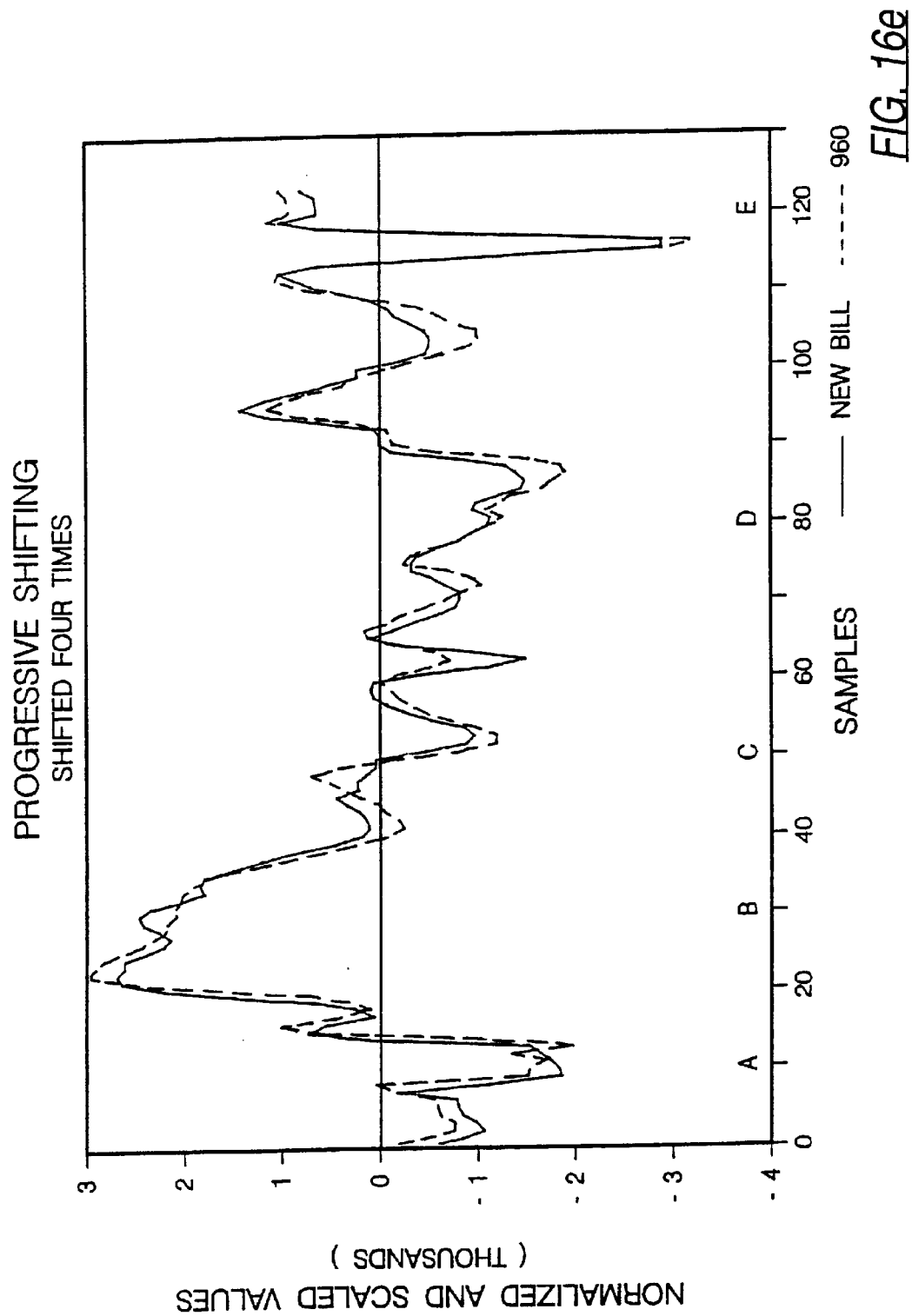

FIG. 16e shows the effect on correlation produced by "quadruple" shifting, where the pattern is first divided into five approximately equal sized sections. The first four sections are shifted in accordance with the "triple" shifting approach of FIG. 16d, whereas the fifth section is shifted by a factor of four data samples. From FIG. 16e it is clear that the correlation at point E is increased almost to the point of superimposition of the compared data samples.

In an alternative progressive shifting approach, the degree of shrinkage of a scanned bill is determined by comparing the length of the scanned bill, as measured by the scanhead, with the length of an "unshrunk" bill. This "unshrunk" length is pre-stored in the system memory. The type of progressive shifting, e.g., "single", "double", "triple", etc., applied to the test pattern is then directly based upon the measured degree of shrinkage. The greater the degree of shrinkage, the greater the number of sections into which the test pattern is divided. An advantage of this approach is that only one correlation factor is calculated, as opposed to potentially calculating several correlation factors for different types of progressive shifting.

In yet another progressive shifting approach, instead of applying progressive shifting to the test pattern, progressive shifting is applied to each of the master patterns. The master patterns in the system memory are partitioned into pre-defined sections, and samples in successive sections are progressively shifted and compared again to the scanned test pattern in order to identify the denomination. To reduce the amount of processing time, the degree of progressive shifting which should be applied to the master patterns may be determined by first measuring the degree of shrinkage of the scanned bill. By first measuring the degree of shrinkage, only one type of progressive shifting is applied to the stored master patterns.

Instead of rearranging the scanned test pattern or the stored master patterns, the system memory may contain pre-stored patterns corresponding to various types of progressive shifting. The scanned test pattern is then compared to all of these stored patterns in the system memory. However, to reduce the time required for processing the data, this approach may be modified to first measure the degree of shrinkage and to then select only those stored patterns from the system memory which correspond to the measured degree of shrinkage for comparison with the scanned test pattern.

The advantage of using the progressive shifting approach, as opposed to merely shifting by a set amount of data samples across the overall test pattern, is that the improvement in correlation achieved in the initial sections of the pattern as a result of shifting is not neutralized or offset by any subsequent shifts in the test pattern. It is apparent from the above figures that the degree of correlation for sample points falling within the progressively shifted sections increases correspondingly.

More importantly, the progressive shifting realizes substantial increases in the overall correlation factor resulting from pattern comparison. For instance, the original correlation factor of 606 (FIG. 16a) is increased to 681 by the "single" shifting shown in FIG. 16b. The "double" shifting shown in FIG. 16c increases the correlation number to 793, the "triple" shifting of FIG. 16d increases the correlation number to 906, and, finally, the "quadruple" shifting shown in FIG. 16e increases the overall correlation number to 960. Using the above approach, it has been determined that used currency bills which exhibit a high degree of shrinkage and which cannot be accurately identified as belonging to the correct currency denomination when the correlation is performed without any shifting, can be identified with a high degree of certainty by using a progressive shifting approach, preferably by adopting "triple" or "quadruple" shifting.

The degree of correlation between a scanned pattern and a master pattern may be negatively impacted if the two patterns are not properly aligned with each other. Such misalignment between patterns may in turn negatively impact upon the performance of a currency identification system. Misalignment between patterns may result from a number of factors. For example, if a system is designed so that the scanning process is initiated in response to the detection of the thin borderline surrounding U.S. currency or the detection of some other printed indicia such as the edge of printed indicia on a bill, stray marks may cause initiation of the scanning process at an improper time. This is especially true for stray marks in the area between the edge of a bill and the edge of the printed indicia on the bill. Such stray marks may cause the scanning process to be initiated too soon, resulting in a scanned pattern which leads a corresponding master pattern. Alternatively, where the detection of the edge of a bill is used to trigger the scanning process, misalignment between patterns may result from variances between the location of printed indicia on a bill relative to the edges of a bill. Such variances may result from tolerances permitted during the printing and/or cutting processes in the manufacture of currency. For example, it has been found that location of the leading edge of printed indicia on Canadian currency relative to the edge of Canadian currency may vary up to approximately 0.2 inches (approximately 0.5 cm).

The problems associated with misaligned patterns may be overcome by removing data samples from one end of a pattern to be modified and adding data values on the opposite end equal to the data values contained in the corresponding sequence positions of the pattern to which the modified pattern is to be compared. This process may be repeated, up to a predetermined number of times, until a sufficiently high correlation is obtained between the two patterns so as to permit the identity of a bill under test to be called.

A preferred embodiment of the technique can be further understood by considering Table 3. Table 3 contains data samples generated by scanning the narrow dimension of Canadian $2 bills along a segment positioned about the center of the bill on the side opposite the portrait side. More specifically, the second column of Table 3 represents a scanned pattern generated by scanning a test Canadian $2 bill. The scanned pattern comprises 64 data samples arranged in a sequence. Each data sample has a sequence position, 1–64, associated therewith. The fifth column represents a master pattern associated with a Canadian $2 bill. The master pattern likewise comprises a sequence of 64 data samples. The third and fourth columns represent the scanned pattern after it has been modified in the forward direction one and two times, respectively. In the embodiment depicted in Table 3, one data sample is moved from the beginning of the preceding pattern during each modification.

TABLE 3

| Sequence Position | Scanned Pattern | Scanned Pattern Modified Once | Scanned Pattern Modified Twice | Master Pattern |
|---|---|---|---|---|
| 1 | 93 | 50 | −21 | 161 |
| 2 | 50 | −21 | 50 | 100 |
| 3 | −21 | 50 | 93 | 171 |
| 4 | 50 | 93 | 65 | 191 |
| 5 | 93 | 65 | 22 | 252 |
| 6 | 65 | 22 | 79 | 403 |
| 7 | 22 | 79 | 136 | 312 |
| 8 | 79 | 136 | 193 | 434 |
| 9 | 136 | 193 | 278 | 90 |
| 10 | 193 | 278 | 164 | 0 |
| 11 | 278 | 164 | 136 | 20 |
| 12 | 164 | 136 | 278 | 444 |
| . | . | . | . | . |
| . | . | . | . | . |
| . | . | . | . | . |
| 52 | −490 | −518 | −447 | −1090 |
| 53 | −518 | −447 | −646 | −767 |
| 54 | −447 | −646 | −348 | −575 |
| 55 | −646 | −348 | −92 | −514 |
| 56 | −348 | −92 | −63 | −545 |
| 57 | −92 | −63 | −205 | −40 |
| 58 | −63 | −205 | 605 | 1665 |
| 59 | −205 | 605 | 1756 | 1705 |
| 60 | 605 | 1756 | 1401 | 1685 |
| 61 | 1756 | 1401 | 1671 | 2160 |
| 62 | 1401 | 1671 | 2154 | 2271 |
| 63 | 1671 | 2154 | *2240 | 2240 |
| 64 | 2154 | *2210 | *2210 | 2210 |

The modified pattern represented in the third column is generated by adding an additional data value to the end of the original scanned pattern sequence which effectively removes the first data sample of the original pattern, e.g., 93, from the modified pattern. The added data value in the last sequence position, 64, is set equal to the data value contained in the 64th sequence position of the master pattern, e.g., 2210. This copying of the 64th data sample is indicated by an asterisk in the third column. The second modified pattern represented in the fourth column is generated by adding two additional data values to the end of the original scanned pattern which effectively removes the first two data samples of the original scanned, e.g., 93 and 50, from the second modified pattern. The last two sequence positions, 63 and 64, are filled with the data values contained in the 63rd and 64th sequence positions of the master pattern, e.g., 2240 and 2210, respectively. The copying of the 63rd and 64th data samples is indicated by asterisks in the fourth column.

In the example of Table 3, the printed area of the bill under test from which the scanned pattern was generated was farther away from the leading edge of the bill than was the printed area of the bill from which the master pattern was generated. As a result, the scanned pattern trailed the master pattern. The preferred embodiment of the pattern generation method described in conjunction with Table 3 compensates for the variance of the distance between the edge of the bill and the edge of the printed indicia by modifying the scanned pattern in the forward direction. As a result of the modification method employed, the correlation between the original and modified versions of the scanned pattern and the master pattern increased from 705 for the original, unmodified scanned pattern to 855 for the first modified pattern and to 988 for the second modified pattern. Accordingly, the bill under test which would otherwise have been rejected may now be properly called as a genuine $2 Canadian bill through the employment of the pattern generation method discussed above.

Figure 17A:
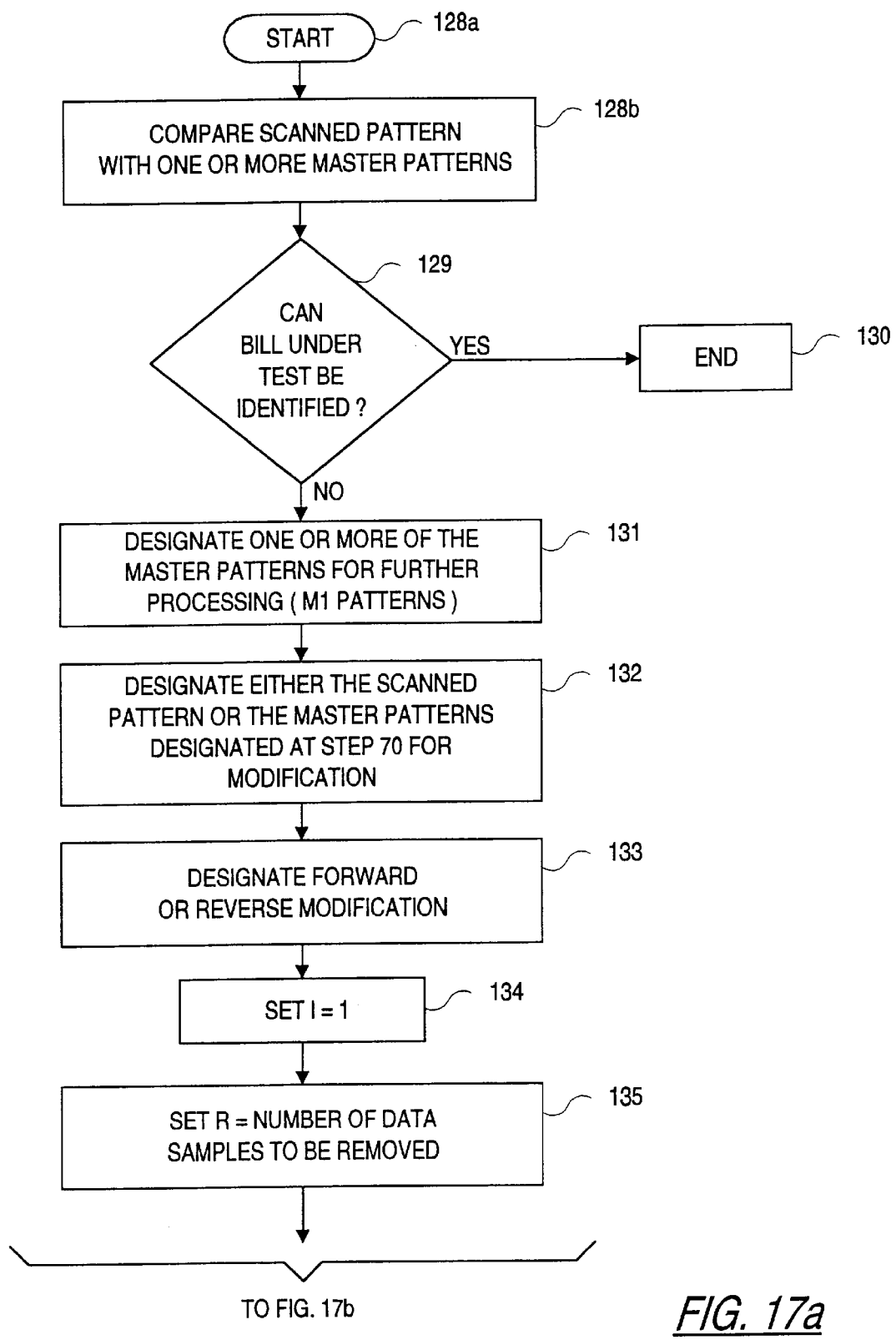
FIGS. 17a–17c are a flowchart illustrating a preferred embodiment of a modified pattern generation method according to the present invention.
Figure 17B:
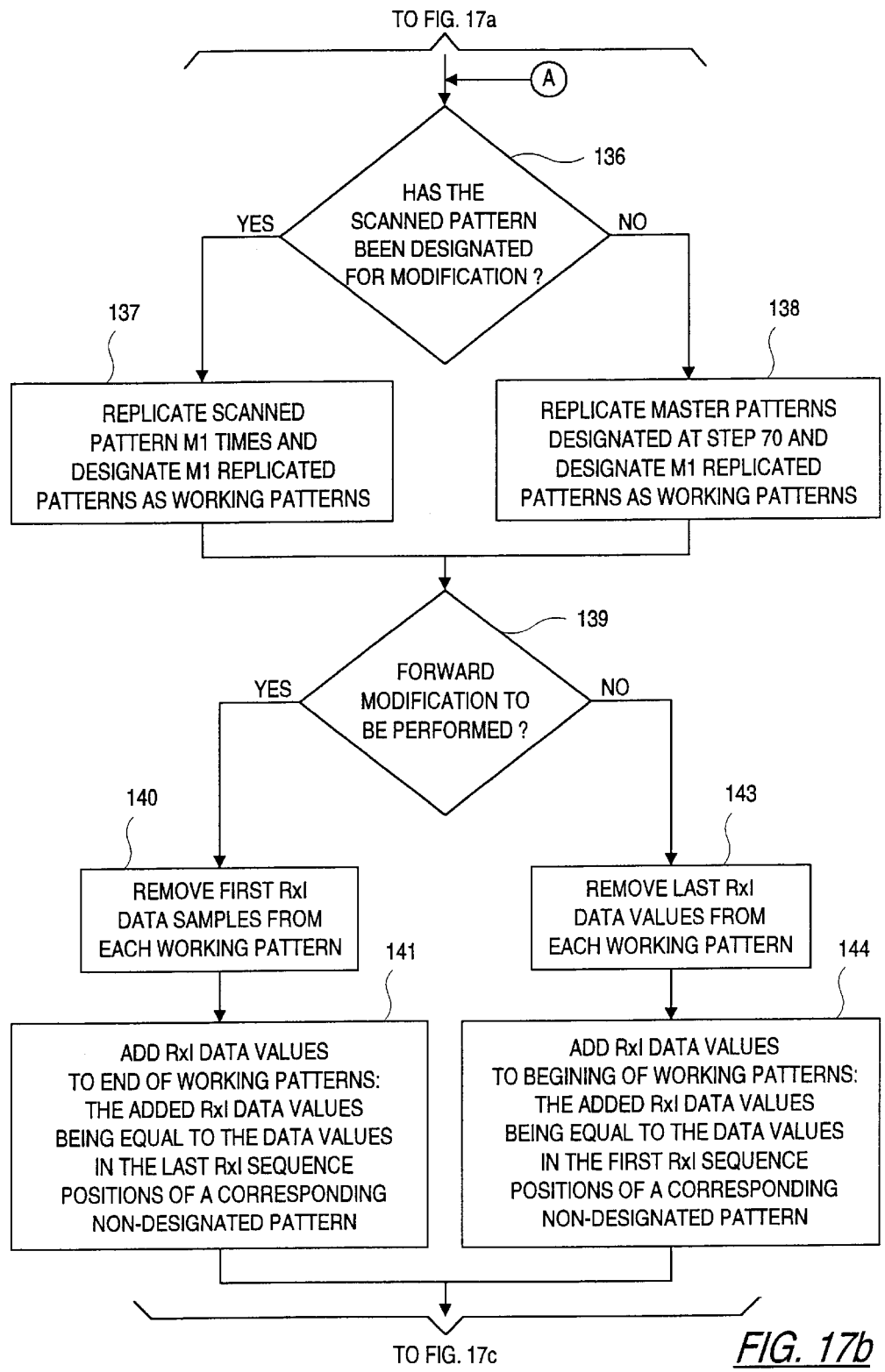
Figure 17C:
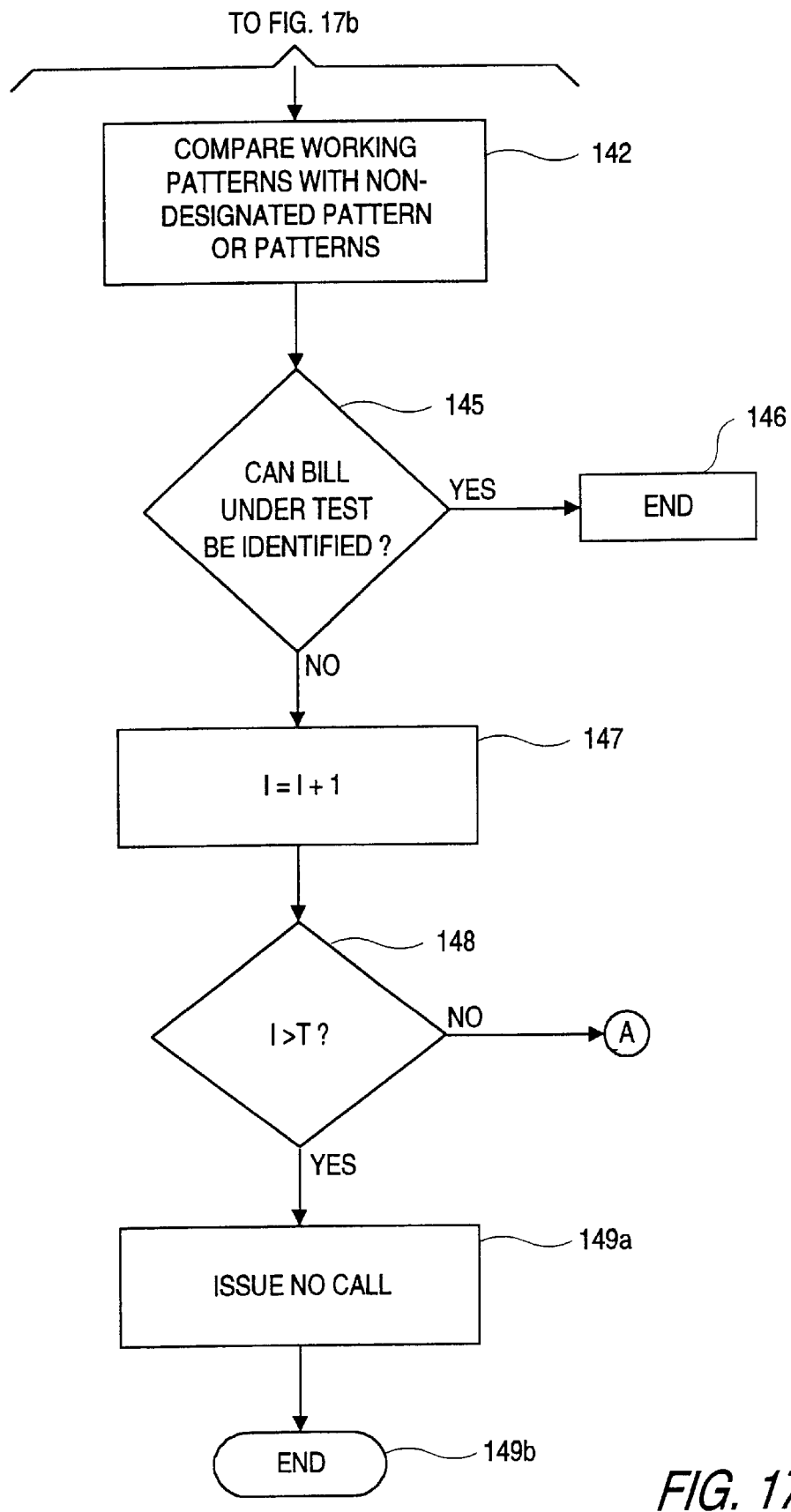

Another modified discrimination technique can be understood with reference to the flowchart of FIGS. 17a–17c. The process of FIGS. 17a–17c involves a method of identifying a bill under test by comparing a scanned pattern retrieved from a bill under test with one or more master patterns associated with one or more genuine bills. After the process begins at step 128a, the scanned pattern is compared with one or more master patterns associated with genuine bills (step 128b). At step 129 it is determined whether the bill under test can be identified based on the comparison at step 128b. This may be accomplished by evaluating the correlation between the scanned pattern and each of the master patterns. If the bill can be identified, the process is ended at step 130. Otherwise, one or more of the master patterns are designated for further processing at step 131. For example, all of the master patterns may be designated for further processing. Alternatively, less than all of the master patterns may be designated based on a preliminary assessment about the identity of the bill under test. For example, only the master patterns which had the four highest correlation values with respect to the scanned pattern at step 128b might be chosen for further processing. In any case, the number of master patterns designated for further processing is M1.

At step 132, either the scanned pattern is designated for modification or the M1 master patterns designated at step 131 are designated for modification. In a preferred embodiment, the scanned pattern is designated for modification and the master patterns remain unmodified. At step 133, it is designated whether forward modification or reverse modification is to be performed. This determination may be made, for example, by analyzing the beginning or ending data samples of the scanned pattern to determine whether the scanned pattern trails or leads the master patterns.

At step 134, the iteration counter, I, is set equal to one. The iteration counter is used to keep track of how many times the working patterns have been modified. Then at step 135, the number of incremental data samples, R, to be removed during each iteration is set. For example, only one additional data sample may be removed from each working pattern during each iteration in which case R is set equal to one.

At step 136, it is determined whether the scanned pattern has been designated for modification. If it has, then the scanned pattern is replicated M1 times and the M1 replicated patterns, one for each of the M1 master patterns, are designated as working patterns at step 137. If the scanned pattern has not been designated for modification, then the M1 master patterns have been so designated, and the M1 master patterns are replicated and designated as working patterns at step 138. Regardless of which pattern or patterns were designated for modification, at step 139, it is determined whether forward or reverse modification is to be performed on the working patterns.

If forward modification is to be performed, the first R×I data samples from each working pattern are removed at step 140. The first R×I data samples may either be explicitly removed from the working patterns or be removed as a result of adding additional data samples (step 141) to the end of the pattern and designating the beginning of the modified pattern to be the (R×I)+1 sequence position of the original pattern. As a result of the modification, the data sample which was in the 64th sequence position in the original working pattern will be in the 64−(R×I) sequence position. The added data values in the last R×I sequence positions of a working pattern are copied from the data samples in the last R×I sequence positions of a corresponding non-designated pattern at step 141. After the above described modification, the working patterns are compared with either respective ones of the non-designated patterns (scanned pattern modified/M1 master patterns not designated for modification) or the non-designated pattern (M1 master patterns designated for modification/scanned pattern not designated for modification) at step 142.

Alternatively, if reverse modification is to be performed, the last R×I data samples from each working pattern are removed at step 143. The last R×I data samples may either be explicitly removed from the working patterns or be removed as a result of adding additional data samples (step 144) to the beginning of the pattern and designating the beginning of the modified pattern to start with the added data samples. As a result of the modification, the data sample which was in the 1st sequence position in the original working pattern will be in the (R×I)+1 sequence position. The added data samples in the first R×I sequence positions of a working pattern are copied from the data samples in the first R×I sequence positions of a corresponding non-designated pattern at step 144. After the above described modification, the working patterns are compared with either respective ones of the non-designated patterns (scanned pattern modified/M1 master patterns not designated for modification) or the non-designated pattern (M1 master patterns designated for modification/scanned pattern not designated for modification) at step 142.

For example, if the scanned pattern is designated for forward modification and four master patterns are designated for further processing, four working patterns are generated from the scanned pattern at step 137, one for each of the four master patterns. If R is set to two at step 135, during the first iteration the last two data samples from each of the M1 master patterns are copied and added to the end of the M1 working patterns so as to become the last two sequence positions of the M1 working patterns, one working pattern being associated with each of the M1 master patterns. As a result, after the first iteration, four different working patterns are generated with each working pattern corresponding to a modified version of the scanned pattern but with each having data values in its last two sequence positions copied from the last two sequence positions of a respective one of the M1 master patterns. After a second iteration, the last four sequence positions of each of the M1 master patterns are copied and added to the end of the M1 working patterns so as to become the last four sequence positions of a respective one of the M1 working patterns.

As another example, if four master patterns are designated for further processing and the four designated master patterns are designated for forward modification, four working patterns are generated at step 138, one from each of the four designated master patterns. If R is set to two at step 135, during the first iteration the last two data samples of the scanned pattern are copied and added to the end of the M1 working patterns so as to become the last two sequence positions of the M1 working patterns, one working pattern being associated with each of the M1 master patterns. As a result, after the first iteration, four different working patterns are generated with each working pattern corresponding to a modified version of a corresponding master pattern but with each having data values in its last two sequence position copied from the last two sequence positions of the scanned pattern. After a second iteration, the last four sequence positions of the scanned pattern are copied and added to the end of the M1 working patterns so as to become the last four sequence positions of the M1 working patterns.

After the comparison at step 142, it is determined whether the bill under test can be identified at step 145. If the bill can be identified the process is ended at step 146. Otherwise, the iteration counter, I, is incremented by one (step 147), and the incremented iteration counter is compared to a maximum iteration number, T (step 148). If the iteration counter, I, is greater than the maximum iteration number, T, then a no call is issued (step 149a), meaning that a match sufficient to identify the bill under test was not obtained, and the process is ended (step 149b). Otherwise, if the iteration is not greater than the maximum iteration number, the modification process is repeated beginning with step 136.

The flowchart of FIGS. 17a–17c is intended to illustrate one preferred embodiment of the above technique. However, it is recognized that there are numerous ways in which the steps of the flowchart of FIGS. 17a–17c may be rearranged or altered and yet still result in the comparison of the same patterns as would be compared if the steps of FIGS. 17a–17c were followed exactly. For example, instead of generating multiple working patterns, a single working pattern may be generated and the leading or trailing sequence positions successively altered before comparisons to corresponding non-designated patterns. Likewise, instead of generating multiple modified patterns directly from unmodified patterns, multiple modified patterns may be generated from the preceding modified patterns. For example, instead of generating a twice forward modified scanned pattern by removing the first two data samples from the original scanned pattern and copying the last 2R sequence positions of a corresponding master pattern and adding these data values to the end of the original scanned pattern, the first data sample of the single forward modified scanned pattern may be removed and one data sample added to the end of the single modified scanned pattern, and then the data samples in the last two sequence positions may be set equal to the data samples in the last 2R sequence positions of a corresponding master pattern.

In a modification of the above technique, instead of copying data values from a scanned pattern into corresponding sequence positions of modified master patterns, leading or trailing sequence positions of modified master patterns are filled with zeros.

In an alternate embodiment, modified master patterns are stored, for example in EPROM 60 of FIG. 7a, before a bill under test is scanned. In such an embodiment, a scanned pattern retrieved from a bill under test is compared to the modified master patterns stored in memory. Modified master patterns are generated by modifying a corresponding master pattern in either the forward or backward direction, or both, and filling in any trailing or leading sequence positions with zeros. An advantage of such a preferred embodiment is that no modification needs to be performed during the normal operation of an identification device incorporating such an embodiment.

Figure 18A:
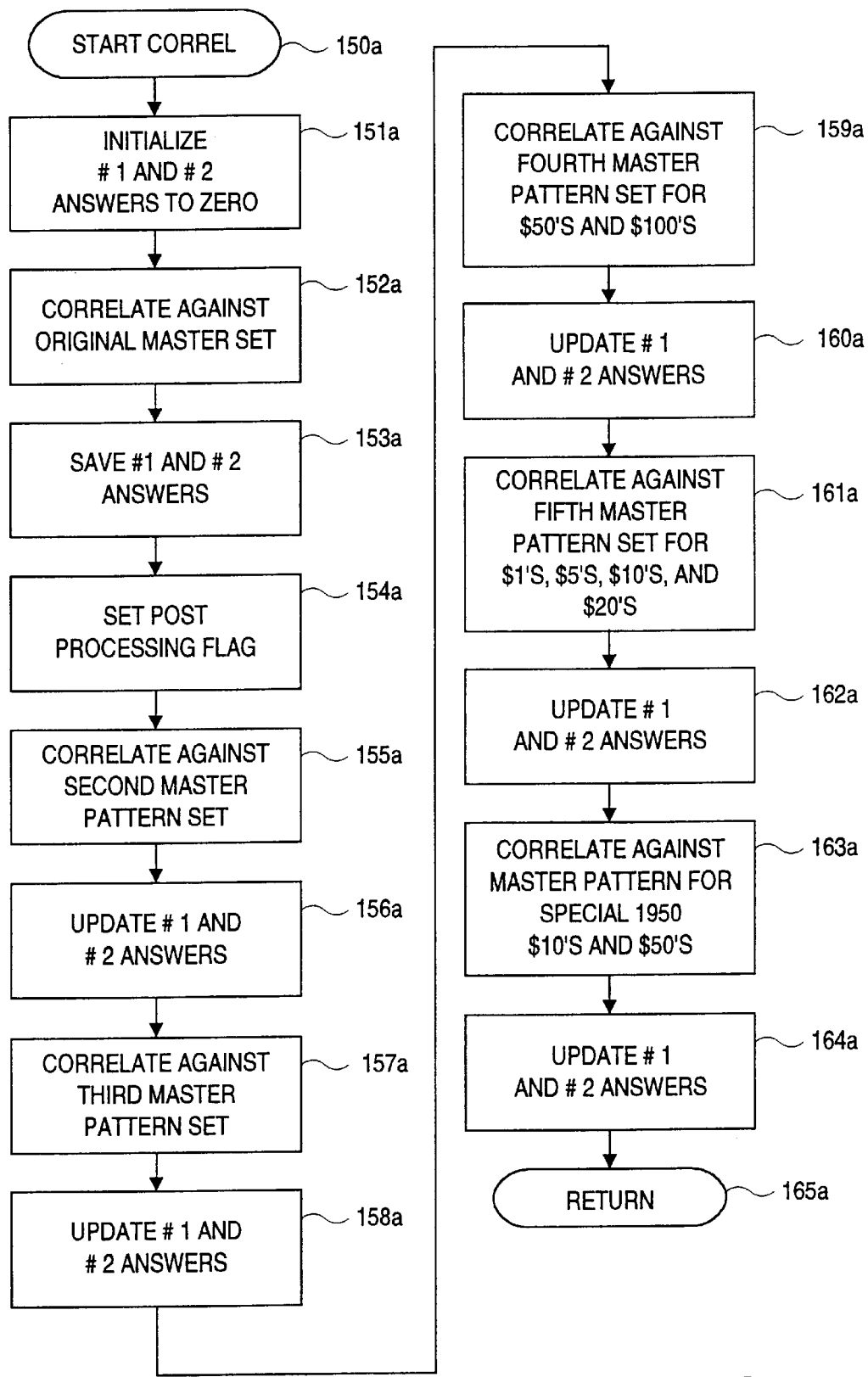
FIG. 18a is a flow chart illustrating the sequential procedure involved in the execution of multiple correlations of the scan data from a single bill.

An example of a procedure involved in comparing test patterns to master patterns is illustrated at FIG. 18a which shows the routine as starting at step 150a. At step 151a, the best and second best correlation results (referred to in FIG. 18a as the "#1 and #2 answers") are initialized to zero and, at step 152a, the test pattern is compared with each of the sixteen or eighteen original master patterns stored in the memory. At step 153a, the calls corresponding to the two highest correlation numbers obtained up to that point are determined and saved. At step 154a, a post-processing flag is set. At step 155a the test pattern is compared with each of a second set of 16 or 18 master patterns stored in the memory. This second set of master patterns is the same as the 16 or 18 original master patterns except that the last sample is dropped and a zero is inserted in front of the first sample. If any of the resulting correlation numbers is higher than the two highest numbers previously saved, the #1 and #2 answers are updated at step 156.

Steps 155*a* and 156*a* are repeated at steps 157*a* and 158*a*, using a third set of master patterns formed by dropping the last two samples from each of the 16 original master patterns and inserting two zeros in front of the first sample. At steps 159*a* and 160*a* the same steps are repeated again, but using only $50 and $100 master patterns formed by dropping the last three samples from the original master patterns and adding three zeros in front of the first sample. Steps 161*a* and 162*a* repeat the procedure once again, using only $1, $5, $10 and $20 master patterns formed by dropping the 33rd sample, whereby original samples 34–64 become samples 33–63, and inserting a 0 as the new last sample. Finally, steps 163*a* and 164*a* repeat the same procedure, using master patterns for $10 and $50 bills printed in 1950, which differ significantly from bills of the same denominations printed in later years. This routine then returns to the main program at step 165*a*. The above multiple sets of master patterns may be pre-stored in EPROM 60.

Figure 18B:
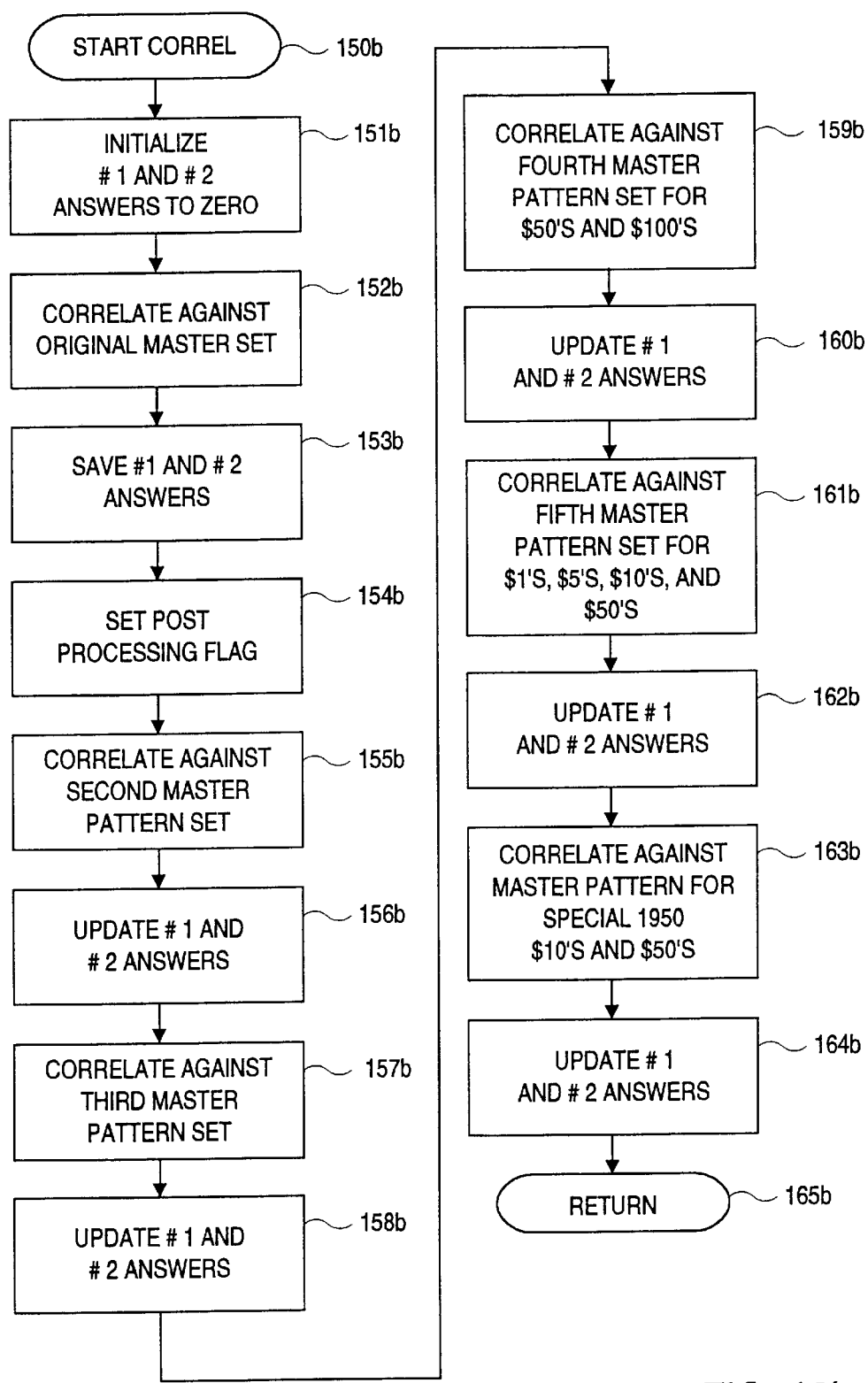

A modified procedure involved in comparing test patterns to green-side master patterns is illustrated at FIG. 18*b* which shows the routine as starting at step 150*b*. At step 151*b*, the best and second best correlation results (referred to in FIG. 18*b* as the "#1 and #2 answers") are initialized to zero and, at step 152*b*, the test pattern is compared with each of the eighteen original green-side master patterns stored in the memory. At step 153*b*, the calls corresponding to the two highest correlation numbers obtained up to that point are determined and saved. At step 154*b*, a post-processing flag is set. At step 155*b* the test pattern is compared with each of a second set of 18 green-side master patterns stored in the memory. This second set of master patterns is the same as the 18 original green-side master patterns except that the last sample is dropped and a zero is inserted in front of the first sample. If any of the resulting correlation numbers is higher than the two highest numbers previously saved, the #1 and #2 answers are updated at step 156*b*.

Steps 155*b* and 156*b* are repeated at steps 157*b* and 158*b*, using a third set of green-side master patterns formed by dropping the last two samples from each of the 18 original master patterns and inserting two zeros in front of the first sample. At steps 159*b* and 160*b* the same steps are repeated again, but using only $50 and $100 master patterns (two patterns for the $50 and four patterns for the $100) formed by dropping the last three samples from the original master patterns and adding three zeros in front of the first sample. Steps 161*b* and 162*b* repeat the procedure once again, using only $1, $5, $10, $20 and $50 master patterns (four patterns for the $10 and two patterns for the other denominations) formed by dropping the 33rd sample whereby original samples 34–64 become samples 33–63, and inserting a 0 as the new last sample. Finally, steps 163*b* and 164*b* repeat the same procedure, using master patterns for $10 and $50 bills printed in 1950 (two patterns scanned along a center segment for each denomination), which differ significantly from bills of the same denominations printed in later years. This routine then returns to the main program at step 165*b*. The above multiple sets of master patterns may be pre-stored in EPROM 60.

Figure 19A:
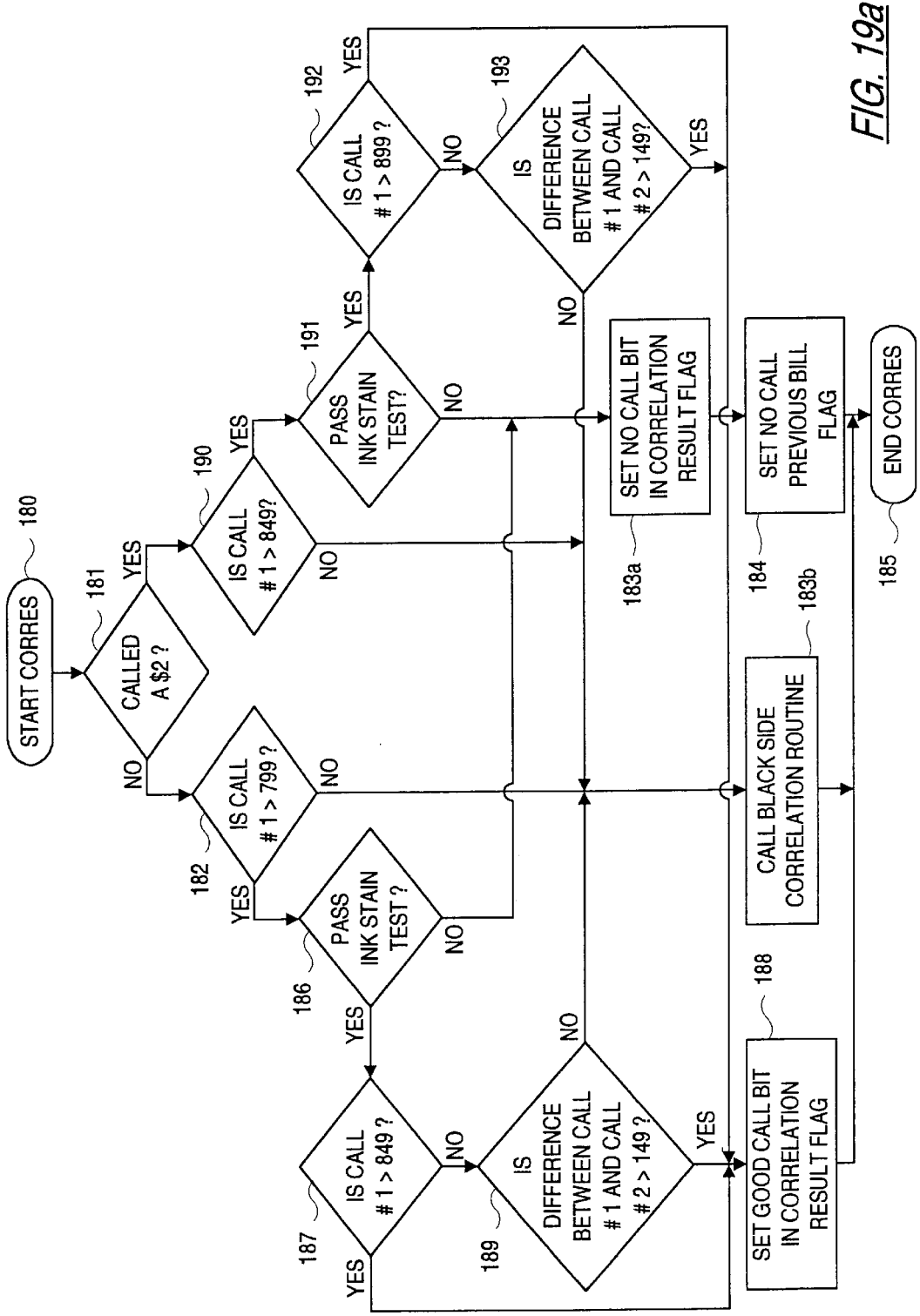
FIG. 19a is a flow chart illustrating the sequence of operations involved in determining the bill denomination from the correlation results using data retrieved from the green side of U.S. bills according to one preferred embodiment of the present invention.

In another modified embodiment where conditional black-side correlation is to be performed, a modified version of the routine designated as "CORRES" is initiated. The procedure involved in executing the modified version of CORRES is illustrated at FIG. 19*a*, which shows the routine as starting at step 180. Step 181 determines whether the bill has been identified as a $2 bill, and, if the answer is negative, step 182 determines whether the best correlation number ("call #1") is greater than 799. If the answer is negative, the correlation number is too low to identify the denomination of the bill with certainty, and at step 183*b* a black side correlation routine is called (described in more detail below in conjunction with FIGS. 19*b*–19*c*).

An affirmative answer at step 182 advances the system to step 186, which determines whether the sample data passes an ink stain test (described below). If the answer is negative, a "no call" bit is set in a correlation result flag at step 183*a*. A "no call previous bill" flag is then set at step 184, and the routine returns to the main program at step 185. If the answer at step 186 is affirmative, the system advances to step 187 which determines whether the best correlation number is greater than 849. An affirmative answer at step 187 indicates that the correlation number is sufficiently high that the denomination of the scanned bill can be identified with certainty without any further checking. Consequently, a "good call" bit is set in the correlation result flag at step 188. A separate register associated with the best correlation number (#1) may then be used to identify the denomination represented by the stored pattern resulting in the highest correlation number. The system returns to the main program at step 185.

A negative answer at step 187 indicates that the correlation number is between 800 and 850. It has been found that correlation numbers within this range are sufficient to identify all bills except the $2 bill. Accordingly, a negative response at step 187 advances the system to step 189 which determines whether the difference between the two highest correlation numbers ("call #1" and "call #2") is greater than 149. If the answer is affirmative, the denomination identified by the highest correlation number is acceptable, and thus the "good call" bit is set in the correlation result flag at step 188. If the difference between the two highest correlation numbers is less than 150, step 189 produces a negative response which advances the system to step 183*b* where the black side correlation routine is called.

Returning to step 181, an affirmative response at this step indicates that the initial call is a $2 bill. This affirmative response initiates a series of steps 190–193 which are similar to steps 182, 186, 187 and 189 described above, except that the numbers 799 and 849 used in steps 182 and 187 are changed to 849 and 899, respectively, in steps 190 and 192. The result is either the setting of a "no call" bit in a correlation result flag at step 183*a*, the setting of the "good call" bit in the correlation result flag at step 188, or the calling of the black side correlation routine at step 183*b*.

Figure 19B:
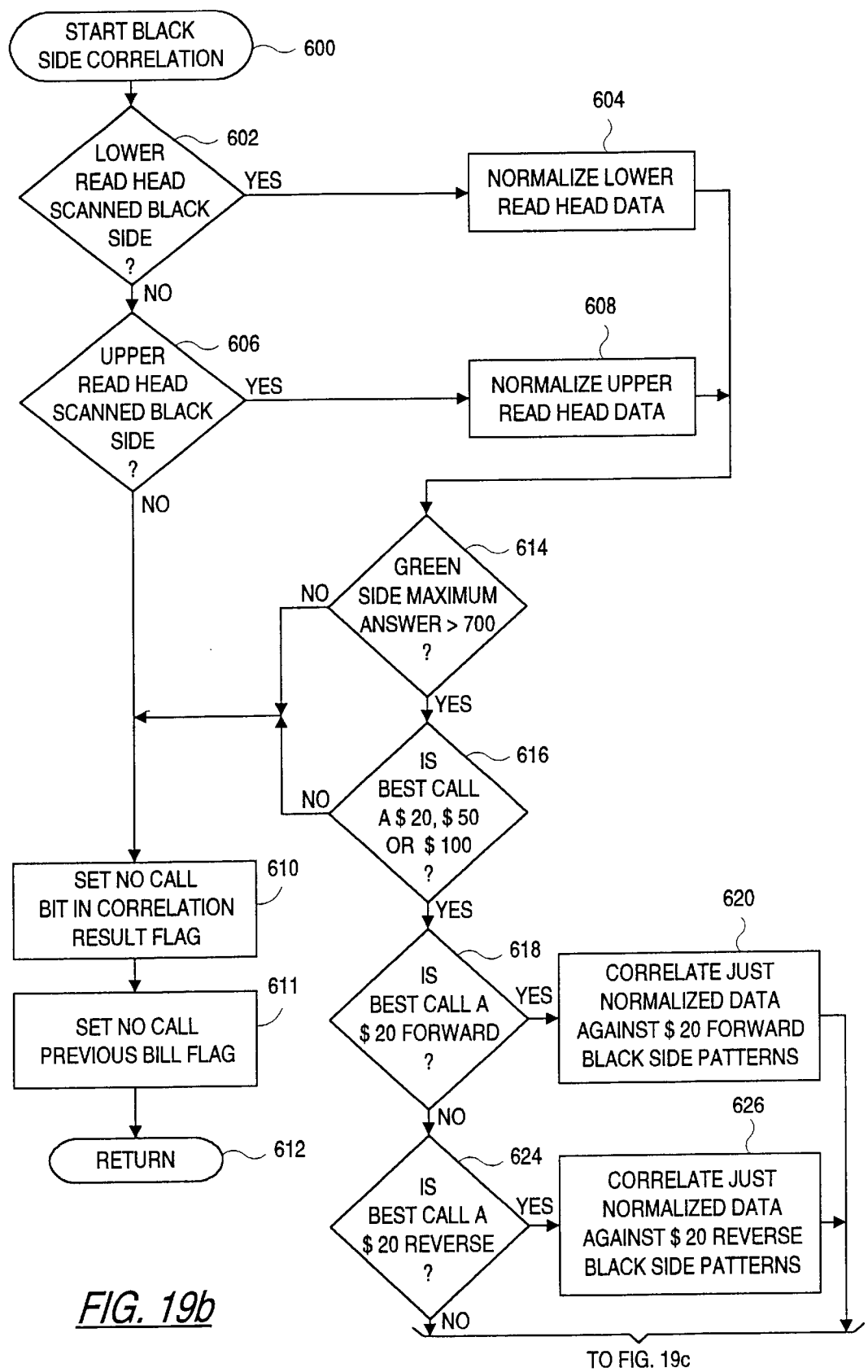
FIGS. 19b and 19c are a flow chart illustrating the sequence of operations involved in determining the bill denomination from the correlation results using data retrieved from the black side of U.S. bills.
Figure 19C:
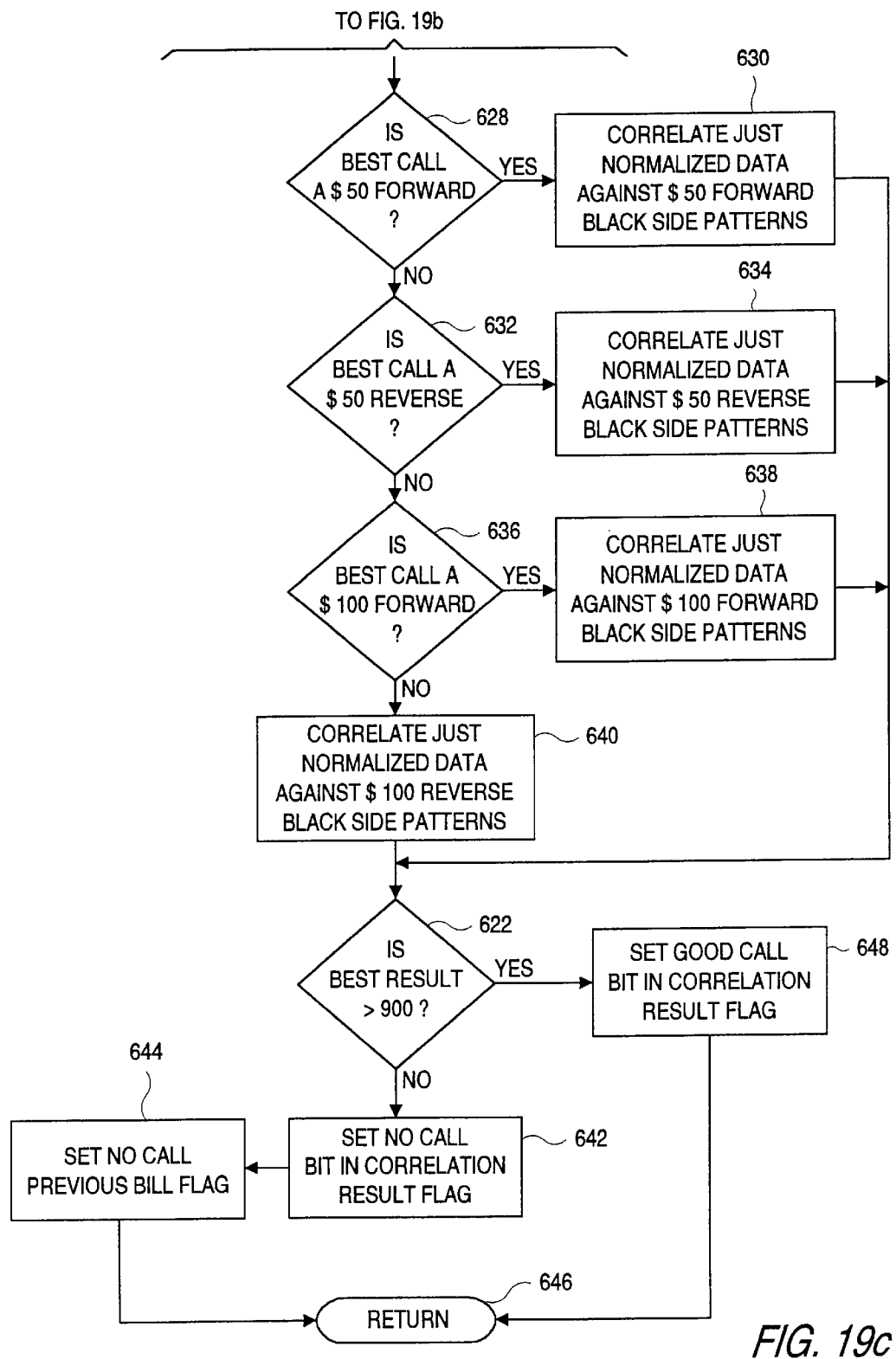

Turning now to FIGS. 19*b* and 19*c* there is shown a flowchart illustrating the steps of the black side correlation routine called at step 183*b* of FIG. 19a. After the black side correlation routine is initiated at step 600, it is determined at step 602 whether the lower read head was the read head that scanned the black side of the test bill. If it was, the lower read head data is normalized at step 604. Otherwise, it is determined at step 606 whether the upper read head was the read head that scanned the black side of the test bill. If it was, the upper read head data is normalized at step 608. If it cannot be determined which read head scanned the black side of the bill, then the patterns generated from both sides of the test bill are correlated against the green-side master patterns (see, e.g., step 110 of FIG. 12). Under such a circumstance, the "no call" bit in the correlation result flag is set at step 610, the "no call previous bill" flag is set at step 611, and the program returns to the calling point at step 612.

After the lower read head data is normalized at step 604, or the upper read head data is normalized at step 608, it is determined whether the best green-side correlation number is greater than 700 at step 614. A negative response at step 614 results in the "no call" bit in the correlation result flag being set at step 610, the "no call previous bill" flag being set at step 611, and the program returning to the calling point at step 612. An affirmative response at step 614 results in a determination being made as to whether the best call from the green side correlation corresponds to a $20, $50, or $100 bill at step 616. A negative response at step 616 results in the "no call" bit in the correlation result flag being set at step 610, the "no call previous bill" flag being set at step 611, and the program returning to the calling point at step 612.

If it is determined at step 616 that the best call from the green side correlation corresponds to a $20, $50, or $100 bill, the scanned pattern from the black side is correlated against the black-side master patterns associated with the specific denomination and scan direction associated with the best call from the green side. According to a preferred embodiment, multiple black-side master patterns are stored for $20, $50 and $100 bills. For each of these denominations, three master patterns are stored for scans in the forward direction, and three master patterns are stored for scans in the reverse direction, for a total of six patterns for each denomination. For a given scan direction, black-side master patterns are generated by scanning a corresponding denominated bill along a segment located about the center of the narrow dimension of the bill, a segment slightly displaced (0.2 inches) to the left of center, and a segment slightly displaced (0.2 inches) to the right of center.

For example, at step 618, it is determined whether the best call from the green side is associated with a forward scan of a $20 bill and, if it is, the normalized data from the black side of the test bill is correlated against the black-side master patterns associated with a forward scan of a $20 bill at step 620. Next it is determined whether the black-side correlation number is greater than 900 at step 622. If it is, the "good call" bit in the correlation result flag is set at step 648, and the program returns to the calling point at step 646. If the black-side correlation number is not greater than 900, then the "no call bit" in the correlation result flag is set at step 642, the "no call previous bill" flag is set at step 644, and the program returns to the calling point at step 646. If it is determined that the best call from the green side is not associated with a forward scan of $20 bill at step 618, the program branches accordingly at steps 624–640 so that the normalized data from the black side of the test bill is correlated against the appropriate black-side master patterns.

The mechanical portions of the currency scanning and counting module are shown in FIGS. 20a–22. From the input receptacle, the bills are moved in seriatim from the bottom of the stack along a curved guideway 211 which receives bills moving downwardly and rearwardly and changes the direction of travel to a forward direction. The curvature of the guideway 211 corresponds substantially to the curved periphery of the drive roll 223 so as to form a narrow passageway for the bills along the rear side of the drive roll. The exit end of the guideway 211 directs the bills onto a linear path where the bills are scanned. The bills are transported with the narrow dimension of the bills maintained parallel to the transport path and the direction of movement at all times.

Bills that are stacked on the bottom wall 205 of the input receptacle are stripped, one at a time, from the bottom of the stack. The bills are stripped by a pair of stripping wheels 220 mounted on a drive shaft 221 which, in turn, is supported across side plates 201, 202. The stripping wheels 220 project through a pair of slots formed in a cover 207. Part of the periphery of each wheel 220 is provided with a raised high-friction, serrated surface 222 which engages the bottom bill of the input stack as the wheels 220 rotate, to initiate feeding movement of the bottom bill from the stack. The serrated surfaces 222 project radially beyond the rest of the wheel peripheries so that the wheels "jog" the bill stack during each revolution so as to agitate and loosen the bottom currency bill within the stack, thereby facilitating the stripping of the bottom bill from the stack.

The stripping wheels 220 feed each stripped bill B (FIG. 21a) onto a drive roll 223 mounted on a driven shaft 224 supported across the side plates 201 and 202. As can be seen most clearly in FIGS. 21a and 21b, the drive roll 223 includes a central smooth friction surface 225 formed of a material such as rubber or hard plastic. This smooth friction surface 225 is sandwiched between a pair of grooved surfaces 226 and 227 having serrated portions 228 and 229 formed from a high-friction material.

The serrated surfaces 228, 229 engage each bill after it is fed onto the drive roll 223 by the stripping wheels 220, to frictionally advance the bill into the narrow arcuate passageway formed by the curved guideway 211 adjacent the rear side of the drive roll 223. The rotational movement of the drive roll 223 and the stripping wheels 220 is synchronized so that the serrated surfaces on the drive roll and the stripping wheels maintain a constant relationship to each other. Moreover, the drive roll 223 is dimensioned so that the circumference of the outermost portions of the grooved surfaces is greater than the width W of a bill, so that the bills advanced by the drive roll 223 are spaced apart from each other. That is, each bill fed to the drive roll 223 is advanced by that roll only when the serrated surfaces 228, 229 come into engagement with the bill, so that the circumference of the drive roll 223 determines the spacing between the leading edges of successive bills.

To avoid the simultaneous removal of multiple bills from the stack in the input receptacle, particularly when small stacks of bills are loaded into the machine, the stripping wheels 220 are always stopped with the raised, serrated portions 222 positioned below the bottom wall 205 of the input receptacle. This is accomplished by continuously monitoring the angular position of the serrated portions of the stripping wheels 220 via the encoder 32, and then controlling the stopping time of the drive motor so that the motor always stops the stripping wheels in a position where the serrated portions 222 are located beneath the bottom wall 205 of the input receptacle. Thus, each time a new stack of bills is loaded into the machine, those bills will rest on the smooth portions of the stripping wheels. This has been found to significantly reduce the simultaneous feeding of double or triple bills, particularly when small stacks of bills are involved.

In order to ensure firm engagement between the drive roll 223 and the currency bill being fed, an idler roll 230 urges each incoming bill against the smooth central surface 225 of the drive roll 223. The idler roll 230 is journalled on a pair of arms 231 which are pivotally mounted on a support shaft 232. Also mounted on the shaft 232, on opposite sides of the idler roll 230, are a pair of grooved guide wheels 233 and 234. The grooves in these two wheels 233, 234 are registered with the central ribs in the two grooved surfaces 226, 227 of the drive roll 223. The wheels 233, 234 are locked to the shaft 232, which in turn is locked against movement in the direction of the bill movement (clockwise as viewed in FIG. 20a) by a one-way spring clutch 235. Each time a bill is fed into the nip between the guide wheels 233, 234 and the drive roll 223, the clutch 235 is energized to turn the shaft 232 just a few degrees in a direction opposite the direction of bill movement. These repeated incremental movements distribute the wear uniformly around the circumferences of the guide wheels 233, 234. Although the idler roll 230 and the guide wheels 233, 234 are mounted behind the guideway 211, the guideway is apertured to allow the roll 230 and the wheels 233, 234 to engage the bills on the front side of the guideway.

Beneath the idler roll 230, a spring-loaded pressure roll 236 (FIGS. 20a and 21b) presses the bills into firm engagement with the smooth friction surface 225 of the drive roll as the bills curve downwardly along the guideway 211. This pressure roll 236 is journalled on a pair of arms 237 pivoted on a stationary shaft 238. A spring 239 attached to the lower ends of the arms 237 urges the roll 236 against the drive roll 233, through an aperture in the curved guideway 211.

At the lower end of the curved guideway 211, the bill being transported by the drive roll 223 engages a flat guide plate 240 which carries a lower scan head 18. Currency bills are positively driven along the flat plate 240 by means of a transport roll arrangement which includes the drive roll 223 at one end of the plate and a smaller driven roll 241 at the other end of the plate. Both the driver roll 223 and the smaller roll 241 include pairs of smooth raised cylindrical surfaces 242 and 243 which hold the bill flat against the plate 240. A pair of O rings 244 and 245 fit into grooves formed in both the roll 241 and the roll 223 to engage the bill continuously between the two rolls 223 and 241 to transport the bill while helping to hold the bill flat against the guide plate 240.

The flat guide plate 240 is provided with openings through which the raised surfaces 242 and 243 of both the drive roll 223 and the smaller driven roll 241 are subjected to counter-rotating contact with corresponding pairs of passive transport rolls 250 and 251 having high-friction rubber surfaces. The passive rolls 250, 251 are mounted on the underside of the flat plate 240 in such a manner as to be freewheeling about their axes 254 and 255 and biased into counter-rotating contact with the corresponding upper rolls 223 and 241. The passive rolls 250 and 251 are biased into contact with the driven rolls 223 and 241 by means of a pair of H-shaped leaf springs 252 and 253 (see FIGS. 23 and 24). Each of the four rolls 250, 251 is cradled between a pair of parallel arms of one of the H-shaped leaf springs 252 and 253. The central portion of each leaf spring is fastened to the plate 240, which is fastened rigidly to the machine frame, so that the relatively stiff arms of the H-shaped springs exert a constant biasing pressure against the rolls and push them against the upper rolls 223 and 241.

The points of contact between the driven and passive transport rolls are preferably coplanar with the flat upper surface of the plate 240 so that currency bills can be positively driven along the top surface of the plate in a flat manner. The distance between the axes of the two driven transport rolls, and the corresponding counter-rotating passive rolls, is selected to be just short of the length of the most narrow dimension of the currency bills. Accordingly, the bills are firmly gripped under uniform pressure between the upper and lower transport rolls within the scanhead area, thereby minimizing the possibility of bill skew and enhancing the reliability of the overall scanning and recognition process.

The positive guiding arrangement described above is advantageous in that uniform guiding pressure is maintained on the bills as they are transported through the optical scanhead area, and twisting or skewing of the bills is substantially reduced. This positive action is supplemented by the use of the H-springs 252, 253 for uniformly biasing the passive rollers into contact with the active rollers so that bill twisting or skew resulting from differential pressure applied to the bills along the transport path is avoided. The O-rings 244, 245 function as simple, yet extremely effective means for ensuring that the central portions of the bills are held flat.

Figure 23:
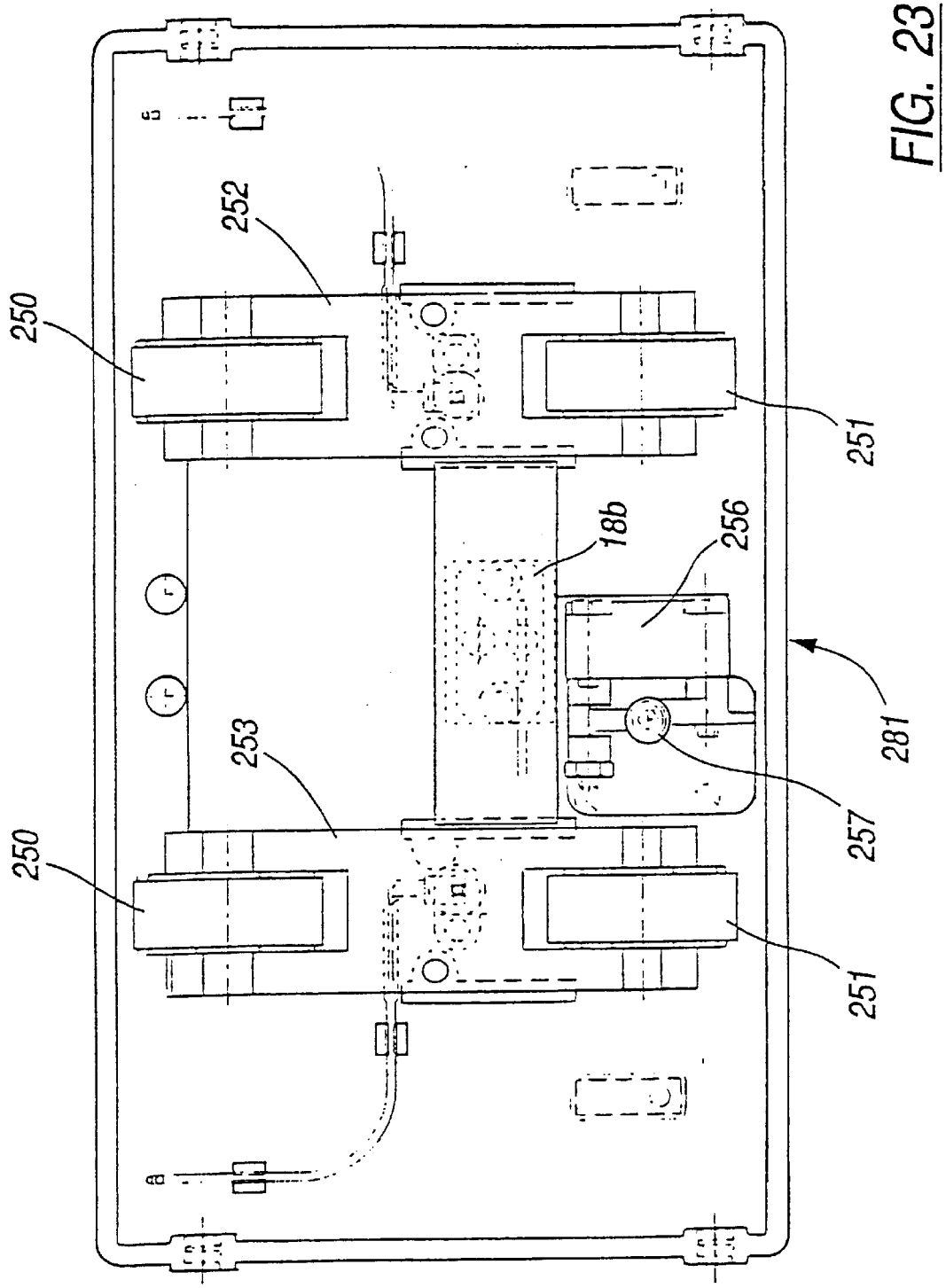
FIG. 23 is an enlarged bottom plan view of the lower support member in the machine of FIG. 1 and the passive transport rolls mounted on that member.
Figure 24:
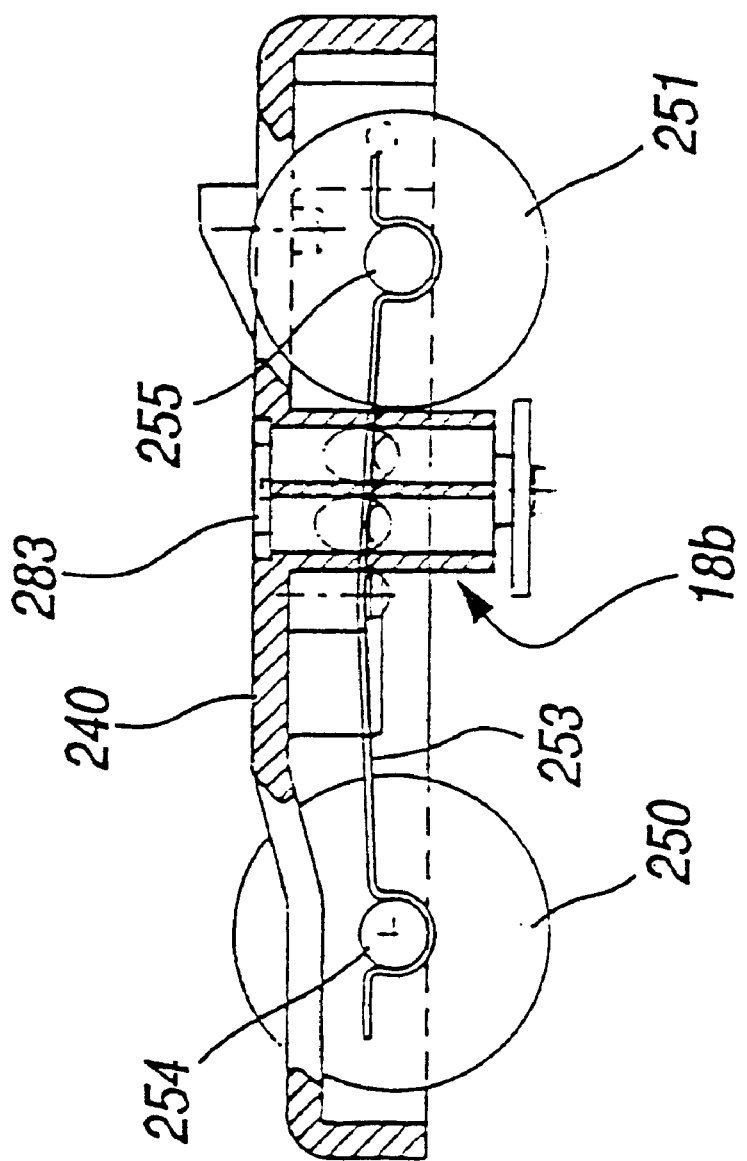
FIG. 24 is a sectional view taken across the center of the bottom support member of FIG. 23 across the narrow dimension thereof.
Figures 25, 26:
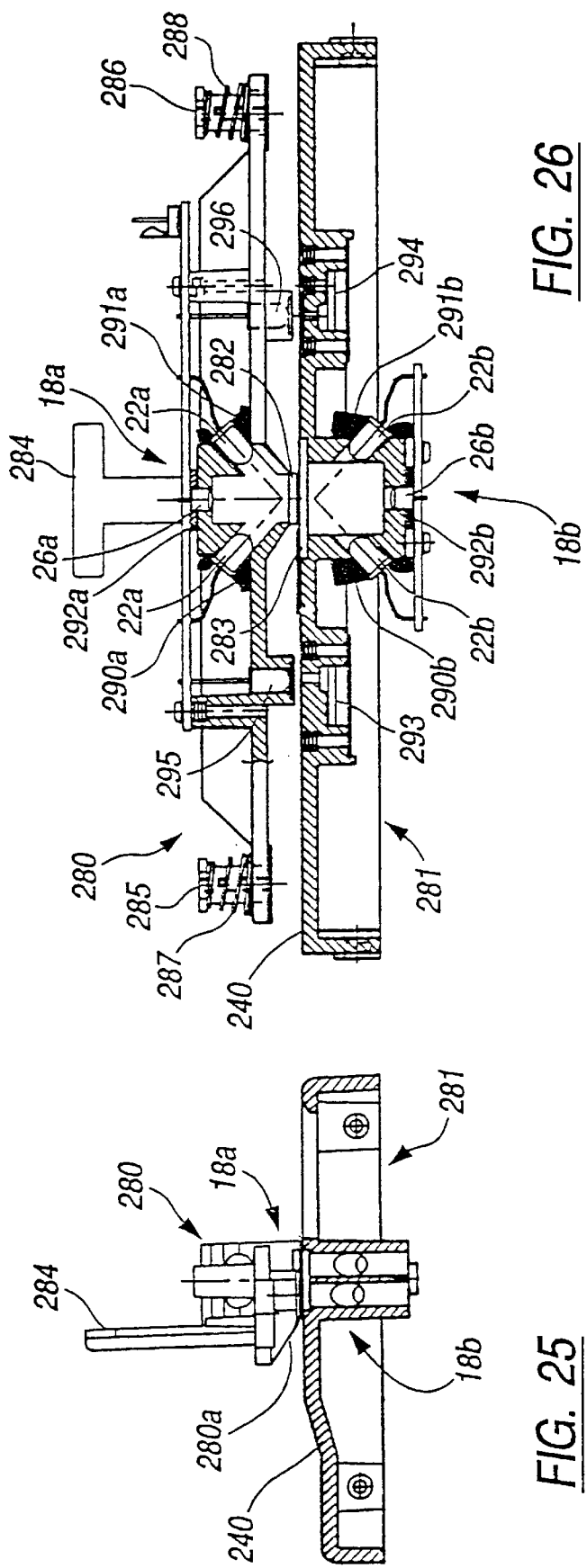
FIG. 25 is an end elevation of the upper support member which includes the upper scanhead in the machine of FIG. 1, and the sectional view of the lower support member mounted beneath the upper support member.
FIG. 26 is a section taken through the centers of both the upper and lower support members, along the long dimension of the lower support member shown in FIG. 23.
Figure 27:
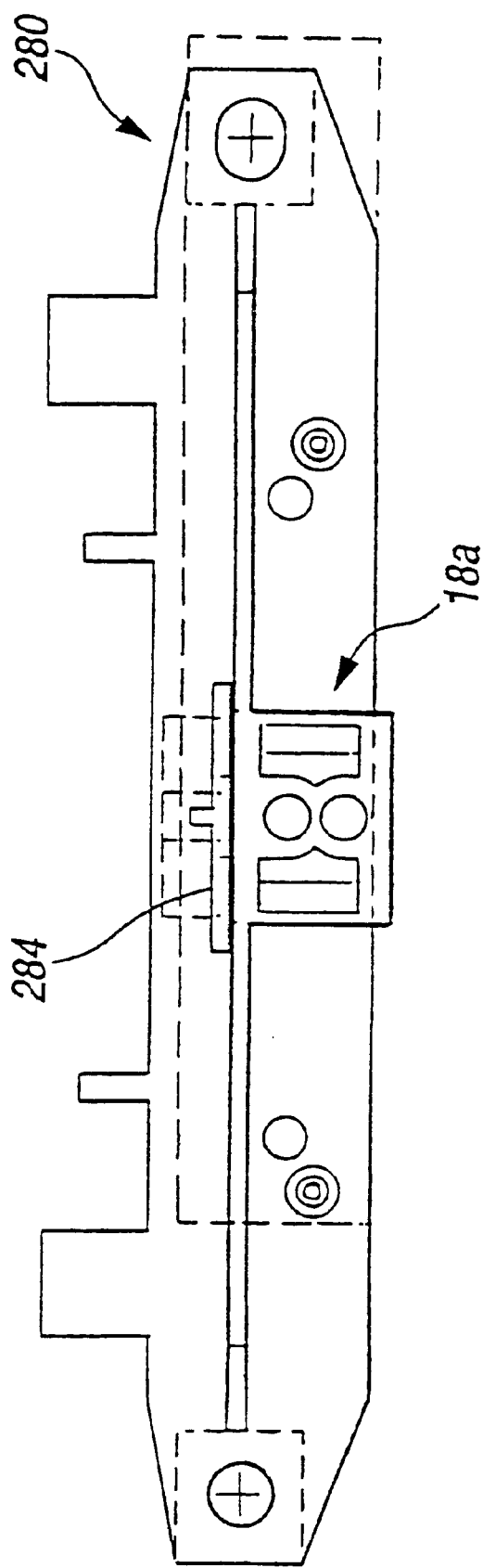
FIG. 27 is a top plan view of the upper support member which includes the upper scanhead.
Figure 28:
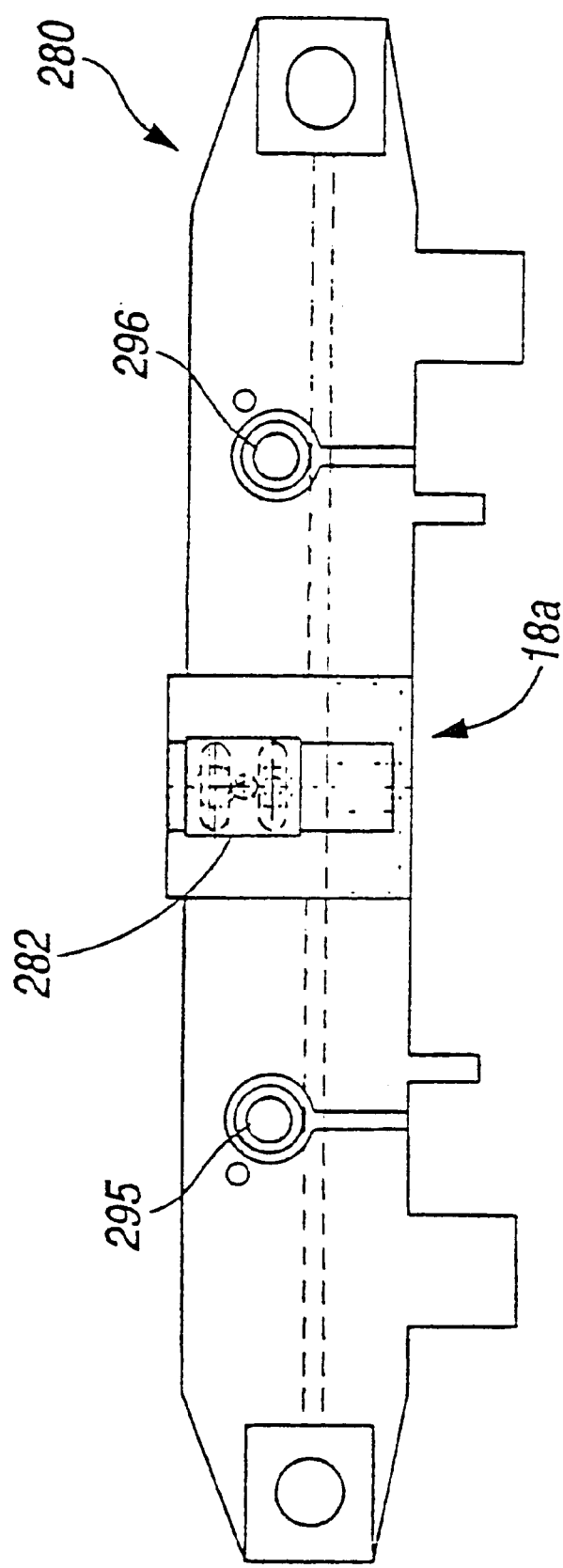
FIG. 28 is a bottom plan view of the upper support member which includes the upper scanhead.

The location of a magnetic head 256 and a magnetic head adjustment screw 257 are illustrated in FIG. 23. The adjustment screw 257 adjusts the proximity of the magnetic head 256 relative to a passing bill and thereby adjusts the strength of the magnetic field in the vicinity of the bill.

Figure 22:
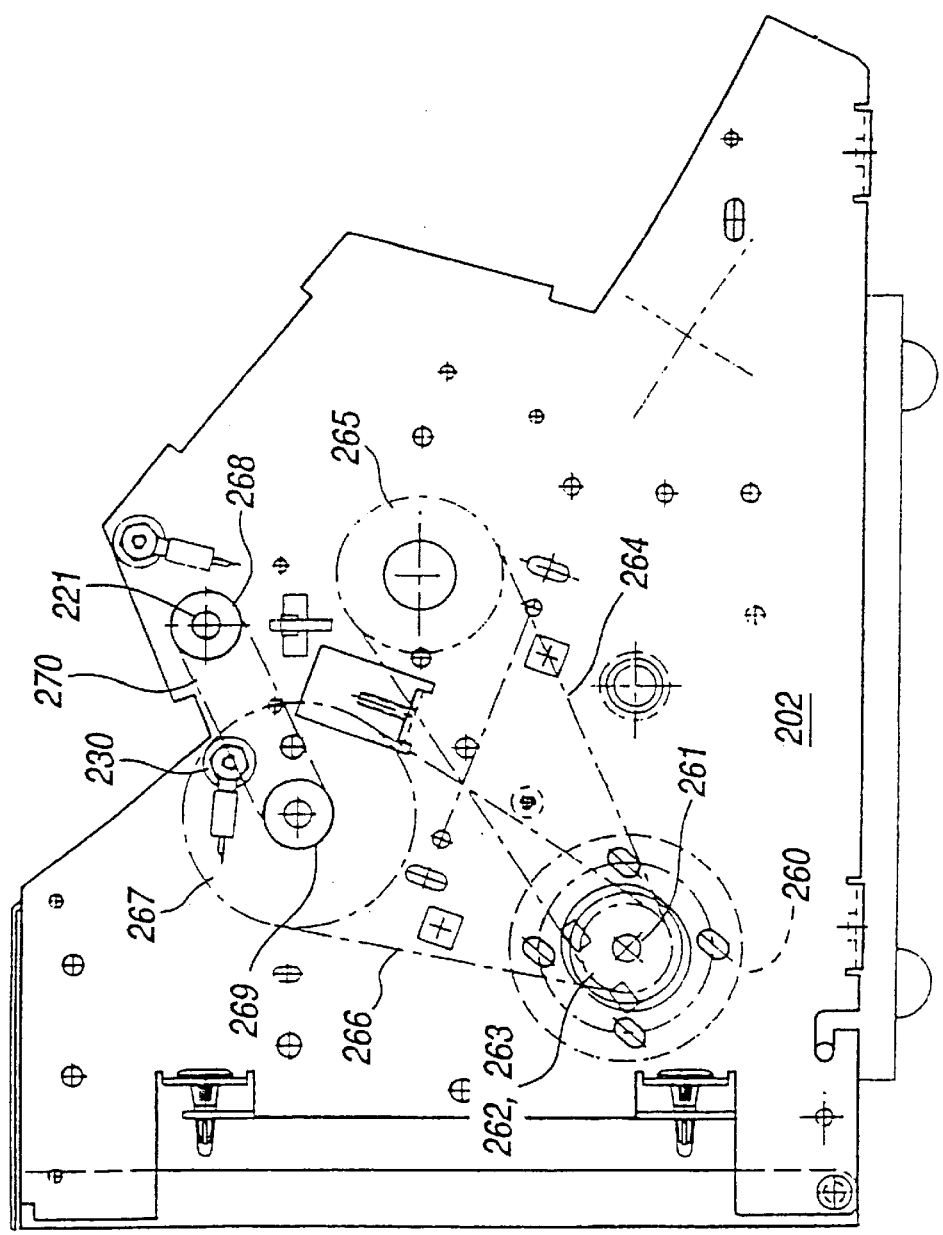
FIG. 22 is a side elevation of the machine of FIG. 1, with the side panel of the housing removed.

FIG. 22 shows the mechanical arrangement for driving the various means for transporting currency bills through the machine. A motor 260 drives a shaft 261 carrying a pair of pulleys 262 and 263. The pulley 262 drives the roll 241 through a belt 264 and pulley 265, and the pulley 263 drives the roll 223 through a belt 266 and pulley 267. Both pulleys 265 and 267 are larger than pulleys 262 and 263 in order to achieve the desired speed reduction from the typically high speed at which the motor 260 operates.

The shaft 221 of the stripping wheels 220 is driven by means of a pulley 268 provided thereon and linked to a corresponding pulley 269 on the shaft 224 through a belt 270. The pulleys 268 and 269 are of the same diameter so that the shafts 221 and 224 rotate in unison.

Figure 20B:
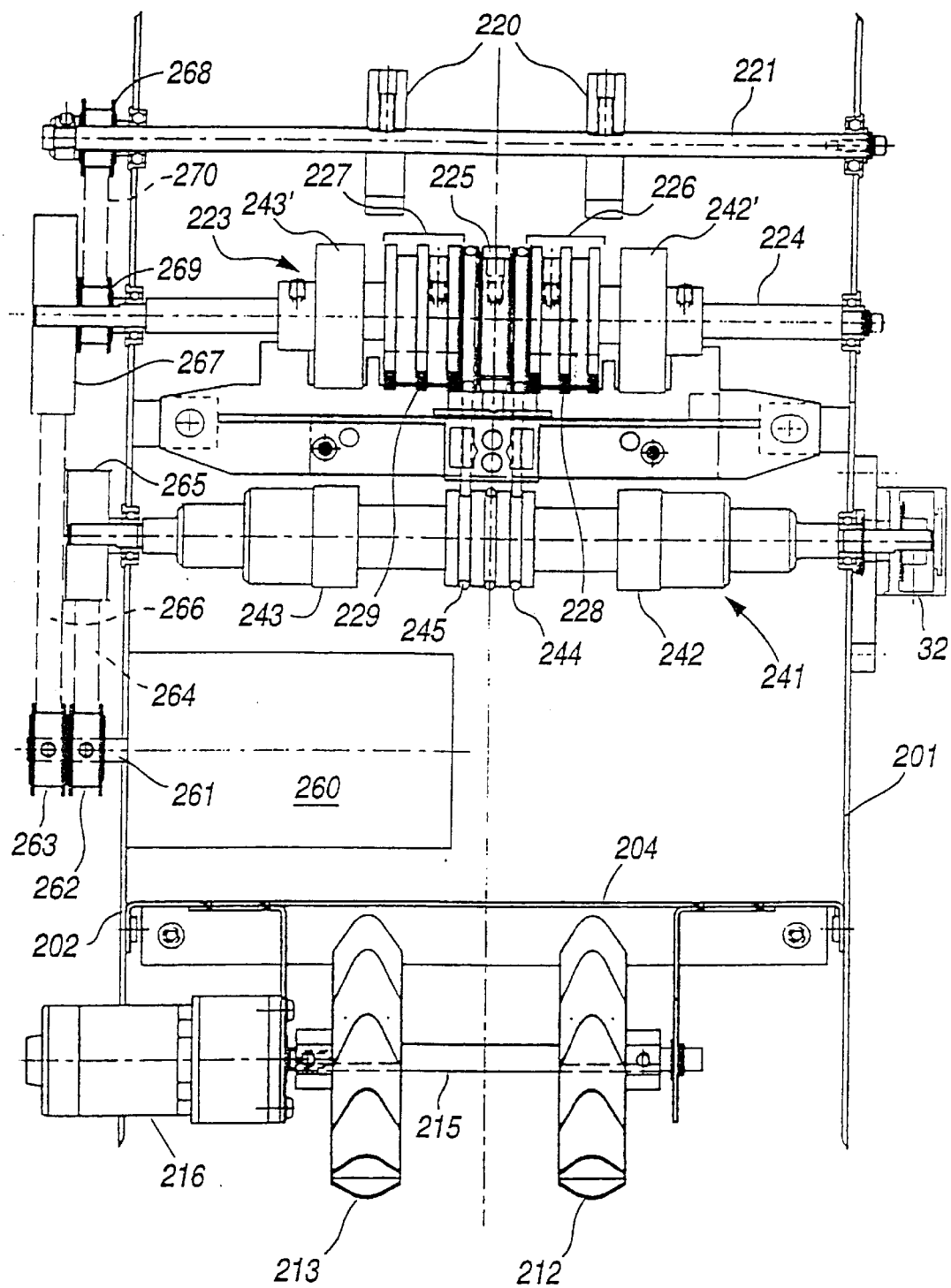
FIG. 20b is a top plan view of the interior mechanism of the machine of FIG. 1 for transporting bills across the optical scanheads, and also showing the stacking wheels at the front of the machine.
Figure 21A:
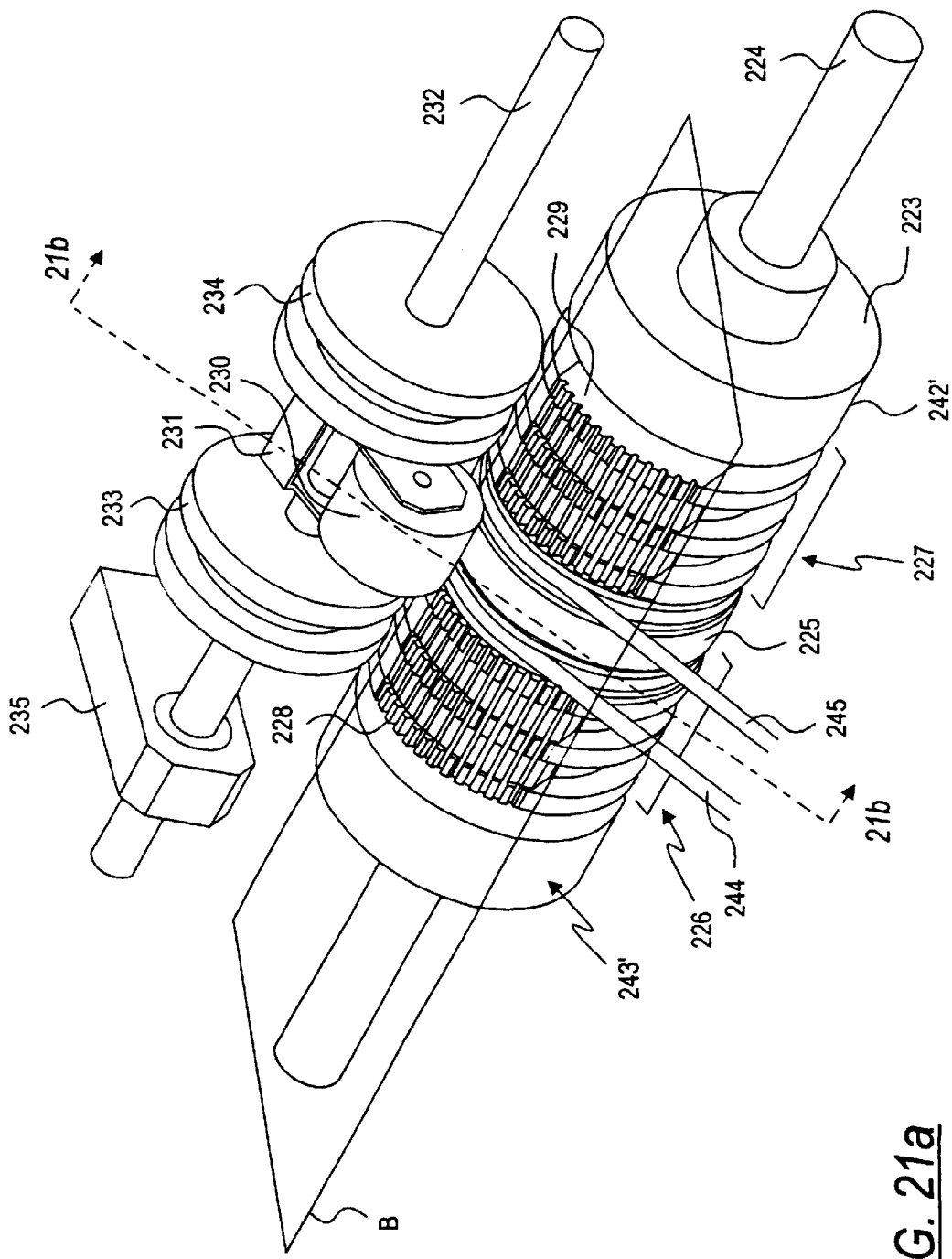
FIG. 21a is an enlarged perspective view of the bill transport mechanism which receives bills from the stripping wheels in the machine of FIG. 1.
Figure 21B:
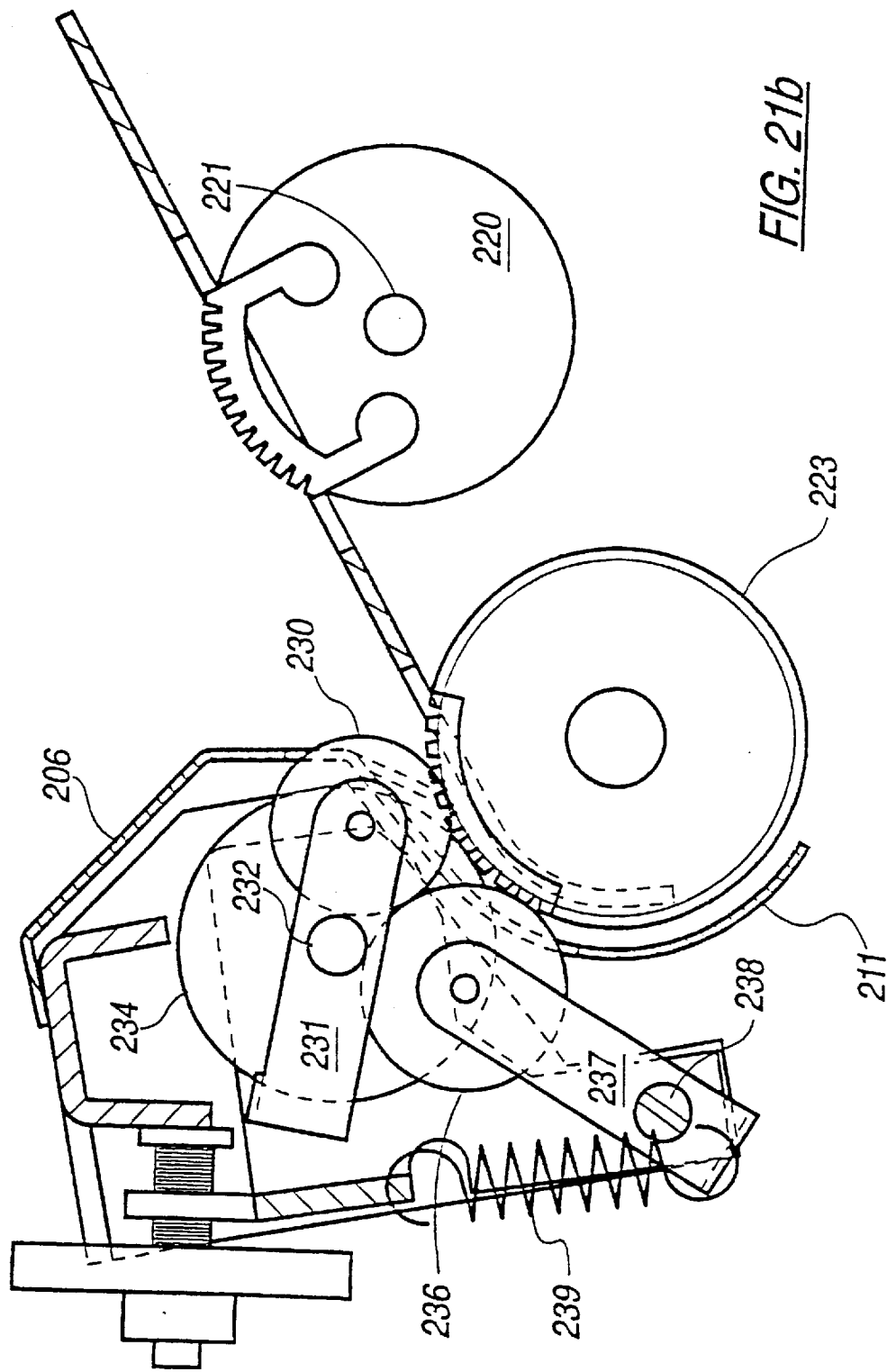
FIG. 21b is a cross-sectional view of the bill transport mechanism depicted in FIG. 21 along line 21b.

As shown in FIG. 20b, the optical encoder 32 is mounted on the shaft of the roller 241 for precisely tracking the position of each bill as it is transported through the machine, as discussed in detail above in connection with the optical sensing and correlation technique.

The upper and lower scanhead assemblies are shown most clearly in FIGS. 25–28. It can be seen that the housing for each scanhead is formed as an integral part of a unitary molded plastic support member 280 or 281 that also forms the housings for the light sources and photodetectors of the photosensors PS1 and PS2. The lower member 281 also forms the flat guide plate 240 that receives the bills from the drive roll 223 and supports the bills as they are driven past the scanheads 18a and 18b.

The two support members 280 and 281 are mounted facing each other so that the lenses 282 and 283 of the two scanheads 18a, 18b define a narrow gap through which each bill is transported. Similar, but slightly larger, gaps are formed by the opposed lenses of the light sources and photodetectors of the photosensors PS1 and PS2. The upper support member 280 includes a tapered entry guide 280a which guides an incoming bill into the gaps between the various pairs of opposed lenses.

The lower support member 281 is attached rigidly to the machine frame. The upper support member 280, however, is mounted for limited vertical movement when it is lifted manually by a handle 284, to facilitate the clearing of any paper jams that occur beneath the member 280. To allow for such vertical movement, the member 280 is slidably mounted on a pair of posts 285 and 286 on the machine frame, with a pair of springs 287 and 288 biasing the member 280 to its lowermost position.

Each of the two optical scanheads 18a and 18b housed in the support members 280, 281 includes a pair of light sources acting in combination to uniformly illuminate light strips of the desired dimension on opposite sides of a bill as it is transported across the plate 240. Thus, the upper scanhead 18a includes a pair of LEDs 22a, directing light downwardly through an optical mask on top of the lens 282 onto a bill traversing the flat guide plate 240 beneath the scanhead. The LEDs 22a are angularly disposed relative to the vertical axis of the scanhead so that their respective light beams combine to illuminate the desired light strip defined by an aperture in the mask. The scanhead 18a also includes a photodetector 26a mounted directly over the center of the illuminated strip for sensing the light reflected off the strip. The photodetector 26a is linked to the CPU 30 through the ADC 28 for processing the sensed data as described above.

Figure 29:
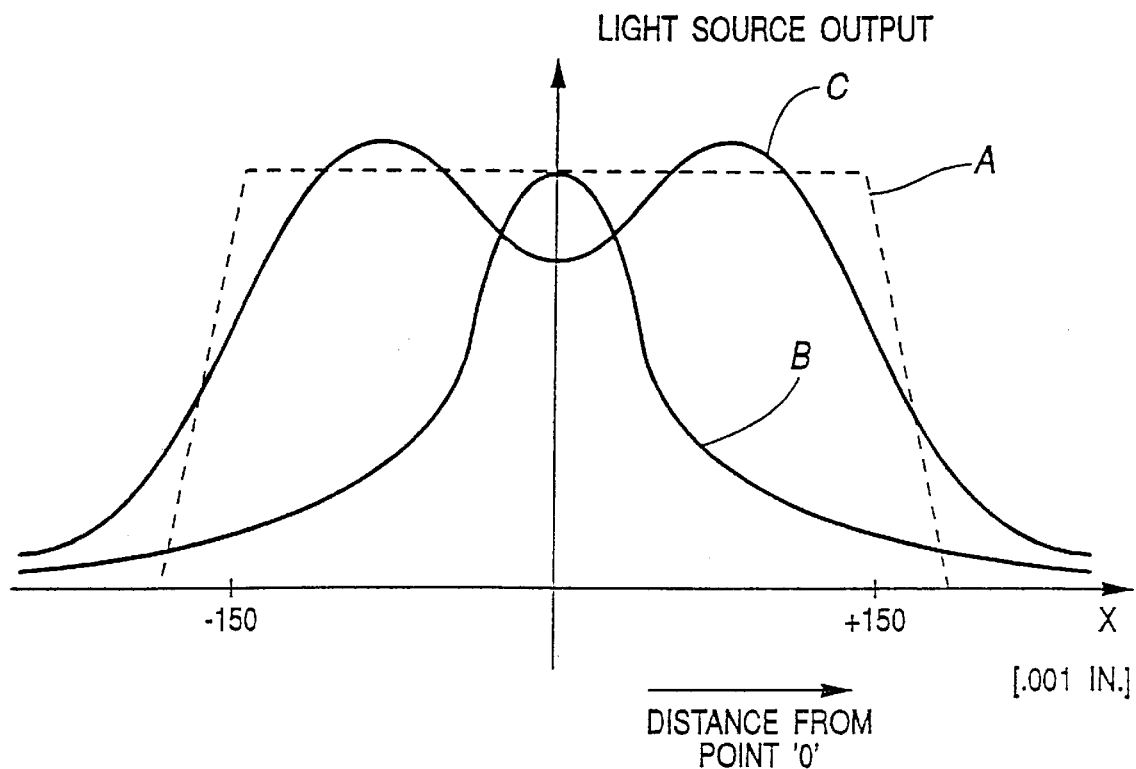
FIG. 29 is an illustration of the light distribution produced about one of the optical scanheads.

When the photodetector 26a is positioned on an axis passing through the center of the illuminated strip, the illumination by the LED's as a function of the distance from the central point "0" along the X axis, should optimally approximate a step function as illustrated by the curve A in FIG. 29. With the use of a single light source angularly displaced relative to a vertical axis through the center of the illuminated strip, the variation in illumination by an LED typically approximates a Gaussian function, as illustrated by the curve B in FIG. 29.

The two LEDs 22a are angularly disposed relative to the vertical axis by angles $\alpha$ and $\beta$, respectively. The angles $\alpha$ and $\beta$ are selected to be such that the resultant strip illumination by the LED's is as close as possible to the optimum distribution curve A in FIG. 29. The LED illumination distribution realized by this arrangement is illustrated by the curve designated as "C" in FIG. 29 which effectively merges the individual Gaussian distributions of each light source to yield a composite distribution which sufficiently approximates the optimum curve A.

In the particular embodiment of the scanheads 18a and 18b illustrated in the drawings, each scanhead includes two pairs of LEDs and two photodetectors for illuminating, and detecting light reflected from, strips of two different sizes. Thus, each mask also includes two slits which are formed to allow light from the LEDs to pass through and illuminate light strips of the desired dimensions. More specifically, one slit illuminates a relatively wide strip used for obtaining the reflectance samples which correspond to the characteristic pattern for a test bill. In a preferred embodiment, the wide slit has a length of about 0.500" and a width of about 0.050". The second slit forms a relatively narrow illuminated strip used for detecting the thin borderline surrounding the printed indicia on currency bills, as described above in detail. In a preferred embodiment, the narrow slit 283 has a length of about 0.300"and a width of about 0.010".

In order to prevent dust from fouling the operation of the scanheads, each scanhead includes three resilient seals or gaskets 290, 291, and 292. The two side seals 290 and 291 seal the outer ends of the LEDs 22, while the center seal 292 seals the outer end of the photodetector 26. Thus, dust cannot collect on either the light sources or the photodetectors, and cannot accumulate and block the slits through which light is transmitted from the sources to the bill, and from the bill to the photodetectors.

Figure 30A:
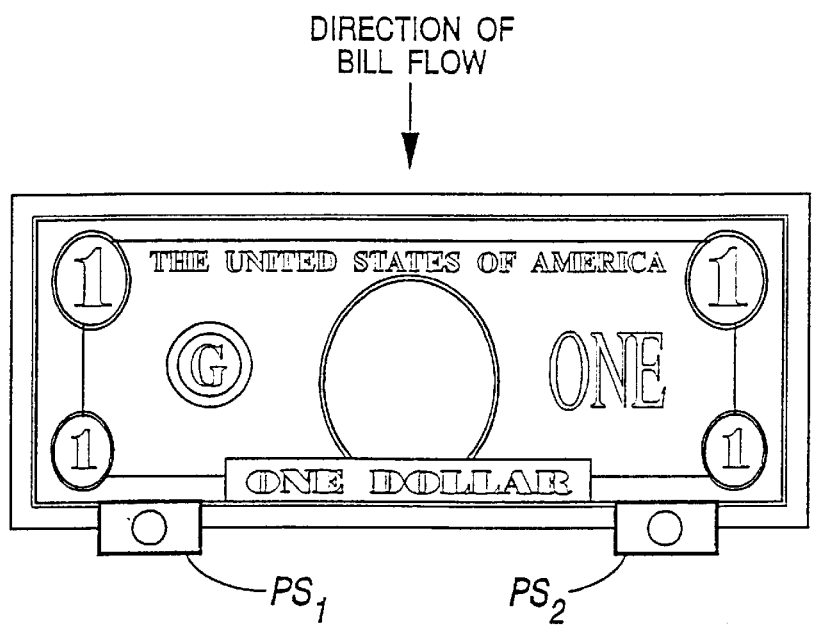
FIGS. 30a and 30b are diagrammatic illustrations of the location of two auxiliary photo sensors relative to a bill passed thereover by the transport and scanning mechanism shown in FIGS. 20a–28.
Figure 30B:
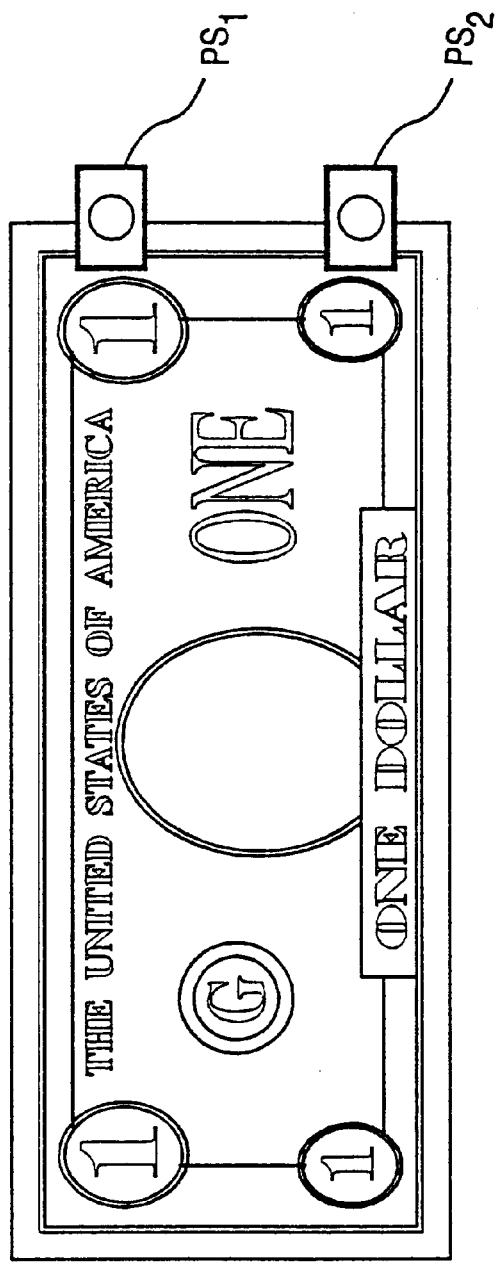

Doubling or overlapping of bills in the illustrative transport system is detected by two photosensors PS1 and PS2 which are located on a common transverse axis that is perpendicular to the direction of bill flow (see e.g., FIGS. 30a and 30b). The photosensors PS1 and PS2 include photodetectors 293 and 294 mounted within the lower support member 281 in immediate opposition to corresponding light sources 295 and 296 mounted in the upper support member 280. The photodetectors 293, 294 detect beams of light directed downwardly onto the bill transport path from the light sources 295, 296 and generate analog outputs which correspond to the sensed light passing through the bill. Each such output is converted into a digital signal by a conventional ADC convertor unit (not shown) whose output is fed as a digital input to and processed by the system CPU.

The presence of a bill adjacent the photosensors PS1 and PS2 causes a change in the intensity of the detected light, and the corresponding changes in the analog outputs of the photodetectors 293 and 294 serve as a convenient means for density-based measurements for detecting the presence of "doubles" (two or more overlaid or overlapped bills) during the currency scanning process. For instance, the photosensors may be used to collect a predefined number of density measurements on a test bill, and the average density value for a bill may be compared to predetermined density thresholds (based, for instance, on standardized density readings for master bills) to determine the presence of overlaid bills or doubles.

In order to prevent the accumulation of dirt on the light sources 295 and 296 and/or the photodetectors 293, 294 of the photosensors PS1 and PS2, both the light sources and the photodetectors are enclosed by lenses mounted so close to the bill path that they are continually wiped by the bills. This provides a self-cleaning action which reduces maintenance problems and improves the reliability of the outputs from the photosensors over long periods of operation.

The CPU 30, under control of software stored in the EPROM 34, monitors and controls the speed at which the bill transport mechanism 16 transports bills from the bill separating station 14 to the bill stacking unit. Flowcharts of the speed control routines stored in the EPROM 34 are depicted in FIGS. 31–35. To execute more than the first step in any given routine, the currency discriminating system 10 must be operating in a mode requiring the execution of the routine.

Figure 31:
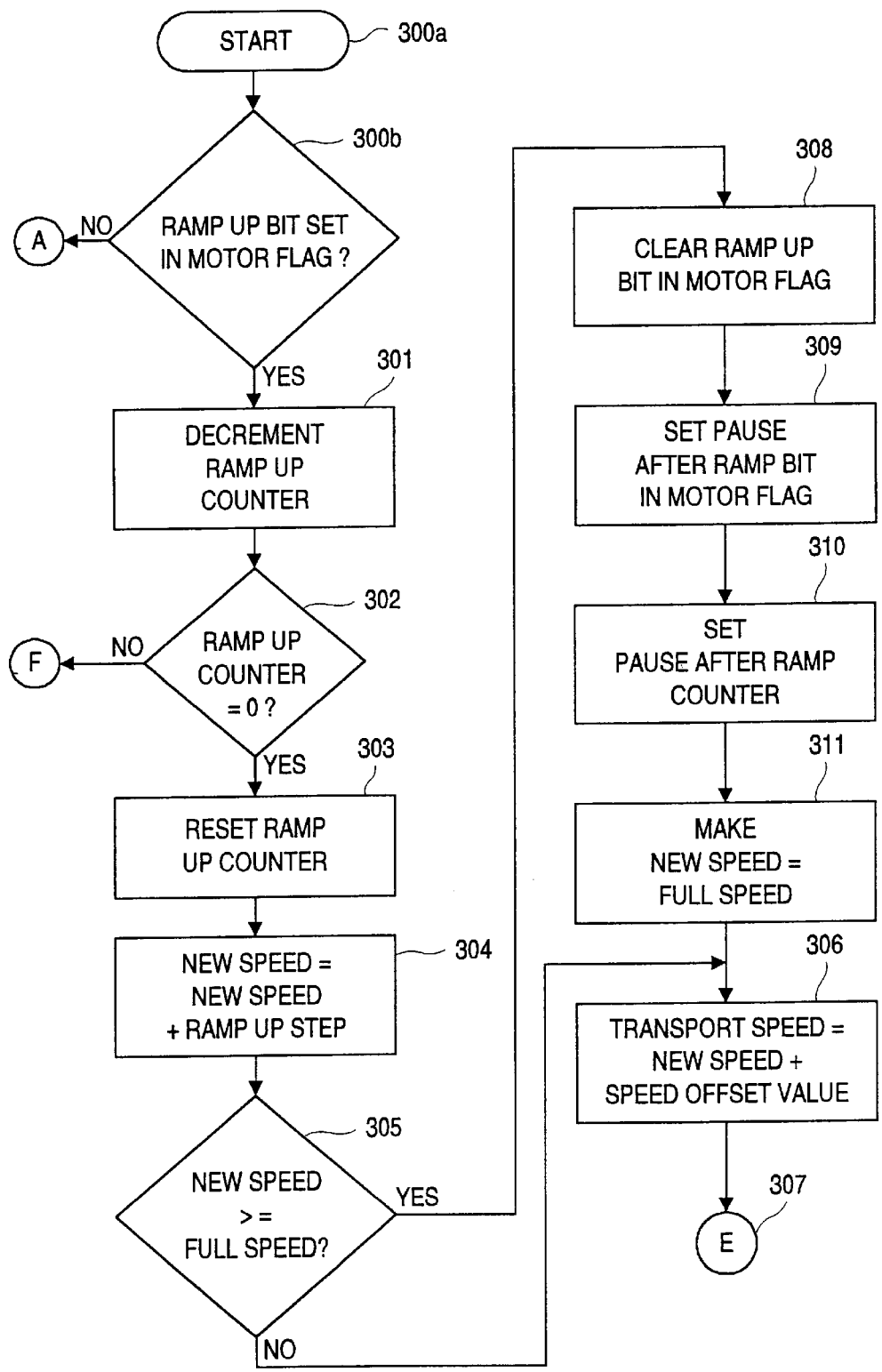
FIG. 31 is a flow chart illustrating the sequential procedure involved in a ramp-up routine for increasing the transport speed of the bill transport mechanism from zero to top speed.

Referring first to FIG. 31, when a user places a stack of bills in the bill accepting station 12 for counting, the transport speed of the bill transport mechanism 16 must accelerate or "ramp up" from zero to top speed. Therefore, in response to receiving the stack of bills in the bill accepting station 12, the CPU 30 sets a ramp-up bit in a motor flag stored in the memory unit 38. Setting the ramp-up bit causes the CPU 30 to proceed beyond step 300b of the ramp-up routine. If the ramp-up bit is set, the CPU 30 utilizes a ramp-up counter and a fixed parameter "ramp-up step" to incrementally increase the transport speed of the bill transport mechanism 16 until the bill transport mechanism 16 reaches its top speed. The "ramp-up step" is equal to the incremental increase in the transport speed of the bill transport mechanism 16, and the ramp-up counter determines the amount of time between incremental increases in the bill transport speed. The greater the value of the "ramp-up step", the greater the increase in the transport speed of the bill transport mechanism 16 at each increment. The greater the maximum value of the ramp-up counter, the greater the amount of time between increments. Thus, the greater the value of the "ramp-up step" and the lesser the maximum value of the ramp-up counter, the lesser the time it takes the bill transport mechanism 16 to reach its top speed.

The ramp-up routine in FIG. 31 employs a variable parameter "new speed", a fixed parameter "full speed", and the variable parameter "transport speed". The "full speed" represents the top speed of the bill transport mechanism 16, while the "new speed" and "transport speed" represent the desired current speed of the bill transport mechanism 16. To account for operating offsets of the bill transport mechanism 16, the "transport speed" of the bill transport mechanism 16 actually differs from the "new speed" by a "speed offset value". Outputting the "transport speed" to the bill transport mechanism 16 causes the bill transport mechanism 16 to operate at the transport speed.

To incrementally increase the speed of the bill transport mechanism 16, the CPU 30 first decrements the ramp-up counter from its maximum value (step 301). If the maximum value of the ramp-up counter is greater than one at step 302, the CPU 30 exits the speed control software in FIGS. 31–35 and repeats steps 300b, 301, and 302 during subsequent iterations of the ramp-up routine until the ramp-up counter is equal to zero. When the ramp-up counter is equal to zero, the CPU 30 resets the ramp-up counter to its maximum value (step 303). Next, the CPU 30 increases the "new speed" by the "ramp-up step" (step 304). If the "new speed" is not yet equal to the "full speed" at step 305, the "transport speed" is set equal to the "new speed" plus the "speed offset value" (step 306). The "transport speed" is output to the bill transport mechanism 16 at step 307 of the routine in FIG. 31 to change the speed of the bill transport mechanism 16 to the "transport speed". During subsequent iterations of the ramp-up routine, the CPU 30 repeats steps 300b–306 until the "new speed" is greater than or equal to the "full speed".

Once the "new speed" is greater than or equal to the "full speed" at step 305, the ramp-up bit in the motor flag is cleared (step 308), a pause-after-ramp bit in the motor flag is set (step 309), a pause-after-ramp counter is set to its maximum value (step 310), and the parameter "new speed" is set equal to the "full speed" (step 311). Finally, the "transport speed" is set equal to the "new speed" plus the "speed offset value" (step 306). Since the "new speed" is equal to the "full speed", outputting the "transport speed" to the bill transport mechanism 16 causes the bill transport mechanism 16 to operate at its top speed. The ramp-up routine in FIG. 31 smoothly increases the speed of the bill transport mechanism without causing jerking or motor spikes. Motor spikes could cause false triggering of the optical scanhead 18 such that the scanhead 18 scans non-existent bills.

Figure 32:
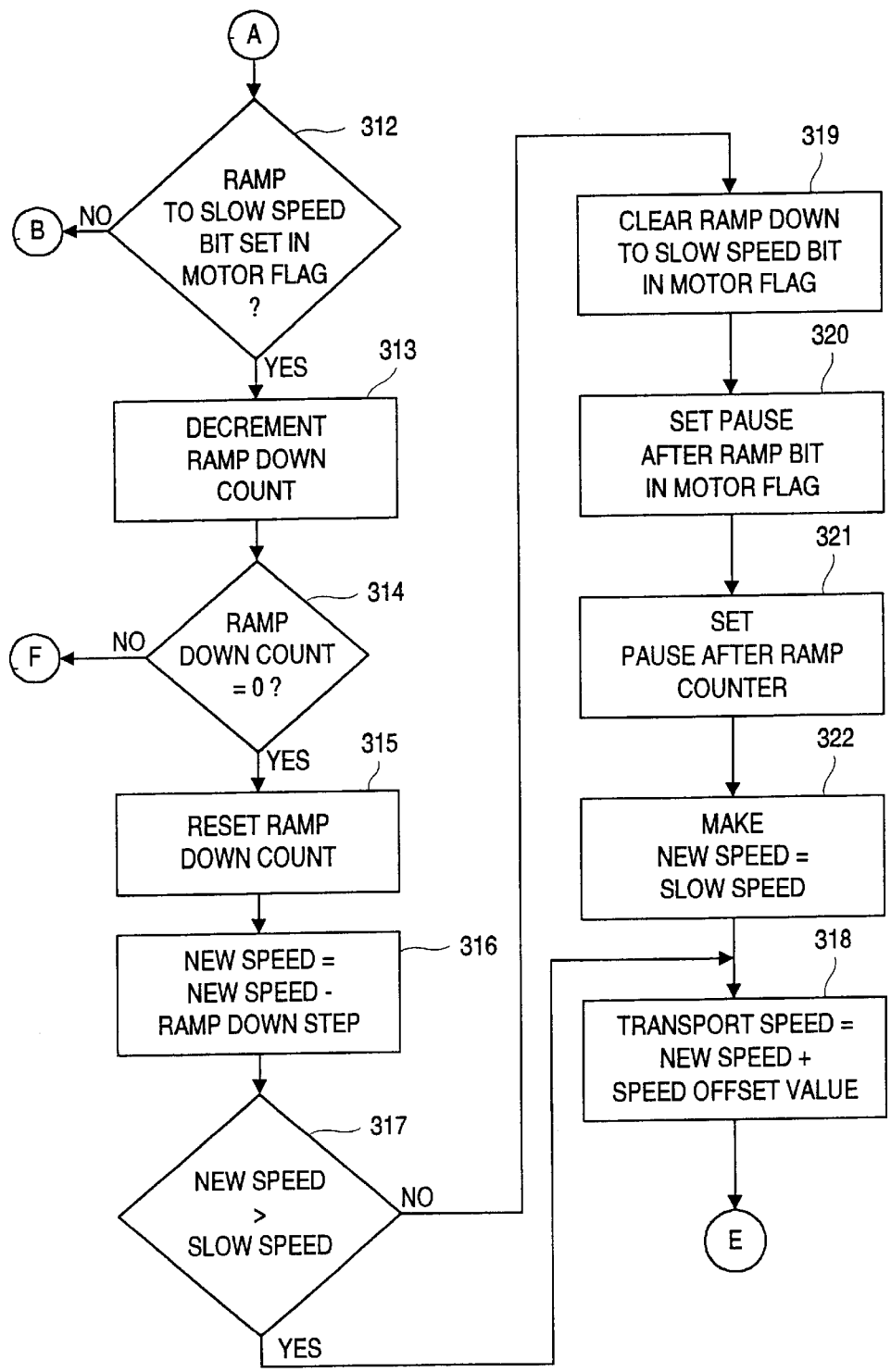
FIG. 32 is a flow chart illustrating the sequential procedure involved in a ramp-to-slow-speed routine for decreasing the transport speed of the bill transport mechanism from top speed to slow speed.

During normal counting, the bill transport mechanism 16 transports bills from the bill separating station 14 to the bill stacking unit at its top speed. In response to the optical scanhead 18 detecting a stranger, suspect or no call bill, however, the CPU 30 sets a ramp-to-slow-speed bit in the motor flag. Setting the ramp-to-slow-speed bit causes the CPU 30 to proceed beyond step 312 of the ramp-to-slow-speed routine in FIG. 32 on the next iteration of the software in FIGS. 31–35. Using the ramp-to-slow-speed routine in FIG. 32, the CPU 30 causes the bill transport mechanism 16 to controllably decelerate or "ramp down" from its top speed to a slow speed. As the ramp-to-slow speed routine in FIG. 32 is similar to the ramp-up routine in FIG. 31, it is not described in detail herein.

It suffices to state that if the ramp-to-slow-speed bit is set in the motor flag, the CPU 30 decrements a ramp-down counter (step 313) and determines whether or not the ramp-down counter is equal to zero (step 314). If the ramp-down counter is not equal to zero, the CPU 30 exits the speed control software in FIGS. 31–35 and repeats steps 312, 313, and 314 of the ramp-to-slow-speed routine in FIG. 32 during subsequent iterations of the speed control software until the ramp-down counter is equal to zero. Once the ramp-down counter is equal to zero, the CPU 30 resets the ramp-down counter to its maximum value (step 315) and subtracts a "ramp-down step" from the variable parameter "new speed" (step 316). The "new speed" is equal to the fixed parameter "full speed" prior to initiating the ramp-to-slow-speed routine in FIG. 32.

After subtracting the "ramp-down step" from the "new speed", the "new speed" is compared to a fixed parameter "slow speed" (step 317). If the "new speed" is greater than the "slow speed", the "transport speed" is set equal to the "new speed" plus the "speed offset value" (step 318) and this "transport speed" is output to the bill transport mechanism 16 (step 307 of FIG. 31). During subsequent iterations of the ramp-to-slow-speed routine, the CPU 30 continues to decrement the "new speed" by the "ramp-down step" until the "new speed" is less than or equal to the "slow speed". Once the "new speed" is less than or equal to the "slow speed" at step 317, the CPU 30 clears the ramp-to-slow-speed bit in the motor flag (step 319), sets the pause-after-ramp bit in the motor flag (step 320), sets the pause-after-ramp counter (step 321), and sets the "new speed" equal to the "slow speed" (step 322). Finally, the "transport speed" is set equal to the "new speed" plus the "speed offset value" (step 318). Since the "new speed" is equal to the "slow speed", outputting the "transport speed" to the bill transport mechanism 16 causes the bill transport mechanism 16 to operate at its slow speed. The ramp-to-slow-speed routine in FIG. 32 smoothly decreases the speed of the bill transport mechanism 16 without causing jerking or motor spikes.

Figure 33:
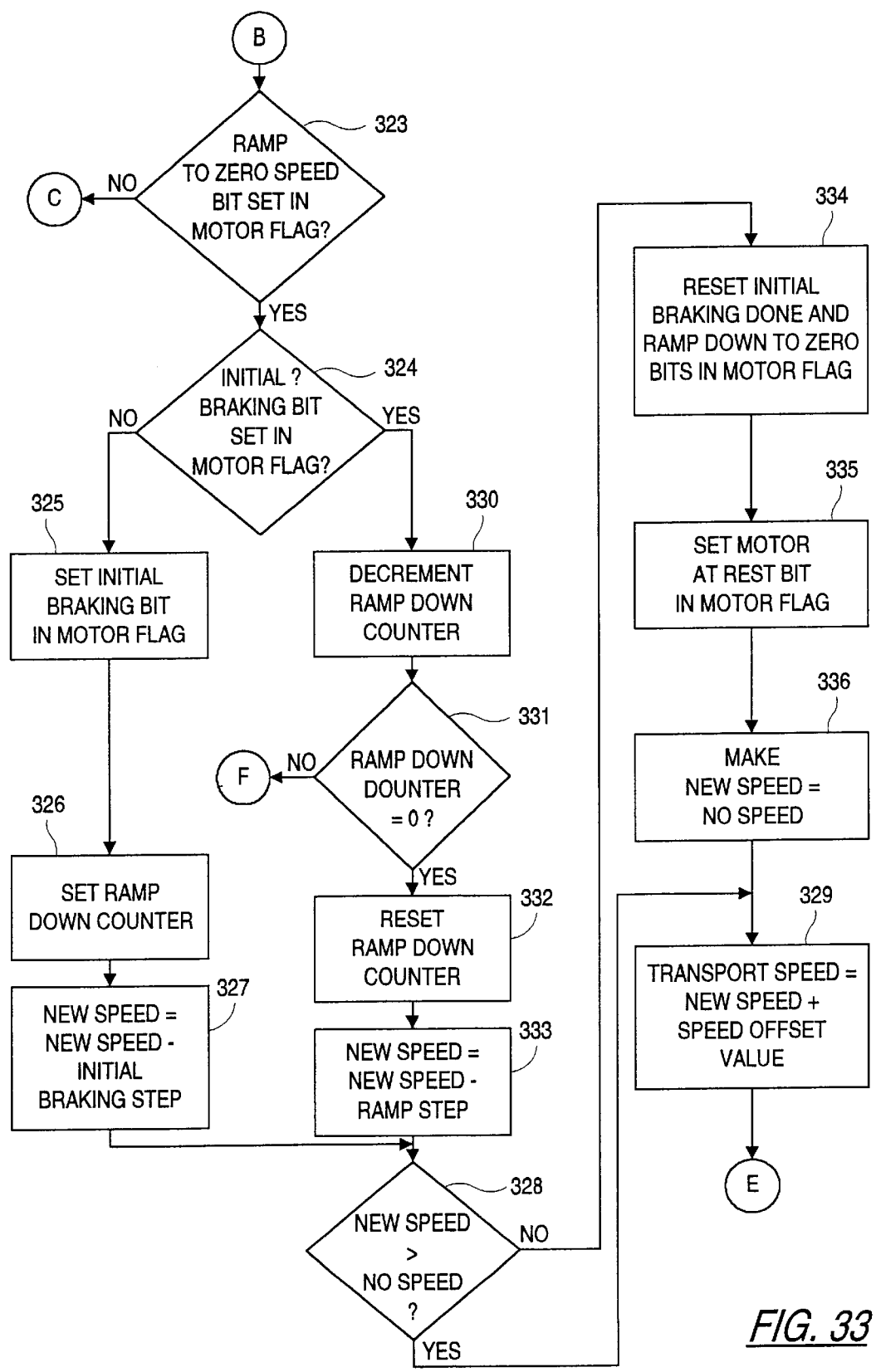
FIG. 33 is a flow chart illustrating the sequential procedure involved in a ramp-to-zero-speed routine for decreasing the transport speed of the bill transport mechanism to zero.

FIG. 33 depicts a ramp-to-zero-speed routine in which the CPU 30 ramps down the transport speed of the bill transport mechanism 16 to zero either from its top speed or its slow speed. In response to completion of counting of a stack of bills, the CPU 30 enters this routine to ramp down the transport speed of the bill transport mechanism 16 from its top speed to zero. Similarly, in response to the optical scanhead 18 detecting a stranger, suspect, or no call bill and the ramp-to-slow-speed routine in FIG. 32 causing the transport speed to be equal to a slow speed, the CPU 30 enters the ramp-to-zero-speed routine to ramp down the transport speed from the slow speed to zero.

With the ramp-to-zero-speed bit set at step 323, the CPU 30 determines whether or not an initial-braking bit is set in the motor flag (step 324). Prior to ramping down the transport speed of the bill transport mechanism 16, the initial-braking bit is clear. Therefore, flow proceeds to the left branch of the ramp-to-zero-speed routine in FIG. 33. In this left branch, the CPU 30 sets the initial-braking bit in the motor flag (step 325), resets the ramp-down counter to its maximum value (step 326), and subtracts an "initial-braking step" from the variable parameter "new speed" (step 327). Next, the CPU 30 determines whether or not the "new speed" is greater than zero (step 328). If the "new speed" is greater than zero at step 328, the variable parameter "transport speed" is set equal to the "new speed" plus the "speed offset value" (step 329) and this "transport speed" is output to the bill transport mechanism 16 at step 307 in FIG. 31.

During the next iteration of the ramp-to-zero-speed routine in FIG. 33, the CPU 30 enters the right branch of the routine at step 324 because the initial-braking bit was set during the previous iteration of the ramp-to-zero-speed routine. With the initial-braking bit set, the CPU 30 decrements the ramp-down counter from its maximum value (step 330) and determines whether or not the ramp-down counter is equal to zero (step 331). If the ramp-down counter is not equal to zero, the CPU 30 immediately exits the speed control software in FIGS. 31–35 and repeats steps 323, 324, 330, and 331 of the ramp-to-slow-speed routine during subsequent iterations of the speed control software until the ramp-down counter is equal to zero. Once the ramp-down counter is equal to zero, the CPU 30 resets the ramp-down counter to its maximum value (step 332) and subtracts a "ramp-down step" from the variable parameter "new speed" (step 333). This "ramp-down step" is smaller than the "initial-braking step" so that the "initial-braking step" causes a larger decremental change in the transport speed of the bill transport mechanism 16 than that caused by the "ramp-down step".

Next, the CPU 30 determines whether or not the "new speed" is greater than zero (step 328). If the "new speed" is greater than zero, the "transport speed" is set equal to the "new speed" plus the "speed offset value" (step 329) and this "transport speed" is outputted to the bill transport mechanism 16 (step 307 in FIG. 31). During subsequent iterations of the speed control software, the CPU 30 continues to decrement the "new speed" by the "rampdown step" at step 333 until the "new speed" is less than or equal to zero at step 328. Once the "new speed" is less than or equal to the zero at step 328, the CPU 30 clears the ramp-to-zero-speed bit and the initial-braking bit in the motor flag (step 334), sets a motor-at-rest bit in the motor A flag (step 335), and sets the "new speed" equal to zero (step 336). Finally, the "transport speed" is set equal to the "new speed" plus the "speed offset value" (step 329). Since the "new speed" is equal to zero, outputting the "transport speed" to the bill transport mechanism 16 at step 307 in FIG. 31 halts the bill transport mechanism 16.

Figure 34:
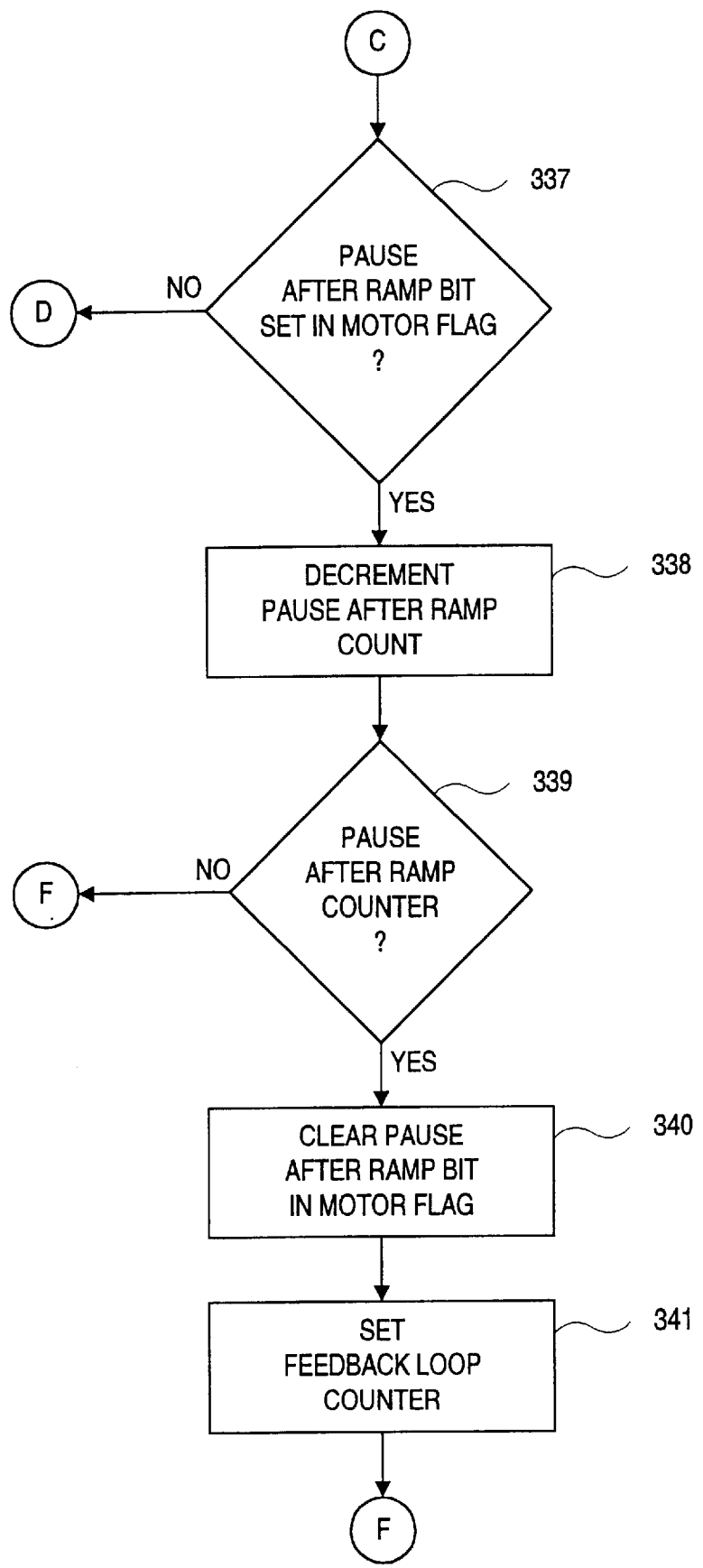
FIG. 34 is a flow chart illustrating the sequential procedure involved in a pause-after-ramp routine for delaying the feedback loop while the bill transport mechanism changes speeds.
Figure 35:
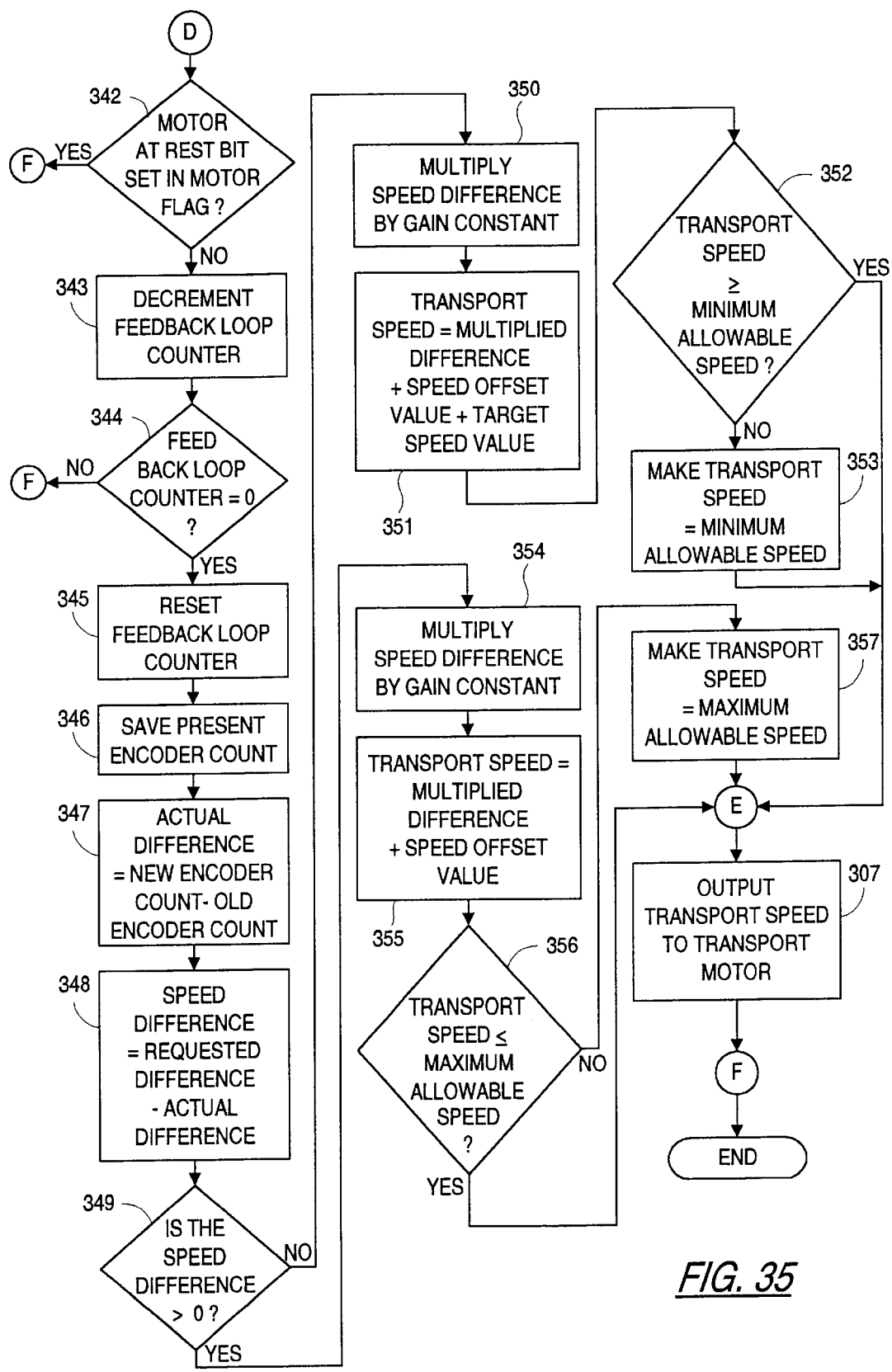
FIG. 35 is a flow chart illustrating the sequential procedure involved in a feedback loop routine for monitoring and stabilizing the transport speed of the bill transport mechanism.

Using the feedback loop routine in FIG. 35, the CPU 30 monitors and stabilizes the transport speed of the bill transport mechanism 16 when the bill transport mechanism 16 is operating at its top speed or at slow speed. To measure the transport speed of the bill transport mechanism 16, the CPU 30 monitors the optical encoder 32. While monitoring the optical encoder 32, it is important to synchronize the feedback loop routine with any transport speed changes of the bill transport mechanism 16. To account for the time lag between execution of the ramp-up or ramp-to-slow-speed routines in FIGS. 31–32 and the actual change in the transport speed of the bill transport mechanism 16, the CPU 30 enters a pause-after-ramp routine in FIG. 34 prior to entering the feedback loop routine in FIG. 35 if the bill transport mechanism 16 completed ramping up to its top speed or ramping down to slow speed during the previous iteration of the speed control software in FIGS. 31–35.

The pause-after-ramp routine in FIG. 34 allows the bill transport mechanism 16 to "catch up" to the CPU 30 so that the CPU 30 does not enter the feedback loop routine in FIG. 35 prior to the bill transport mechanism 16 changing speeds. As stated previously, the CPU 30 sets a pause-after-ramp bit during step 309 of the ramp-up routine in FIG. 31 or step 320 of the ramp-to-slow-speed routine in FIG. 32. With the pause-after-ramp bit set, flow proceeds from step 337 of the pause-after-ramp routine to step 338, where the CPU 30 decrements a pause-after-ramp counter from its maximum value. If the pause-after-ramp counter is not equal to zero at step 339, the CPU 30 exits the pause-after-ramp routine in FIG. 34 and repeats steps 337, 338, and 339 of the pause-after-ramp routine during subsequent iterations of the speed control software until the pause-after-ramp counter is equal to zero. Once the pause-after-ramp counter decrements to zero, the CPU 30 clears the pause-after-ramp bit in the motor flag (step 340) and sets the feedback loop counter to its maximum value (step 341). The maximum value of the pause-after-ramp counter is selected to delay the CPU 30 by an amount of time sufficient to permit the bill transport mechanism 16 to adjust to a new transport speed prior to the CPU 30 monitoring the new transport speed with the feedback loop routine in FIG. 35.

Referring now to the feedback loop routine in FIG. 35, if the motor-at-rest bit in the motor flag is not set at step 342, the CPU 30 decrements a feedback loop counter from its maximum value (step 343). If the feedback loop counter is not equal to zero at step 344, the CPU 30 immediately exits the feedback loop routine in FIG. 35 and repeats steps 342, 343, and 344 of the feedback loop routine during subsequent iterations of the speed control software in FIGS. 31–36 until the feedback loop counter is equal to zero. Once the feedback loop counter is decremented to zero, the CPU 30 resets the feedback loop counter to its maximum value (step 345), stores the present count of the optical encoder 32 (step 346), and calculates a variable parameter "actual difference" between the present count and a previous count of the optical encoder 32 (step 347). The "actual difference" between the present and previous encoder counts represents the transport speed of the bill transport mechanism 16. The larger the "actual difference" between the present and previous encoder counts, the greater the transport speed of the bill transport mechanism. The CPU 30 subtracts the "actual difference" from a fixed parameter "requested difference" to obtain a variable parameter "speed difference" (step 348).

If the "speed difference" is greater than zero at step 349, the bill transport speed of the bill transport mechanism 16 is too slow. To counteract slower than ideal bill transport speeds, the CPU 30 multiplies the "speed difference" by a "gain constant" (step 354) and sets the variable parameter "transport speed" equal to the multiplied difference from step 354 plus the "speed offset value" plus a fixed parameter "target speed" (step 355). The "target speed" is a value that, when added to the "speed offset value", produces the ideal transport speed. The calculated "transport speed" is greater than this ideal transport speed by the amount of the multiplied difference. If the calculated "transport speed" is nonetheless less than or equal to a fixed parameter "maximum allowable speed" at step 356, the calculated "transport speed" is output to the bill transport mechanism 16 at step 307 so that the bill transport mechanism 16 operates at the calculated "transport speed". If, however, the calculated "transport speed" is greater than the "maximum allowable speed" at step 356, the parameter "transport speed" is set equal to the "maximum allowable speed" (step 357) and is output to the bill transport mechanism 16 (step 307).

If the "speed difference" is less than or equal to zero at step 349, the bill transport speed of the bill transport mechanism 16 is too fast or is ideal. To counteract faster than ideal bill transport speeds, the CPU 30 multiplies the "speed difference" by a "gain constant" (step 350) and sets the variable parameter "transport speed" equal to the multiplied difference from step 350 plus the "speed offset value" plus a fixed parameter "target speed" (step 351). The calculated "transport speed" is less than this ideal transport speed by the amount of the multiplied difference. If the calculated "transport speed" is nonetheless greater than or equal to a fixed parameter "minimum allowable speed" at step 352, the calculated "transport speed" is output to the bill transport mechanism 16 at step 307 so that the bill transport mechanism 16 operates at the calculated "transport speed". If, however, the calculated "transport speed" is less than the "minimum allowable speed" at step 352, the parameter "transport speed" is set equal to the "minimum allowable speed" (step 353) and is output to the bill transport mechanism 16 (step 307).

It should be apparent that the smaller the value of the "gain constant", the smaller the variations of the bill transport speed between successive iterations of the feedback control routine in FIG. 35 and, accordingly, the less quickly the bill transport speed is adjusted toward the ideal transport speed. Despite these slower adjustments in the bill transport speed, it is generally preferred to use a relatively small "gain constant" to prevent abrupt fluctuations in the bill transport speed and to prevent overshooting the ideal bill transport speed.

Figure 36:
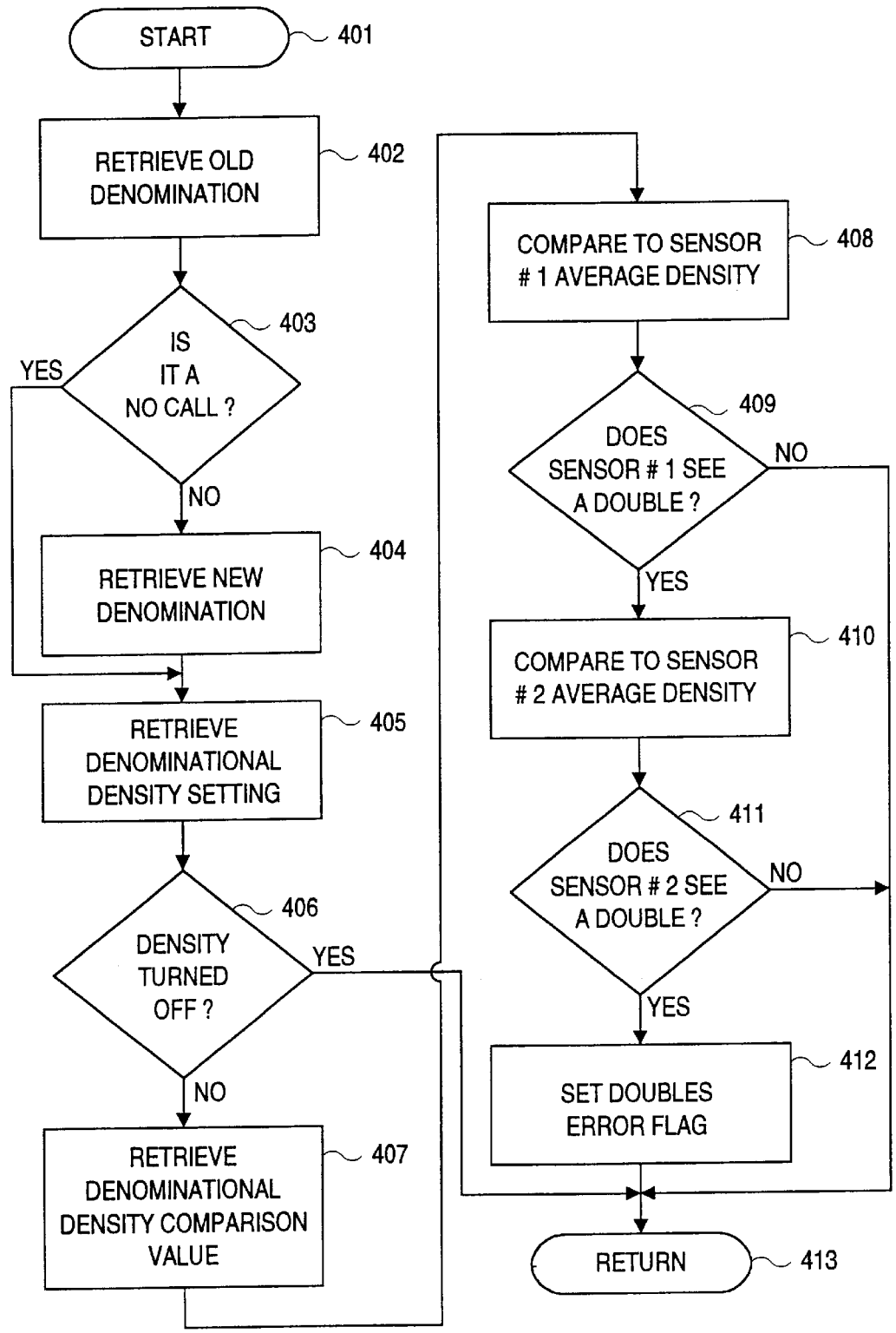
FIG. 36 is a flow chart illustrating the sequential procedure involved in a doubles detection routine for detecting overlapped bills.

A routine for using the outputs of the two photosensors PS1 and PS2 to detect any doubling or overlapping of bills is illustrated in FIG. 36 by sensing the optical density of each bill as it is scanned. This routine starts at step 401 and retrieves the denomination determined for the previously scanned bill at step 402. This previously determined denomination is used for detecting doubles in the event that the newly scanned bill is a "no call", as described below. Step 403 determines whether the current bill is a "no call," and if the answer is negative, the denomination determined for the new bill is retrieved at step 404.

If the answer at step 403 is affirmative, the system jumps to step 405, so that the previous denomination retrieved at step 402 is used in subsequent steps. To permit variations in the sensitivity of the density measurement, a "density setting" is retrieved from memory at step 405. If the "density setting" has been turned off, this condition is sensed at step 406, and the system returns to the main program at step 413. If the "density setting" is not turned off, a denominational density comparison value is retrieved from memory at step 407.

The memory preferably contains five different density values (for five different density settings, i.e., degrees of sensitivity) for each denomination. Thus, for a currency set containing seven different denominations, the memory contains 35 different values. The denomination retrieved at step 404 (or step 402 in the event of a "no call"), and the density setting retrieved st step 405, determine which of the 35 stored values is retrieved at step 407 for use in the comparison steps described below.

At step 408, the density comparison value retrieved at step 407 is compared to the average density represented by the output of the photosensor PS1. The result of this comparison is evaluated at step 409 to determine whether the output of sensor S1 identifies a doubling of bills for the particular denomination of bill determined at step 402 or 404. If the answer is negative, the system returns to the main program at step 413. If the answer is affirmative, step 410 then compares the retrieved density comparison value to the average density represented by the output of the second sensor PS2. The result of this comparison is evaluated at step 411 to determine whether the output of the photosensor PS2 identifies a doubling of bills. Affirmative answers at both step 409 and step 411 result in the setting of a "doubles error" flag at step 412, and the system then returns to the main program at step 413. The "doubles error" flag can, of course, be used to stop the bill transport motor.

Figure 37:
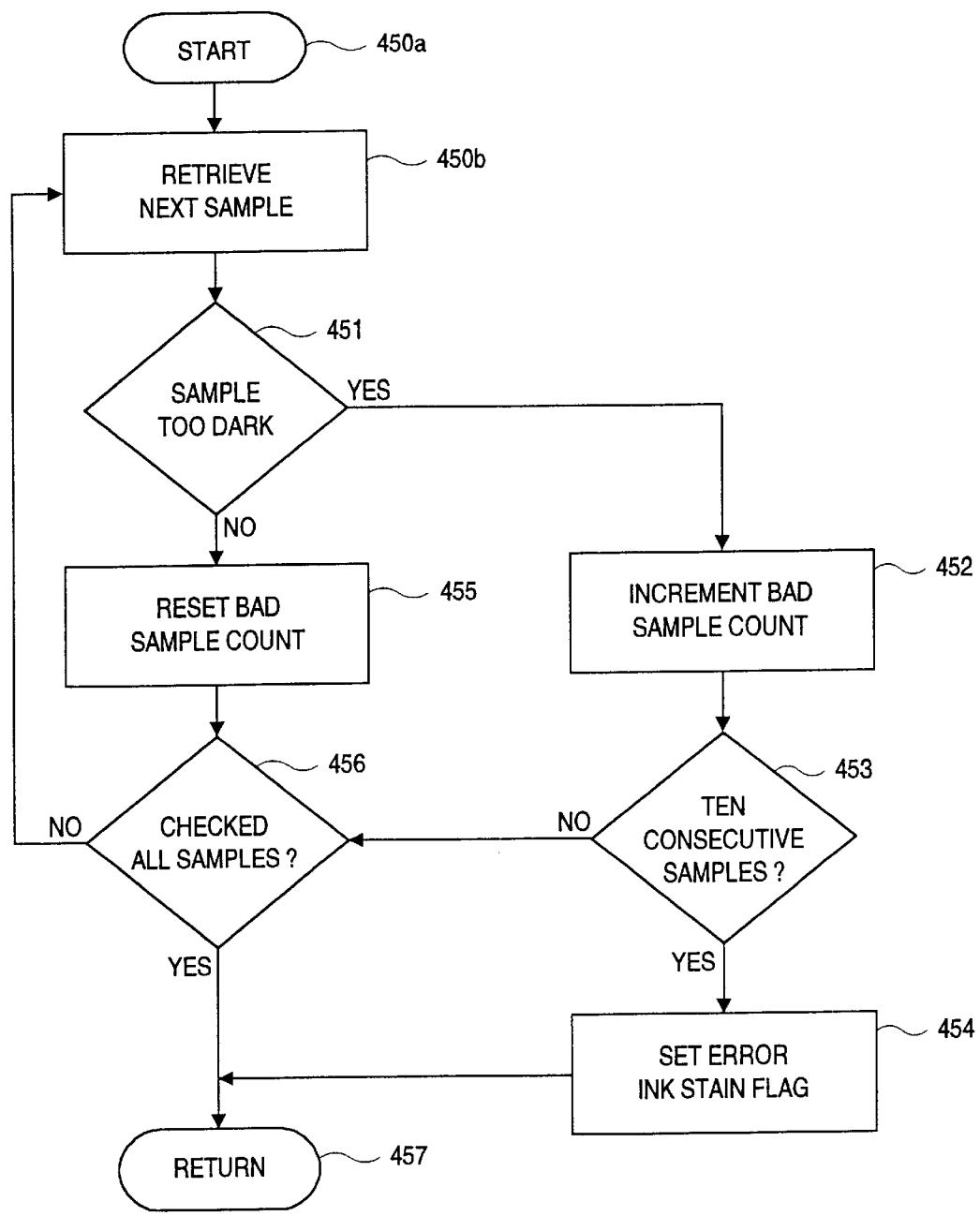
FIG. 37 is a flow chart illustrating the sequential procedure involved in a routine for detecting sample data representing dark blemishes on a bill.

FIG. 37 illustrates a routine that enables the system to detect bills which have been badly defaced by dark marks such as ink blotches, felt-tip pen marks and the like. Such severe defacing of a bill can result in such distorted scan data that the data can be interpreted to indicate the wrong denomination for the bill. Consequently, it is desirable to detect such severely defaced bills and then stop the bill transport mechanism so that the bill in question can be examined by the operator.

The routine of FIG. 37 retrieves each successive data sample at step 450b and then advances to step 451 to determine whether that sample is too dark. As described above, the output voltage from the photodetector 26 decreases as the darkness of the scanned area increases. Thus, the lower the output voltage from the photodetector, the darker the scanned area. For the evaluation carried out at step 451, a preselected threshold level for the photodetector output voltage, such as a threshold level of about 1 volt, is used to designate a sample that is "too dark."

An affirmative answer at step 451 advances the system to step 452 where a "bad sample" count is incremented by one. A single sample that is too dark is not enough to designate the bill as seriously defaced. Thus, the "bad sample" count is used to determine when a preselected number of consecutive samples, e.g., ten consecutive samples, are determined to be too dark. From step 452, the system advances to step 453 to determine whether ten consecutive bad samples have been received. If the answer is affirmative, the system advances to step 454 where an error flag is set. This represents a "no call" condition, which causes the bill transport system to be stopped in the same manner discussed above.

When a negative response is obtained at step 451, the system advances to step 455 where the "bad sample" count is reset to zero, so that this count always represents the number of consecutive bad samples received. From step 455 the system advances to step 456 which determines when all the samples for a given bill have been checked. As long as step 456 yields a negative answer, the system continues to retrieve successive samples at step 450b. When an affirmative answer is produced at step 456, the system returns to the main program at step 457.

Figure 38:
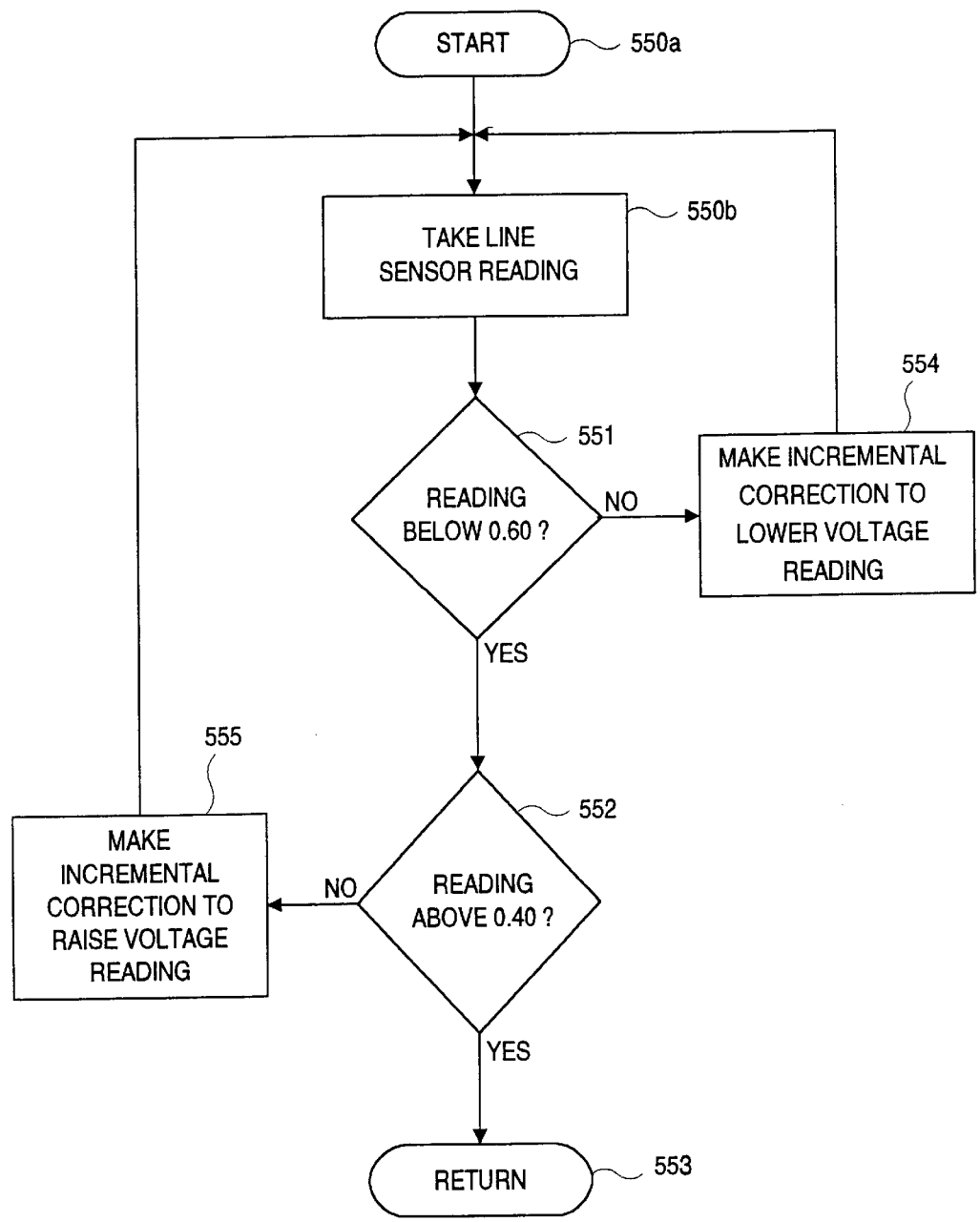
FIG. 38 is a flow chart illustrating the sequential procedure involved in a routine for maintaining a desired readhead voltage level.

A routine for automatically monitoring and making any necessary corrections in various line voltages is illustrated in FIG. 38. This routine is useful in automatically compensating for voltage drifts due to temperature changes, aging of components and the like. The routine starts at step 550 and reads the output of a line sensor which is monitoring a selected voltage at step 550b. Step 551 determines whether the reading is below 0.60, and if the answer is affirmative, step 552 determines whether the reading is above 0.40. If step 552 also produces an affirmative response, the voltage is within the required range and thus the system returns to the main program step 553. If step 551 produces a negative response, an incremental correction is made at step 554 to reduce the voltage in an attempt to return it to the desired range. Similarly, if a negative response is obtained at step 552, an incremental correction is made at step 555 to increase the voltage toward the desired range.

Figure 39:
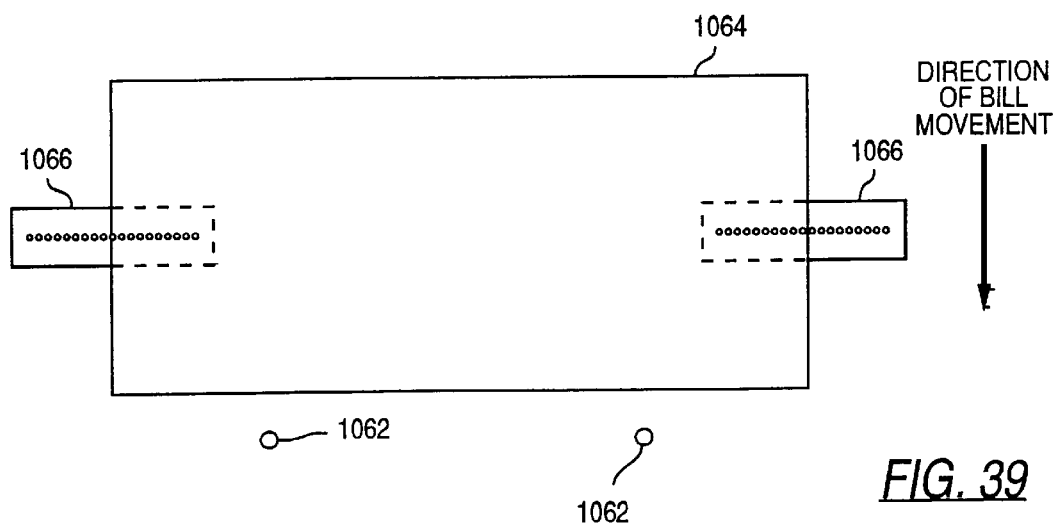
FIG. 39 is a top view of a bill and size determining sensors according to a preferred embodiment of the present invention.

Because currencies come in a variety of sizes, sensors may be added to determine the size of a bill to be scanned. These sensors are placed upstream of the scanheads. A preferred embodiment of size determining sensors is illustrated in FIG. 39. Two leading/trailing edge sensors 1062 detect the leading and trailing edges of a bill 1064 as it passes along the transport path. These sensors in conjunction with the encoder 32 (FIGS. 2a–2b) may be used to determine the dimension of the bill along a direction parallel to the scan direction which in FIG. 39 is the narrow dimension (or width) of the bill 1064. Additionally, two side edge sensors 1066 are used to detect the dimension of a bill 1064 transverse to the scan direction which in FIG. 39 is the wide dimension (or length) of the bill 1064. While the sensors 1062 and 1066 of FIG. 39 are optical sensors, other means of determining the size of a bill may be employed.

Once the size of a bill is determined, the potential identity of the bill is limited to those bills having the same size. Accordingly, the area to be scanned can be tailored to the area or areas best suited for identifying the denomination and country of origin of a bill having the measured dimensions.

Figure 40:
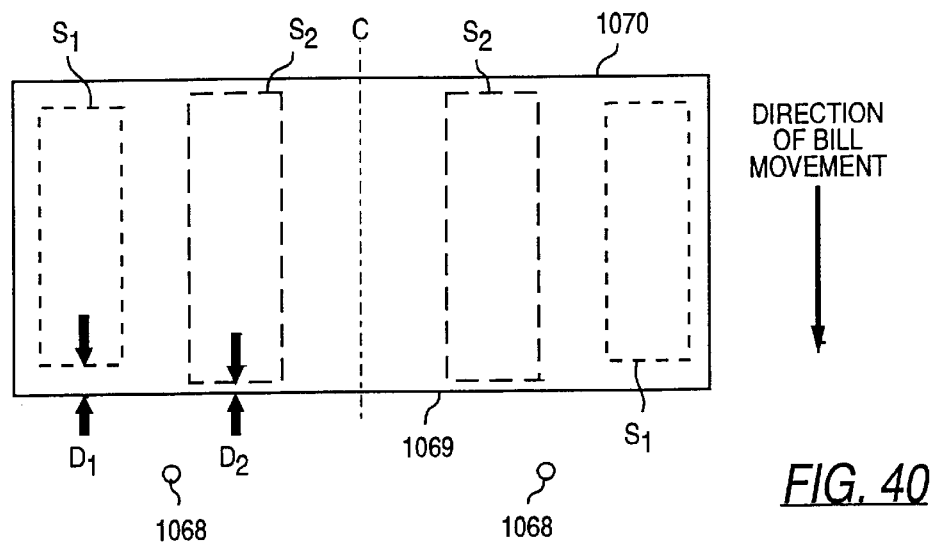
FIG. 40 is a top view of a bill illustrating multiple areas to be optically scanned on a bill according to a preferred embodiment of the present invention.

While the printed indicia on U.S. currency is enclosed within a thin borderline, the sensing of which may serve as a trigger to begin scanning using a wider slit, most currencies of other currency systems such as those from other countries do not have such a borderline. Thus the system described above may be modified to begin scanning relative to the edge of a bill for currencies lacking such a borderline. Referring to FIG. 40, two leading edge detectors 1068 are shown. The detection of the leading edge 1069 of a bill 1070 by leading edge sensors 1068 triggers scanning in an area a given distance away from the leading edge of the bill 1070, e.g., $D_1$ or $D_2$, which may vary depending upon the preliminary indication of the identity of a bill based on the dimensions of a bill. Alternatively, the leading edge 1069 of a bill may be detected by one or more of the scanheads (to be described below) in a similar manner as that described with respect to FIGS. 7a and 7b. Alternatively, the beginning of scanning may be triggered by positional information provided by the encoder 32 of FIG. 2a–2b, for example, in conjunction with the signals provided by sensors 1062 of FIG. 39, thus eliminating the need for leading edge sensors 1068.

Figure 41A:
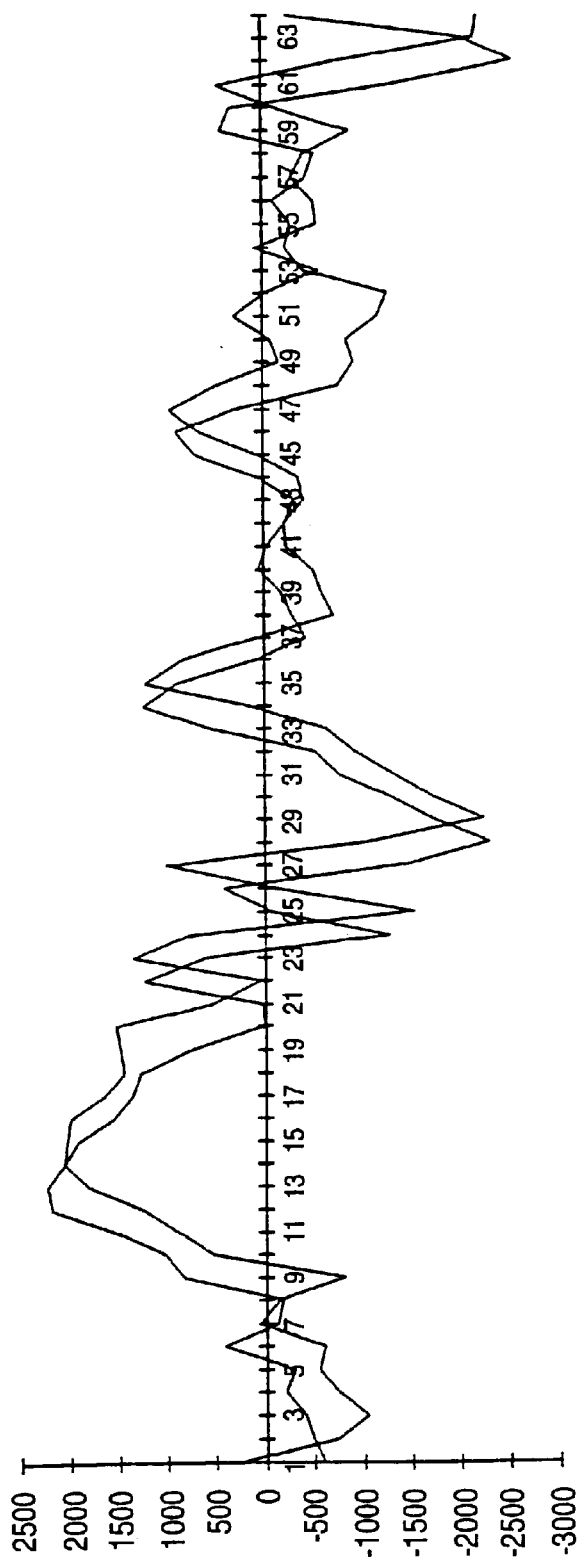
FIG. 41a is a graph illustrating a scanned pattern which is offset from a corresponding master pattern.
Figure 41B:
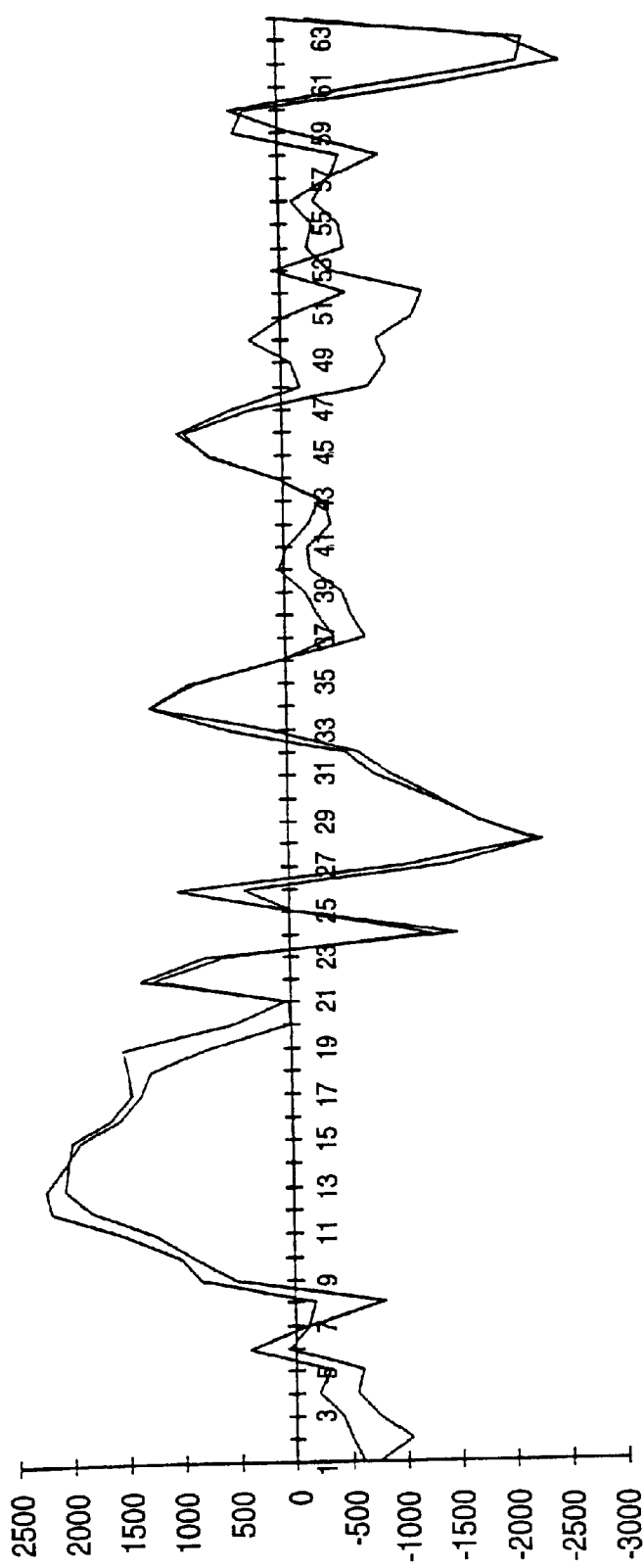
FIG. 41b is a graph illustrating the same patterns of FIG. 41a after the scanned pattern is shifted relative to the master pattern.

However, when the initiation of scanning is triggered by the detection of the leading edge of a bill, the chance that a scanned pattern will be offset relative to a corresponding master pattern increases. Offsets can result from the existence of manufacturing tolerances which permit the location of printed indicia of a document to vary relative to the edges of the document. For example, the printed indicia on U.S. bills may vary relative to the leading edge of a bill by as much as 50 mils which is 0.05 inches (1.27 mm). Thus when scanning is triggered relative to the edge of a bill (rather than the detection of a certain part of the printed indicia itself, such as the printed borderline of U.S. bills), a scanned pattern can be offset from a corresponding master pattern by one or more samples. Such offsets can lead to erroneous rejections of genuine bills due to poor correlation between scanned and master patterns. To compensate, overall scanned patterns and master patterns can be shifted relative to each other as illustrated in FIGS. 41a and 41b. More particularly, FIG. 41a illustrates a scanned pattern which is offset from a corresponding master pattern. FIG. 41b illustrates the same patterns after the scanned pattern is shifted relative to the master pattern, thereby increasing the correlation between the two patterns. Alternatively, instead of shifting either scanned patterns or master patterns, master patterns may be stored in memory corresponding to different offset amounts.

Figure 42:
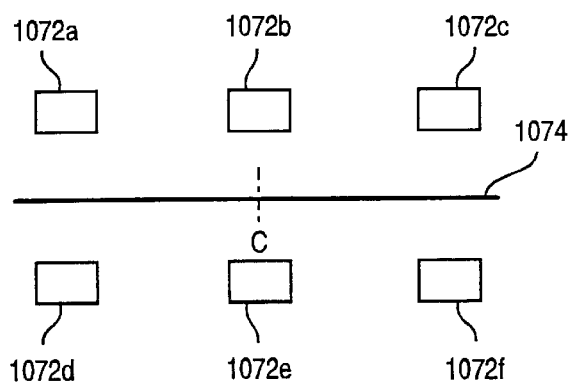
FIG. 42 is a side elevation of a multiple scanhead arrangement according to a preferred embodiment of the present invention.

Thirdly, while it has been determined that the scanning of the central area on the green side of a U.S. bill (see segment S of FIG. 4) provides sufficiently distinct patterns to enable discrimination among the plurality of U.S. denominations, the central area may not be suitable for bills originating in other countries. For example, for bills originating from Country 1, it may be determined that segment S1 (FIG. 40) provides a more preferable area to be scanned, while segment S2 (FIG. 40) is more preferable for bills originating from Country 2. Alternatively, in order to sufficiently discriminate among a given set of bills, it may be necessary to scan bills which are potentially from such set along more than one segment, e.g., scanning a single bill along both S1 and S2. To accommodate scanning in areas other than the central portion of a bill, multiple scanheads may be positioned next to each other. A preferred embodiment of such a multiple scanhead system is depicted in FIG. 42. Multiple scanheads 1072a–c and 1072d–f are positioned next to each other along a direction lateral to the direction of bill movement. Such a system permits a bill 1074 to be scanned along different segments. Multiple scanheads 1072a–f are arranged on each side of the transport path, thus permitting both sides of a bill 1074 to be scanned.

Two-sided scanning may be used to permit bills to be fed into a currency discrimination system according to the present invention with either side face up. An example of a two-sided scanhead arrangement is described above in connection with FIGS. 2a, 6c, and 6d. Master patterns generated by scanning genuine bills may be stored for segments on one or both sides. In the case where master patterns are stored from the scanning of only one side of a genuine bill, the patterns retrieved by scanning both sides of a bill under test may be compared to a master set of single-sided master patterns. In such a case, a pattern retrieved from one side of a bill under test should match one of the stored master patterns, while a pattern retrieved from the other side of the bill under test should not match one of the master patterns. Alternatively, master patterns may be stored for both sides of genuine bills. In such a two-sided system, a pattern retrieved by scanning one side of a bill under test should match with one of the master patterns of one side (Match 1) and a pattern retrieved from scanning the opposite side of a bill under test should match the master pattern associated with the opposite side of a genuine bill identified by Match 1.

Alternatively, in situations where the face orientation of a bill (i.e., whether a bill is "face up" or "face down") may be determined prior to or during characteristic pattern scanning, the number of comparisons may be reduced by limiting comparisons to patterns corresponding to the same side of a bill. That is, for example, when it is known that a bill is "face up", scanned patterns associated with scanheads above the transport path need only be compared to master patterns generated by scanning the "face" of genuine bills. By "face" of a bill it is meant a side which is designated as the front surface of the bill. For example, the front or "face" of a U.S. bill may be designated as the "black" surface while the back of a U.S. bill may be designated as the "green" surface. The face orientation may be determinable in some situations by sensing the color of the surfaces of a bill. An alternative method of determining the face orientation of U.S. bills by detecting the borderline on each side of a bill is described above in connection with FIGS. 6c, 6d, and 12. The implementation of color sensing is discussed in more detailed below.

According to the embodiment of FIG. 42, the bill transport mechanism operates in such a fashion that the central area C of a bill 1074 is transported between central scanheads 1072b and 1072e. Scanheads 1072a and 1072c and likewise scanheads 1072d and 1072f are displaced the same distance from central scanheads 1072b and 1072e, respectively. By symmetrically arranging the scanheads about the central region of a bill, a bill may be scanned in either direction, e.g., top edge first (forward direction) or bottom edge first (reverse direction). As described above with respect to FIGS. 1–7b, master patterns are stored from the scanning of genuine bills in both the forward and reverse directions. While a symmetrical arrangement is preferred, it is not essential provided appropriate master patterns are stored for a non-symmetrical system.

Figure 43:
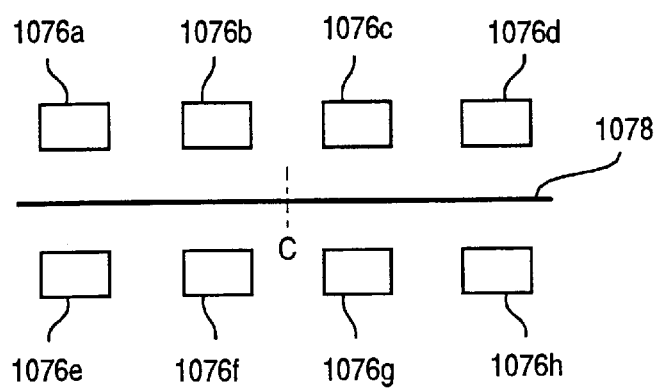
FIG. 43 is a side elevation of a multiple scanhead arrangement according to another preferred embodiment of the present invention.

While FIG. 42 illustrates a system having three scanheads per side, any number of scanheads per side may be utilized. Likewise, it is not necessary that there be a scanhead positioned over the central region of a bill. For example, FIG. 43 illustrates another preferred embodiment of the present invention capable of scanning the segments $S_1$ and $S_2$ of FIG. 40. Scanheads 1076a, 1076d, 1076e, and 1076h scan a bill 1078 along segment $S_1$ while scanheads 1076b, 1076c, 1076f, and 1076g scan segment $S_2$.

Figure 44:
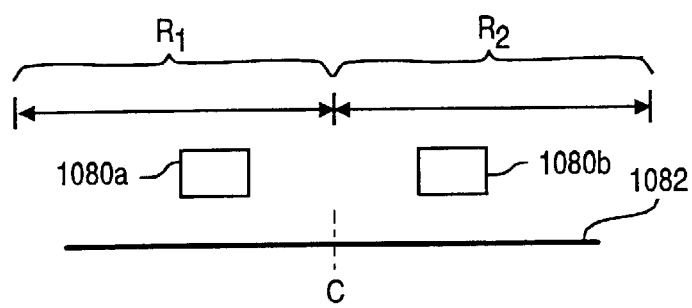
FIG. 44 is a side elevation of a multiple scanhead arrangement according to another preferred embodiment of the present invention.

FIG. 44 depicts another preferred embodiment of a scanning system according to the present invention having laterally moveable scanheads 1080a–b. Similar scanheads may be positioned on the opposite side of the transport path. Moveable scanheads 1080a–b may provide more flexibility that may be desirable in certain scanning situations. Upon the determination of the dimensions of a bill as described in connection with FIG. 39, a preliminary determination of the identity of a bill may be made. Based on this preliminary determination, the moveable scanheads 1080a–b may be positioned over the area of the bill which is most appropriate for retrieving discrimination information. For example, if based on the size of a scanned bill, it is preliminarily determined that the bill is a Japanese 5000 Yen bill-type, and if it has been determined that a suitable characteristic pattern for a 5000 Yen bill-type is obtained by scanning a segment 2.0 cm to the left of center of the bill fed in the forward direction, scanheads 1080a and 1080b may be appropriately positioned for scanning such a segment, e.g., scanhead 1080a positioned 2.0 cm left of center and scanhead 1080b positioned 2.0 cm right of center. Such positioning permits proper discrimination regardless of the whether the scanned bill is being fed in the forward or reverse direction. Likewise scanheads on the opposite side of the transport path (not shown) could be appropriately positioned. Alternatively, a single moveable scanhead may be used on one or both sides of the transport path. In such a system, size and color information (to be described in more detail below) may be used to properly position a single laterally moveable scanhead, especially where the orientation of a bill may be determined before scanning.

FIG. 44 depicts a system in which the transport mechanism is designed to deliver a bill 1082 to be scanned centered within the area in which scanheads 1080a–b are located. Accordingly, scanheads 1080a–b are designed to move relative to the center of the transport path with scanhead 1080a being moveable within the range $R_1$ and scanhead 1080b being moveable within range $R_2$.

Figure 45:
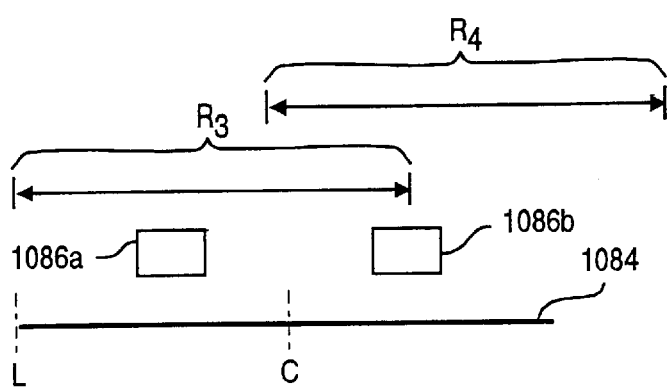
FIG. 45 is a side elevation of a multiple scanhead arrangement according to another preferred embodiment of the present invention.

FIG. 45 depicts another preferred embodiment of a scanning system according to the present invention wherein bills to be scanned are transported in a left justified manner along the transport path, that is wherein the left edge L of a bill 1084 is positioned in the same lateral location relative to the transport path. Based on the dimensions of the bill, the position of the center of the bill may be determined and the scanheads 1086a–b may in turn be positioned accordingly. As depicted in FIG. 45, scanhead 1086a has a range of motion $R_3$ and scanhead 1086b has a range of motion $R_4$. The ranges of motion of scanheads 1086a–b may be influenced by the range of dimensions of bills which the discrimination system is designed to accommodate. Similar scanheads may be positioned on the opposite side of the transport path.

Alternatively, the transport mechanism may be designed such that scanned bills are not necessarily centered or justified along the lateral dimension of the transport path. Rather the design of the transport mechanism may permit the position of bills to vary left and right within the lateral dimension of the transport path. In such a case, the edge sensors 1066 of FIG. 39 may be used to locate the edges and center of a bill, and thus provide positional information in a moveable scanhead system and selection criteria in a stationary scanhead system.

Figure 46:
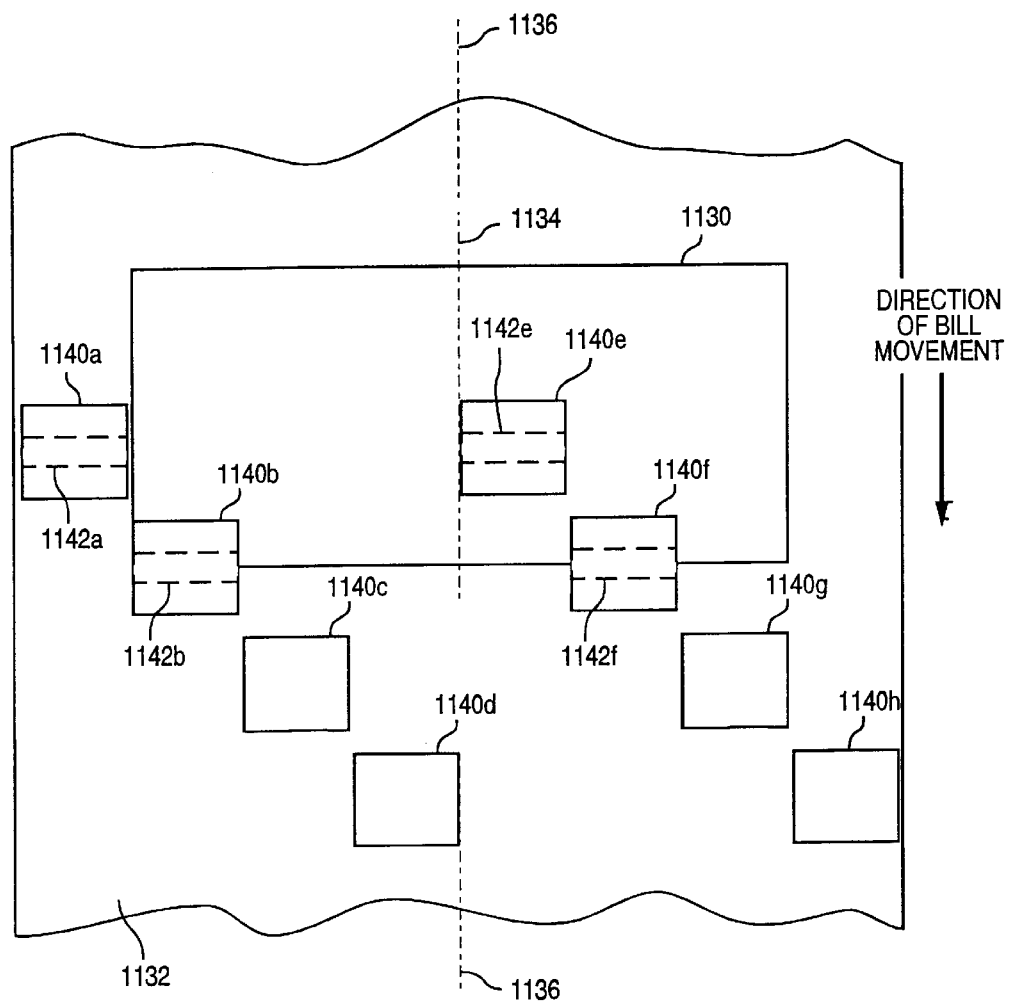
FIG. 46 is a top view of a staggered scanhead arrangement according to a preferred embodiment of the present invention.

In addition to the stationary scanhead and moveable scanhead systems described above, a hybrid system having both stationary and moveable scanheads may be used. Likewise, it should be noted that the laterally displaced scanheads described above need not lie along the same lateral axis. That is, the scanheads may be, for example, staggered upstream and downstream from each other. FIG. 46 is a top view of a staggered scanhead arrangement according to a preferred embodiment of the present invention. As illustrated in FIG. 46, a bill 1130 is transported in a centered manner along the transport path 1132 so that the center 1134 of the bill 1130 is aligned with the center 1136 of the transport path 1132. Scanheads 1140a–h are arranged in a staggered manner so as to permit scanning of the entire width of the transport path 1132. The areas illuminated by each scanhead are illustrated by strips 1142a, 1142b, 1142e, and 1142f for scanheads 1140a, 1140b, 1140e, and 1140f, respectively. Based on size determination sensors, scanheads 1140a and 1140h may either not be activated or their output ignored.

In general, if prior to scanning a document, preliminary information about a document can be obtained, such as its size or color, appropriately positioned stationary scanheads may be activated or laterally moveable scanheads may be appropriately positioned provided the preliminary information provides some indication as to the potential identity of the document. Alternatively, especially in systems having scanheads positioned over a significant portion of the transport path, many or all of the scanheads of a system may be activated to scan a document. Then subsequently, after some preliminary determination as to a document's identity has been made, only the output or derivations thereof of appropriately located scanheads may be used to generate scanned patterns. Derivations of output signals include, for example, data samples stored in memory generated by sampling output signals. Under such an alternative embodiment, information enabling a preliminary determination as to a document's identity may be obtained by analyzing information either from sensors separate from the scanheads or from one or more of the scanheads themselves. An advantage of such preliminary determinations is that the number of scanned patterns which have to be generated or compared to a set of master patterns is reduced. Likewise the number of master patterns to which scanned patterns must be compared may also be reduced.

While the scanheads 1140a–h of FIG. 46 are arranged in a non-overlapping manner, they may alternatively be arranged in an overlapping manner. By providing additional lateral positions, an overlapping scanhead arrangement may provide greater selectivity in the segments to be scanned. This increase in scanable segments may be beneficial in compensating for currency manufacturing tolerances which result in positional variances of the printed indicia on bills relative to their edges. Additionally, in a preferred embodiment, scanheads positioned above the transport path are positioned upstream relative to their corresponding scanheads positioned below the transport path.

Figure 47A:
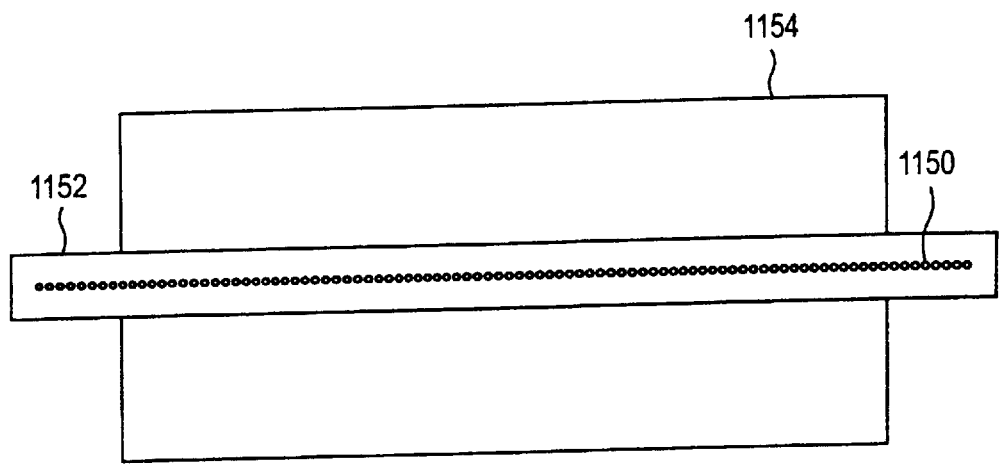
FIG. 47a is a top view of a linear array scanhead according to a preferred embodiment of the present invention illustrating a bill being fed in a centered fashion.
Figure 47B:
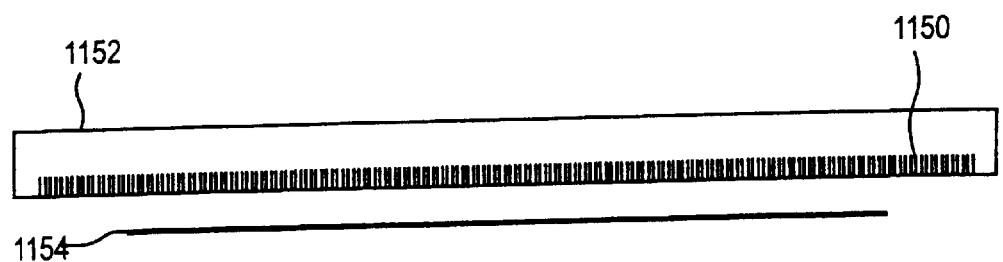
FIG. 47b is a side view of a linear array scanhead according to a preferred embodiment of the present invention illustrating a bill being fed in a centered fashion.

FIGS. 47a and 47b illustrate another embodiment wherein a plurality of analog sensors 1150 such as photodetectors are laterally displaced from each other and are arranged in a linear array within a single scanhead 1152. FIG. 47a is a top view while FIG. 47b is a side elevation view of such a linear array embodiment. The output of individual sensors 1150 are connected to photodetectors (not shown) through the use of graded index fibers, such as a "lens array" manufactured by MSG America, Inc., part number SLA20A1675702A3, and subsequently to analog-to-digital converters and a CPU (not shown) in a manner similar to that depicted in FIGS. 1 and 6a. As depicted in FIGS. 47a and 47b, a bill 1154 is transported past the linear array scanhead 1152 in a centered fashion. A preferred length for the linear array scanhead is about 6–7 inches (15 cm–17 cm).

In a manner similar to that described above, based on the determination of the size of a bill, appropriate sensors may be activated and their output used to generate scanned patterns. Alternatively many or all of the sensors may be activated with only the output or derivations thereof of appropriately located sensors being used to generate scanned patterns. Derivations of output signals include, for example, data samples stored in memory generated by sampling output signals. As a result, a discriminating system incorporating a linear array scanhead according the present invention would be capable of accommodating a wide variety of bill-types. Additionally, a linear array scanhead provides a great deal of flexibility in how information may be read and processed with respect to various bills. In addition to the ability to generate scanned patterns along segments in a direction parallel to the direction of bill movement, by appropriately processing scanned samples, scanned patterns may be "generated" or approximated in a direction perpendicular to the direction of bill movement. For example, if the linear array scanhead 1152 comprises one hundred and sixty (160) sensors 1150 over a length of 7 inches (17.78 cm) instead of taking samples for 64 encoder pulses from say 30 sensors, samples may be taken for 5 encoder pulses from all 160 cells (or all those positioned over the bill 1154). Alternatively, 160 scanned patterns (or selected ones thereof) of 5 data samples each may be used for pattern comparisons. Accordingly, it can be seen that the data acquisition time is significantly reduced from 64 encoder pulses to only 5 encoder pulses. The time saved in acquiring data can be used to permit more time to be spent processing data and/or to reduce the total scanning time per bill thus enabling increased throughput of the identification system. Additionally, the linear array scanhead permits a great deal of flexibility in tailoring the areas to be scanned. For example, it has been found that the leading edges of Canadian bills contain valuable graphic information. Accordingly, when it is determined that a test bill may be a Canadian bill (or when the identification system is set to a Canadian currency setting), the scanning area can be limited to the leading edge area of bills, for example, by activating many laterally displaced sensors for a relatively small number of encoder pulses.

Figure 48:
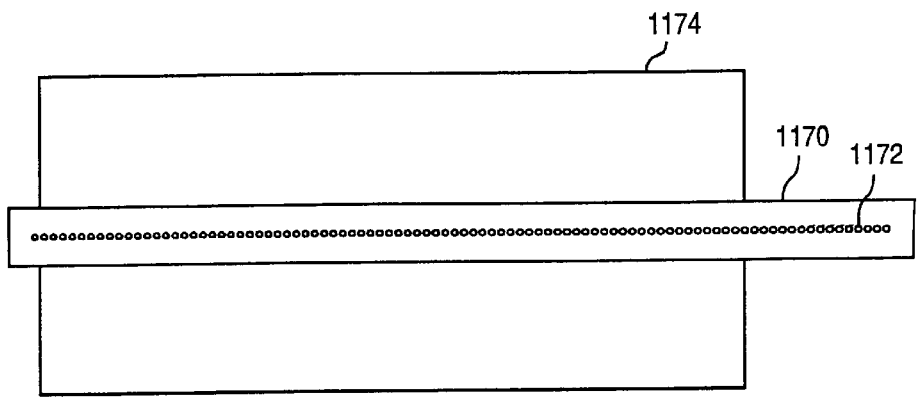
FIG. 48 is a top view of a linear array scanhead according to another preferred embodiment of the present invention illustrating a bill being fed in a non-centered fashion.

FIG. 48 is a top view of another preferred embodiment of a linear array scanhead 1170 having a plurality of analog sensors 1172 such as photodetectors wherein a bill 1174 is transported past the scanhead 1170 in a non-centered manner. As discussed above, positional information from size-determining sensors may be used to select appropriate sensors. Alternatively, the linear array scanhead itself may be employed to determine the size of a bill, thus eliminating the need for separate size-determining sensors. For example, all sensors may be activated, data samples derived from sensors located on the ends of the linear array scanhead may be preliminarily processed to determine the lateral position and the length of a bill. The width of a bill may be determined either by employing separate leading/trailing edge sensors or pre-processing data samples derived from initial and ending cycle encoder pulses. Once size information is obtained about a bill under test, only the data samples retrieved from appropriate areas of a bill need be further processed.

Figure 49:
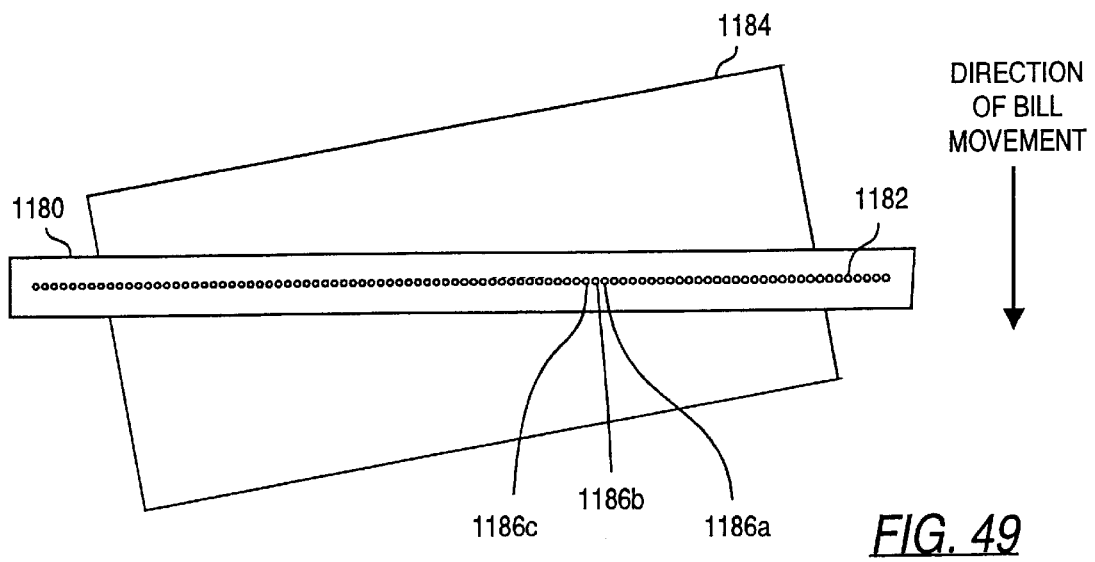
FIG. 49 is a top view of a linear array scanhead according to another preferred embodiment of the present invention illustrating a bill being fed in a skewed fashion.

FIG. 49 is a top view of another embodiment of a linear scanhead 1180 having the ability to compensate for skewing of bills. Scanhead 1180 has a plurality of analog sensors 1182 and a bill 1184 is transported past scanhead 1180 in a skewed manner. Once the skew of a bill has been determined, for example through the use of leading edge sensors, readings from sensors 1182 along the scanhead 1180 may be appropriately delayed. For example, suppose it is determined that a bill is being fed past scanhead 1180 so that the left front corner of the bill reaches the scanhead five encoder pulses before the right front corner of the bill. In such a case, sensor readings along the right edge of the bill can be delayed for 5 encoder pulses to compensate for the skew. Where scanned patterns are to be generated over only a few encoder pulses, the bill may be treated as being fed in a non-skewed manner since the amount of lateral deviation between a scan along a skewed angle and a scan along a non-skewed angle is minimal for a scan of only a few encoder pulses. However, where it is desired to obtain a scan over a large number of encoder pulses, a single scanned pattern may be generated from the outputs of more than one sensor. For example, a scanned pattern may be generated by taking data samples from sensor 1186a for a given number of encoder pulses, then taking data samples from sensor 1186b for a next given number of encoder pulses, and then taking data samples from sensor 1186c for a next given number of encoder pulses. The number of given encoder pulses for which data samples may be taken from the same sensor is influenced by the degree of skew: the greater the degree of skew of the bill, the fewer the number of data samples which may be obtained before switching to the next sensor. Alternatively, master patterns may be generated and stored for various degrees of skew, thus permitting a single sensor to generate a scanned pattern from a bill under test.

With regard to FIGS. 47–49, while only a single linear array scanhead is shown, another linear array scanhead may be positioned on the opposite side of the transport path to permit scanning of either or both sides of a bill. Likewise, the benefits of using a linear array scanhead may also be obtainable using a multiple scanhead arrangement which is configured appropriately, such as depicted in FIG. 46 or a linear arrangement of multiple scanheads.

In addition to size and scanned characteristic patterns, color may also be used to discriminate bills. For example, while all U.S. bills are printed in the same colors, e.g., a green side and a black side, bills from other countries often vary in color with the denomination of the bill. For example, a German 50 deutsche mark bill is brown in color while a German 100 deutsche mark bill is blue in color. Alternatively, color detection may be used to determine the face orientation of a bill, such as where the color of each side of a bill vanes. For example, color detection may be used to determine the face orientation of U.S. bills by detecting whether or not the "green" side of a U.S. bill is facing upwards. Separate color sensors may be added upstream of the scanheads described above. According to such an embodiment, color information may be used in addition to size information to preliminarily identify a bill. Likewise, color information may be used to determine the face orientation of a bill, which determination may be used to select upper or lower scanheads for scanning a bill, or to compare scanned patterns retrieved from upper scanheads with a set of master patterns generated by scanning a corresponding face while the scanned patterns retrieved from the lower scanheads are compared with a set of master patterns generated by scanning an opposing face. Alternatively, color sensing may be incorporated into the scanheads described above. Such color se may be achieved by, for example, incorporating color filters, colored light sources, and/or dichroic beamsplitters into the currency discrimination system of the present invention. Color information acquisition is described in more detail in co-pending U.S. application Ser. No. 08/219,093 filed Mar. 29, 1994, for a "Currency Discriminator and Authenticator", now abandoned, incorporated herein by reference. Various color information acquisition techniques are described in U.S. Pat. Nos. 4,841,358; 4,658,289; 4,716,456; 4,825,246; and 4,992,860.

Figure 50A:
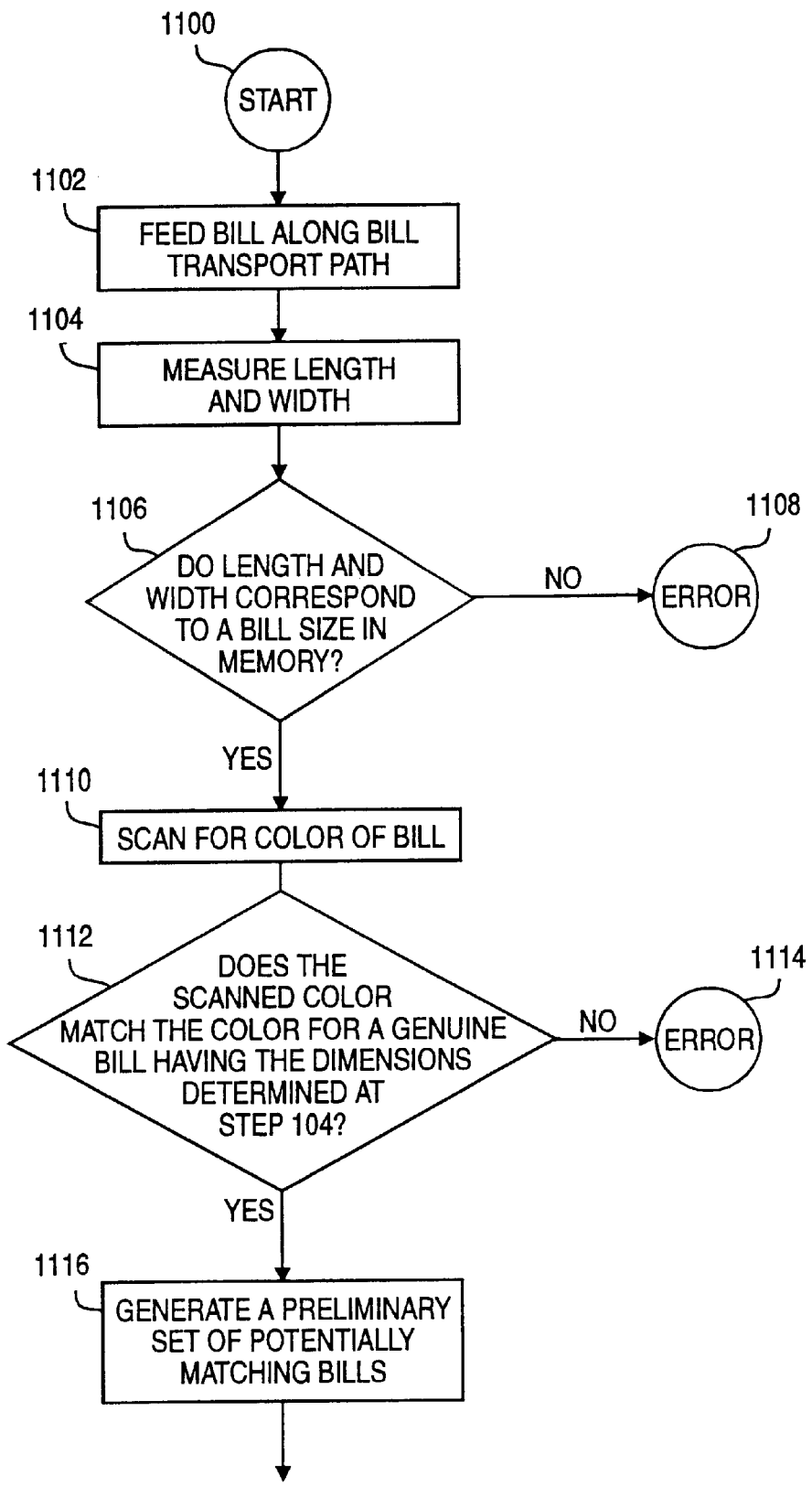
FIGS. 50a and 50b are a flowchart of the operation of a currency discrimination system according to a preferred embodiment of the present invention.
Figure 50B:
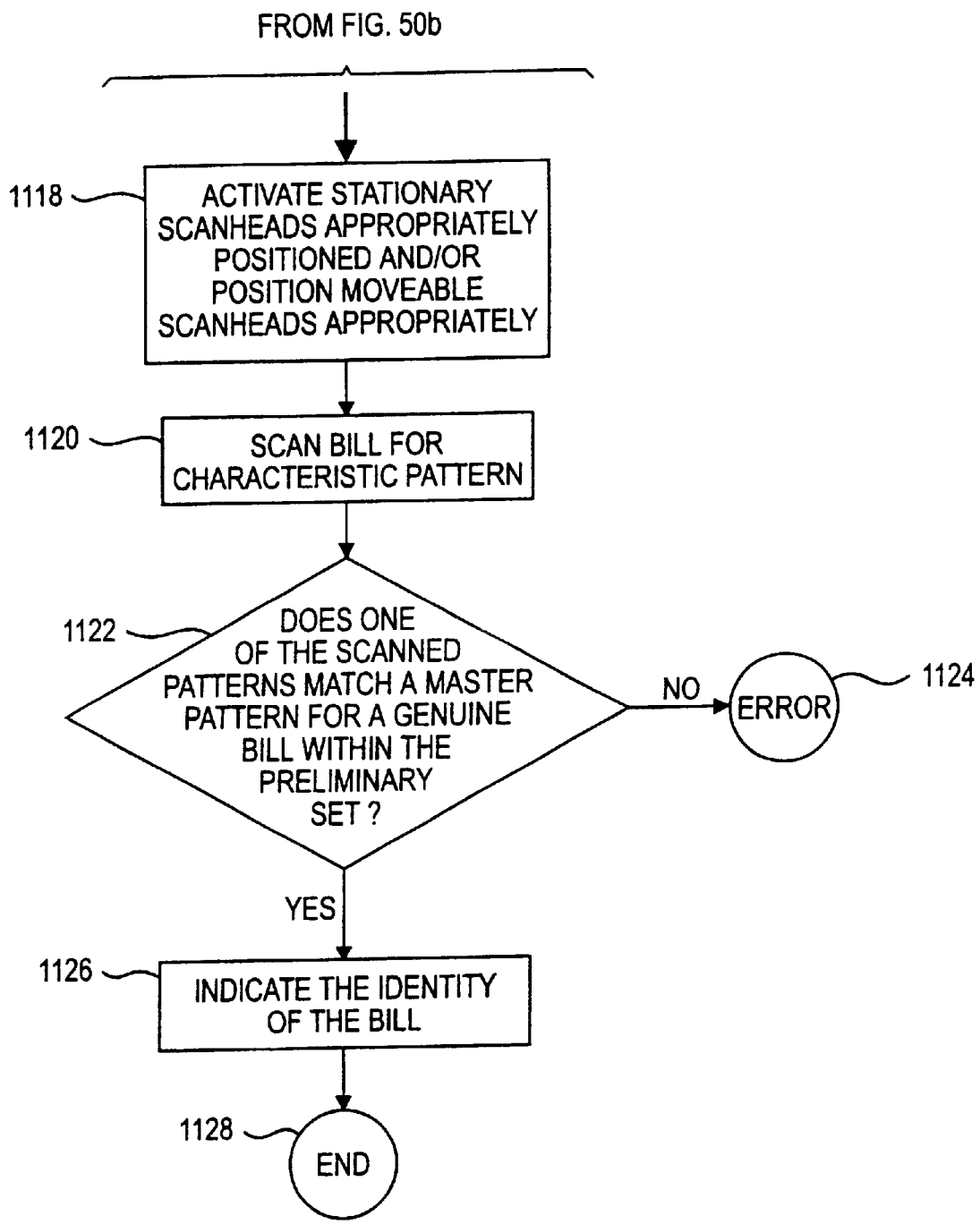

The operation of a currency discriminator according to one preferred embodiment may be further understood by referring to the flowchart of FIGS. 50a and 50b. In the process beginning at step 1100, a bill is fed along a transport path (step 1102) past sensors which measure the length and width of the bill (step 1104). These size determining sensors may be, for example, those illustrated in FIG. 39. Next at step 1106, it is determined whether the measured dimensions of the bill match the dimensions of at least one bill stored in memory, such as EPROM 60 of FIG. 7a. If no match is found, an appropriate error is generated at step 1108. If a match is found, the color of the bill is scanned at step 1110. At step 1112, it is determined whether the color of the bill matches a color associated with a genuine bill having the dimensions measured at step 1104. An error is generated at step 1114 if no such match is found. However, if a match is found, a preliminary set of potentially matching bills is generated at step 1116. Often, only one possible identity will exist for a bill having a given color and dimensions. However, the preliminary set of step 1116 is not limited to the identification of a single bill-type, that is, a specific denomination of a specific currency system; but rather, the preliminary set may comprise a number of potential bill-types. For example, all U.S. bills have the same size and color. Therefore, the preliminary set generated by scanning a U.S. $5 bill would include U.S. bills of all denominations.

Based on the preliminary set (step 1116), selected scanheads in a stationary scanhead system may be activated (step 1118). For example, if the preliminary identification indicates that a bill being scanned has the color and dimensions of a German 100 deutsche mark bill, the scanheads over regions associated with the scanning of an appropriate segment for a German 100 deutsche mark bill may be activated. Then upon detection of the leading edge of the bill by sensors 1068 of FIG. 40, the appropriate segment may be scanned. Alternatively, all scanheads may be active with only the scanning information from selected scanheads being processed. Alternatively, based on the preliminary identification of a bill (step 1116), moveable scanheads may be appropriately positioned (step 1118).

Subsequently, the bill is scanned for a characteristic pattern (step 1120). At step 1122, the scanned patterns produced by the scanheads are compared with the stored master patterns associated with genuine bills as dictated by the preliminary set. By only making comparisons with master patterns of bills within the preliminary set, processing time may be reduced. Thus for example, if the preliminary set indicated that the scanned bill could only possibly be a German 100 deutsche mark bill, then only the master pattern or patterns associated with a German 100 deutsche mark bill need be compared to the scanned patterns. If no match is found, an appropriate error is generated (step 1124). If a scanned pattern does match an appropriate master pattern, the identity of the bill is accordingly indicated (step 1126) and the process is ended (step 1128).

While some of the embodiments discussed above entail a system capable of identifying a plurality of bill-types, the system may be adapted to identify a bill under test as either belonging to a specific bill-type or not. For example, the system may be adapted to store master information associated with only a single bill-type such as a United Kingdom 5 pound bill. Such a system would identify bills under test which were United Kingdom 5 pound bills and would reject all other bill-types.

The scanheads described above may be incorporated into a currency identification system capable of identifying a variety of currencies. For example, the system may be designed to accommodate a number of currencies from different countries. Such a system may be designed to permit operation in a number of modes. For example, the system may be designed to permit an operator to select one or more of a plurality of bill-types which the system is designed to accommodate. Such a selection may be used to limit the number of master patterns with which scanned patterns are to be compared. Likewise, the operator may be permitted to select the manner in which bills will be fed, such as all bills face up, all bills top edge first, random face orientation, and/or random top edge orientation. Additionally, the system may be designed to permit output information to be displayed in a variety of formats to a variety of output devices, such as a monitor, LCD display, or printer. For example, the system may be designed to count the number of each specific bill-type identified and to tabulate the total amount of currency counted for each of a plurality of currency systems. For example, a stack of bills could be placed in the bill accepting station 12 of FIGS. 2a–2b, and the output unit 36 of FIGS. 2a–2b may indicate that a total of 370 British pounds and 650 German marks were counted. Alternatively, the output from scanning the same batch of bills may provide more detailed information about the specific denominations counted, for example, one 100 pound bill, five 50 pound bills, and one 20 pound bill and thirteen 50 deutsche mark bills.

In a currency identification system capable of identifying a variety of bills from a number of countries, a manual selection device, such as a switch or a scrolling selection display, may be provided so that the customer may designate what type of currency is to be discriminated. For example, in a system designed to accommodate both Canadian and German currency, the customer could turn a dial to the Canadian bill setting or scroll through a displayed menu and designate Canadian bills. By pre-declaring what type of currency is to be discriminated, scanned patterns need only be compared to master patterns corresponding to the indicated type of currency, e.g., Canadian bills. By reducing the number of master patterns which have to be compared to scanned patterns, the processing time can be reduced.

Alternatively, a system may be designed to compare scanned patterns to all stored master patterns. In such a system, the customer need not pre-declare what type of currency is to be scanned. This reduces the demands on the customer. Furthermore, such a system would permit the inputting of a mixture of bills from a number of countries. The system would scan each bill and automatically determine the issuing country and the denomination.

In addition to the manual and automatic bill-type discriminating systems, an alternate system employs a semi-automatic bill-type discriminating method. Such a system operates in a manner similar to the stranger mode described above. In such a system, a stack of bills is placed in the input hopper. The first bill is scanned and the generated scanned pattern is compared with the master patterns associated with bills from a number of different countries. The discriminator identifies the country-type and the denomination of the bill. Then the discriminator compares all subsequent bills in the stack to the master patterns associated with bills only from the same country as the first bill. For example, if a stack of U.S. bills were placed in the input hopper and the first bill was a $5 bill, the first bill would be scanned. The scanned pattern would be compared to master patterns associated with bills from a number of countries, e.g., U.S., Canadian, and German bills. Upon determining that the first bill is a U.S. $5 bill, scanned patterns from the remaining bills in the stack are compared only to master patterns associated with U.S. bills, e.g., $1, $2, $5, $10, $20, $50, and $100 bills. When a bill fails to sufficiently match one of the compared patterns, the bill may be flagged as described above such as by stopping the transport mechanism while the flagged bill is returned to the customer.

A currency discriminating device designed to accommodate both Canadian and German currency bills will now be described. According to this embodiment, a currency discriminating device similar to that described above in connection with scanning U.S. currency (see, e.g., FIGS. 1–38 and accompanying description) is modified so as to be able to accept both Canadian and German currency bills. According to a preferred embodiment when Canadian bills are being discriminated, no magnetic sampling or authentication is performed.

Canadian bills have one side with a portrait (the portrait side) and a reverse side with a picture (the picture side). Likewise, German bills also have one side with a portrait (the portrait side) and a reverse side with a picture (the picture side). In a preferred embodiment, the discriminator is designed to accept either stacks of Canadian bills or stacks of German bills, the bills in the stacks being faced so that the picture side of all the bills will be scanned by a triple scanhead arrangement to be described in connection with FIG. 51. In a preferred embodiment, this triple scanhead replaces the single scanhead arrangement housed in the unitary molded plastic support member 280 (see, e.g., FIGS. 25 and 26).

Figure 51:
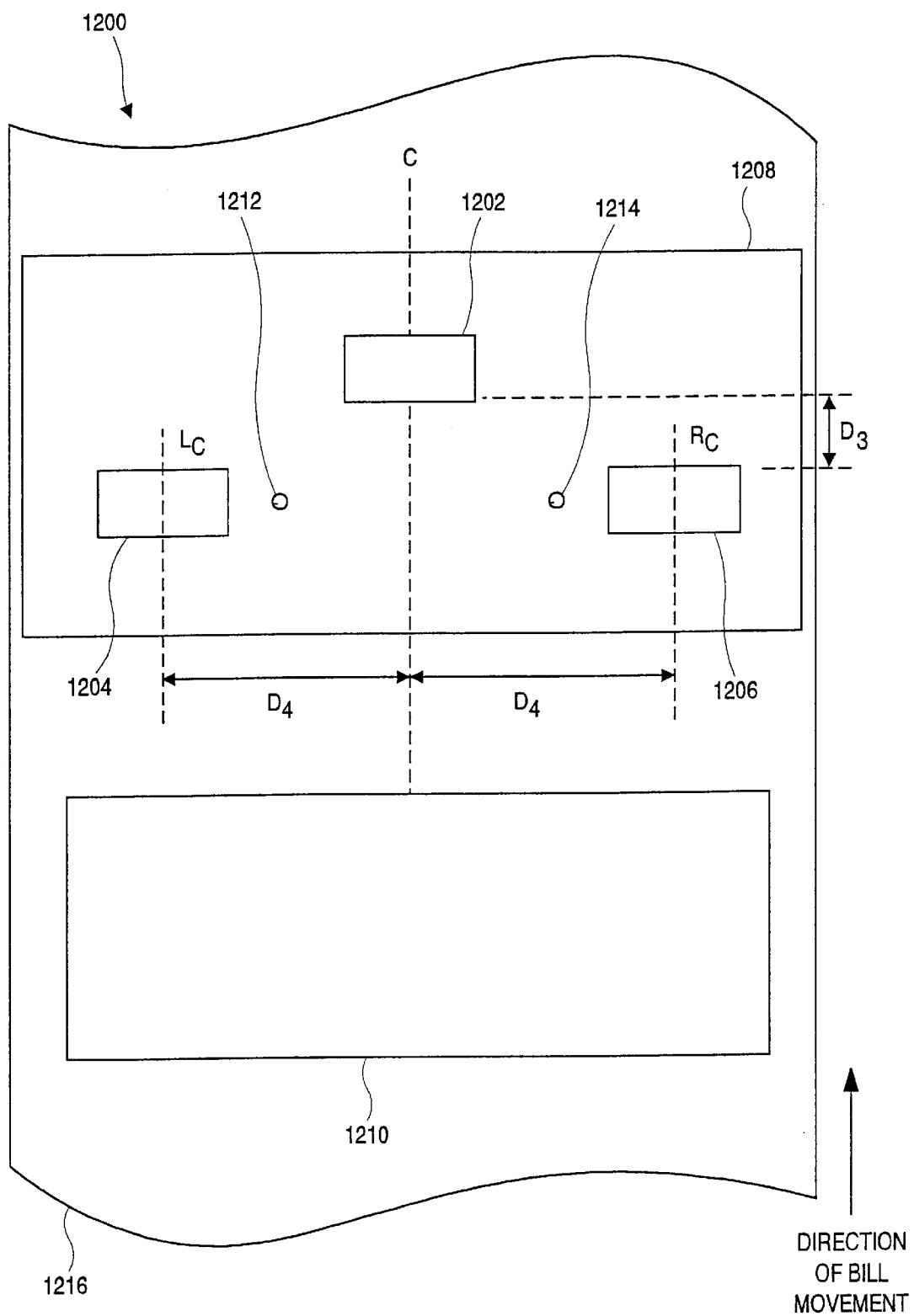
FIG. 51 is a top view of a triple scanhead arrangement utilized in a discriminating device able to discriminate both Canadian and German bills according to a preferred embodiment of the present invention.

FIG. 51 is a top view of a triple scanhead arrangement 1200. The triple scanhead arrangement 1200 comprises a center scanhead 1202, a left scanhead 1204, and a right scanhead 1206 housed in a unitary molded plastic support member 1208. A bill 1210 passes under the arrangement 1200 in the direction shown. O-rings are positioned near each scanhead, preferably two O-rings per scanhead, one on each side of a respective scanhead, to engage the bill continuously while transporting the bill between rolls 223 and 241 (FIG. 20a) and to help hold the bill flat against the guide plate 240 (FIG. 20a). The left 1204 and right 1206 scanhead are placed slightly upstream of the center scanhead 1202 by a distance $D_3$. In a preferred embodiment, $D_3$ is 0.083 inches (0.21 cm). The center scanhead 1202 is centered over the center C of the transport path 1216. The center $L_C$ of the left scanhead 1204 and the center $R_C$ of the right scanhead 1206 are displaced laterally from center C of the transport path in a symmetrical fashion by a distance $D_4$. In a preferred embodiment, $D_4$ is 1.625 inches (4.128 cm).

The scanheads 1202, 1204, and 1206 are each similar to the scanheads described above connection with FIGS. 1–38, except only a wide slit having a length of about 0.500 inch and a width of about 0.050 inch is utilized. The wide slit of each scanhead is used both to detect the leading edge of a bill and to scan a bill after the leading edge has been detected.

Two photosensors 1212 and 1214 are located along the lateral axis of the left and right scanheads 1204 and 1206, one on either side of the center scanhead 1202. Photosensors 1212 and 1214 are same as the photosensors PS1 and PS2 described above (see, e.g., FIGS. 26 and 30). Photosensors 1212 and 1214 are used to detect doubles and also to measure the dimensions of bills in the direction of bill movement which in the preferred embodiment depicted in FIG. 51 is the narrow dimension of bills. Photosensors 1212 and 1214 are used to measure the narrow dimension of a bill by indicating when the leading and trailing edges of a bill passes by the photosensors 1212 and 1214. This information in combination with the encoder information permits the narrow dimension of a bill to be measured.

All Canadian bills are 6 inches (15.24 cm) in their long dimension and 2.75 inches (6.985 cm) in their narrow dimension. German bills vary in size according to denomination. In a preferred embodiment of the currency discriminating system, the discriminating device is designed to accept and discriminate $2, $5, $10, $20, $50, and $100 Canadian bills and 10 DM, 20 DM, 50 DM, and 100 DM German bills. These German bills vary in size from 13.0 cm (5.12 inches) in the long dimension by 6.0 cm (2.36 inches) in the narrow dimension for 10 DM bills to 16.0 cm (6.30 inches) in the long dimension by 8.0 cm (3.15 inches) in the narrow dimension for 100 DM bills. The input hopper of the discriminating device is made sufficiently wide to accommodate all the above listed Canadian and German bills, e.g., 6.3 inches (16.0 cm) wide.

Figure 52:
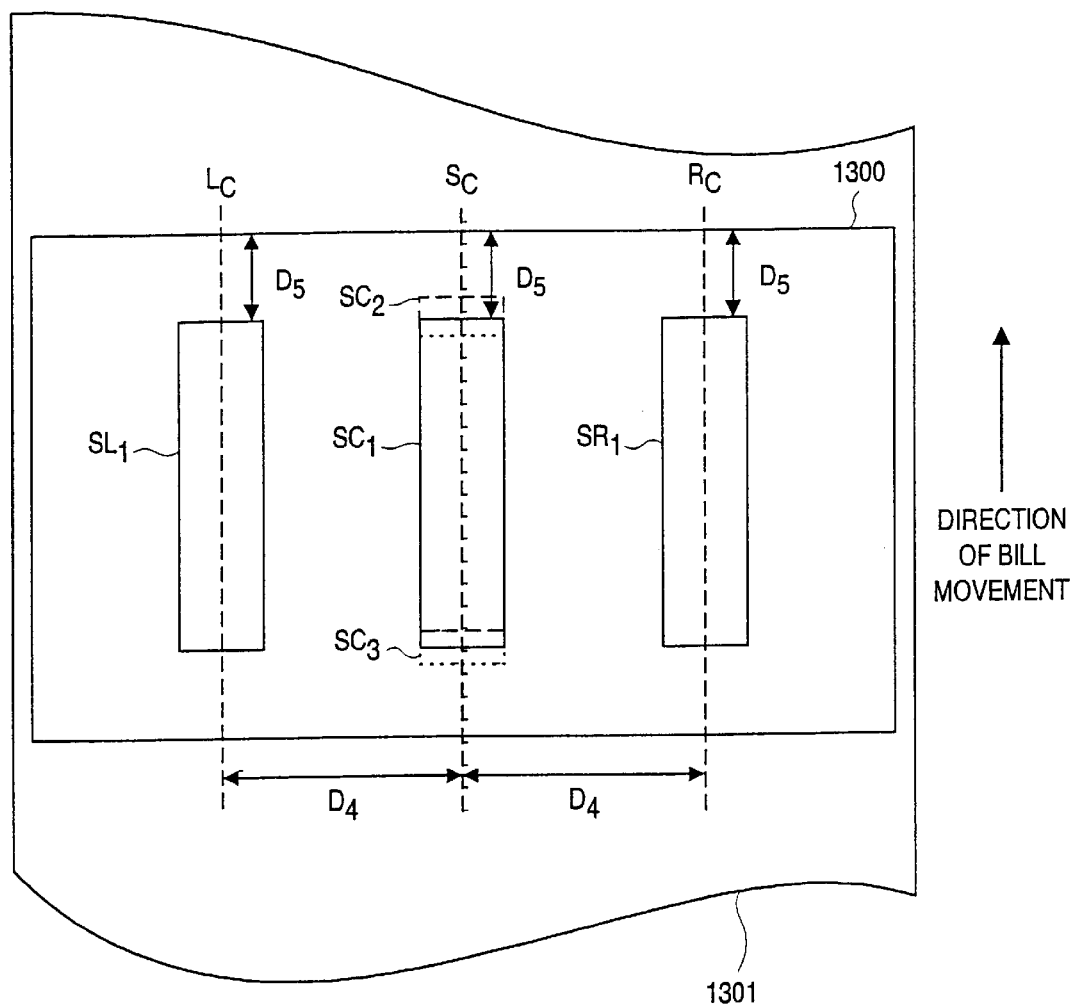
FIG. 52 is a top view of Canadian bill illustrating the areas scanned by the triple scanhead arrangement of FIG. 51 according to a preferred embodiment of the present invention.

FIG. 52 is a top view of a Canadian bill illustrating the areas scanned by the triple scanhead arrangement of FIG. 51. In generating scanned patterns from a Canadian bill 1300 traveling along a transport path 1301, segments $SL_1$, $SC_1$, and $SR_1$ are scanned by the left 1204, center 1202, and right 1206 scanheads, respectively, on the picture side of the bill 1300. These segments are similar to segment S in FIG. 4. Each segment begins a predetermined distance $D_5$ inboard of the leading edge of the bill. In a preferred embodiment $D_5$ is 0.5" (1.27 cm). Segments $SL_1$, $SC_1$, and $SR_1$ each comprise 64 samples as shown in FIGS. 3 and 5. In a preferred embodiment Canadian bills are scanned at a rate of 1000 bills per minute. The lateral location of segments $SL_1$, $SC_1$, and $SR_1$ is fixed relative to the transport path 1301 but may vary left to right relative to bill 1300 since the lateral position of bill 1300 may vary left to right within the transport path 1301.

A set of eighteen master Canadian patterns are stored for each type of Canadian bill that the system is designed to discriminate, three for each scanhead in both the forward and reverse directions. For example, three patterns are generated by scanning a given genuine Canadian bill in the forward direction with the center scanhead. One pattern is generated by scanning down the center of the bill along segment $SC_1$, a second is generated by scanning along a segment $SC_2$ initiated 1.5 samples before the beginning of $SC_1$, and a third is generated by scanning along a segment $SC_3$ initiated 1.5 samples after the beginning of $SC_1$. The second and third patterns are generated to compensate for the problems associated with triggering off the edge of a bill as discussed above.

To compensate for possible lateral displacement of bills to be scanned along a direction transverse to the direction of bill movement, the exact lateral location along which each of the above master patterns is generated is chosen after considering the correlation results achieved when a bill is displaced slightly to the left or to the right of the center of each scanhead, i.e., lines $L_C$, $S_C$, and $R_C$. For example, in generating a master pattern associated with segment $SC_1$, a scan of a genuine bill may be taken down the center of a bill, a second scan may be taken along a segment 0.15 inch to the right of center (+0.15 inch), and a third scan may be taken along a segment 0.15 inch to the left of center (−0.15 inch). Based on the correlation result achieved, the actual scan location may be adjusted slightly to the right or left so the effect of the lateral displacement of a bill on the correlation results is minimized. Thus, for example, the master pattern associated with a forward scan of a Canadian $2 bill using the center scanhead 1202 may be taken along a line 0.05 inch to the right of the center of the bill.

Furthermore, the above stored master patterns are generated either by scanning both a relatively new crisp genuine bill and an older yellowed genuine bill and averaging the patterns generated from each or, alternatively, by scanning an average looking bill.

Master patterns are stored for nine types of Canadian bills, namely, the newer series $2, $5, $10, $20, $50, and $100 bills and the older series $20, $50, and $100 bills. Accordingly, a total of 162 Canadian master patterns are stored (9 types×18 per type).

Figure 53:
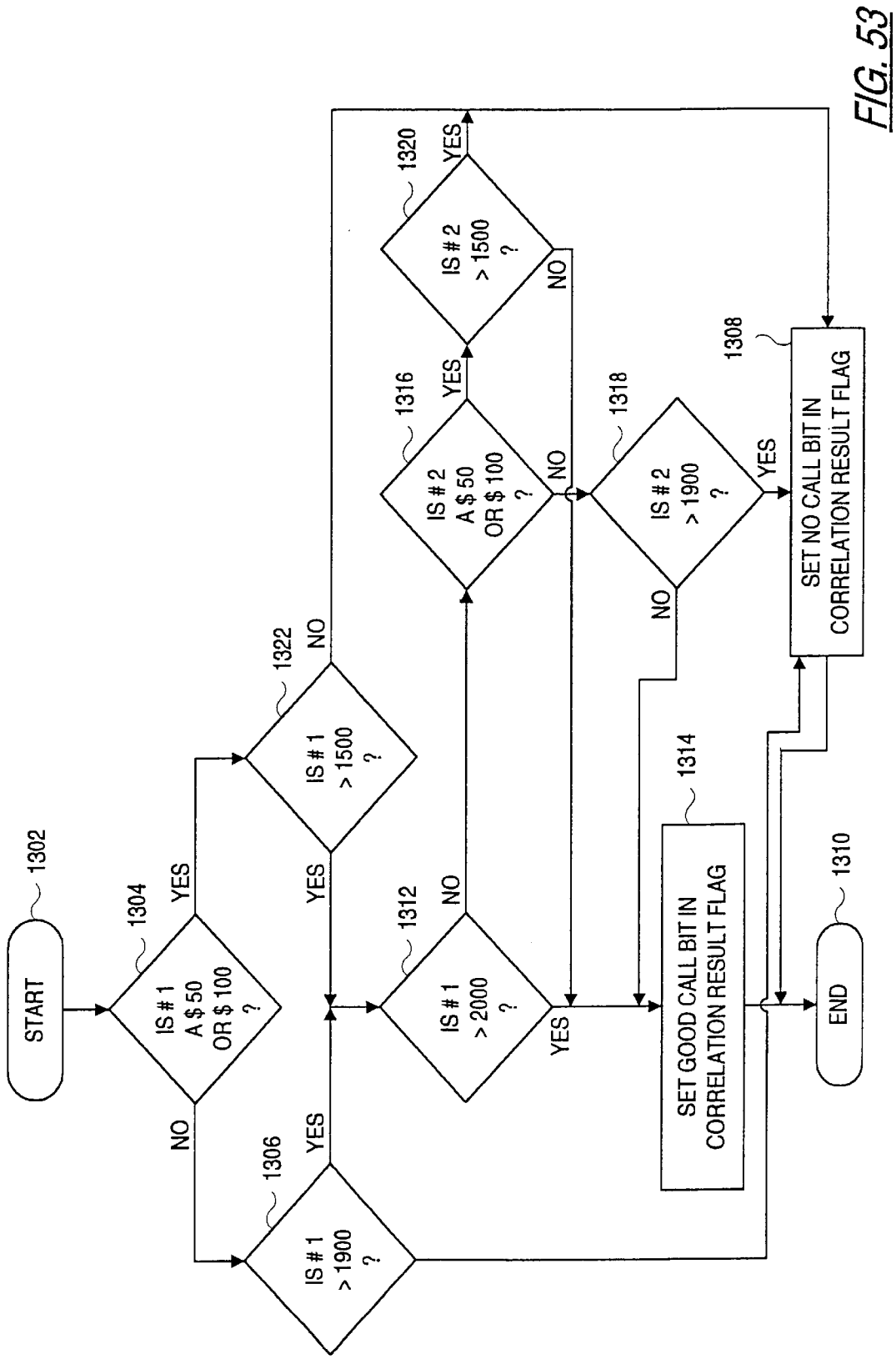
FIG. 53 is a flowchart of the threshold tests utilized in calling the denomination of a Canadian bill according to a preferred embodiment of the present invention.

FIG. 53 is a flowchart of the threshold test utilized in calling the denomination of a Canadian bill. When Canadian bills are being discriminated the flowchart of FIG. 53 replaces the flowchart of FIG. 13. The correlation results associated with correlating a scanned pattern to a master pattern of a given type of Canadian bill in a given scan direction and a given offset in the direction of bill movement from each of the three scanheads are summed. The highest of the resulting 54 summations is designated the #1 correlation and the second highest is preliminarily designated the #2 correlation. The #1 and #2 correlations each have a given bill type associated with them. If the bill type associated with the #2 correlation is merely a different series from, but the same denomination as, the bill type associated with the #1 denomination, the preliminarily designated #2 correlation is substituted with the next highest correlation where the bill denomination is different from the denomination of the bill type associated with the #1 correlation.

The threshold test of FIG. 53 begins at step 1302. Step 1304 checks the denomination associated with the #1 correlation. If the denomination associated with the #1 correlation is not a $50 or $100, the #1 correlation is compared to a threshold of 1900 at step 1306. If the #1 correlation is less than or equal to 1900, the correlation number is too low to identify the denomination of the bill with certainty. Therefore, step 1308 sets a "no call" bit in a correlation result flag and the system returns to the main program at step 1310. If, however, the #1 correlation is greater than 1900 at step 1306, the system advances to step 1312 which determines whether the #1 correlation is greater than 2000. If the #1 correlation is greater than 2000, the correlation number is sufficiently high that the denomination of the scanned bill can be identified with certainty without any further checking. Consequently, a "good call" bit is set in the correlation result flag at step 1314 and the system returns to the main program at step 1310.

If the #1 correlation is not greater than 2000 at step 1312, step 1316 checks the denomination associated with the #2 correlation. If the denomination associated with the #2 correlation is not a $50 or $100, the #2 correlation is compared to a threshold of 1900 at step 1318. If the #2 correlation is less than or equal to 1900, the denomination identified by the #1 correlation is acceptable, and thus the "good call" bit is set in the correlation result flag at step 1314 and the system returns to the main program at step 1310. If, however, the #2 correlation is greater than 1900 at step 1318, the denomination of the scanned bill cannot be identified with certainty because the #1 and #2 correlations are both above 1900 and, yet, are associated with different denominations. Accordingly, the "no call" bit is set in the correlation result flag at step 1308.

If the denomination associated with the #2 correlation is a $50 or $100 at step 1316, the #2 correlation is compared to a threshold of 1500 at step 1320. If the #2 correlation is less than or equal to 1500, the denomination identified by the #1 correlation is acceptable, and thus the "good call" bit is set in the correlation result flag at step 1314 and the system returns to the main program at step 1310. If, however, the #2 correlation is greater than 1500 at step 1320, the denomination of the scanned bill cannot be identified with certainty. As a result, the "no call" bit is set in the correlation result flag at step 1308.

If the denomination associated with the #1 correlation is a $50 or $100 at step 1304, the #1 correlation is compared to a threshold of 1500 at step 1322. If the #1 correlation is less than or equal to 1500, the denomination of the scanned bill cannot be identified with certainty and, therefore, the "no call" bit is set in the correlation result flag at step 1308. If, however, the #1 correlation at step 1322 is greater than 1500, the system advances to step 1312 which determines whether the #1 correlation is greater than 2000. If the #1 correlation is greater than 2000, the correlation number is sufficiently high that the denomination of the scanned bill can be identified with certainty without any further checking. Consequently, a "good call" bit is set in the correlation result flag at step 1314 and the system returns to the main program at step 1310.

If the #1 correlation is not greater than 2000 at step 1312, step 1316 checks the denomination associated with the #2 correlation. If the denomination associated with the #2 correlation is not a $50 or $100, the #2 correlation is compared to a threshold of 1900 at step 1318. If the #2 correlation is less than or equal to 1900, the denomination identified by the #1 correlation is acceptable, and thus the "good call" bit is set in the correlation result flag at step 1314 and the system returns to the main program at step 1310. If, however, the #2 correlation is greater than 1900 at step 1318, the denomination of the scanned bill cannot be identified with certainty. Accordingly, the "no call" bit is set in the correlation result flag at step 1308.

If the denomination associated with the #2 correlation is a $50 or $100 at step 1316, the #2 correlation is compared to a threshold of 1500 at step 1320. If the #2 correlation is less than or equal to 1500, the denomination identified by the #1 correlation is acceptable, and thus the "good call" bit is set in the correlation result flag at step 1314 and the system returns to the main program at step 1310. If, however, the #2 correlation is greater than 1500 at step 1320, the denomination of the scanned bill cannot be identified with certainty. As a result, the "no call" bit is set in the correlation result flag at step 1308 and the system returns to the main program at step 1310.

Now the use of the triple scanhead arrangement 1200 in scanning and discriminating German currency will be described. When scanning German bills, only the output of the center scanhead 1202 is utilized to generate scanned patterns. A segment similar to segment S of FIG. 4 is scanned over the center of the transport path at a predetermined distance $D_6$ inboard after the leading edge of a bill is detected. In a preferred embodiment $D_6$ is 0.25" (0.635 cm). The scanned segment comprises 64 samples as shown in FIGS. 3 and 5. In a preferred embodiment German bills are scanned at a rate of 1000 bills per minute. The lateral location of the scanned segment is fixed relative to the transport path 1216 but may vary left to right relative to bill 1210 since the lateral position of bill 1210 may vary left to right within the transport path 1216.

Figure 54A:
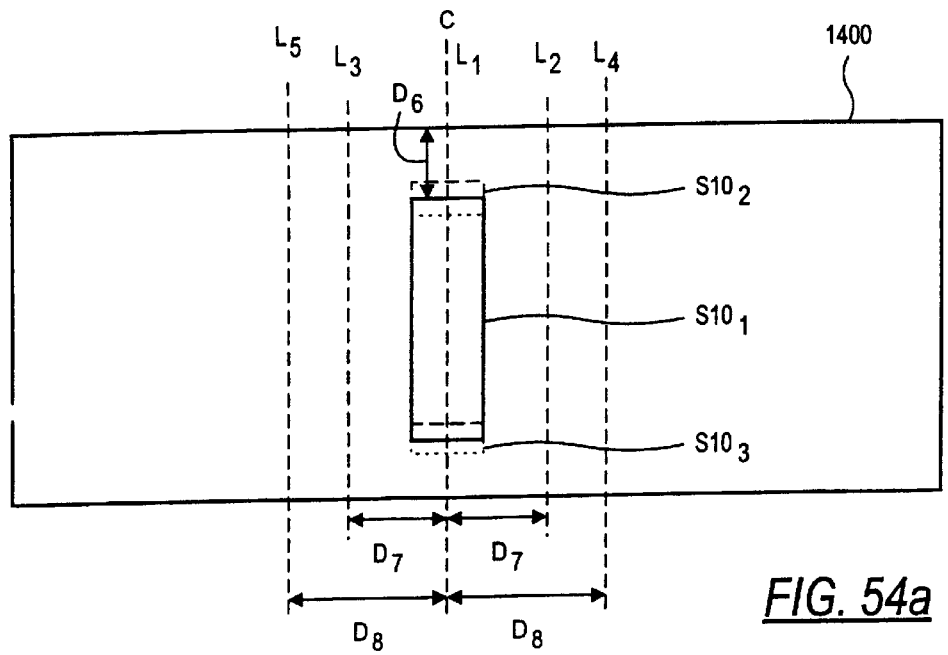
FIG. 54a illustrates the general areas scanned in generating master 10 DM German patterns according to a preferred embodiment of the present invention.

FIG. 54a illustrates the general areas scanned in generating master 10 DM German patterns. Due to the short length of 10 DM bills in their long dimension relative to the width of the transport path, thirty 10 DM master patterns are stored. A first set of five patterns are generated by scanning a genuine 10 DM bill 1400 in the forward direction along laterally displaced segments all beginning a predetermined distance $D_6$ inboard of the leading edge of the bill 1400. Each of these five laterally displaced segments is centered about a respective one of lines $L_1$–$L_5$. One such segment $S10_1$ centered about line $L_1$ is illustrated in FIG. 54a. Line $L_1$ is disposed down the center C of the bill 1400. In a preferred embodiment lines $L_2$–$L_5$ are disposed in a symmetrical fashion about the center C of the bill 1400. In a preferred embodiment lines $L_2$ and $L_3$ are laterally displaced from $L_1$ by a distance $D_7$ where $D_7$ is 0.24" (0.61 cm) and lines $L_4$ and $L_5$ are laterally displaced from $L_1$ by a distance $D_8$ where $D_8$ is 0.48" (1.22 cm).

A second set of five patterns are generated by scanning a genuine 10 DM bill 1400 in the forward direction along laterally displaced segments along lines $L_1$–$L_5$ all beginning at a second predetermined distance inboard of the leading edge of the bill 1400, the second predetermined distance being less than the predetermined distance $D_6$. One such segment $S10_2$ centered about line $L_1$ is illustrated in FIG. 54a. In a preferred embodiment the second predetermined distance is such that scanning begins one sample earlier than $D_6$, that is about 30 mils before the initiation of the patterns in the first set of five patterns.

A third set of five patterns are generated by scanning a genuine 10 DM bill 1400 in the forward direction along laterally displaced segments along lines $L_1$–$L_5$ all beginning at a third predetermined distance inboard of the leading edge of the bin 1400, the third predetermined distance being greater than the predetermined distance $D_6$. One such segment $S10_3$ centered about line $L_1$ is illustrated in FIG. 54a. In a preferred embodiment the third predetermined distance is such that scanning begins one sample later than $D_6$, that is about 30 mils after the initiation of the patterns in the first set of five patterns.

The above three sets of five patterns yield fifteen patterns in the forward direction. Fifteen additional 10 DM master patterns taken in the manner described above but in the reverse direction are also stored.

Figure 54B:
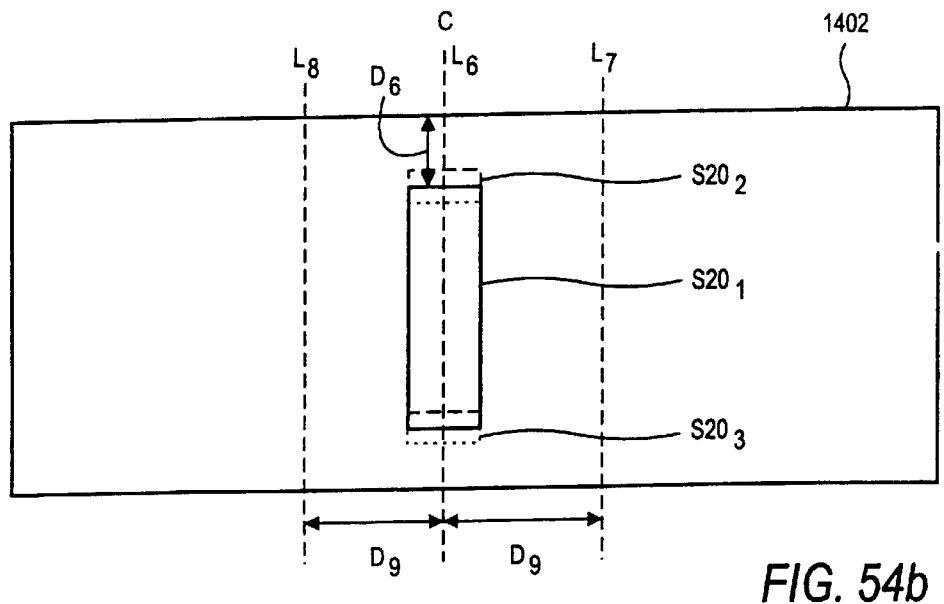
FIG. 54b illustrates the general areas scanned in generating master 20 DM, 50 DM, and 100 DM German patterns according to a preferred embodiment of the present invention.

FIG. 54b illustrates the general areas scanned in generating master 20 DM, 50 DM, and 100 DM German patterns. Due to the lengths of 20 DM, 50 DM, and 100 DM bills in their long dimension being shorter than the width of the transport path, eighteen 20 DM master patterns, eighteen 50 DM master patterns, and eighteen 100 DM master patterns are stored. The 50 DM master patterns and the 100 DM master patterns are taken in the same manner as the 20 DM master patterns except that the 50 DM master patterns and 100 DM master patterns are generated from respective genuine 50 DM bills and 100 DM bills while the 20 DM master patterns are generated from genuine 20 DM bills. Therefore, only the generation of the 20 DM master patterns will be described in detail.

A first set of three patterns are generated by scanning a genuine 20 DM bill 1402 in the forward direction along laterally displaced segments all beginning a predetermined distance $D_6$ inboard of the leading edge of the bill 1402. Each of these three laterally displaced segments is centered about a respective one of lines $L_6$–$L_8$. One such segment $S20_1$ centered about line $L_6$ is illustrated in FIG. 54b. Line $L_6$ is disposed down the center C of the bill 1402. In a preferred embodiment lines $L_7$–$L_8$ are disposed in a symmetrical fashion about the center C of the bill 1402. In a preferred embodiment lines $L_7$ and $L_8$ are laterally displaced from $L_6$ by a distance $D_9$ where $D_9$ is 0.30" (0.76 cm) for the 20 DM bill. The value of $D_9$ is 0.20" (0.51 m) for the 50 DM bill and 0.10" (0.25 cm) for the 100 DM bill.

A second set of three patterns are generated by scanning a genuine 20 DM bill 1402 in the forward direction along laterally displaced segments along lines $L_6$–$L_8$ all beginning at a second predetermined distance inboard of the leading edge of the bill 1402, the second predetermined distance being less than the predetermined distance $D_6$. One such segment $S20_2'$ centered about line $L_6$ is illustrated in FIG. 54b. In a preferred embodiment the second predetermined distance is such that scanning begins one sample earlier than $D_6$, that is about 30 mils before the initiation of the patterns in the first set of three patterns.

A third set of three patterns are generated by scanning a genuine 20 DM bill 1402 in the forward direction along laterally displaced segments along lines $L_6$–$L_8$ all beginning at a third predetermined distance inboard of the leading edge of the bill 1402, the third predetermined distance being greater than the predetermined distance $D_6$. One such segment $S20_3$ centered about line $L_6$ is illustrated in FIG. 54b. In a preferred embodiment the third predetermined distance is such that scanning begins one sample later than $D_6$, that is about 30 mils after the initiation of the patterns in the first set of three patterns.

The above three sets of three patterns yield nine patterns in the forward direction. Nine additional 20 DM master patterns taken in the manner described above but in the reverse direction are also stored. Furthermore, the above stored master patterns are generated either by scanning both a relatively new crisp genuine bill and an older yellowed genuine bill and averaging the patterns generated from each or, alternatively, by scanning an average looking bill.

This yields a total of 84 German master patterns (30 for 10 DM bills, 18 for 20 DM bills, 18 for 50 DM bills, and 18 for 100 DM bills). To reduce the number of master patterns that must compared to a given scanned pattern, the narrow dimension of a scanned bill is measured using photosensors 1212 and 1214. After a given bill has been scanned by the center scanhead 1202, the generated scanned pattern is correlated only against certain ones of above described 84 master patterns based on the size of the narrow dimension of the bill as determined by the photosensors 1212 and 1214. The narrow dimension of each bill is measured independently by photosensors 1212 and 1214 and then averaged to indicate the length of the narrow dimension of a bill. In particular, a first number of encoder pulses occur between the detection of the leading and trailing edges of a bill by the photosensor 1212. Likewise, a second number of encoder pulses occur between the detection of the leading and trailing edges of the bill by the photosensor 1214. These first and second numbers of encoder pulses are averaged to indicate the length of the narrow dimension of the bill in terms of encoder pulses.

The photosensors 1212 and 1214 can also determine the degree of skew of a bill as it passes by the triple scanhead arrangement 1200. By counting the number of encoder pulses between the time when photosensors 1212 and 1214 detect the leading edge of a bill, the degree of skew can be determined in terms of encoder pulses. If no or little skew is measured, a generated scanned pattern is only compared to master patterns associated with genuine bills having the same narrow dimension length. If a relatively large degree of skew is detected, a scanned pattern will be compared with master patterns associated with genuine bills having the next smaller denominational amount than would be indicated by the measured narrow dimension length.

Table 4 indicates which denominational set of master patterns are chosen for comparison to the scanned pattern based on the measured narrow dimension length in terms of encoder pulses and the measured degree of skew in terms of encoder pulses:

TABLE 4

| Narrow Dimension Length in Encoder Pulses | Degree of Skew in Encoder Pulses | Selected Set of Master Patterns |
| --- | --- | --- |
| <1515 | Not applicable | 10 DM |
| ≧1515 and <1550 | ≧175 | 10 DM |
| ≧1515 and <1550 | <175 | 20 DM |
| ≧1550 and <1585 | ≧300 | 10 DM |
| ≧1550 and <1585 | <300 | 20 DM |
| ≧1585 and <1620 | ≧200 | 20 DM |
| ≧1585 and <1620 | <200 | 50 DM |
| ≧1620 and <1655 | ≧300 | 20 DM |
| ≧1620 and <1655 | <300 | 50 DM |
| ≧1655 and <1690 | ≧150 | 50 DM |
| ≧1655 and <1690 | <150 | 100 DM |
| ≧1690 and <1725 | ≧300 | 50 DM |
| ≧1690 and <1725 | <300 | 100 DM |
| ≧1725 | Not applicable | 100 DM |

Figure 55:
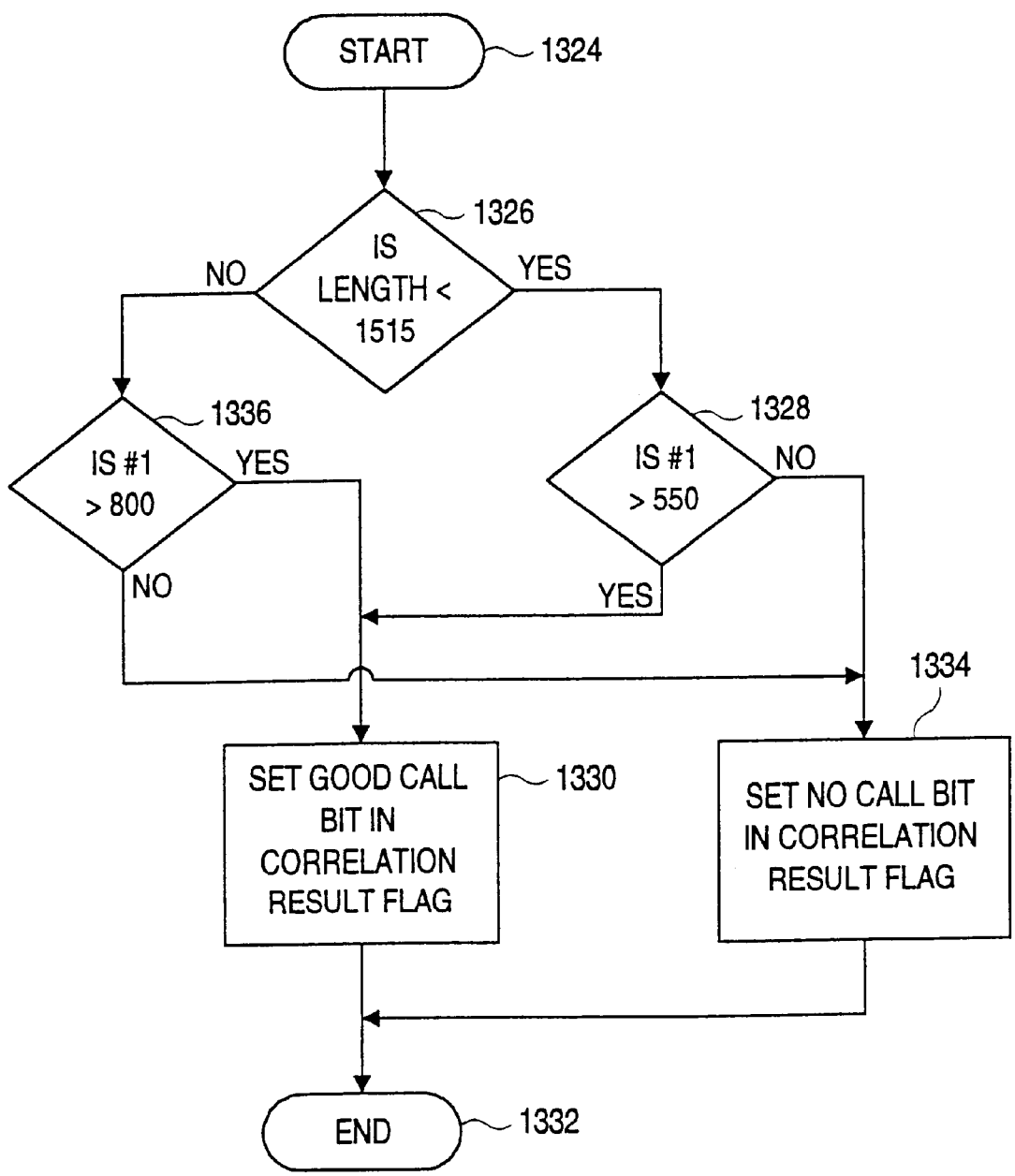
FIG. 55 is a flowchart of the threshold tests utilized in calling the denomination of a German bill.

FIG. 55 is a flowchart of the threshold test utilized in calling the denomination of a German bill. It should be understood that this threshold test compares the scanned bill pattern only to the set of master patterns selected in accordance with Table 4. Therefore, the selection made in accordance with Table 4 provides a preliminary indication as to the denomination of the scanned bill. The threshold test in FIG. 55, in effect, serves to confirm or overturn the preliminary indication given by Table 4.

The threshold test of FIG. 55 begins at step 1324. Step 1326 checks the narrow dimension length of the scanned bill in terms of encoder pulses. If the narrow dimension length is less than 1515 at step 1326, the preliminary indication is that the denomination of the scanned bill is a 10 DM bill. In order to confirm this preliminary indication, the #1 correlation is compared to 550 at step 1328. If the #1 correlation is greater than 550, the correlation number is sufficiently high to identify the denomination of the bill as a 10 DM bill. Accordingly, a "good call" bit is set in a correlation result flag at step 1330, and the system returns to the main program at step 1332. If, however, the #1 correlation is less than or equal to 550 at step 1328, the preliminary indication that the scanned bill is a 10 DM bill is effectively overturned. The system advances to step 1334 which sets a "no call" bit in the correlation result flag.

If step 1326 determines that the narrow dimension length is greater than or equal to 1515, a correlation threshold of 800 is required to confirm the preliminary denominational indication provided by Table 4. Therefore, if the #1 correlation is greater than 800 at step 1336, the preliminary indication provided by Table 4 is confirmed. To confirm the preliminary indication, the "good call" bit is set in the correlation result flag. If, however, the #1 correlation is less than or equal to 800 at step 1336, the preliminary indication is rejected and the "no call" bit in the correlation result flag is set at step 1334. The system then returns to the main program at step 1332.

Figure 56:
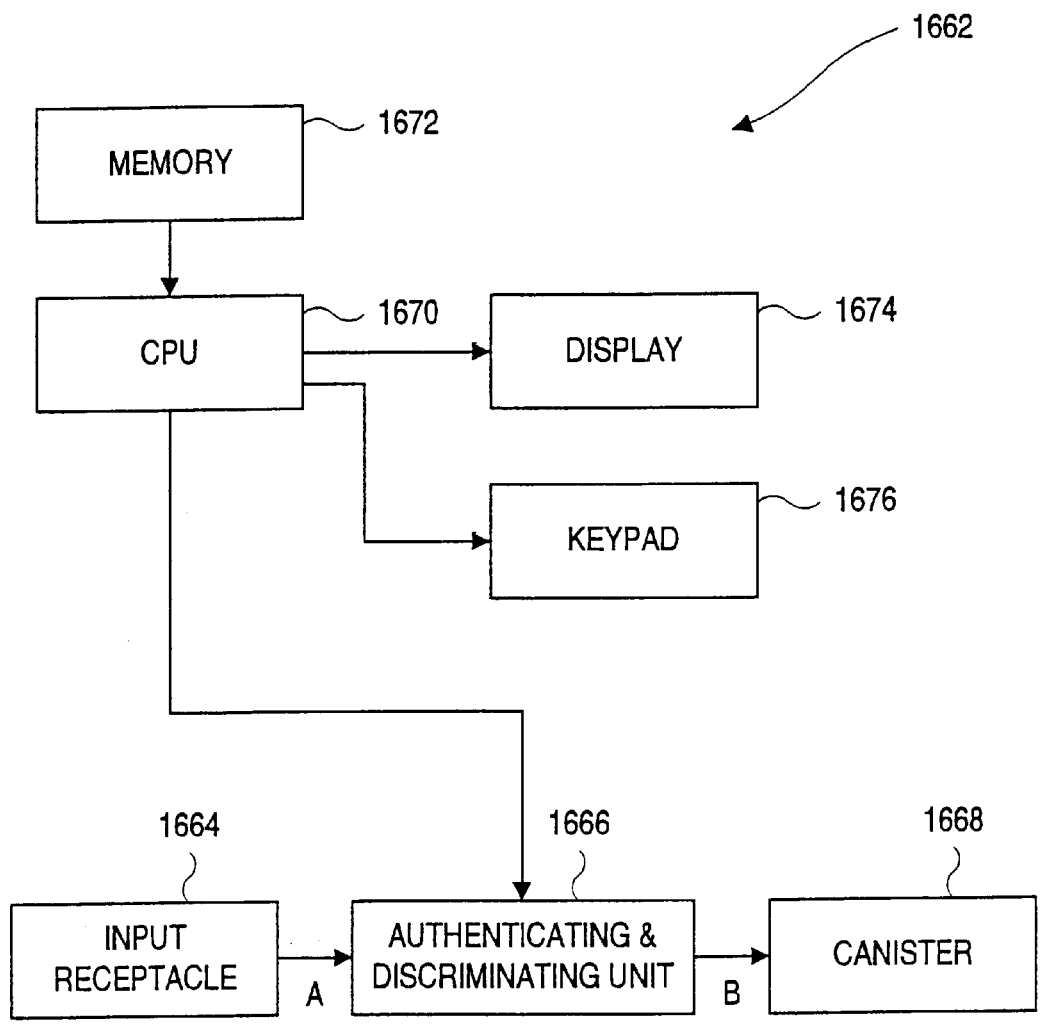
FIG. 56 is a functional block diagram illustrating a first embodiment of a document authenticator and discriminator.

FIG. 56 is a functional block diagram illustrating another embodiment of a currency discriminator system 1662. The discriminator system 1662 comprises an input receptacle 1664 for receiving a stack of currency bills. A transport mechanism (as represented by arrows A and B) transports the bills in the input receptacle past an authenticating and discriminating unit 1666 to a canister 1668 where the bills are re-stacked. In addition to determining the denomination of each scanned bill, the authenticating and discriminating unit 1666 may additionally include various authenticating tests such as the ultraviolet authentication test described below.

Signals from the authenticating and discriminating unit 1666 are sent to a signal processor such as a central processor unit ("CPU") 1670. The CPU 1670 records the results of the authenticating and discriminating tests in a memory 1672. When the authenticating and discriminating unit 1666 is able to confirm the genuineness and denomination of a bill, the value of the bill is added to a total value counter in memory 1672 that keeps track of the total value of the stack of bills that was inserted in the input receptacle 1664 and scanned by the authenticating and discriminating unit 1666. Additionally, depending on the mode of operation of the discriminator system 1662, counters associated with one or more denominations are maintained in the memory 1672. For example, a $1 counter may be maintained to record how many $1 bills were scanned by the authenticating and discriminating unit 1666. Likewise, a $5 counter may be maintained to record how many $5 bills were scanned, and so on. In an operating mode where individual denomination counters are maintained, the total value of the scanned bills may be determined without maintaining a separate total value counter. The total value of the scanned bills and/or the number of each individual denomination may be displayed on a display 1674 such as a monitor or LCD display.

As discussed above, a discriminating unit such as the authenticating and discriminating unit 1666 may not be able to identify the denomination of one or more bills in the stack of bills loaded into the input receptacle 1664. For example, if a bill is excessively worn or soiled or if the bill is torn, a discriminating unit may not be able to identify the bill. Furthermore, some known discrimination methods do not have a high discrimination efficiency and thus are unable to identify bills which vary even somewhat from an "ideal" bill condition or which are even somewhat displaced by the transport mechanism relative to the scanning mechanism used to discriminate bills. Accordingly, such poorer performing discriminating units may yield a relatively large number of bills which are not identified.

The discriminator system 1662 may be designed so that when the authenticating and discriminating unit is unable to identify a bill, the transport mechanism is altered to divert the unidentified bill to a separate storage canister. Such bills may be "flagged" or "marked" to indicate that the bill is a no call or suspect bill. Alternatively, the unidentified bill may be returned to the customer. The discriminator system 1662 may be designed to continue operation automatically when a bill is diverted from the normal transport path because the bill is a "no call" or a counterfeit suspect, or the system may be designed to require a selection element to be depressed. For example, upon examination of a returned bill the customer may conclude that the returned bill is genuine even though it was not identified by the discriminating unit. However, because the bill was not identified, the total value and/or denomination counters in the memory 1672 will not reflect its value. Nevertheless, the customer may wish to deposit the bill for subsequent verification by the bank.

Figure 57:
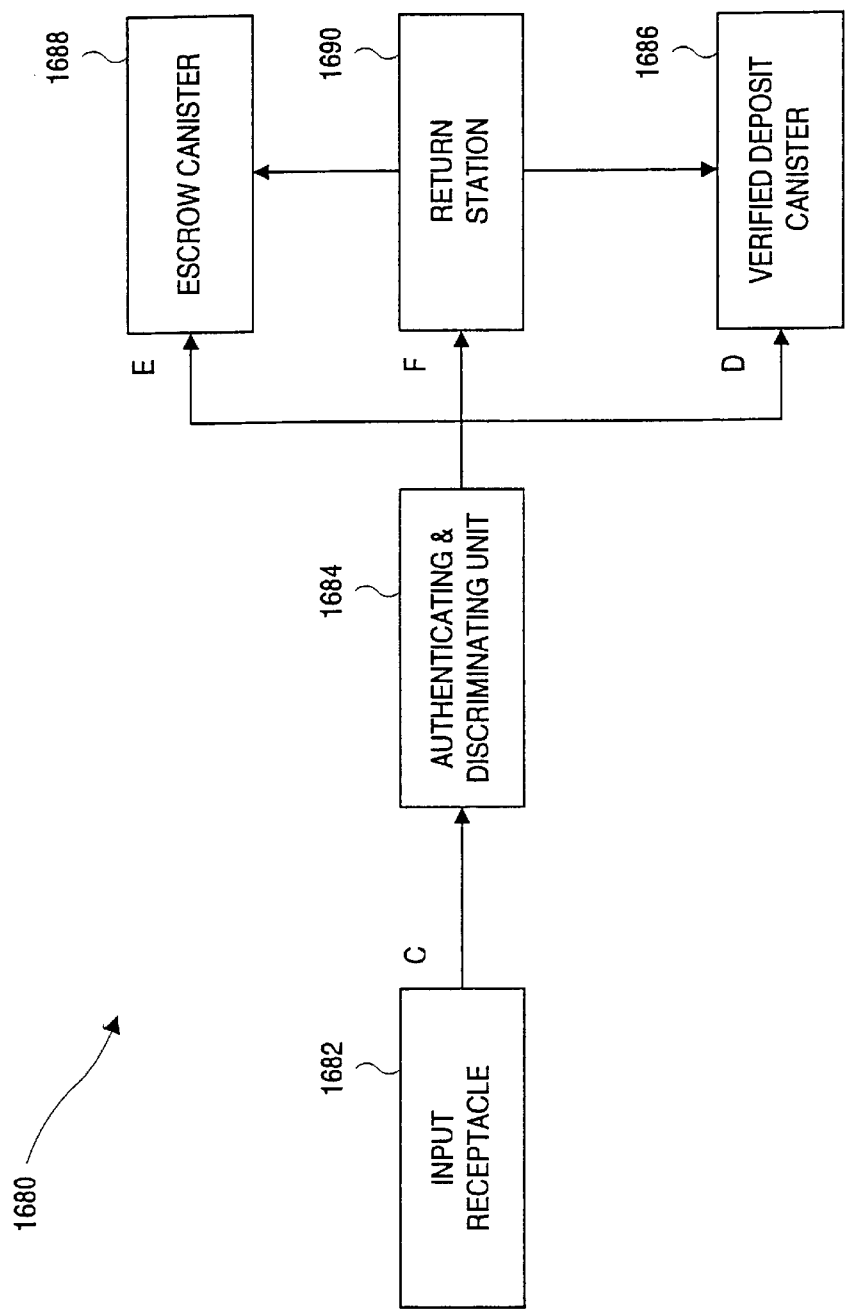
FIG. 57 is a functional block diagram illustrating a second embodiment of a document authenticator and discriminator.

Turning now to FIG. 57, there is shown a functional block diagram illustrating another embodiment of a document authenticator and discriminator according to the present invention. The discriminator system 1680 comprises an input receptacle 1682 for receiving a stack of currency bills. A transport mechanism (as represented by arrow C) transports the bills from the input receptacle, one at a time, past an authenticating and discriminating unit 1684. Based on the results of the authenticating and discriminating unit 1684, a bill is either transported to a verified-deposit canister 1686 (arrow D), to an escrow canister 1688 (arrow E), or to a return station 1690 (arrow F). When is bill is determined to be genuine and its denomination has been identified, the bill is transported to the verified-deposit canister 1686. Alternatively, where the authenticating and discriminating unit determines that a bill is a fake, the bill is immediately routed (arrow E) to the escrow canister 1688. Finally, if a bill is not determined to be fake but for some reason the authenticating and discriminating unit 1684 is not able to identify the denomination of the bill, the flagged bill is returned (arrow F) to the customer at station 1690. If the customer concludes that the bill is genuine, the customer may deposit the returned bill or bills in an envelope for later verification by the bank and crediting to the customer's account. The discriminator system 1680 then resumes operation, and the suspect bills in the deposit envelope are held for manual pick-up without incrementing the counters associated with the various denomination and/or the total value counters.

Figure 58A:
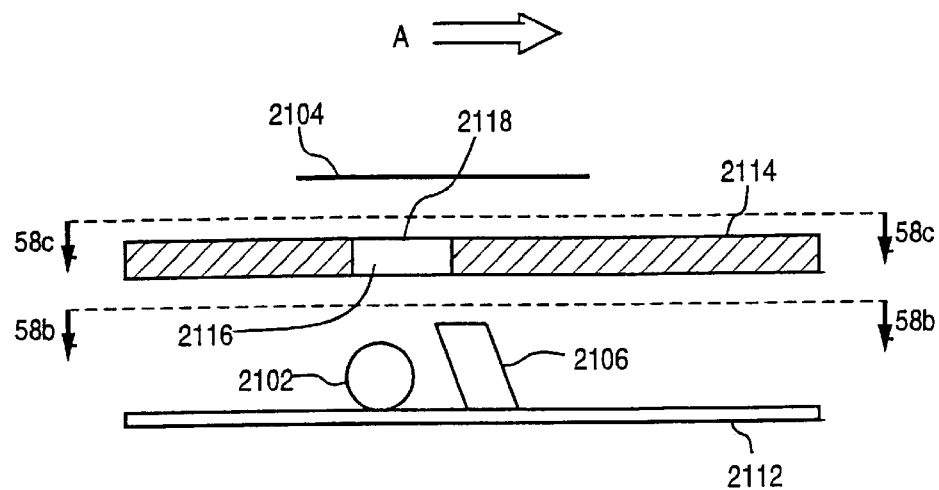
FIG. 58a is a side view of a document authenticating system utilizing ultraviolet light.
Figures 58B, 58C:
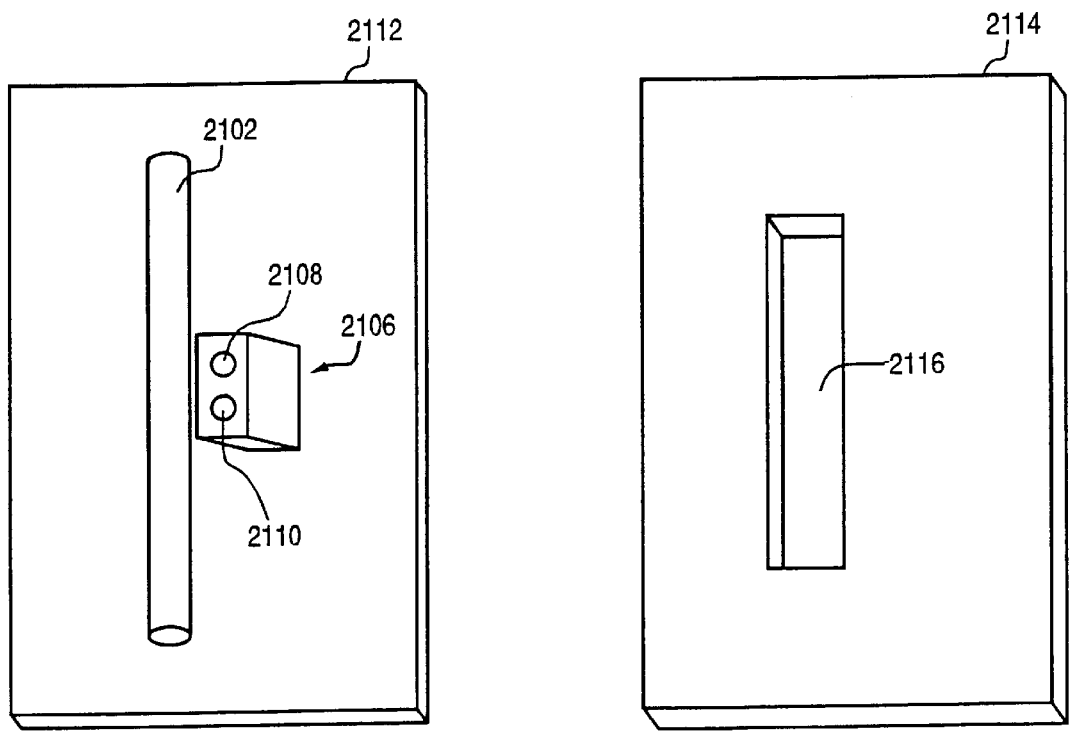
FIG. 58b is a top view of the system of FIG. 58a along the direction 58b.
FIG. 58c is a top view of the system of FIG. 58a along the direction 58c.

Referring now to FIGS. 58–58, there is shown a document authenticating system using ultraviolet ("UV") light. A UV light source 2102 illuminates a document 2104. Depending upon the characteristics of the document, ultraviolet light may be reflected off the document and/or fluorescent light may be emitted from the document. A detection system 2106 is positioned so as to receive any light reflected or emitted toward it but not to receive any UV light directly from the light source 2102. The detection system 2106 comprises a UV sensor 2108, a fluorescence sensor 2110, filters, and a plastic housing. The light source 2102 and the detection system 2106 are both mounted to a printed circuit board 2112. The document 2104 is transported in the direction indicated by arrow A by a transport system (not shown). The document is transported over a transport plate 2114 which has a rectangular opening 2116 in it to permit passage of light to and from the document. In a preferred embodiment, the rectangular opening 2116 is 1.375 inches (3.493 cm) by 0.375 inches (0.953 cm). To minimize dust accumulation onto the light source 2102 and the detection system 2106 and to prevent document jams, the opening 2116 is covered with a transparent UV-transmitting acrylic window 2118. To further reduce dust accumulation, the UV light source 2102 and the detection system 2106 are completely enclosed within a housing (not shown) comprising the transport plate 2114.

Figure 59:
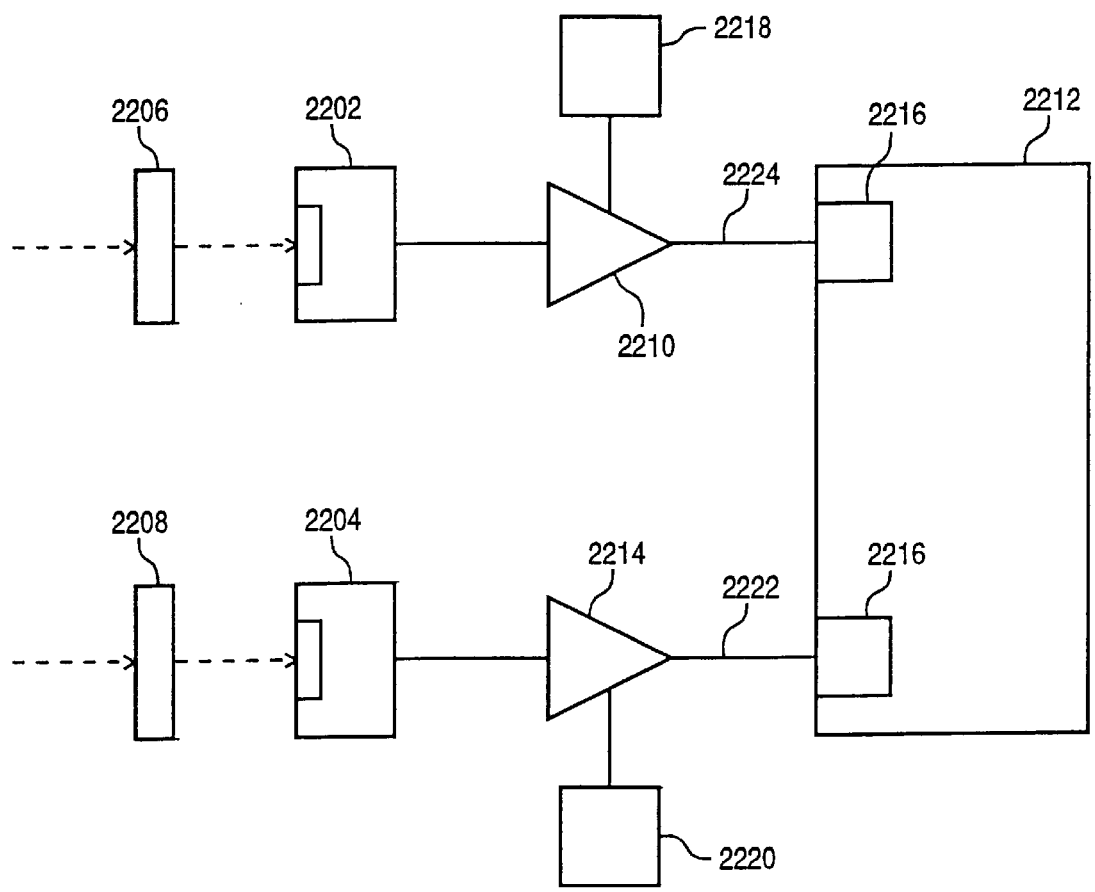
FIG. 59 is a functional block diagram of the optical and electronic components of the document authenticating system of FIGS. 58a–58c.

Referring now to FIG. 59, there is shown a functional block diagram illustrating a preferred embodiment of a UV authenticating system. FIG. 59 shows a UV sensor 2202, a fluorescence sensor 2204, and filters 2206, 2208 of a detection system such as the detection system 2106 of FIG. 59. Light from the document passes through the filters 2206, 2208 before striking the sensors 2202, 2204, respectively. An ultraviolet filter 2206 filters out visible light and permits UV light to be transmitted and hence to strike the UV sensor 2202. Similarly, a visible light filter 2208 filters out UV light and permits visible light to be transmitted and hence to strike fluorescence sensor 2204. Accordingly, UV light, which has a wavelength below 400 nm, is prevented from striking the fluorescence sensor 2204, and visible light, which has a wavelength greater than 400 nm, is prevented from striking the UV sensor 2202. In a preferred embodiment the UV filter 2206 transmits light having a wavelength between about 260 nm and about 380 nm and has a peak transmittance at 360 nm. In a preferred embodiment, the visible light filter 2208 is a blue filter and preferably transmits light having a wavelength between about 415 nm and about 620 nm and has a peak transmittance at 450 nm. The preferred blue filter comprises a combination of a blue component filter and a yellow component filter. The blue component filter transmits light having a wavelength between about 320 nm and about 620 nm and has a peak transmittance at 450 nm. The yellow component filter transmits light having a wavelength between about 415 nm and about 2800 nm. Examples of suitable filters are UG1 (UV filter), BG23 (blue bandpass filter), and GG420 (yellow longpass filter), all manufactured by Schott.

The UV sensor 2202 outputs an analog signal proportional to the amount of light incident thereon, and this signal is amplified by amplifier 2210 and fed to a microcontroller 2212. Similarly, the fluorescence sensor 2204 outputs an analog signal proportional to the amount of light incident thereon and this signal is amplified by amplifier 2214 and fed to a microcontroller 2212. Analog-to-digital converters 2216 within the microcontroller 2212 convert the signals from the amplifiers 2210, 2214 to digital and these digital signals are processed by the software of the microcontroller 2212. The UV sensor 2202 may be, for example, an ultraviolet enhanced photodiode sensitive to light having a wavelength of about 360 nm and the fluorescence sensor 2204 may be a blue enhanced photodiode sensitive to light having a wavelength of about 450 nm. Such photodiodes are available from, for example, Advanced Photonix, Inc., Massachusetts. The microcontroller 2212 may be, for example, a Motorola 68HC16.

The exact characteristics of the sensors 2202, 2204 and the filters 2206, 2208 including the wavelength transmittance ranges of the above filters are not as critical as the prevention of the fluorescence sensor from generating an output signal in response to ultraviolet light, and the prevention of the ultraviolet sensor from generating an output signal in response to visible light. For example, instead of, or in addition to, filters, the authentication system may employ an ultraviolet sensor which is not responsive to light having a wavelength longer than 400 nm and/or a fluorescence sensor which is not responsive to light having a wavelength shorter than 400 nm.

Calibration potentiometers 2218, 2220 permit the gains of amplifiers 2210, 2214 to be adjusted to appropriate levels. Calibration may be performed by positioning a piece of white fluorescent paper on the transport plate 2114 so that it completely covers the rectangular opening 2116. The potentiometers 2218, 2220 may then be adjusted so that the output of the amplifiers 2210, 2214 is 5 volts.

It has been determined that genuine United States currency reflects a high level of ultraviolet light and does not fluoresce under ultraviolet illumination. It has also been determined that under ultraviolet illumination counterfeit United States currency exhibits one of the four sets of characteristics listed below:

1) Reflects a low level of ultraviolet light and fluoresces;
2) Reflects a low level of ultraviolet light and does not fluoresce;
3) Reflects a high level of ultraviolet light and fluoresces;
4) Reflects a high level of ultraviolet light and does not fluoresce.

Counterfeit bills in categories (1) and (2) may be detected by a currency authenticator employing an ultraviolet light reflection test. Counterfeit bills in category (3) may be detected by a currency authenticator employing both an ultraviolet reflection test and a fluorescence test. Only counterfeits in category (4) are not detected by the authenticating methods of the present invention.

Fluorescence is determined by any signal that is above the noise floor. Thus, the amplified fluorescent sensor signal 2222 will be approximately 0 volts for genuine U.S. currency and will vary between approximately 0 and 5 volts for counterfeit bills, depending upon their fluorescence characteristics. Accordingly, an authenticating system will reject bills when signal 2222 exceeds approximately 0 volts.

A high level of reflected UV light ("high UV") is indicated when the amplified UV sensor signal 2224 is above a predetermined threshold. The high/low UV threshold is a function of lamp intensity and reflectance. Lamp intensity can degrade by as much as 50% over the life of the lamp and can be further attenuated by dust accumulation on the lamp and the sensors. The problem of dust accumulation is mitigated by enclosing the lamp and sensors in a housing as discussed above. The authenticating system tracks the intensity of the UV light source and readjusts the high/low threshold accordingly. The degradation of the UV light source may be compensated for by periodically feeding a genuine bill into the system, sampling the output of the UV sensor, and adjusting the threshold accordingly. Alternatively, degradation may be compensated for by periodically sampling the output of the UV sensor when no bill is present in the rectangular opening 2116 of the transport plate 2114. It is noted that a certain amount of UV light is always reflected off the acrylic window 2118. By periodically sampling the output of the UV sensor when no bill is present, the system can compensate for light source degradation. Furthermore, such sampling can also be used to indicate when the ultraviolet light source has burned out or otherwise requires replacement. This may be accomplished, for example, by means of a display reading or an illuminated light emitting diode ("LED"). The amplified ultraviolet sensor signal 2224 will initially vary between 1.0 and 5.0 volts depending upon the UV reflectance characteristics of the document being scanned and will slowly drift downward as the light source degrades. Alternatively, the sampling of the UV sensor output may be used to adjust the gain of the amplifier 2210, thereby maintaining the output of the amplifier 2210 at its initial levels.

It has been found that the voltage ratio between counterfeit and genuine U.S. bills varies from a discernable 2-to-1 ratio to a non-discernable ratio. Thus, a 2-to-1 ratio is used to discriminate between genuine and counterfeit bills. For example, if a genuine U.S. bill generates an amplified UV output sensor signal 2224 of 4.0 volts, documents generating an amplified UV output sensor signal 2224 of 2.0 volts or less will be rejected as counterfeit. As described above, this threshold of 2.0 volts may either be lowered as the light source degrades or the gain of the amplifier 2210 may be adjusted so that 2.0 volts remains an appropriate threshold value.

The determination of whether the level of UV reflected off a document is high or low is made by sampling the output of the UV sensor at a number of intervals, averaging the readings, and comparing the average level with the predetermined high/low threshold. Alternatively, a comparison may be made by measuring the amount of UV light reflected at a number of locations on the bill and comparing these measurements with those obtained from genuine bills. Alternatively, the output of one or more UV sensors may be processed to generate one or more patterns of reflected UV light and these patterns may be compared to the patterns generated by genuine bills.

In a similar manner, the presence of fluorescence may be determined by sampling the output of the fluorescence sensor at a number of intervals. However, a bill is rejected as counterfeit U.S. currency if any of the sampled outputs rise above the noise floor. The alternative methods discussed above with respect to processing the signal or signals of a UV sensor or sensors may also be employed, especially with respect to currencies of other countries or other types of documents which may employ as security features certain locations or patterns of fluorescent materials.

Figure 60:
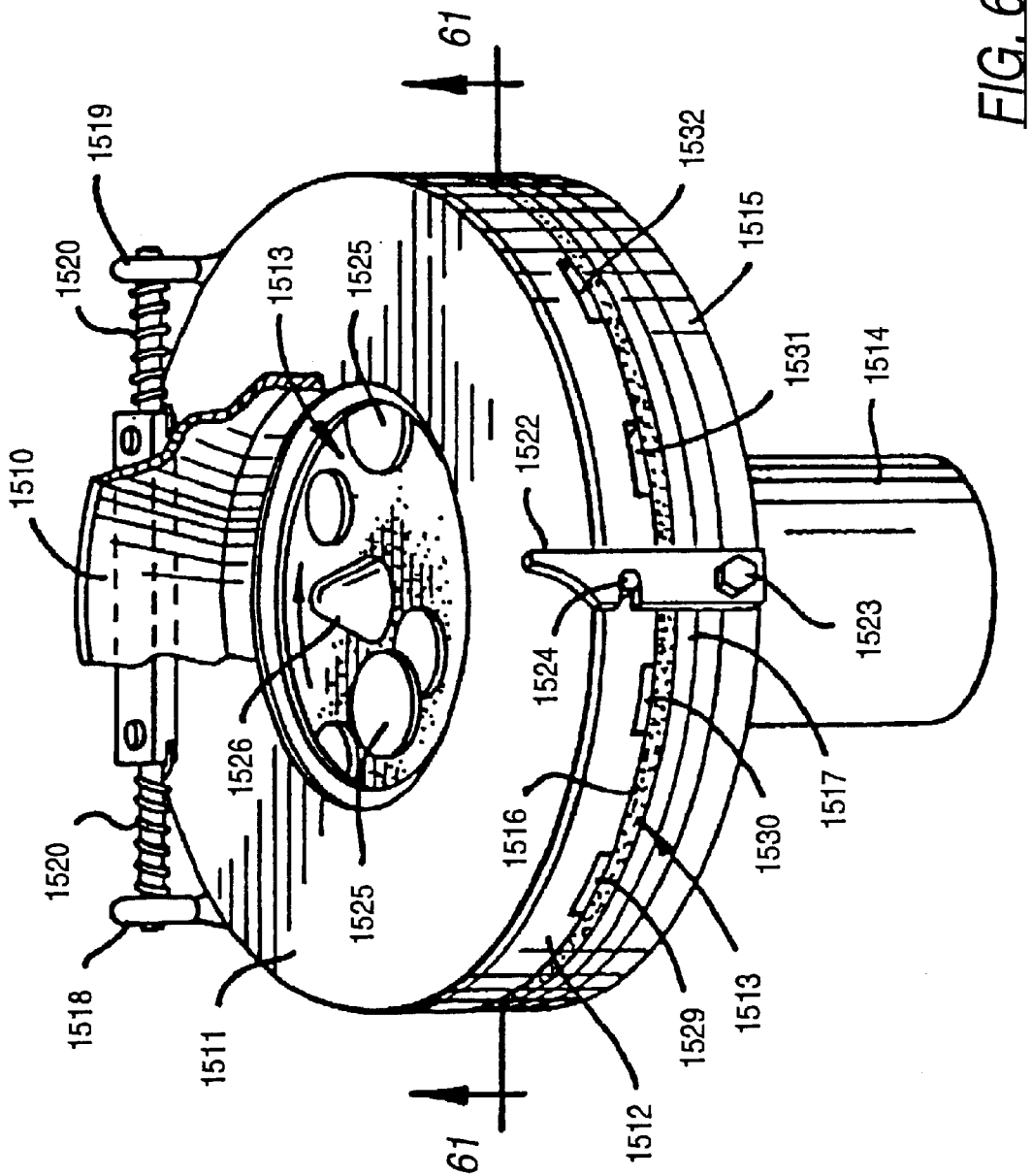
FIG. 60 is perspective view of a disc-type coin sorter embodying the present invention, with a top portion thereof broken away to show internal structure.

FIGS. 60–63 illustrate a disc-type coin sorter that uses a coin-driving member having a resilient surface for moving coins along a metal coin-guiding surface of a stationary coin-guiding member. The coin-driving member is a rotating disc, and the coin-guiding member is a stationary sorting head. As can be seen in FIG. 60, a hopper 1510 receives coins of mixed denominations and feeds them through central openings in a housing 1511 and a coin-guiding member in the form of an annular sorting head or guide plate 1512 inside or underneath the housing. As the coins pass through these openings, they are deposited on the top surface of a coin-driving member in the form of a rotatable disc 1513. This disc 1513 is mounted for rotation on a stub shaft (not shown) and driven by an electric motor 1514 mounted to a base plate 1515. The disc 1513 comprises a resilient pad 1516 bonded to the top surface of a solid metal disc 1517.

The top surface of the resilient pad 1516 is preferably spaced from the lower surface of the sorting head 1512 by a gap of about 0.005 inches (0.13 mm). The gap is set around the circumference of the sorting head 1512 by a three point mounting arrangement including a pair of rear pivots 1518, 1519 loaded by respective torsion springs 1520 which tend to elevate the forward portion of the sorting head. During normal operation, however, the forward portion of the sorting head 1512 is held in position by a latch 1522 which is pivotally mounted to the frame 1515 by a bolt 1523. The latch 1522 engages a pin 1524 secured to the sorting head. For gaining access to the opposing surfaces of the resilient pad 1516 and the sorting head, the latch is pivoted to disengage the pin 1524, and the forward portion of the sorting head is raised to an upward position (not shown) by the torsion springs 1520.

As the disc 1513 is rotated, the coins 1525 deposited on the top surface thereof tend to slide outwardly over the surface of the pad due to centrifugal force. The coins 1525, for example, are initially displaced from the center of the disc 1513 by a cone 1526, and therefore are subjected to sufficient centrifugal force to overcome their static friction with the upper surface of the disc. As the coins move outwardly, those coins which are lying flat on the pad enter the gap between the pad surface and the guide plate 1512 because the underside of the inner periphery of this plate is spaced above the pad 16 by a distance which is about the same as the thickness of the thickest coin. As further described below, the coins are sorted into their respective denominations, and the coins for each denomination issue from a respective exit slot, such as the slots 1527, 1528, 1529, 1530, 1531 and 1532 (see FIGS. 60 and 61) for dimes, pennies, nickels, quarters, dollars, and half-dollars, respectively. In general, the coins for any given currency are sorted by the variation in diameter for the various denominations.

Preferably most of the aligning, referencing, sorting, and ejecting operations are performed when the coins are pressed into engagement with the lower surface of the sorting head 1512. In other words, the distance between the lower surfaces of the sorting head 1512 with the passages conveying the coins and the upper surface of the rotating disc 1513 is less than the thickness of the coins being conveyed. As mentioned above, such positive control permits the coin sorter to be quickly stopped by braking the rotation of the disc 1513 when a preselected number of coins of a selected denomination have been ejected from the sorter. Positive control also permits the sorter to be relatively compact yet operate at high speed. The positive control, for example, permits the single file stream of coins to be relatively dense, and ensures that each coin in this stream can be directed to a respective exit slot.

Figure 61:
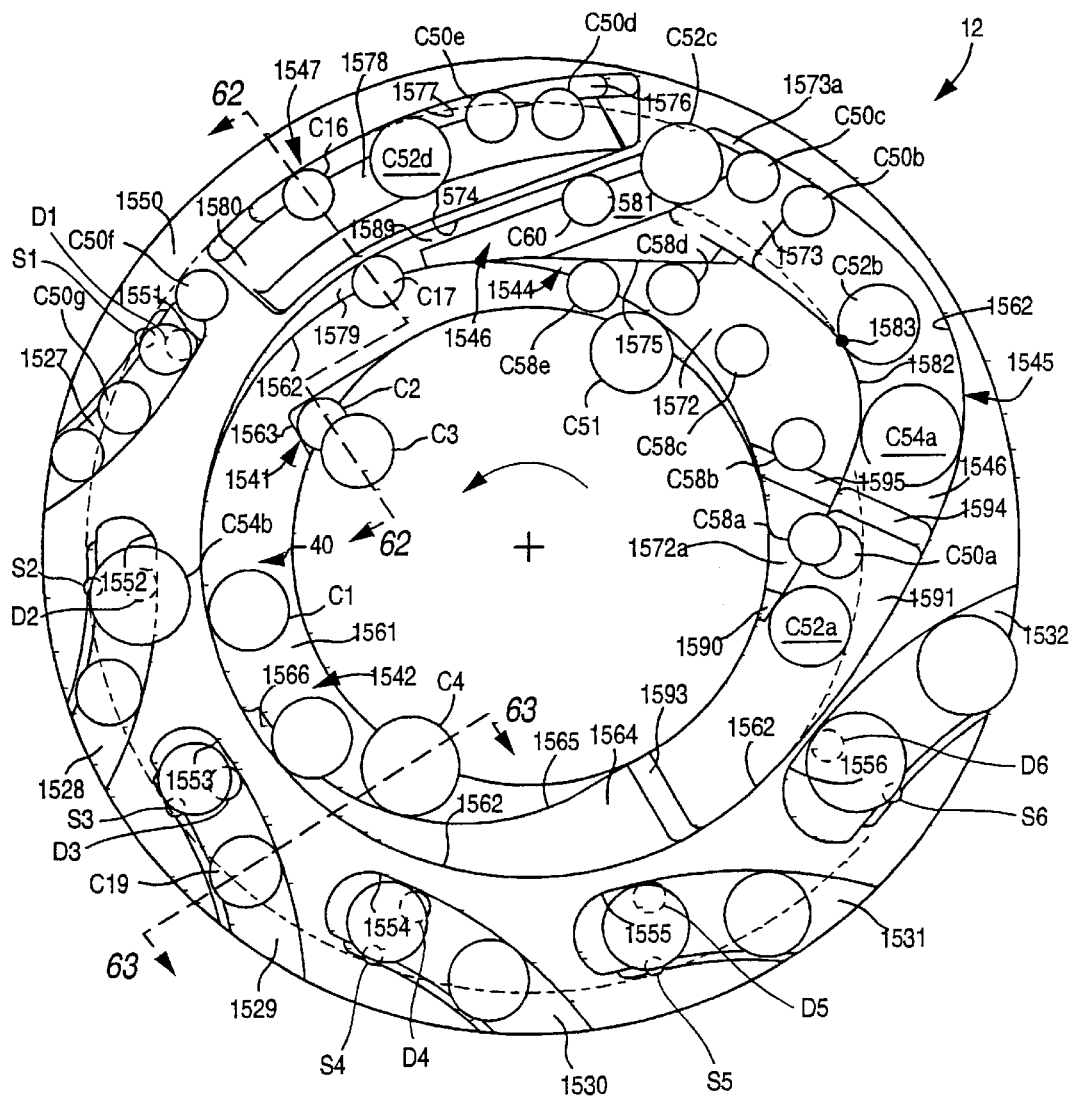
FIG. 61 is an enlarged horizontal section taken generally along line 61—61 in FIG. 60.

Turning now to FIG. 61, there is shown a bottom view of the preferred sorting head 1512 including various channels and other means especially designed for high-speed sorting with positive control of the coins, yet avoiding the galling problem. It should be kept in mind that the circulation of the coins, which is clockwise in FIG. 60, appears counterclockwise in FIG. 61 because FIG. 61 is a bottom view. The various means operating upon the circulating coins include an entrance region 1540, means 1541 for stripping "shingled" coins, means 1542 for selecting thick coins, first means 1544 for recirculating coins, first referencing means 1545 including means 1546 for recirculating coins, second referencing means 1547, and the exit means 1527, 1528, 1529, 1530, 1531 and 1532 for six different coin denominations, such as dimes, pennies, nickels, quarters, dollars and half-dollars. The lowermost surface of the sorting head 1512 is indicated by the reference numeral 1550.

Considering first the entrance region 1540, the outwardly moving coins initially enter under a semi-annular region underneath a planar surface 1561 formed in the underside of the guide plate or sorting head 1512. Coin C1, superimposed on the bottom plan view of the guide plate in FIG. 61 is an example of a coin which has entered the entrance region 1540. Free radial movement of the coins within the entrance region 1540 is terminated when they engage a wall 1562, though the coins continue to move circumferentially along the wall 1562 by the rotational movement of the pad 1516, as indicated by the central arrow in the counterclockwise direction in FIG. 61. To prevent the entrance region 1540 from becoming blocked by shingled coins, the planar region 1561 is provided with an inclined surface 1541 forming a wall or step 1563 for engaging the upper most coin in a shingled pair. In FIG. 61, for example, an upper coin C2 is shingled over a lower coin C3. As further shown in FIG. 62, movement of the upper coin C2 is limited by the wall 1563 so that the upper coin C2 is forced off of the lower coin C3 as the lower coin is moved by the rotating disc 1513.

Returning to FIG. 61, the circulating coins in the entrance region 1540, such as the coin Cl, are next directed to the means 1542 for selecting thick coins. This means 1542 includes a surface 1564 recessed into the sorting head 1512 at a depth of 0.070 inches (1.78 mm) from the lowermost surface 1550 of the sorting head. Therefore, a step or wall 1565 is formed between the surface 1561 of the entrance region 1540 and the surface 1564. The distance between the surface 1564 and the upper surface of the disc 1513 is therefore about 0.075 inches so that relatively thick coins between the surface 1564 and the disc 1513 are held by pad pressure. To initially engage such thick coins, an initial portion of the surface 1564 is formed with a ramp 1566 located adjacent to the wall 1562. Therefore, as the disc 1513 rotates, thick coins in the entrance region that are next to the wall 1562 are engaged by the ramp 1566 and thereafter their radial position is fixed by pressure between the disc and the surface 1564. Thick coins which fail to initially engage the ramp 1566, however, engage the wall 1565 and are therefore recirculated back within the central region of the sorting head. This is illustrated, for example, in FIG. 63 for the coin C4. This initial selecting and positioning of the thick coins prevents misaligned thick coins from hindering the flow of coins to the first referencing means 1545.

Returning now to FIG. 61, the ramp 1566 in the means 1542 for selecting the thick coins can also engage a pair or stack of thin coins. Such a stack or pair of thin coins will be carried under pad pressure between the surface 1564 and the rotating disc 1513. In the same manner as a thick coin, such a pair of stacked coins will have its radial position fixed and will be carried toward the first referencing means 1545. The first means 1545 for referencing the coins obtains a single-file stream of coins directed against the outer wall 1562 and leading up to a ramp 1573.

Coins are introduced into the referencing means 1545 by the thinner coins moving radially outward via centrifugal force, or by the thicker coin(s) C52a following concentricity via pad pressure. The stacked coins C58a and C50a are separated at the inner wall 1582 such that the lower coin C58a is carried against surface 1572a. The progression of the lower coin C58a is depicted by its positions at C58b, C58c, C58d, and C58e. More specifically, the lower coin C58 becomes engaged between the rotating disc 1513 and the surface 1572 in order to carry the lower coin to the first recirculating means 1544, where it is recirculated by the wall 1575 at positions C58d and C58e. At the beginning of the wall 1582, a ramp 1590 is used to recycle coins not fully between the outer and inner walls 1562 and 1582 and under the sorting head 1512. As shown in FIG. 61, no other means is needed to provide a proper introduction of the coins into the referencing means 1545.

The referencing means 1545 is further recessed over a region 1591 of sufficient length to allow the coins C54 of the widest denomination to move to the outer wall 1562 by centrifugal force. This allows coins C54 of the widest denomination to move freely into the referencing means 1545 toward its outer wall 1562 without being pressed between the resilient pad 1516 and the sorting head 1512 at the ramp 1590. The inner wall 1582 is preferably constructed to follow the contour of the recess ceiling. The region 1591 of the referencing recess 1545 is raised into the head 1512 by ramps 1593 and 1594, and the consistent contour at the inner wall 1582 is provided by a ramp 1595.

The first referencing means 1545 is sufficiently deep to allow coins C50 having a lesser thickness to be guided along the outer wall 1562 by centrifugal force, but sufficiently shallow to permit coins C52, C54 having a greater thickness to be pressed between the pad 1516 and the sorting head 1512, so that they are guided along the inner wall 1582 as they move through the referencing means 1545. The referencing recess 1545 includes a section 1596 which bends such that coins C52, which are sufficiently thick to be guided by the inner wall 1582 but have a width which is less than the width of the referencing recess 1545, are carried away from the inner wall 1582 from a maximum radial location 1583 on the inner wall toward the ramp 1573.

This configuration in the sorting head 1512 allows the coins of all denominations to converge at a narrow ramped finger 1573a on the ramp 1573, with coins C54 having the largest width being carried between the inner and outer walls via the surface 1596 to the ramped finger 1573a so as to bring the outer edges of all coins to a generally common radial location. By directing the coins C50 radially inward along the latter portion of the outer wall 1562, the probability of coins being offset from the outer wall 1562 by adjacent coins and being led onto the ramped finger 1573a is significantly reduced. Any coins C50 which are slightly offset from the outer wall 1562 while being led onto the ramp finger 1573a may be accommodated by moving the edge 1551 of exit slot 1527 radially inward, enough to increase the width of the slot 1527 to capture offset coins C50 but to prevent the capture of coins of the larger denominations. For sorting Dutch coins, the width of the ramp finger 1573a may be about 0.140 inch. At the terminal end of the ramp 1573, the coins become firmly pressed into the pad 16 and are carried forward to the second referencing means 1547.

A coin such as the coin C50c will be carried forward to the second referencing means 1547 so long as a portion of the coin is engaged by the narrow ramped finger 1573a on the ramp 1573. If a coin is not sufficiently close to the wall 1562 so as to be engaged by this ramped finger 1573a, then the coin strikes a wall 1574 defined by the second recirculating means 1546, and that coin is recirculated back to the entrance region 1540.

The first recirculating means 1544, the second recirculating means 1546 and the second referencing means 1547 are defined at successive positions in the sorting head 1512. It should be apparent that the first recirculating means 1544, as well as the second recirculating means 1546, recirculate the coins under positive control of pad pressure. The second referencing means 1547 also uses positive control of the coins to align the outer most edge of the coins with a gaging wall 1577. For this purpose, the second referencing means 1547 includes a surface 1576, for example, at 0.110 inches (1.27 mm) from the bottom surface of the sorting head 1512, and a ramp 1578 which engages the inner edge portions of the coins, such as the coin C50d.

Figure 62:
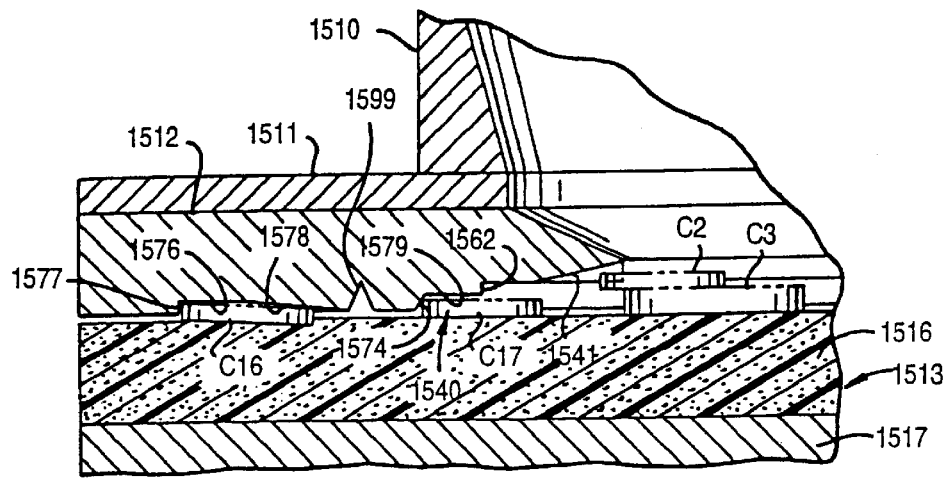
FIG. 62 is an enlarged section taken generally along line 62—62 in FIG. 61, showing the coins in full elevation.
Figure 63:
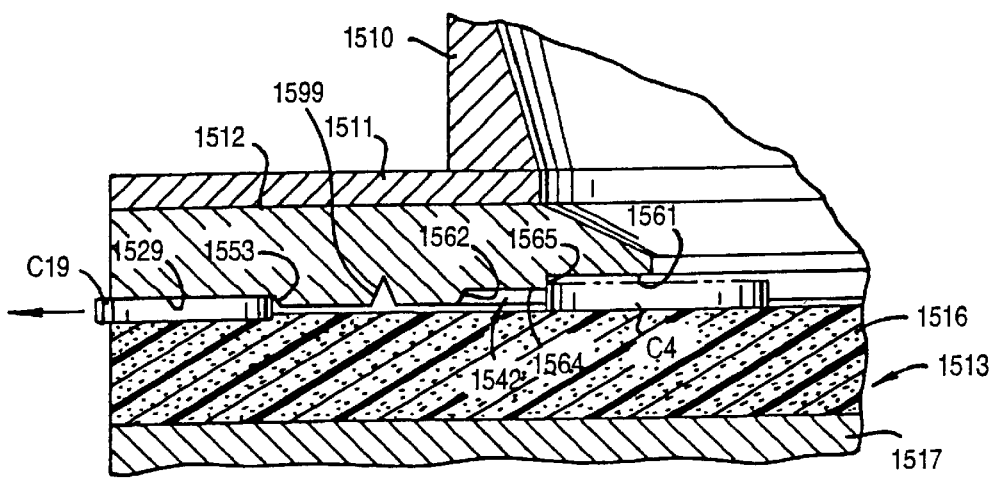
FIG. 63 is an enlarged section taken generally along line 63—63 in FIG. 61, showing in full elevation a nickel registered with an ejection recess.

As best shown in FIG. 61, the initial portion of the gaging wall 1577 is along a spiral path with respect to the center of the sorting head 1512 and the sorting disc 1513, so that as the coins are positively driven in the circumferential direction by the rotating disc 1513, the outer edges of the coins engage the gaging wall 1577 and are forced slightly radially inward to a precise gaging radius, as shown for the coin C16 in FIG. 62. FIG. 62 further shows a coin C17 having been ejected from the second recirculating means 1546.

Referring back to FIG. 61, the second referencing means 1547 terminates with a slight ramp 1580 causing the coins to be firmly pressed into the pad 1516 on the rotating disc with their outer most edges aligned with the gaging radius provided by the gaging wall 1577. At the terminal end of the ramp 1580 the coins are gripped between the guide plate 1512 and the resilient pad 1516 with the maximum compressive force. This ensures that the coins are held securely in the new radial position determined by the wall 1577 of the second referencing means 1547.

The sorting head 1512 further includes sorting means comprising a series of ejection recesses 1527, 1528, 1529, 1530, 1531 and 1532 spaced circumferentially around the outer periphery of the plate, with the innermost edges of successive slots located progressively farther away from the common radial location of the outer edges of all the coins for receiving and ejecting coins in order of increasing diameter. The width of each ejection recess is slightly larger than the diameter of the coin to be received and ejected by that particular recess, and the surface of the guide plate adjacent the radially outer edge of each ejection recess presses the outer portions of the coins received by that recess into the resilient pad so that the inner edges of those coins are tilted upwardly into the recess. The ejection recesses extend outwardly to the periphery of the guide plate so that the inner edges of these recesses guide the tilted coins outwardly and eventually eject those coins from between the guide plate 1512 and the resilient pad 1516.

The innermost edges of the ejection recesses are positioned so that the inner edge of a coin of only one particular denomination can enter each recess; the coins of all other remaining denominations extend inwardly beyond the innermost edge of that particular recess so that the inner edges of those coins cannot enter the recess.

For example, the first ejection recess 1527 is intended to discharge only dimes, and thus the innermost edge 1551 of this recess is located at a radius that is spaced inwardly from the radius of the gaging wall 1577 by a distance that is only slightly greater than the diameter of a dime. Consequently, only dimes can enter the recess 1527. Because the outer edges of all denominations of coins are located at the same radial position when they leave the second referencing means 1547, the inner edges of the pennies, nickels, quarters, dollars and half dollars all extend inwardly beyond the innermost edge of the recess 1527, thereby preventing these coins from entering that particular recess.

At recess 1528, the inner edges of only pennies are located close enough to the periphery of the sorting head 1512 to enter the recess. The inner edges of all the larger coins extend inwardly beyond the innermost edge 1552 of the recess 1528 so that they remain gripped between the guide plate and the resilient pad. Consequently, all the coins except the pennies continue to be rotated past the recess 1528.

Similarly, only nickels enter the ejection recess 1529, only the quarters enter the recess 1530, only the dollars enter the recess 1531, and only the half dollars enter the recess 1532.

Because each coin is gripped between the sorting head 1512 and the resilient pad 16 throughout its movement through the ejection recess, the coins are under positive control at all times. Thus, any coin can be stopped at any point along the length of its ejection recess, even when the coin is already partially projecting beyond the outer periphery of the guide plate. Consequently, no matter when the rotating disc is stopped (e.g., in response to the counting of a preselected number of coins of a particular denomination), those coins which are already within the various ejection recesses can be retained within the sorting head until the disc is re-started for the next counting operation.

One of six proximity sensors $S_1$–$S_6$ is mounted along the outboard edge of each of the six exit channels 1527–1532 in the sorting head for sensing and counting coins passing through the respective exit channels. By locating the sensors $S_1$–$S_6$ in the exit channels, each sensor is dedicated to one particular denomination of coin, and thus it is not necessary to process the sensor output signals to determine the coin denomination. The effective fields of the sensors $S_1$–$S_6$ are all located just outboard of the radius at which the outer edges of all coin denominations are gaged before they reach the exit channels 1527–1532, so that each sensor detects only the coins which enter its exit channel and does not detect the coins which bypass that exit channel. Only the largest coin denomination (e.g., U.S. half dollars) reaches the sixth exit channel 1532, and thus the location of the sensor in this exit channel is not as critical as in the other exit channels 1527–1531.

In addition to the proximity sensors $S_1$–$S_6$, each of the exit channels 1527–1532 also includes one of six coin discrimination sensors D1–D6. These sensors D1–D6 are the eddy current sensors, and will be described in more detail below in connection with FIGS. 64–67 of the drawings.

When one of the discrimination sensors detects a coin material that is not the proper material for coins in that exit channel, the disc may be stopped by de-energizing or disengaging the drive motor and energizing a brake. The suspect coin may then be discharged by jogging the drive motor with one or more electrical pulses until the trailing edge of the suspect coin clears the exit edge of its exit channel. The exact disc movement required to move the trailing edge of a coin from its sensor to the exit edge of its exit channel, can be empirically determined for each coin denomination and then stored in the memory of the control system. An encoder on the sorter disc can then be used to measure the actual disc movement following the sensing of the suspect coin, so that the disc can be stopped at the precise position where the suspect coin clears the exit edge of its exit channel, thereby ensuring that no coins following the suspect coin are discharged.

Turning now to FIGS. 64–67, one embodiment of the present invention employs an eddy current sensor 1710 to perform as the coin handling system's coin discrimination sensors D1–D6. The eddy current sensor 1710 includes an excitation coil 1712 for generating an alternating magnetic field used to induce eddy currents in a coin 1714. The excitation coil 1712 has a start end 1716 and a finish end 1718. An embodiment an a–c. excitation coil voltage $V_{ex}$, e.g., a sinusoidal signal of 250 KHz and 10 volts peak-to-peak, is applied across the start end 1716 and the finish end 1718 of the excitation coil 1712. The alternating voltage $V_{ex}$ produces a corresponding current in the excitation coil 1712 which in turn produces a corresponding alternating magnetic field. The alternating magnetic field exists within and around the excitation coil 1712 and extends outwardly to the coin 1714. The magnetic field penetrates the coin 1714 as the coin is moving in close proximity to the excitation coil 1712, and eddy currents are induced in the coin 1714 as the coin moves through the alternating magnetic field. The strength of the eddy currents flowing in the coin 1714 is dependent on the material composition of the coin, and particularly the electrical resistance of that material. Resistance affects how much current will flow in the coin 1614 according to Ohm's Law (voltage=current * resistance).

The eddy currents themselves also produce a corresponding magnetic field. A proximal detector coil 1722 and a distal coil 1724 are disposed above the coin 1714 so that the eddy current-generated magnetic field induces voltages upon the coils 1722, 1724. The distal detector coil 1724 is positioned above the coin 1714, and the proximal detector coil 1722 is positioned between the distal detector coil 1724 and the passing coin 1714.

In one embodiment, the excitation coil 1712, the proximal detector coil 1722 and the distal detector coil 1724 are all wound in the same direction (either clockwise or counterclockwise). The proximal detection coil 1722 and the distal detector coil 1724 are wound in the same direction so that the voltages induced on these coils by the eddy currents are properly oriented.

The proximal detection coil 1722 has a starting end 1726 and a finish end 1728. Similarly, the distal coil 1724 has a starting end 1730 and a finish end 1632. In order of increasing distance from the coin 1614, the detector coils 1722, 1724 are positioned as follows: finish end 1728 of the proximal detector coil 1722, start end 1726 of the proximal detector coil 1722, finish end 1732 of the distal detector coil 1724 and start end 1730 of the distal detector coil 1724. The finish end 1728 of the proximal detection coil 1722 is connected to the finish end 1732 of the distal detector coil 1724 via a conductive wire 1734. It will be appreciated by those skilled in the art that other detector coil 1722, 1724 combinations are possible. For example, in an alternative embodiment the proximal detection coil 1722 is wound in the opposite direction of the distal detection coil 1724. In this case the start end 1726 of the proximal coil 1722 is connected to the finish end 1732 of the distal coil 1724.

Eddy currents in the coin 1714 induce voltages $V_{prox}$ and $V_{dist}$ respectively on the detector coils 1722, 1724. Likewise, the excitation coil 1712 also induces a common-mode voltage $V_{com}$ on each of the detector coils 1722, 1724. The common-mode voltage $V_{com}$ is effectively the same on each detector coil due to the symmetry of the detector coils' physical arrangement within the excitation coil 1712. Because the detector coils 1722, 1724 are wound and physically oriented in the same direction and connected at their finish ends 1728, 1732, the common-mode voltage $V_{com}$ induced by the excitation coil 1712 is subtracted out, leaving only a difference voltage $V_{diff}$ corresponding to the eddy currents in the coin 1714. This eliminates the need for additional circuitry to subtract out the common-mode voltage $V_{com}$. The common-mode voltage $V_{com}$ is effectively subtracted out because both the distal detection coil 1724 and the proximal detection coil 1722 receive the same level of induced voltage $V_{com}$ from the excitation coil 1712.

Unlike the common-mode voltage, the voltages induced by the eddy current in the detector coils are not effectively the same. This is because the proximal detector coil 1722 is purposely positioned closer to the passing coin than the distal detector coil 1724. Thus, the voltage induced in the proximal detector coil 1722 is significantly stronger, i.e. has greater amplitude, than the voltage induced in the distal detector coil 1724. Although the present invention subtracts the eddy current-induced voltage on the distal coil 1724 from the eddy current-induced voltage on the proximal coil 1722, the voltage amplitude difference is sufficiently great to permit detailed resolution of the eddy current response.

Figure 64:
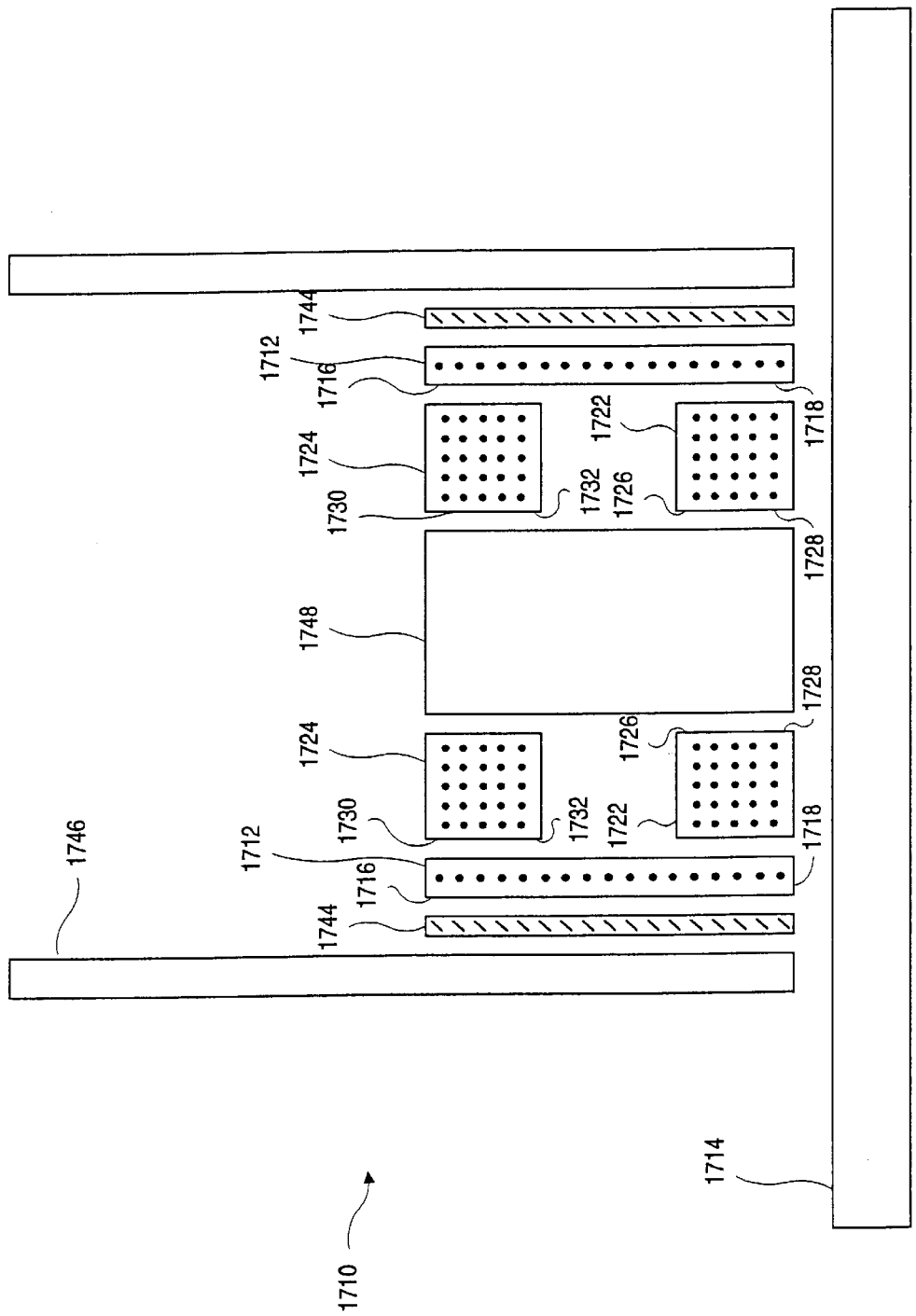
FIG. 64 is a diagrammatic cross-section of a coin and an improved coin discrimination sensor embodying the invention.
Figure 65:
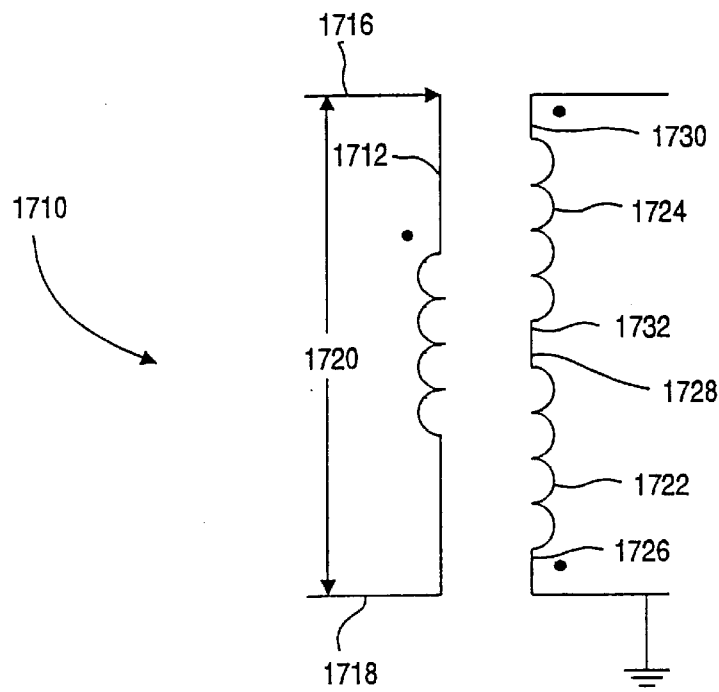
FIG. 65 is a schematic circuit diagram of the coin discrimination sensor of FIG. 64.
Figure 66:
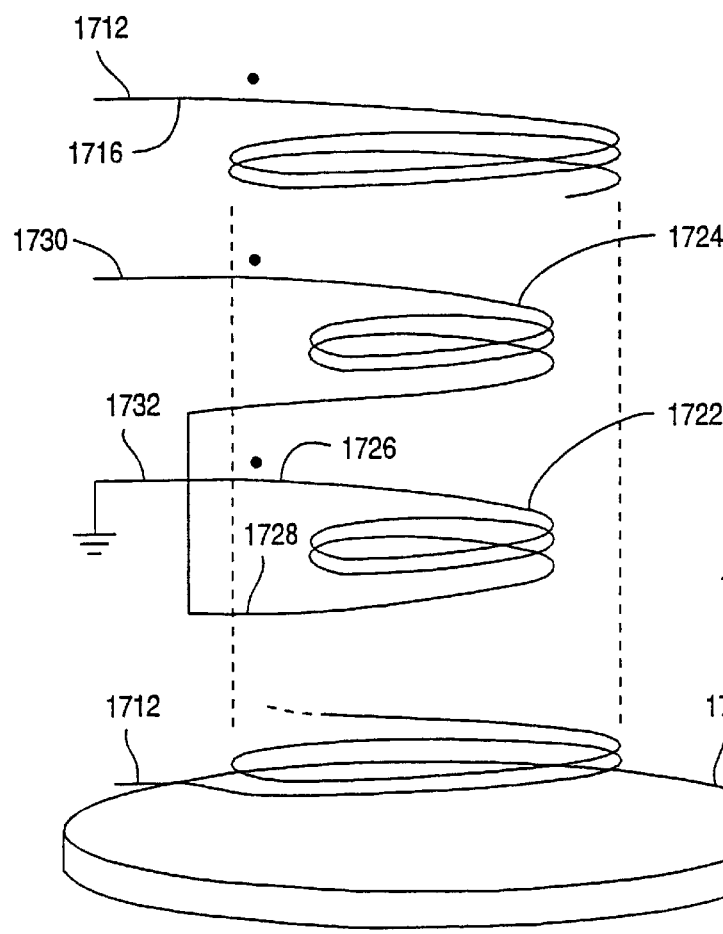
FIG. 66 is a diagrammatic perspective view of the coils in the coin discrimination sensor of FIG. 64.

As seen in FIG. 64, the excitation coil 1712 is radially surrounded by a magnetic shield 1734. The magnet shield 1734 has a high level of magnetic permeability in order to help contain the magnetic field surrounding the excitation coil 1712. The magnetic shield 1734 has the advantage of preventing stray magnetic field from interfering with other nearby eddy current sensors. The magnetic shield is itself radially surrounded by a steel outer case 1736.

In one embodiment the excitation coil utilizes a cylindrical ceramic (e.g., alumina) core 1738. Alumina has the advantages of being impervious to humidity and providing a good wear surface. It is desirable that the core 1748 be able to withstand wear because it may come into frictional contact with the coin 1714. Alumina withstands frictional contact well because of its high degree of hardness, i.e., approximately 9 on mohs scale.

To form the eddy current sensor 1510, the detection coils 1722, 1724 are wound on a coil form (not shown). A preferred form is a cylinder having a length of 0.5 inch, a maximum diameter of 0.2620 inch, a minimum diameter of 0.1660 inch, and two grooves of 0.060 inch width spaced apart by 0.060 inch and spaced from one end of the form by 0.03 inch. Both the proximal detection coil 1722 and the distal detector coil 1724 have 350 turns of #44 AWG enamel covered magnet wire layer wound to generally uniformly fill the available space in the grooves. Each of the detector coils 1722, 1724 are wound in the same direction with the finish ends 1728, 1732 being connected together by the conductive wire 1734. The start ends 1726, 1730 of the detector coils 1722, 1724 are connected to separately identified wires in a connecting cable.

The excitation coil 1712 is a generally uniformly layer wound on a cylindrical alumina ceramic coil form having a length of 0.5 inch, an outside diameter of 0.2750 inch, and a wall thickness of 0.03125 inch. The excitation coil 1712 is wound with 135 turns of #42 AWG enamel covered magnet wire in the same direction as the detector coils 1722, 1724. The excitation coil voltage $V_{ex}$ is applied across the start end 1716 and the finish end 1718.

After the excitation coil 1712 and detector coils 1722, 1724 are wound, the excitation coil 1712 is slipped over the detector coils 1722, 1724 around a common center axis. At this time the sensor 1710 is connected to a test oscillator (not shown) which applies the excitation voltage $V_{ex}$ to the excitation coil 1712. The excitation coil's position is adjusted along the axis of the coil to give a null response from the detector coils 1722, 1724 on an a–c. voltmeter with no metal near the coil windings.

Then the magnetic shield 1644 is the slipped over the excitation coil 1712 and adjusted to again give a null response from the detector coils 1722, 1724.

The magnetic shield 1744 and coils 1712, 1722, 1724 within the magnetic shield 1744 are then placed in the steel outer case 1746 and encapsulated with a polymer resin (not shown) to "freeze" the position of the magnetic shield 1744 and coils 1712, 1722, 1724.

After curing the resin, an end of the eddy current sensor 1710 nearest the proximal detector coil 1722 is sanded and lapped to produce a flat and smooth surface with the coils 1712, 1722 slightly recessed within the resin.

In order to detect the effect of the coin 1714 on the voltages induced upon the detector coils 1722, 1724, it is preferred to use a combination of phase and amplitude analysis of the detected voltage. This type of analysis minimizes the effects of variations in coin surface geometry and in the distance between the coin and the coils.

The voltage applied to the excitation coil 1712 causes current to flow in the coil 1712 which lags behind the voltage 1720. For example, the current may lag the voltage 1720 by 90 degrees in a superconductive coil. In effect, the coin's 1714 eddy currents impose a resistive loss on the current in the excitation coil 1712. Therefore, the initial phase difference between the voltage and current in the excitation coil 1712 is decreased by the presence of the coin 1714. Thus, when the detector coils 1724, 1726 have a voltage induced upon them, the phase difference between the voltage applied to the excitation coil 1712 and that of the detector coils is reduced due to the eddy current effect in the coin. The amount of reduction in the phase difference is proportional to the electrical and magnetic characteristics of the coin and thus the composition of the coin. By analyzing both the phase difference and the maximum amplitude, an accurate assessment of the composition of the coin is achieved.

Figure 67A:
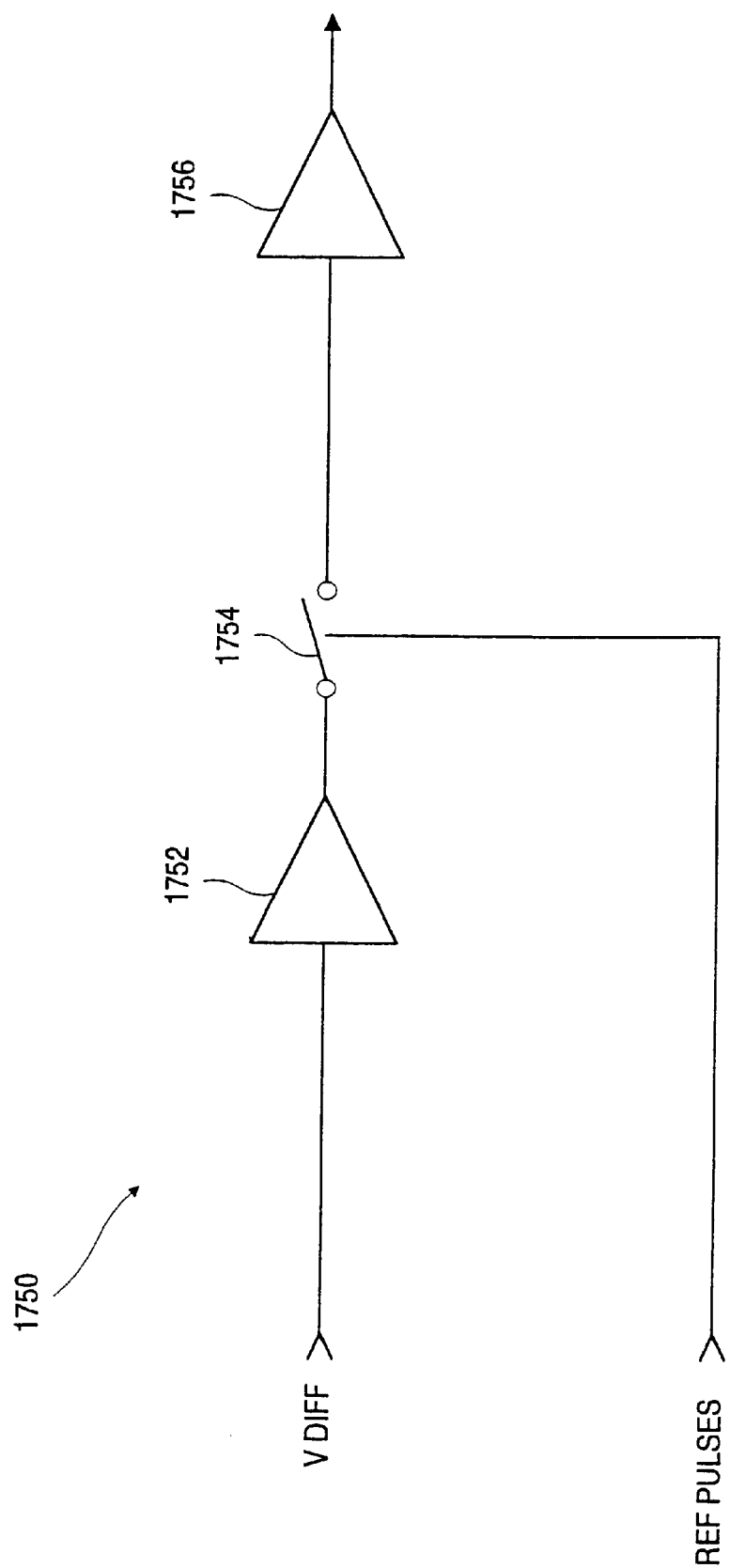
FIG. 67a is a circuit diagram of a detector circuit for use with the discrimination sensor of this invention.
Figure 67B:
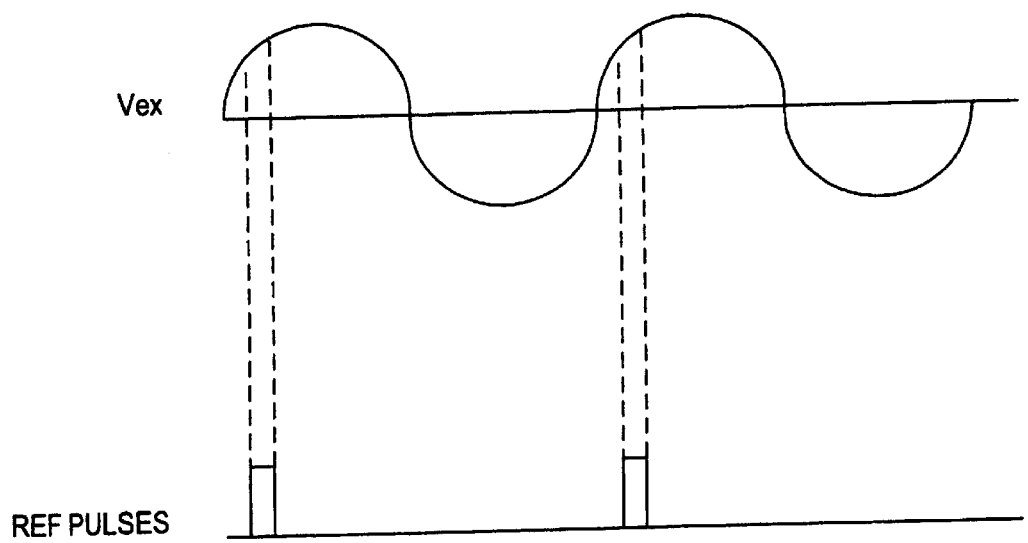
Figure 68:
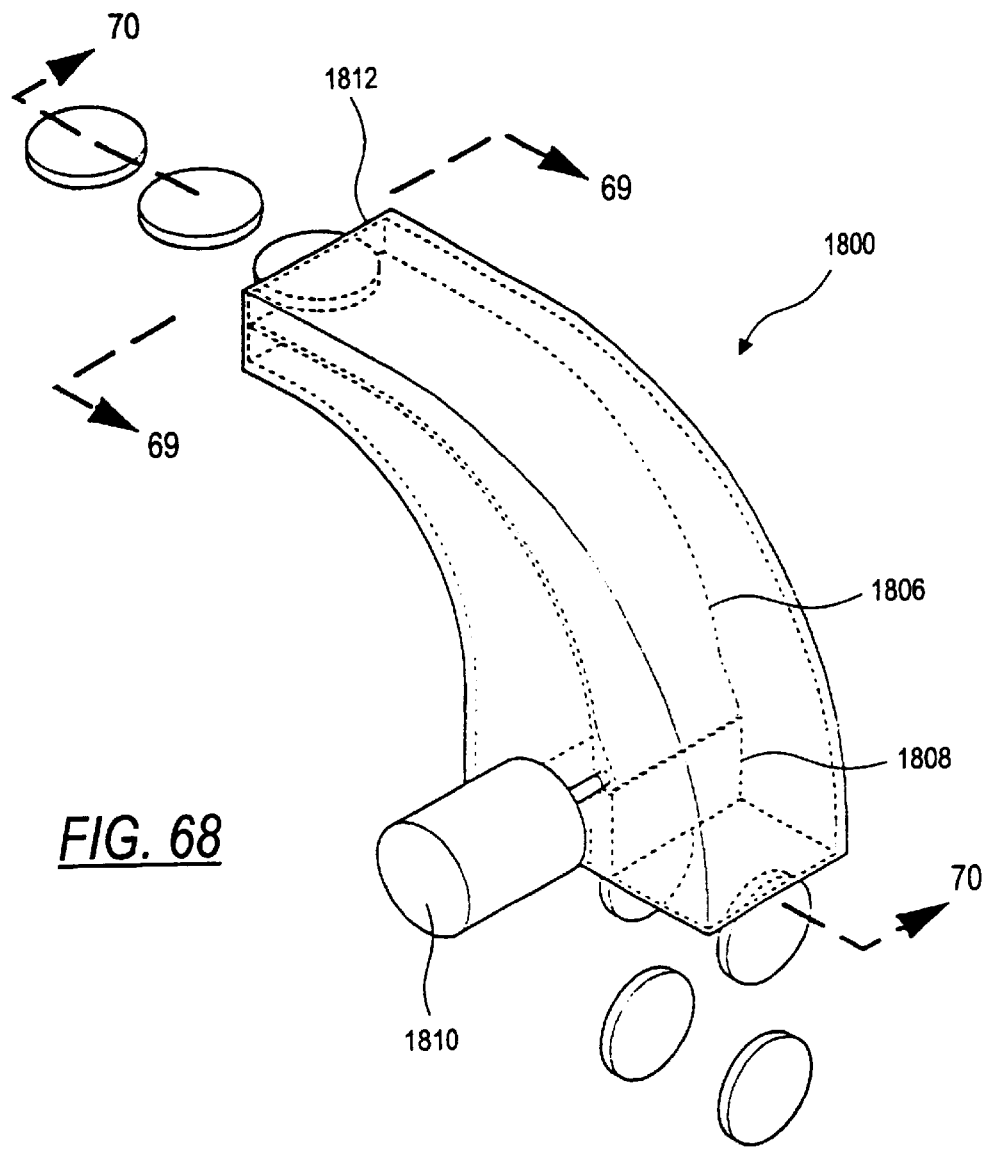
FIG. 68 is a perspective view of an outboard shunting device embodying the present invention.

FIGS. 67A and 67B illustrate a preferred phase-sensitive detector 1750 for sampling the differential output signal $V_{diff}$ from the two detector coils 1722, 1724. The differential output signal $V_{diff}$ is passed through a buffer amplifier 252 to a switch 1754, where the buffered $V_{diff}$ is sampled once per cycle by momentarily closing the switch 1754. The switch 1754 is controlled by a series of reference pulses produced from the $V_{ex}$ signal, one pulse per cycle. The reference pulses 1758 are synchronized with excitation voltage $V_{ex}$, so that the amplitude of the differential output signal $V_{diff}$ during the sampling interval is a function not only of the amplitude of the detector coil voltages 1736, 1738, but also of the phase difference between the signals in excitation coil 1712 and the detection coils 1736, 1738.

The pulses derived from $V_{ex}$ are delayed by an "offset angle" which can be adjusted to minimize the sensitivity of $V_{diff}$ to variations in the gap between the proximal face of the sensor 1710 and the surface of the coin 1714 being sensed. The value of the offset angle for any given coin can be determined empirically by moving a standard metal disc, made of the same material as the coin 1714, from a position where it contacts the sensor face, to a position where it is spaced about 0.001 to 0.020 inch from the sensor face. The signal sample from the detector 1750 is measured at both positions, and the difference between the two measurements is noted. This process is repeated at several different offset angles to determine the offset angle which produces the minimum difference between the two measurements.

Each time buffered $V_{diff}$ is sampled, the resulting sample is passed through a second buffer amplifier 1756 to an analog-to-digital converter (not shown). The resulting digital value is supplied to a microprocessor (not shown) which compares that value with several different ranges of values stored in a lookup table (not shown). Each stored range of values corresponds to a particular coin material, and thus the coin material represented by any given sample value is determined by the particular stored range into which the sample value falls. The stored ranges of values an be determined empirically by simply measuring a batch of coins of each denomination and storing the resulting range of values measured for each denomination.

If desired, the coin sorting and counting module 8 may be replaced with a coin discriminating module which does not sort the coins. Such a module would align the coins of all denominations in a single file and guide them past a single coin discrimination sensor to determine whether the coins are genuine. The coins of all denominations would then be discharged into a single storage receptacle and sorted at a later time. Coins that are detected to be non-genuine would be diverted and returned to the customer at the coin return station 4.

Figure 69:
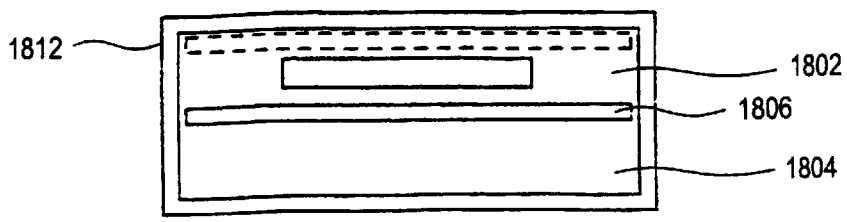
FIG. 69 is a section taken generally along line 69—69 in FIG. 68.
Figure 70:
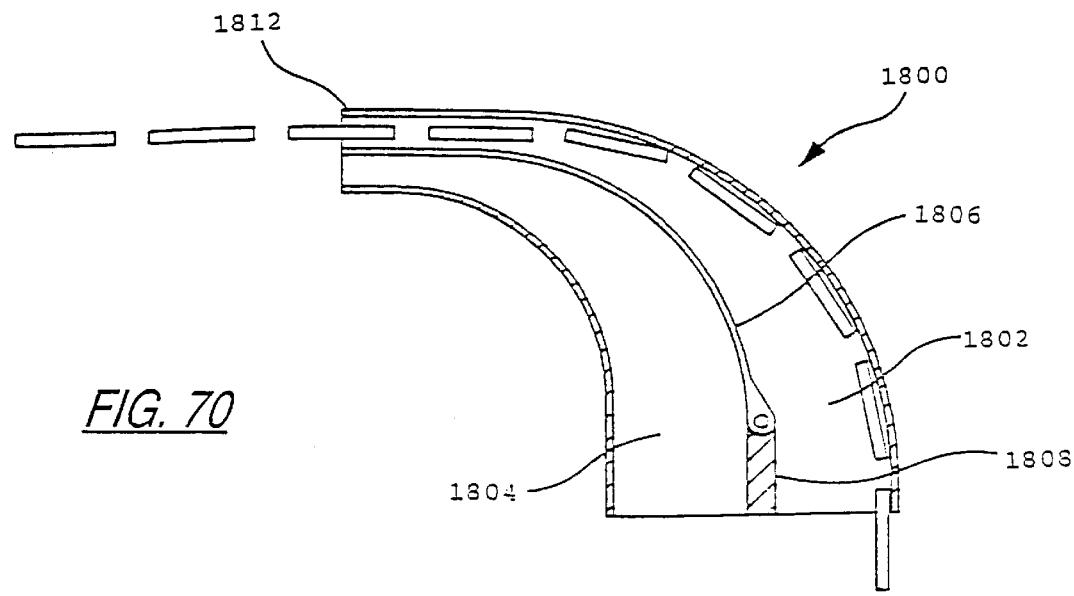
FIG. 70 is a section taken generally along line 70—70 in FIG. 68, showing a movable partition in a nondiverting position.
Figure 71:
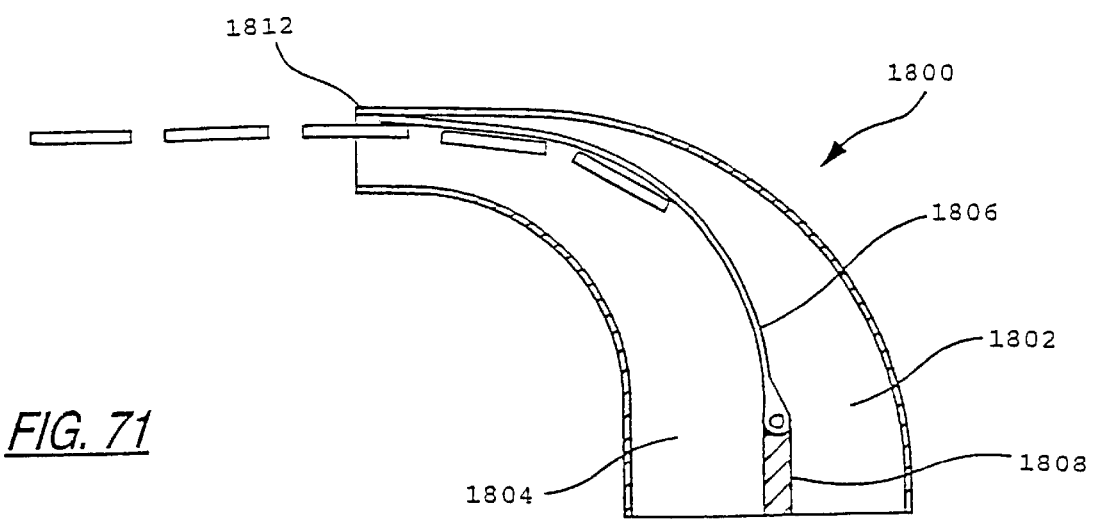
FIG. 71 is the same section illustrated in FIG. 70, showing the movable portion in a diverting position.

When an invalid coin is detected by one of the discriminating sensors described above, the invalid coin is separated from the valid coins and returned to the customer. In the illustrative module 8, this separation is effected outside the sorting disc by the shunting device illustrated in FIGS. 68–71. The curved exit chute 1800 includes two slots 1802, 1804 separated by an internal partition 1806. The internal partition 1806 is pivotally mounted to a stationary base 1808 so that the internal partition 1806 may be moved, perpendicular to the plane of the coins, by an actuator 1810 between an up position (FIG. 70) and a down position (FIG. 69). The exit chute 1800 is positioned adjacent an exit channel of the coin sorter such that coins exiting the coin sorter are guided into the slot 1802 when the internal partition 1806. is in the down position (FIG. 69). When an invalid coin is detected by the discriminating sensor D, the actuator 1810 moves the internal partition 1806 to the up position (FIG. 66) so that the invalid coin now enters the slot 1804 of the exit chute 1800. Coins entering the slot 1804 are discharged into the tube 9 that conveys those coins to the coin-return slot 4 at the front of the ATM. While FIGS. 67–70 illustrate only a single exit chute, it will be apparent that a similar exit chute is provided at each of the six coin exit locations around the circumference of the sorting disc.

The actuator 1810 moves the internal partition 1806 between the up and down positions in response to detection of invalid and valid coins. Thus, if the internal partition 1806 is in the down position and an invalid coin is detected, the partition 1806 is moved to the up position so that the invalid coin will be diverted into the slot 1804.

Alternatively, an invalid coin may be separated from the valid coins by use of inboard actuators in the sorting head, activated by signals derived from one or more sensors mounted in the sorting head upstream of the actuators. Such an arrangement is described in U.S. Pat. No. 5,299,977, which is incorporated herein by reference.

What is claimed is:

1. An automated deposit system comprising:
    a cash accounting system of a bank, the accounting system comprising a financial account associated with a bank customer, the accounting system maintaining the balance in the account of the bank customer; and an automatic teller machine, the automatic teller machine comprising:
- an input device for receiving information identifying an account to which currency to be deposited is to be credited;
- an input receptacle adapted to receive a stack of currency bills to be deposited in a deposit transaction;
- a bill denominating module adapted to determine the denomination of the bills to be deposited and determining the total value of the bills denominated by the bill denominating module;
- a control system for transferring the total value of the bills denominated to the cash accounting system;
- wherein the cash accounting system credits the identified account with the value of the bills denominated substantially immediately after the execution of the deposit transaction by the automatic teller machine.

2. The automated deposit system of claim 1 wherein said automatic teller machine denominates bills at a rate in excess of about 350 bills per minute.

3. The automated deposit system of claim 1 wherein said bill denominating module is further adapted to authenticate the genuineness of each bill.

4. The automated deposit system of claim 3 wherein said automatic teller machine alters the processing of a bill detected to be non-genuine.

5. An automated deposit system comprising:
- a cash accounting system of a bank, the accounting system comprising a financial account associated with a bank customer, the accounting system maintaining the balance in the account of the bank customer; and
- an automatic teller machine, the automatic teller machine comprising:
  - an input device for receiving information identifying an account to which currency to be deposited is to be credited and information declaring the value of currency to be deposited;
  - an input receptacle adapted to receive a stack of currency bills to be deposited;
  - a bill denominating module adapted to determine the denomination of the bills to be deposited and determining the total value of the bills denominated by the bill denominating module;
  - a memory for storing the value declared as being deposited and the total value of the bills denominated by the bill denominating module; and
  - a control system for transferring the value of the currency deposited to the cash accounting system if the declared value equals the denominated value;
- wherein the cash accounting system substantially immediately credits the identified account with the value of the currency deposited.

6. The automated deposit system of claim 5 wherein said automatic teller machine denominates bills at a rate in excess of about 350 bills per minute.

7. The automated deposit system of claim 5 wherein said bill denominating module is further adapted to authenticate the genuineness of each bill.

8. The automated deposit system of claim 7 wherein said automatic teller machine alters the processing of a bill detected to be non-genuine.

9. A method of depositing currency bills using an automated teller machine wherein the verified value of bills deposited is substantially immediately credited to a bank account comprising:
- receiving information at an automatic teller machine identifying a bank account to which currency to be deposited during a deposit transaction is to be credited;
- receiving in the automatic teller machine a stack of currency bills to be deposited into the bank account during the deposit transaction;
- automatically determining the denominations of the individuals bills in the stack and determining the total value of the bills in the stack;
- automatically transferring the total value of the bills deposited into the automatic teller machine during the deposit transaction to a cash accounting system associated with a bank, the accounting system comprising the bank account to which the currency is to be deposited, the accounting system maintaining the balance in the account; and
- automatically crediting the bank account with the total value of the bills in the stack substantially immediately after the execution of the deposit transaction by the automatic teller machine.

10. The method of claim 9 wherein sad determining the denominations of the individual bills is performed at a rate in excess of about 350 bills per minute.

11. The method of claim 9 further comprising authenticating the genuineness of each bill.

12. The method of claim 11 further comprising altering the processing of a bill detected to be non-genuine.

13. A method of depositing currency bills using an automated teller machine wherein the verified value of bills deposited is substantially immediately credited to a bank account comprising:
- receiving information at an automated teller machine identifying a bank account to which currency to be deposited during a deposit transaction is to be credited;
- receiving in the automatic teller machine a stack of currency bills to be deposited into the bank account during the deposit transaction;
- automatically determining the denominations of the individuals bills in the stack and determining the total value of the bills in the stack, the total value of the bills as automatically determined by the automatic teller machine being a verified cash deposit amount;
- automatically transferring the verified cash deposit amount for the deposit transaction from the automatic teller machine to a cash accounting system associated with a bank, the accounting system comprising the bank account to which the verified cash deposit amount is to be credited, the accounting system maintaining the balance in the bank account; and
- automatically crediting the bank account with the verified cash deposit amount substantially immediately after the execution of the deposit transaction by the automatic teller machine.

14. The method of claim 13 wherein said determining the denominations of the individual bills is performed at a rate in excess of about 350 bills per minute.

15. The method of claim 13 further comprising authenticating the genuineness of each bill.

16. The method of claim 15 further comprising altering the processing of a bill detected to be non-genuine.

17. A method of depositing currency bills using an automated teller machine wherein the verified value of bills deposited is substantially immediately credited to a bank account comprising:
- receiving information from a bank customer at an automated teller machine identifying a bank account to which currency to be deposited during a deposit transaction is to be credited;
- receiving in the automatic teller machine from the bank customer a stack of currency bills to be deposited into the bank account during the deposit transaction;

automatically determining the denominations of the individuals bills in the stack and determining the total value of the bills in the stack, the total value of the bills as automatically determined by the automatic teller machine being a verified cash deposit amount;

automatically transferring the verified cash deposit amount for the deposit transaction from the automatic teller machine to a cash accounting system associated with a bank, the accounting system comprising the bank account to which the verified cash deposit amount is to be credited, the accounting system maintaining the balance in the bank account; and automatically crediting the bank account with the verified cash deposit amount substantially immediately after the execution of the deposit transaction by the automatic tellers machine.

18. The method of claim 17 wherein said determining the denominations of the individual bills is performed at a rate in excess of about 350 bills per minute.

19. The method of claim 18 further comprising authenticating the genuineness of each bill.

20. The method of claim 19 further comprising altering the processing of a bill detected to be non-genuine.

21. A method of depositing currency bills using an automated teller machine wherein the verified value of bills deposited is substantially immediately credited to a bank account comprising:

receiving information from a bank customer at an automated teller machine identifying a bank account to which currency to be deposited during a deposit transaction is to be credited;

receiving in the automatic teller machine a declared cash deposit amount from the bank customer;

receiving in the automatic teller machine from the bank customer a stack of currency bills to be deposited into the bank account during the deposit transaction;

automatically determining the denominations of the individuals bills in the stack and determining the total value of the bills in the stack, the total value of the bills as automatically determined by the automatic teller machine being a verified cash deposit amount;

automatically determining whether the verified cash deposit amount coincides with the declared cash deposit amount;

if the verified cash deposit amount coincides with the declared cash deposit amount, automatically transferring the verified cash deposit amount for the deposit transaction from the automatic teller machine to a cash accounting system associated with a bank, the accounting system comprising the bank account to which the verified cash deposit amount is to be credited, the accounting system maintaining the balance in the bank account; and automatically crediting the bank account with the verified cash deposit amount substantially immediately after the execution of the deposit transaction by the automatic teller machine.

22. The method of claim 21 wherein said determining the denominations of the individual bills is performed at a rate in excess of about 350 bills per minute.

23. The method of claim 21 further comprising authenticating the genuineness of each bill.

24. The method of claim 23 further comprising altering the processing of a bill detected to be non-genuine.

25. An automated deposit system comprising:

a cash accounting system of a financial institution, the accounting system comprising a financial account associated with a financial institution customer, the accounting system maintaining the balance in the account of the financial institution customer; and an automatic teller machine, the automatic teller machine comprising:
an input device for receiving information identifying an account to which currency to be deposited is to be credited;
an input receptacle adapted to receive a stack of currency bills to be deposited in a deposit transaction;
a bill denominating module adapted to determine the denomination of the bills to be deposited and determining the total value of the bills denominated by the bill denominating module;
a control system for transferring the total value of the bills denominated to the cash accounting system;

wherein the cash accounting system credits the identified account with the value of the bills denominated substantially immediately after the execution of the deposit transaction by the automatic teller machine.

26. The automated deposit system of claim 25 wherein said automatic teller machine denominates bills at a rate in excess of about 350 bills per minute.

27. The automated deposit system of claim 25 wherein said bill denominating module is further adapted to authenticate the genuineness of each bill.

28. The automated deposit system of claim 27 wherein said automatic teller machine alters the processing of a bill detected to be non-genuine.

29. An automated deposit system comprising:

a cash accounting system of a financial institution, the accounting system comprising a financial account associated with a financial institution customer, the accounting system maintaining the balance in the account of the financial institution customer; and an automatic teller machine, the automatic teller machine comprising:
an input device for receiving information identifying an account to which currency to be deposited is to be credited and information declaring the value of currency to be deposited;
an input receptacle adapted to receive a stack of currency bills to be deposited;
a bill denominating module adapted to determine the denomination of the bills to be deposited and determining the total value of the bills denominated by the bill denominating module;
a memory for storing the value declared as being deposited and the total value of the bills denominated by the bill denominating module; and
a control system for transferring the value of the currency deposited to the cash accounting system if the declared value equals the denominated value;

wherein the cash accounting system substantially immediately credits the identified account with the value of the currency deposited.

30. The automated deposit system of claim 29 wherein said automatic teller machine denominates bills at a rate in excess of about 350 bills per minute.

31. The automated deposit system of claim 29 wherein said bill denominating module is further adapted to authenticate the genuineness of each bill.

32. The automated deposit system of claim 31 wherein said automatic teller machine alters the processing of a bill detected to be non-genuine.

33. A method of depositing currency bills using an automated teller machine wherein the verified value of bills deposited is substantially immediately credited to a financial account comprising:

receiving information at an automatic teller machine identifying a financial account to which currency to be deposited during a deposit transaction is to be credited;

receiving in the automatic teller machine a stack of currency bills to be deposited into the financial account during the deposit transaction;

automatically determining the denominations of the individuals bills in the stack and determining the total value of the bills in the stack;

automatically transferring the total value of the bills deposited into the automatic teller machine during the deposit transaction to a cash accounting system associated with a financial institution, the accounting system comprising the financial account to which the currency is to be deposited, the accounting system maintaining the balance in the account; and automatically crediting the financial account with the total value of the bills in the stack substantially immediately after the execution of the deposit transaction by the automatic teller machine.

34. The method of claim 33 wherein said determining the denominations of the individual bills is performed at a rate in excess of about 350 bills per minute.

35. The method of claim 33 further comprising authenticating the genuineness of each bill.

36. The method of claim 35 further comprising altering the processing of a bill detected to be non-genuine.

37. A method of depositing currency bills using an automated teller machine wherein the verified value of bills deposited is substantially immediately credited to a financial account comprising:

receiving information at an automated teller machine identifying a financial account to which currency to be deposited during a deposit transaction is to be credited;

receiving in the automatic teller machine a stack of currency bills to be deposited into the financial account during the deposit transaction;

automatically determining the denominations of the individuals bills in the stack and determining the total value of the bills in the stack, the total value of the bills as automatically determined by the automatic teller machine being a verified cash deposit amount;

automatically transferring the verified cash deposit amount for the deposit transaction from the automatic teller machine to a cash accounting system associated with a financial institution, the accounting system comprising the financial account to which the verified cash deposit amount is to be credited, the accounting system maintaining the balance in the financial account; and automatically crediting the financial account with the verified cash deposit amount substantially immediately after the execution of the deposit transaction by the automatic teller machine.

38. The method of claim 37 wherein said determining the denominations of the individual bills is performed at a rate in excess of about 350 bills per minute.

39. The method of claim 37 further comprising authenticating the genuineness of each bill.

40. The method of claim 39 further comprising altering the processing of a bill detected to be non-genuine.

41. A method of depositing currency bills using an automated teller machine wherein the verified value of bills deposited is substantially immediately credited to a financial account comprising:

receiving information from a financial institution customer at an automated teller machine identifying a financial account to which currency to be deposited during a deposit transaction is to be credited;

receiving in the automatic teller machine from the financial institution customer a stack of currency bills to be deposited into the financial account during the deposit transaction;

automatically determining the denominations of the individuals bills in the stack and determining the total value of the bills in the stack, the total value of the bills as automatically determined by the automatic teller machine being a verified cash deposit amount;

automatically transferring the verified cash deposit amount for the deposit transaction from the automatic teller machine to a cash accounting system associated with a financial institution, the accounting system comprising the financial account to which the verified cash deposit amount is to be credited, the accounting system maintaining the balance in the financial account; and automatically crediting the financial account with the verified cash deposit amount substantially immediately after the execution of the deposit transaction by the automatic teller machine.

42. The method of claim 41 wherein said determining the denominations of the individual bills is performed at a rate in excess of about 350 bills per minute.

43. The method of claim 42 further comprising authenticating the genuineness of each bill.

44. The method of claim 43 further comprising altering the processing of a bill detected to be non-genuine.

45. A method of depositing currency bills using an automated teller machine wherein the verified value of bills deposited is substantially immediately credited to a financial account comprising:

receiving information from a financial institution customer at an automated teller machine identifying a financial account to which currency to be deposited during a deposit transaction is to be credited;

receiving in the automatic teller machine a declared cash deposit amount from the financial institution customer;

receiving in the automatic teller machine from the financial institution customer a stack of currency bills to be deposited into the financial account during the deposit transaction;

automatically determining the denominations of the individuals bills in the stack and determining the total value of the bills in the stack, the total value of the bills as automatically determined by the automatic teller machine being a verified cash deposit amount;

automatically determining whether the verified cash deposit amount coincides with the declared cash deposit amount;

if the verified cash deposit amount coincides with the declared cash deposit amount, automatically transferring the verified cash deposit amount for the deposit transaction from the automatic teller machine to a cash accounting system associated with a financial institution, the accounting system comprising the financial account to which the verified cash deposit amount is to be credited, the accounting system maintaining the balance in the financial account; and automatically crediting the financial account with the verified cash deposit amount substantially immediately after the execution of the deposit transaction by the automatic teller machine.

46. The method of claim 45 wherein said determining the denominations of the individual bills is performed at a rate in excess of about 350 bills per minute.

47. The method of claim 45 further comprising authenticating the genuineness of each bill.

48. The method of claim 47 further comprising altering the processing of a bill detected to be non-genuine.

* * * * *